(12) United States Patent
Jo et al.

(10) Patent No.: US 12,421,893 B2
(45) Date of Patent: Sep. 23, 2025

(54) SYSTEMS AND METHODS FOR PROCESSING AMMONIA

(71) Applicant: AMOGY INC., Brooklyn, NY (US)

(72) Inventors: Young Suk Jo, Brooklyn, NY (US); Hyunho Kim, Brooklyn, NY (US); Gregory Robert Johnson, Annandale, NJ (US); Matthew Jacob Montgomery, Brooklyn, NY (US)

(73) Assignee: AMOGY INC., Brooklyn, NY (US)

( * ) Notice: Subject to any disclaimer, the term of this patent is extended or adjusted under 35 U.S.C. 154(b) by 0 days.

(21) Appl. No.: 18/638,363

(22) Filed: Apr. 17, 2024

(65) Prior Publication Data

US 2024/0280048 A1 Aug. 22, 2024

Related U.S. Application Data

(63) Continuation of application No. 18/454,638, filed on Aug. 23, 2023, now Pat. No. 11,994,062, which is a
(Continued)

(51) Int. Cl.
*F02C 3/30* (2006.01)
*B01J 8/00* (2006.01)
(Continued)

(52) U.S. Cl.
CPC ............... *F02C 3/30* (2013.01); *B01J 8/001* (2013.01); *B01J 8/0496* (2013.01); *C01B 3/047* (2013.01);
(Continued)

(58) Field of Classification Search
CPC ........... C01B 3/047; C01B 2203/0244; C01B 2203/066; C01B 2203/0811; C01B 2203/1614
See application file for complete search history.

(56) References Cited

U.S. PATENT DOCUMENTS 2,013,809 A 9/1935 Hall
3,198,604 A 8/1965 Pfefferle
(Continued)

FOREIGN PATENT DOCUMENTS

AU 2020267318 A1 6/2021
CA 2676027 A1 8/2008
(Continued)

OTHER PUBLICATIONS

US 11,787,692 B1, 10/2023, Jo et al. (withdrawn)
(Continued)

*Primary Examiner* — Anthony J Zimmer
*Assistant Examiner* — Syed T Iqbal
(74) *Attorney, Agent, or Firm* — WILSON SONSINI GOODRICH & ROSATI

(57) ABSTRACT

The present disclosure provides systems and methods for processing ammonia. The system may comprise one or more reactor modules configured to generate hydrogen from a source material comprising ammonia. The hydrogen generated by the one or more reactor modules may be used to provide additional heating of the reactor modules (e.g., via combustion of the hydrogen), or may be provided to one or more fuel cells for the generation of electrical energy.

20 Claims, 97 Drawing Sheets

Related U.S. Application Data continuation of application No. 17/889,256, filed on Aug. 16, 2022, now Pat. No. 12,000,333, and a continuation of application No. 17/889,260, filed on Aug. 16, 2022, now Pat. No. 11,994,061, said application No. 17/889,256 is a continuation of application No. PCT/US2022/029264, filed on May 13, 2022, said application No. 17/889,260 is a continuation of application No. PCT/US2022/029264, filed on May 13, 2022, which is a continuation of application No. 17/401,993, filed on Aug. 13, 2021, now Pat. No. 11,724,245, and a continuation of application No. 17/366,633, filed on Jul. 2, 2021, now abandoned.

(60) Provisional application No. 63/292,122, filed on Dec. 21, 2021, provisional application No. 63/247,054, filed on Sep. 22, 2021, provisional application No. 63/236,048, filed on Aug. 23, 2021, provisional application No. 63/215,843, filed on Jun. 28, 2021, provisional application No. 63/209,530, filed on Jun. 11, 2021, provisional application No. 63/188,593, filed on May 14, 2021.

(51) Int. Cl.
*B01J 8/04* (2006.01)
*C01B 3/04* (2006.01)
*F02C 7/14* (2006.01)
*F02C 7/22* (2006.01)

(52) U.S. Cl.
CPC .................. *F02C 7/14* (2013.01); *F02C 7/22* (2013.01); *B01J 2208/00415* (2013.01); *B01J 2208/00504* (2013.01); *B01J 2208/0053* (2013.01); *B01J 2208/00539* (2013.01); *B01J 2208/00548* (2013.01); *C01B 2203/0277* (2013.01); *C01B 2203/066* (2013.01); *C01B 2203/0822* (2013.01); *F05D 2220/323* (2013.01)

(56) References Cited

U.S. PATENT DOCUMENTS

| | | |
|---|---|---|
| 3,352,716 A | 11/1967 | Olle |
| 3,442,613 A | 5/1969 | Grotz, Jr. |
| 3,689,042 A | 9/1972 | Pere et al. |
| 3,807,963 A | 4/1974 | Smith |
| 4,155,986 A | 5/1979 | Gladden |
| 5,055,282 A | 10/1991 | Shikada et al. |
| 5,185,139 A | 2/1993 | Krishnamurthy et al. |
| 5,912,198 A | 6/1999 | Feitelberg et al. |
| 6,350,540 B1 | 2/2002 | Sugita et al. |
| 6,555,084 B2 | 4/2003 | Ohtsuka |
| 6,936,363 B2 | 8/2005 | Kordesch et al. |
| 6,984,750 B2 | 1/2006 | Chaturvedi et al. |
| 7,071,239 B2 | 7/2006 | Ortego, Jr. et al. |
| 7,157,166 B2 | 1/2007 | Vajo |
| 7,160,360 B2 | 1/2007 | Wu et al. |
| 7,220,699 B2 | 5/2007 | Chellappa |
| 7,276,214 B2 | 10/2007 | Johnston et al. |
| 7,282,467 B2 | 10/2007 | Huisman et al. |
| 7,294,425 B2 | 11/2007 | Hodge et al. |
| 7,374,838 B2 | 5/2008 | Gallagher |
| 7,439,273 B2 | 10/2008 | Woods et al. |
| 7,569,294 B2 | 8/2009 | Graham et al. |
| 7,662,435 B2 | 2/2010 | Chellappa et al. |
| 7,670,587 B2 | 3/2010 | Porter et al. |
| 7,731,918 B2 | 6/2010 | Chellappa |
| 7,763,086 B2 | 7/2010 | Woods et al. |
| 7,803,496 B2 | 9/2010 | Koyama et al. |
| 7,862,631 B2 | 1/2011 | Burch et al. |
| 8,043,767 B2 | 10/2011 | Benson |
| 8,166,926 B2 | 5/2012 | Sasaki et al. |
| 8,440,357 B2 | 5/2013 | Hossain et al. |
| 8,617,265 B2 | 12/2013 | Chellappa |
| 8,664,148 B2 | 3/2014 | Brey et al. |
| 8,795,918 B2 | 8/2014 | Shimomura |
| 8,877,407 B2 | 11/2014 | Akiyama |
| 8,900,420 B2 | 12/2014 | Veeraraghavan et al. |
| 8,916,300 B2 | 12/2014 | McElroy et al. |
| 8,921,000 B2 | 12/2014 | Takeshita et al. |
| 8,932,773 B2 | 1/2015 | Nakanishi et al. |
| 8,961,923 B2 | 2/2015 | Grannell et al. |
| 9,023,542 B2 | 5/2015 | Kaneko et al. |
| 9,105,891 B2 | 8/2015 | Nagaosa |
| 9,163,541 B2 | 10/2015 | Kumagai et al. |
| 9,172,106 B2 | 10/2015 | Berning |
| 9,187,321 B2 | 11/2015 | Fuse et al. |
| 9,236,624 B2 | 1/2016 | Page et al. |
| 9,341,111 B2 | 5/2016 | Hikazudani et al. |
| 9,359,270 B2 | 6/2016 | Daly et al. |
| 9,359,271 B2 | 6/2016 | LeViness et al. |
| 9,506,400 B2 | 11/2016 | Tange et al. |
| 9,670,063 B2 | 6/2017 | David et al. |
| 9,737,869 B2 | 8/2017 | Kamata et al. |
| 9,819,040 B2 | 11/2017 | Littau |
| 9,861,951 B2 | 1/2018 | Vu |
| 9,884,770 B2 | 2/2018 | Takeshima |
| 9,896,332 B2 | 2/2018 | Hikazudani et al. |
| 9,958,211 B2 | 5/2018 | Vernon |
| 10,166,526 B2 | 1/2019 | Hamada et al. |
| 10,322,940 B2 | 6/2019 | Hosono et al. |
| 10,449,506 B2 | 10/2019 | Kamata et al. |
| 10,450,192 B2 | 10/2019 | Finkelshtain et al. |
| 10,478,805 B2 | 11/2019 | Hinokuma et al. |
| 10,596,551 B2 | 3/2020 | Sharma et al. |
| 10,830,125 B2 | 11/2020 | Pomar |
| 10,875,002 B2 | 12/2020 | Patel et al. |
| 10,906,804 B2 | 2/2021 | Li et al. |
| 10,914,212 B1 | 2/2021 | Bargman et al. |
| 10,919,025 B2 | 2/2021 | Li et al. |
| 10,961,890 B2 | 3/2021 | Sung et al. |
| 11,014,809 B2 | 5/2021 | Miura |
| 11,038,181 B2 | 6/2021 | Kandlikar |
| 11,065,591 B2 | 7/2021 | Speth et al. |
| 11,084,012 B2 | 8/2021 | Jiang et al. |
| 11,084,719 B2 | 8/2021 | Andersen et al. |
| 11,110,434 B2 | 9/2021 | Jiang et al. |
| 11,117,809 B2 | 9/2021 | Hojlund Nielsen |
| 11,148,955 B2 | 10/2021 | Gorval et al. |
| 11,149,662 B2 | 10/2021 | Heggen |
| 11,156,168 B2 | 10/2021 | Nose et al. |
| 11,161,739 B2 | 11/2021 | Gray |
| 11,167,732 B1 | 11/2021 | Cohen et al. |
| 11,287,089 B1 | 3/2022 | Cohen et al. |
| 11,305,250 B2 | 4/2022 | Verykios et al. |
| 11,309,568 B2 | 4/2022 | Achrai et al. |
| 11,374,246 B2 | 6/2022 | Luo et al. |
| 11,437,637 B2 | 9/2022 | Ikemoto et al. |
| 11,465,114 B2 | 10/2022 | Jo et al. |
| 11,539,063 B1 | 12/2022 | Choi et al. |
| 11,697,108 B2 | 7/2023 | Sheludko et al. |
| 11,724,245 B2 | 8/2023 | Jo et al. |
| 11,764,381 B2 | 9/2023 | Choi et al. |
| 11,769,893 B2 | 9/2023 | Choi et al. |
| 11,795,055 B1 | 10/2023 | Sheludko et al. |
| 11,806,704 B2 | 11/2023 | Jo et al. |
| 11,834,334 B1 | 12/2023 | Jo et al. |
| 11,834,985 B1 | 12/2023 | Jo et al. |
| 11,840,447 B1 | 12/2023 | Jo et al. |
| 11,843,149 B2 | 12/2023 | Choi et al. |
| 11,866,328 B1 | 1/2024 | Sheludko et al. |
| 11,975,968 B2 | 5/2024 | Jo et al. |
| 11,994,062 B2 | 5/2024 | Jo et al. |
| 2002/0028171 A1 | 3/2002 | Goetsch et al. |
| 2003/0015093 A1 | 1/2003 | Wegeng et al. |
| 2003/0189037 A1 | 10/2003 | Kochman et al. |
| 2004/0121227 A1 | 6/2004 | Cheng et al. |
| 2004/0163313 A1 | 8/2004 | Buxbaum |
| 2004/0261379 A1 | 12/2004 | Bruun et al. |
| 2006/0112636 A1 | 6/2006 | Chellappa et al. |

(56) References Cited

U.S. PATENT DOCUMENTS

| | | |
|---|---|---|
| 2006/0121322 A1 | 6/2006 | Haas et al. |
| 2007/0051041 A1 | 3/2007 | Genkin et al. |
| 2007/0190389 A1 | 8/2007 | Hinsenkamp et al. |
| 2007/0221060 A1 | 9/2007 | Song |
| 2007/0254204 A1 | 11/2007 | Shin et al. |
| 2008/0145733 A1 | 6/2008 | Asazawa et al. |
| 2008/0171255 A1 | 7/2008 | Brantley et al. |
| 2010/0060404 A1 | 3/2010 | Raiser et al. |
| 2010/0221625 A1 | 9/2010 | Jung et al. |
| 2011/0136027 A1* | 6/2011 | Chen .................. C01B 3/38  429/423 |
| 2012/0088168 A1 | 4/2012 | Pledger |
| 2012/0121488 A1 | 5/2012 | Comrie |
| 2012/0148925 A1 | 6/2012 | Grannell et al. |
| 2012/0195817 A1 | 8/2012 | Singh et al. |
| 2013/0025547 A1 | 1/2013 | Nakagawa et al. |
| 2013/0037122 A1 | 2/2013 | Nager et al. |
| 2013/0084508 A1 | 4/2013 | Yukimasa et al. |
| 2013/0140295 A1 | 6/2013 | Yoshioka et al. |
| 2013/0171527 A1 | 7/2013 | Lanning et al. |
| 2013/0189603 A1 | 7/2013 | Sakamoto et al. |
| 2014/0105816 A1 | 4/2014 | Grannell et al. |
| 2014/0287911 A1 | 9/2014 | Wang et al. |
| 2014/0356738 A1 | 12/2014 | Bell et al. |
| 2016/0167962 A1 | 6/2016 | Hikazudani et al. |
| 2016/0375985 A1 | 12/2016 | Ribarov et al. |
| 2017/0070088 A1 | 3/2017 | Berntsen et al. |
| 2018/0015443 A1 | 1/2018 | Finkelshtain et al. |
| 2018/0230006 A1 | 8/2018 | Finkelshtain et al. |
| 2018/0261856 A1 | 9/2018 | Akashi et al. |
| 2019/0058199 A1 | 2/2019 | Utsunomiya et al. |
| 2020/0032676 A1 | 1/2020 | Nose et al. |
| 2020/0062590 A1 | 2/2020 | McCullough et al. |
| 2020/0099072 A1 | 3/2020 | Ikemoto et al. |
| 2020/0123006 A1 | 4/2020 | Speth et al. |
| 2020/0197889 A1 | 6/2020 | Jo et al. |
| 2020/0266469 A1 | 8/2020 | Kojima et al. |
| 2020/0269208 A1 | 8/2020 | Way et al. |
| 2020/0346937 A1 | 11/2020 | Beach et al. |
| 2020/0388869 A1 | 12/2020 | Galbiati |
| 2020/0398240 A1 | 12/2020 | Jiang et al. |
| 2020/0403258 A1 | 12/2020 | Luo et al. |
| 2021/0001311 A1 | 1/2021 | Wu et al. |
| 2021/0098808 A1 | 4/2021 | Al-Smail |
| 2021/0113983 A1 | 4/2021 | Mortensen et al. |
| 2021/0178377 A1 | 6/2021 | Khatiwada et al. |
| 2021/0178378 A1 | 6/2021 | Khatiwada et al. |
| 2021/0234179 A1 | 7/2021 | Klein et al. |
| 2021/0237046 A1 | 8/2021 | Gascon et al. |
| 2021/0245139 A1 | 8/2021 | Seabaugh et al. |
| 2021/0395082 A1 | 12/2021 | Iwai |
| 2021/0395101 A1 | 12/2021 | Giddey et al. |
| 2021/0395883 A1 | 12/2021 | Dip |
| 2022/0002151 A1 | 1/2022 | Katikaneni et al. |
| 2022/0090576 A1 | 3/2022 | Sia |
| 2022/0119250 A1 | 4/2022 | Shin et al. |
| 2022/0119269 A1 | 4/2022 | Huckman et al. |
| 2022/0154646 A1 | 5/2022 | Araki et al. |
| 2022/0158202 A1 | 5/2022 | Nishibayashi et al. |
| 2022/0162490 A1 | 5/2022 | Jo et al. |
| 2022/0162989 A1 | 5/2022 | Cocks et al. |
| 2022/0162999 A1 | 5/2022 | Cocks et al. |
| 2022/0163002 A1 | 5/2022 | Takeuchi |
| 2022/0195919 A1 | 6/2022 | Akbari et al. |
| 2022/0205415 A1 | 6/2022 | Takeuchi et al. |
| 2022/0212172 A1 | 7/2022 | Song et al. |
| 2022/0234886 A1 | 7/2022 | Yamazaki et al. |
| 2022/0347644 A1 | 11/2022 | Jo et al. |
| 2022/0362748 A1 | 11/2022 | Jo et al. |
| 2022/0364505 A1 | 11/2022 | Kim et al. |
| 2022/0389864 A1 | 12/2022 | Jo et al. |
| 2022/0395810 A1 | 12/2022 | Sheludko et al. |
| 2022/0395812 A1 | 12/2022 | Sheludko et al. |
| 2022/0403775 A1 | 12/2022 | Jo et al. |
| 2023/0001377 A1 | 1/2023 | Jo et al. |
| 2023/0053230 A1 | 2/2023 | Jo et al. |
| 2023/0055180 A1 | 2/2023 | Choi et al. |
| 2023/0118083 A1 | 4/2023 | Jo et al. |
| 2023/0123946 A1 | 4/2023 | Mann |
| 2023/0387439 A1 | 11/2023 | Choi et al. |
| 2023/0392548 A1 | 12/2023 | Jo et al. |
| 2024/0234769 A1 | 7/2024 | Hidaka |

FOREIGN PATENT DOCUMENTS

| | | |
|---|---|---|
| CA | 3132213 A1 | 9/2020 |
| CN | 101172575 A | 5/2008 |
| CN | 102456891 B | 7/2014 |
| CN | 106517092 A | 3/2017 |
| CN | 210528460 U | 5/2020 |
| CN | 111332447 A | 6/2020 |
| CN | 210973870 U | 7/2020 |
| CN | 112901339 A | 6/2021 |
| CN | 113048469 A | 6/2021 |
| CN | 113058595 A | 7/2021 |
| CN | 113058610 A | 7/2021 |
| CN | 113074046 A | 7/2021 |
| CN | 113181957 A | 7/2021 |
| CN | 213651846 U | 7/2021 |
| CN | 213726378 U | 7/2021 |
| CN | 213738601 U | 7/2021 |
| CN | 113198476 A | 8/2021 |
| CN | 113202660 A | 8/2021 |
| CN | 113289693 A | 8/2021 |
| CN | 213943062 U | 8/2021 |
| CN | 213976966 U | 8/2021 |
| CN | 214059903 U | 8/2021 |
| CN | 214060653 U | 8/2021 |
| CN | 113332987 A | 9/2021 |
| CN | 113363545 A | 9/2021 |
| CN | 113451615 A | 9/2021 |
| CN | 113540541 A | 10/2021 |
| CN | 214399815 U | 10/2021 |
| CN | 214406970 U | 10/2021 |
| CN | 214406981 U | 10/2021 |
| CN | 214486811 U | 10/2021 |
| CN | 113604813 A | 11/2021 |
| CN | 113666334 A | 11/2021 |
| CN | 113694922 A | 11/2021 |
| CN | 214611516 U | 11/2021 |
| CN | 214716493 U | 11/2021 |
| CN | 214753865 U | 11/2021 |
| CN | 214880199 U | 11/2021 |
| CN | 214959115 U | 11/2021 |
| CN | 214959751 U | 11/2021 |
| CN | 113775924 A | 12/2021 |
| CN | 113788134 A | 12/2021 |
| CN | 113864783 A | 12/2021 |
| CN | 214990264 U | 12/2021 |
| CN | 215002336 U | 12/2021 |
| CN | 215066412 U | 12/2021 |
| CN | 215364901 U | 12/2021 |
| CN | 113896168 A | 1/2022 |
| CN | 215578650 U | 1/2022 |
| CN | 215592611 U | 1/2022 |
| DE | 102010006153 A1 | 8/2011 |
| DE | 102017011833 A1 | 6/2019 |
| DK | 201900097 U3 | 3/2020 |
| EP | 2070141 B1 | 12/2012 |
| EP | 2774202 B1 | 8/2015 |
| EP | 1868941 B9 | 2/2017 |
| EP | 3028990 B1 | 8/2017 |
| EP | 3059206 B1 | 8/2017 |
| EP | 3258524 A1 | 12/2017 |
| EP | 2715847 B1 | 1/2019 |
| EP | 3448803 A1 | 3/2019 |
| EP | 3632543 A1 | 4/2020 |
| EP | 2332646 B1 | 7/2020 |
| EP | 3409354 B1 | 9/2021 |
| EP | 3878806 A1 | 9/2021 |
| EP | 3015164 B1 | 2/2022 |
| EP | 3981054 A1 | 4/2022 |
| EP | 3981739 A1 | 4/2022 |
| EP | 4017947 A1 | 6/2022 |

(56) References Cited

FOREIGN PATENT DOCUMENTS

| | | | |
|---|---|---|---|
| IN | 394309 B | 4/2022 |
| JP | 2005145748 A | 6/2005 |
| JP | 3940551 B2 | 7/2007 |
| JP | 2008153091 A | 7/2008 |
| JP | 2009035458 A | 2/2009 |
| JP | 2010195642 A | 9/2010 |
| JP | 4666301 B2 | 4/2011 |
| JP | 2012005926 A | 1/2012 |
| JP | 5263677 B2 | 8/2013 |
| JP | 5272762 B2 | 8/2013 |
| JP | 5272767 B2 | 8/2013 |
| JP | 5321230 B2 | 10/2013 |
| JP | 5346693 B2 | 11/2013 |
| JP | 5352343 B2 | 11/2013 |
| JP | 5371542 B2 | 12/2013 |
| JP | 5380233 B2 | 1/2014 |
| JP | 5389525 B2 | 1/2014 |
| JP | 5426201 B2 | 2/2014 |
| JP | 5430224 B2 | 2/2014 |
| JP | 5755160 B2 | 7/2015 |
| JP | 5810710 B2 | 11/2015 |
| JP | 5811494 B2 | 11/2015 |
| JP | 2016131065 A | 7/2016 |
| JP | 2016198720 A | 12/2016 |
| JP | 6308844 B2 | 4/2018 |
| JP | 2018076214 A | 5/2018 |
| JP | 6381131 B2 | 8/2018 |
| JP | 6482022 B2 | 3/2019 |
| JP | 2019053854 A | 4/2019 |
| JP | 2019177381 A | 10/2019 |
| JP | 6604501 B2 | 11/2019 |
| JP | 2020040860 A | 3/2020 |
| JP | WO2018221701 A1 | 4/2020 |
| JP | 6706277 B2 | 6/2020 |
| JP | 6778370 B2 | 11/2020 |
| JP | 6789080 B2 | 11/2020 |
| JP | 2020183337 A | 11/2020 |
| JP | 2020196646 A | 12/2020 |
| JP | 2020197169 A | 12/2020 |
| JP | 6850449 B2 | 3/2021 |
| JP | 6866570 B2 | 4/2021 |
| JP | 2021095300 A | 6/2021 |
| JP | 2021110463 A | 8/2021 |
| JP | 6929045 B2 | 9/2021 |
| JP | 6938186 B2 | 9/2021 |
| JP | 2021127861 A | 9/2021 |
| JP | 2021128904 A | 9/2021 |
| JP | 2021130100 A | 9/2021 |
| JP | 2021161006 A | 10/2021 |
| JP | 2021161921 A | 10/2021 |
| JP | 2021173232 A | 11/2021 |
| JP | 6996181 B2 | 2/2022 |
| JP | 7036318 B2 | 3/2022 |
| JP | 7074103 B2 | 5/2022 |
| JP | 7076930 B2 | 5/2022 |
| JP | 7079068 B2 | 6/2022 |
| JP | 7105021 B1 | 7/2022 |
| KR | 20040039951 A | 5/2004 |
| KR | 101173456 B1 | 8/2012 |
| KR | 101388755 B1 | 4/2014 |
| KR | 101768078 B1 | 8/2017 |
| KR | 102159237 B1 | 9/2020 |
| KR | 102174654 B1 | 11/2020 |
| KR | 102219136 B1 | 2/2021 |
| KR | 102247199 B1 | 5/2021 |
| KR | 102254196 B1 | 5/2021 |
| KR | 102256907 B1 | 5/2021 |
| KR | 102303094 B1 | 9/2021 |
| KR | 102304381 B1 | 9/2021 |
| KR | 102304406 B1 | 9/2021 |
| KR | 102309466 B1 | 10/2021 |
| KR | 102315763 B1 | 10/2021 |
| KR | 20210136381 A | 11/2021 |
| KR | 102335322 B1 | 12/2021 |
| KR | 20220005829 A | 1/2022 |
| KR | 102392578 B1 | 5/2022 |
| KR | 20220057717 A | 5/2022 |
| KR | 20220093960 A | 7/2022 |
| KR | 20220094475 A | 7/2022 |
| NL | 2017963 B1 | 6/2018 |
| TW | I274604 B | 3/2007 |
| WO | WO-9840311 A1 | 9/1998 |
| WO | WO-0183108 A1 | 11/2001 |
| WO | WO-0187770 A1 | 11/2001 |
| WO | WO-0208117 A1 | 1/2002 |
| WO | WO-02071451 A2 | 9/2002 |
| WO | WO-2005091418 A2 | 9/2005 |
| WO | WO-2005099885 A1 | 10/2005 |
| WO | WO-2006113451 A2 | 10/2006 |
| WO | WO-2006134419 A2 | 12/2006 |
| WO | WO-2007119262 A1 | 10/2007 |
| WO | WO-2008024089 A2 | 2/2008 |
| WO | WO-2008088319 A2 | 7/2008 |
| WO | WO-2009098452 A2 | 8/2009 |
| WO | WO-2009116679 A1 | 9/2009 |
| WO | WO-2010116874 A3 | 4/2011 |
| WO | WO-2011107279 A1 | 9/2011 |
| WO | WO-2012039183 A1 | 3/2012 |
| WO | WO-2013057473 A1 | 4/2013 |
| WO | WO-2013063169 A1 | 5/2013 |
| WO | WO-2013122849 A1 | 8/2013 |
| WO | WO-2013142123 A1 | 9/2013 |
| WO | WO-2014054277 A1 | 4/2014 |
| WO | WO-2015044691 A1 | 4/2015 |
| WO | WO-2015074127 A1 | 5/2015 |
| WO | WO-2016013652 A1 | 1/2016 |
| WO | WO-2016051633 A1 | 4/2016 |
| WO | WO-2017099143 A1 | 6/2017 |
| WO | WO-2017186614 A1 | 11/2017 |
| WO | WO-2018185663 A1 | 10/2018 |
| WO | WO-2018198635 A1 | 11/2018 |
| WO | WO-2019032591 A1 | 2/2019 |
| WO | WO-2019038251 A1 | 2/2019 |
| WO | WO-2020245016 A1 | 12/2020 |
| WO | WO-2021030876 A1 | 2/2021 |
| WO | WO-2021063795 A1 | 4/2021 |
| WO | WO-2021156626 A1 | 8/2021 |
| WO | WO-2021168226 A1 | 8/2021 |
| WO | WO-2021172545 A1 | 9/2021 |
| WO | WO-2021177359 A1 | 9/2021 |
| WO | WO-2021221943 A1 | 11/2021 |
| WO | WO-2021225254 A1 | 11/2021 |
| WO | WO-2021228428 A1 | 11/2021 |
| WO | WO-2021241841 A1 | 12/2021 |
| WO | WO-2021260108 A1 | 12/2021 |
| WO | WO-2022003312 A1 | 1/2022 |
| WO | WO-2022010178 A1 | 1/2022 |
| WO | WO-2022055225 A1 | 3/2022 |
| WO | WO-2021257944 A9 | 4/2022 |
| WO | WO-2022070597 A1 | 4/2022 |
| WO | WO-2022076341 A1 | 4/2022 |
| WO | WO-2022079435 A1 | 4/2022 |
| WO | WO-2022106568 A1 | 5/2022 |
| WO | WO-2022119376 A1 | 6/2022 |
| WO | WO-2022129294 A1 | 6/2022 |
| WO | WO-2022153059 A1 | 7/2022 |
| WO | WO-2022153060 A1 | 7/2022 |
| WO | WO-2022153061 A1 | 7/2022 |
| WO | WO-2022153718 A1 | 7/2022 |
| WO | WO-2022153719 A1 | 7/2022 |
| WO | WO-2022153720 A1 | 7/2022 |
| WO | WO-2022241260 A1 | 11/2022 |
| WO | WO-2022261488 A1 | 12/2022 |
| WO | WO-2023022995 A1 | 2/2023 |
| WO | WO-2024077179 A1 | 4/2024 |
| WO | WO-2024081632 A1 | 4/2024 |
| WO | WO-2024086612 A2 | 4/2024 |
| WO | WO-2024086793 A1 | 4/2024 |

OTHER PUBLICATIONS

Co-pending U.S. Appl. No. 17/974,885, inventors Jo; Young Suk et al., filed Oct. 27, 2022.

(56) References Cited

OTHER PUBLICATIONS

Co-pending U.S. Appl. No. 17/974,997, inventors Jo; Young Suk et al., filed Oct. 27, 2022.
Co-pending U.S. Appl. No. 17/975,184, inventors Jo; Young Suk et al., filed Oct. 27, 2022.
Co-pending U.S. Appl. No. 18/065,915, inventors Sheludko; Boris et al., filed Dec. 14, 2022.
Co-pending U.S. Appl. No. 18/066,163, inventors Sheludko; Boris et al., filed Dec. 14, 2022.
Co-pending U.S. Appl. No. 18/133,388, inventors Sheludko; Boris et al., filed Apr. 11, 2023.
Co-pending U.S. Appl. No. 18/454,692, inventors Jo; Young Suk et al., filed Aug. 23, 2023.
Gallucci, M. The Ammonia Solution: Ammonia engines and fuel cells in cargo ships could slash their carbon emissions. IEEE Spectrum. 58(3): 44-50. Mar. 2021. doi: 10.1109/MSPEC.2021.9370109.
Hansgen, et al. Using first principles to predict bimetallic catalysts for the ammonia decomposition reaction. Nat Chem. Jun. 2010;2(6):484-489. doi: 10.1038/nchem.626. Epub Apr. 25, 2010.
International search report with written opinion dated Sep. 21, 2022 for PCT/US2022/029264.
Kumar S. Heat Exchanger—Types, Working, Construction. https://marinerspoint.in/working-of-heatexchanger/2020/11/ , Nov. 4, 2020, 9 pages.
Machine Translation of JP 2020-040860 A (Year: 2020).
Metkemeijer, et al. Ammonia as a feedstock for a hydrogen fuel cell; reformer and fuel cell behaviour. Journal of Power Sources, vol. 49, 271-282 (1994).
Notice of Allowance dated Mar. 29, 2023 for U.S. Appl. No. 17/401,993.
Notice of Allowance dated Jun. 1, 2023 for U.S. Appl. No. 17/974,885.
Notice of Allowance dated Jun. 12, 2023 for U.S. Appl. No. 18/081,512.
Notice of Allowance dated Jul. 14, 2023 for U.S. Appl. No. 17/401,993.
Notice of Allowance dated Jul. 19, 2023 for U.S. Appl. No. 17/975,184.
Notice of Allowance dated Jul. 24, 2023 for U.S. Appl. No. 17/974,997.
Notice of Allowance dated Aug. 4, 2023 for U.S. Appl. No. 17/889,260.
Notice of Allowance dated Aug. 7, 2023 for U.S. Appl. No. 17/889,256.
Notice of Allowance dated Aug. 11, 2022 for U.S. Appl. No. 17/589,287.
Notice of Allowance dated Aug. 30, 2023 for U.S. Appl. No. 17/974,997.
Notice of Allowance dated Aug. 31, 2023 for U.S. Appl. No. 17/889,256.
Notice of Allowance dated Sep. 12, 2023 for U.S. Appl. No. 17/889,260.
Notice of Allowance dated Sep. 13, 2023 for U.S. Appl. No. 17/974,885.
Notice of Allowance dated Sep. 13, 2023 for U.S. Appl. No. 17/975,184.
Notice of Allowance dated Sep. 14, 2022 for U.S. Appl. No. 17/589,287.
Notice of Allowance dated Sep. 20, 2023 for U.S. Appl. No. 18/081,512.
Office action dated Jan. 27, 2023 for U.S. Appl. No. 17/974,885.
Office action dated Feb. 14, 2023 for U.S. Appl. No. 17/974,997.
Office action dated Feb. 15, 2023 for U.S. Appl. No. 17/975,184.
Office action dated Mar. 9, 2023 for U.S. Appl. No. 17/366,633.
Office action dated May 12, 2023 for U.S. Appl. No. 17/889,256.
Office action dated May 19, 2023 for U.S. Appl. No. 18/081,512.
Office action dated Jun. 2, 2022 for U.S. Appl. No. 17/589,287.
Office action dated Jun. 15, 2023 for U.S. Appl. No. 17/889,260.
Office action dated Oct. 4, 2023 for U.S. Appl. No. 18/454,638.
Office action dated Oct. 5, 2023 for U.S. Appl. No. 18/454,692.
Office action dated Nov. 17, 2022 for U.S. Appl. No. 17/401,993.
Translation of DE102010006153A1 (2011).
PCT/US2023/076448 International Search Report and Written Opinion dated Mar. 5, 2024.
PCT/US2023/077140 International Search Report and Written Opinion dated Apr. 18, 2024.
PCT/US2023/077140 Invitation to Pay Additional Fees dated Jan. 26, 2024.

\* cited by examiner

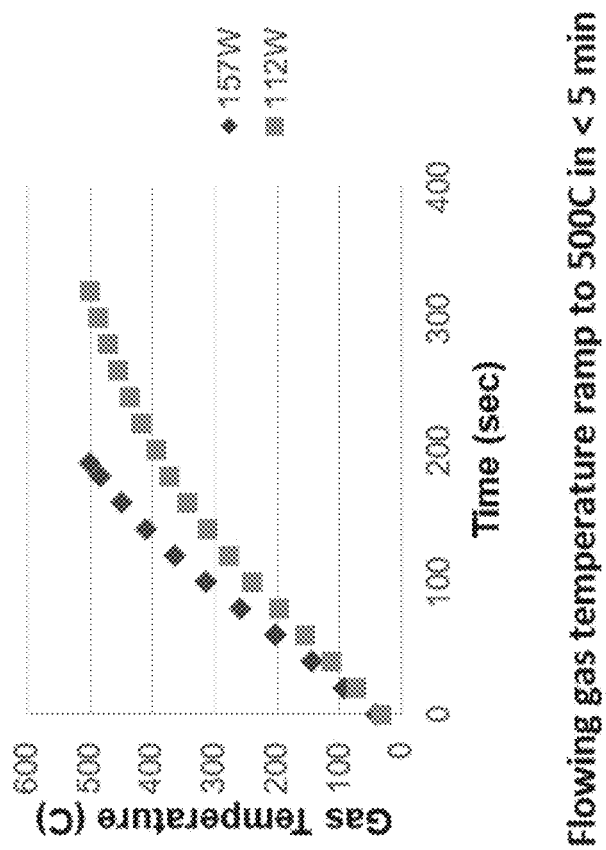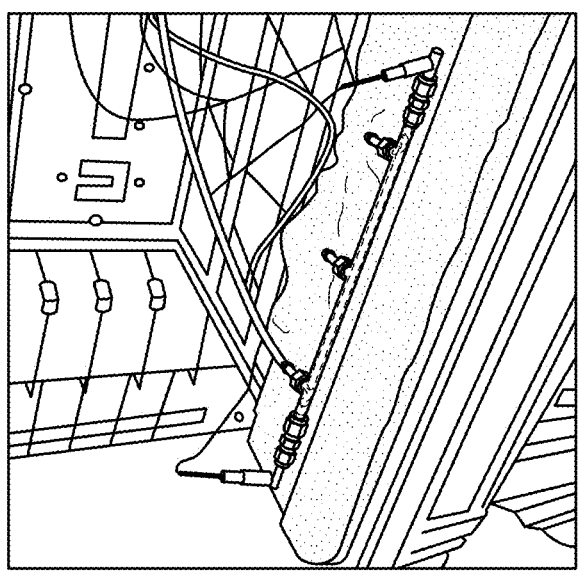
*FIG. 8*

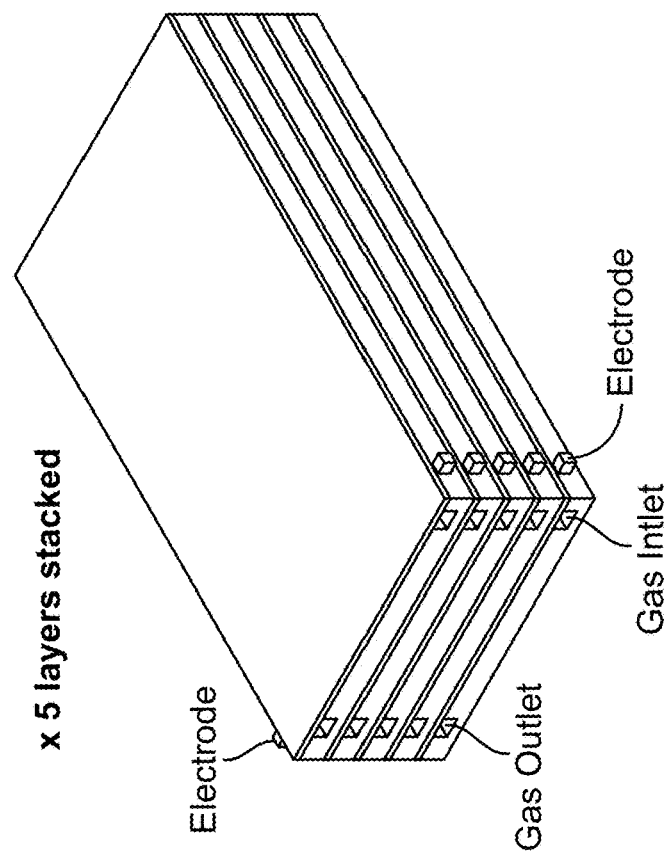
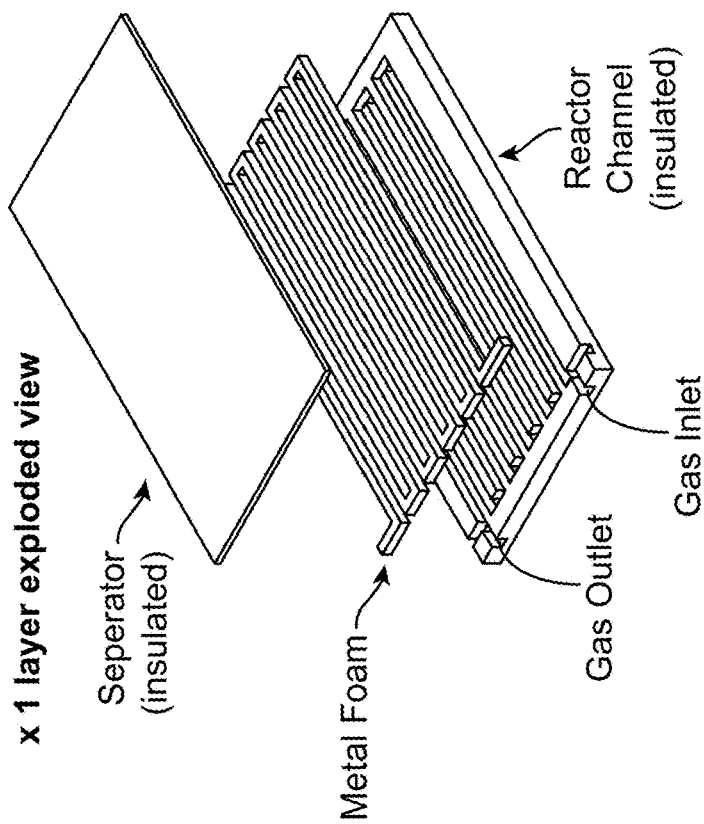
FIG. 12

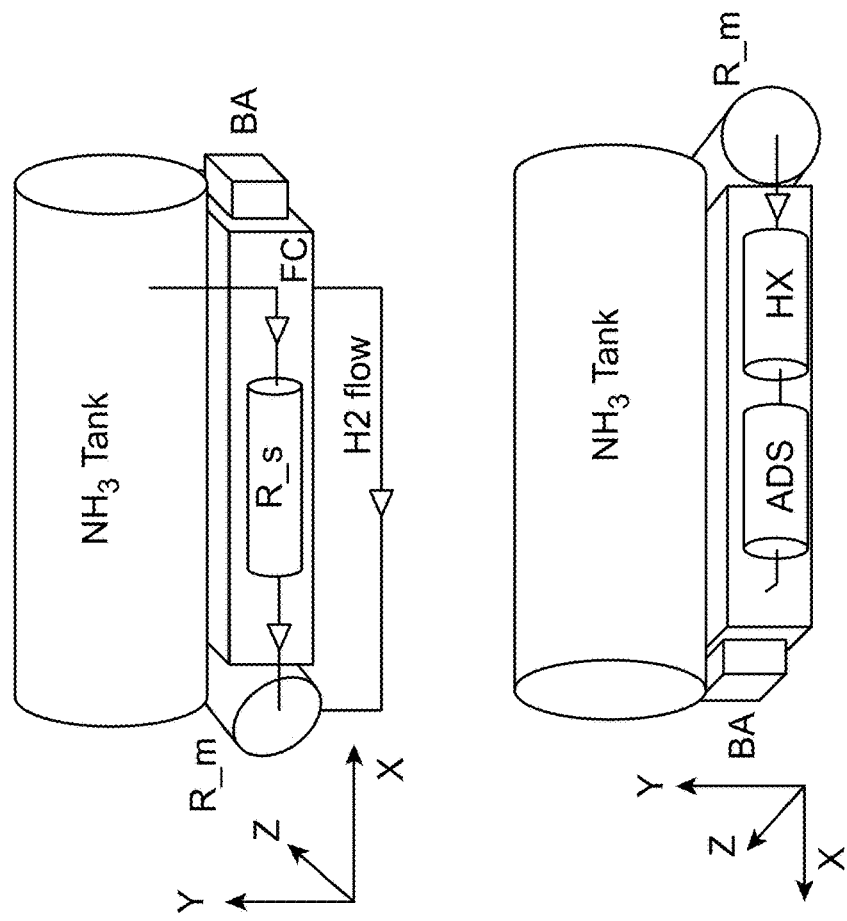
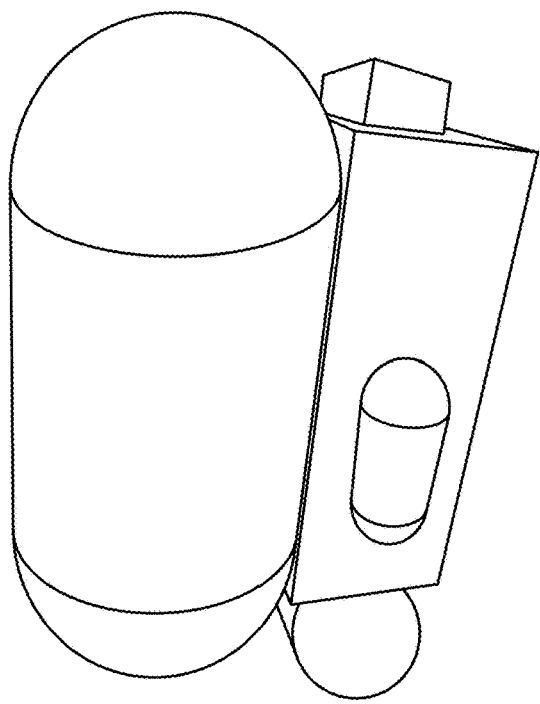
FIG. 26

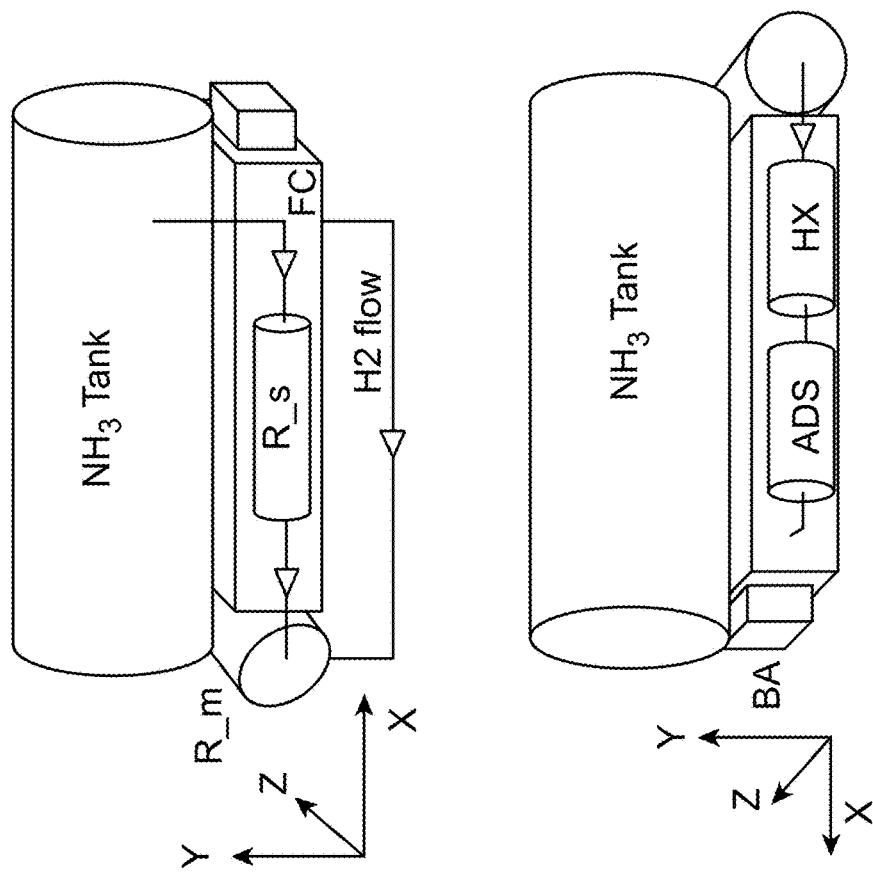
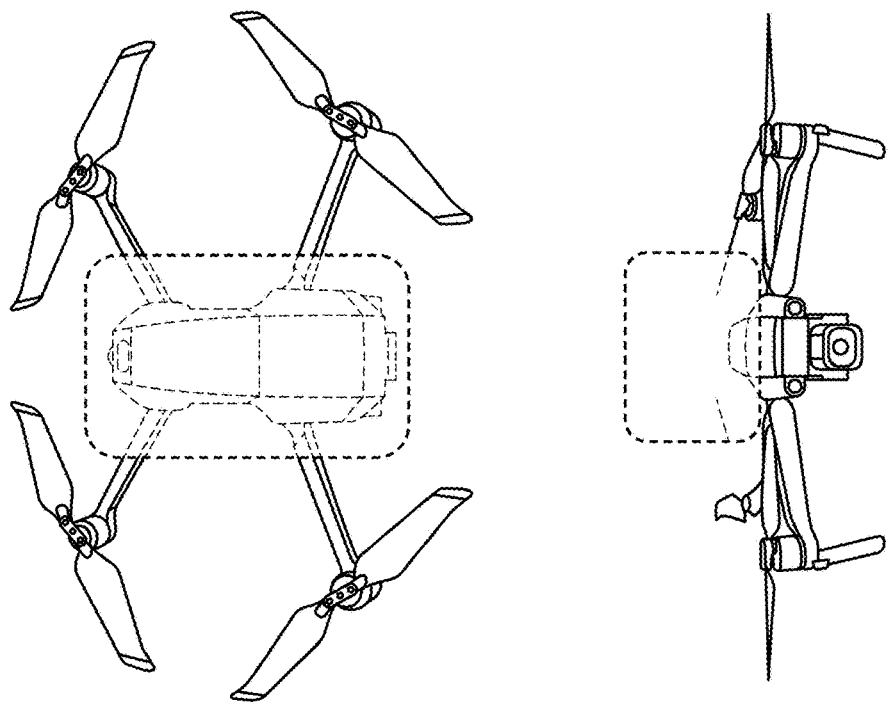
FIG. 28

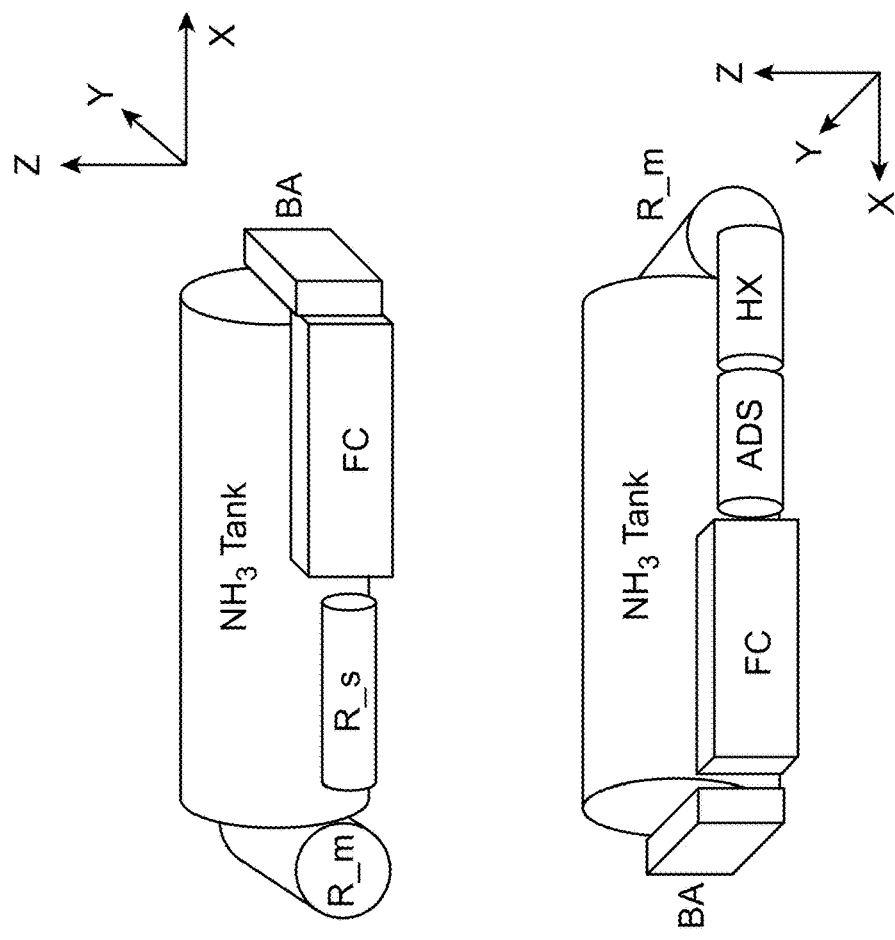
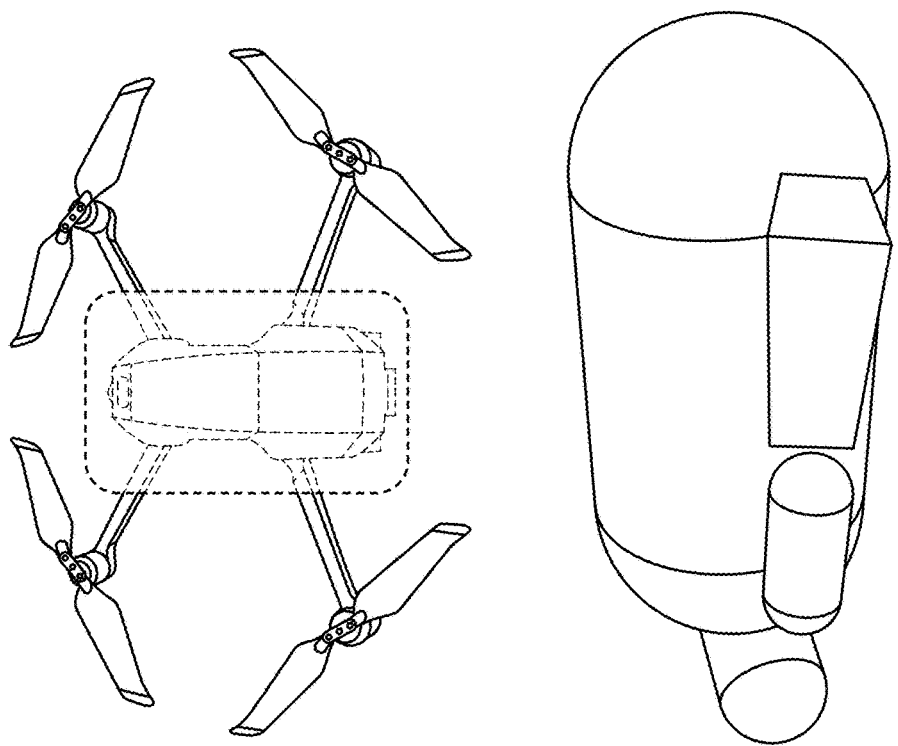
FIG. 29

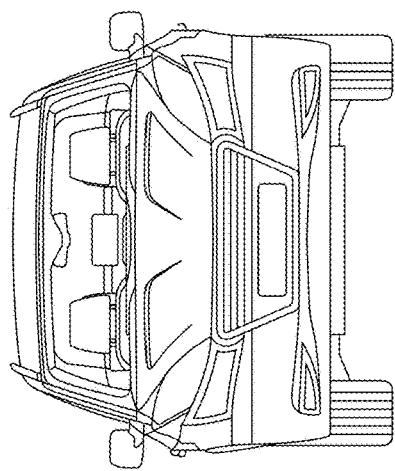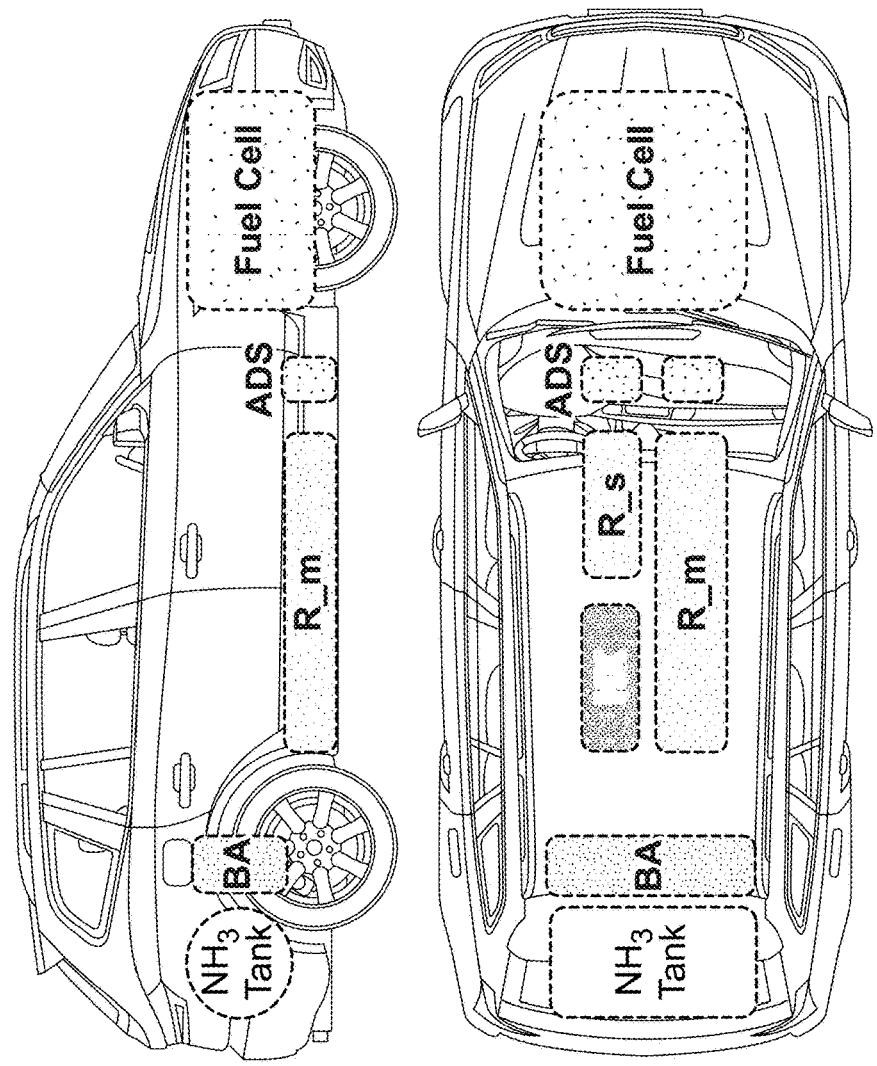
FIG. 30

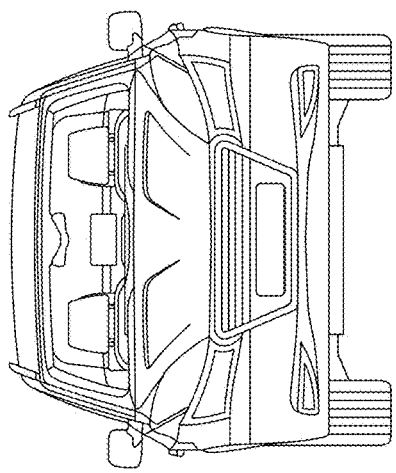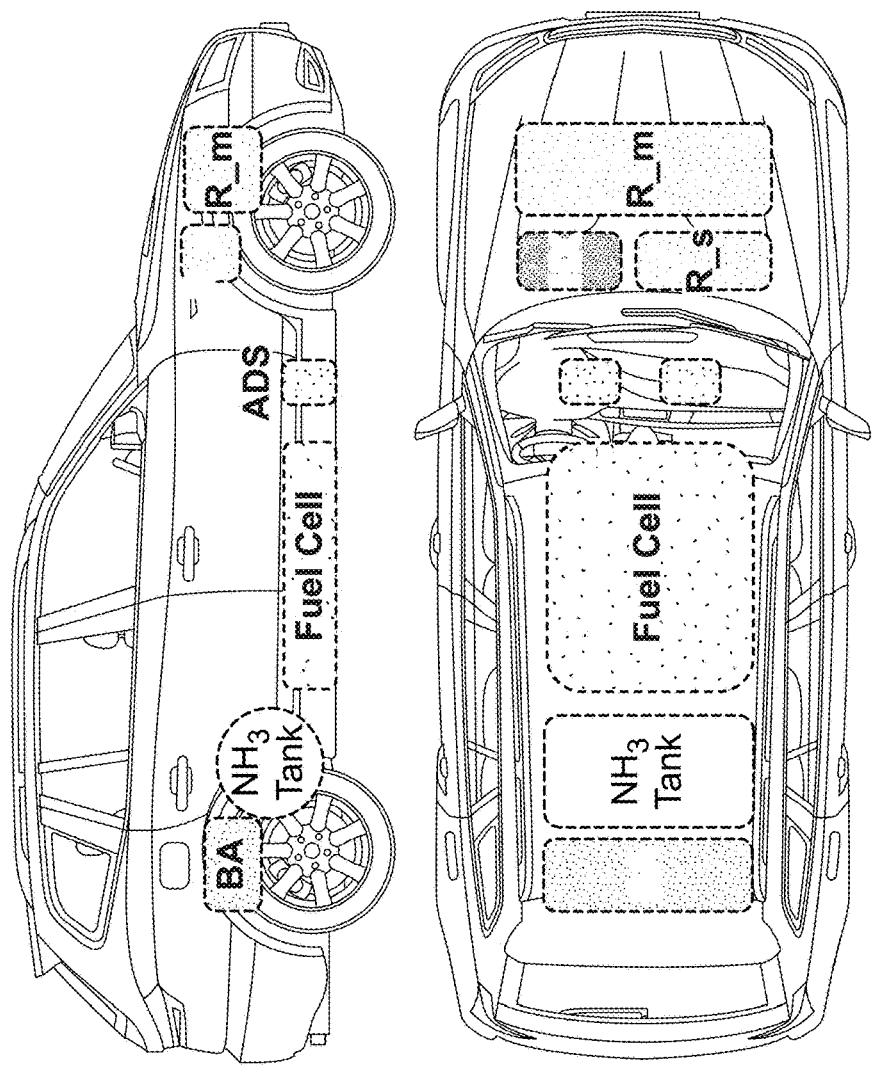
FIG. 31

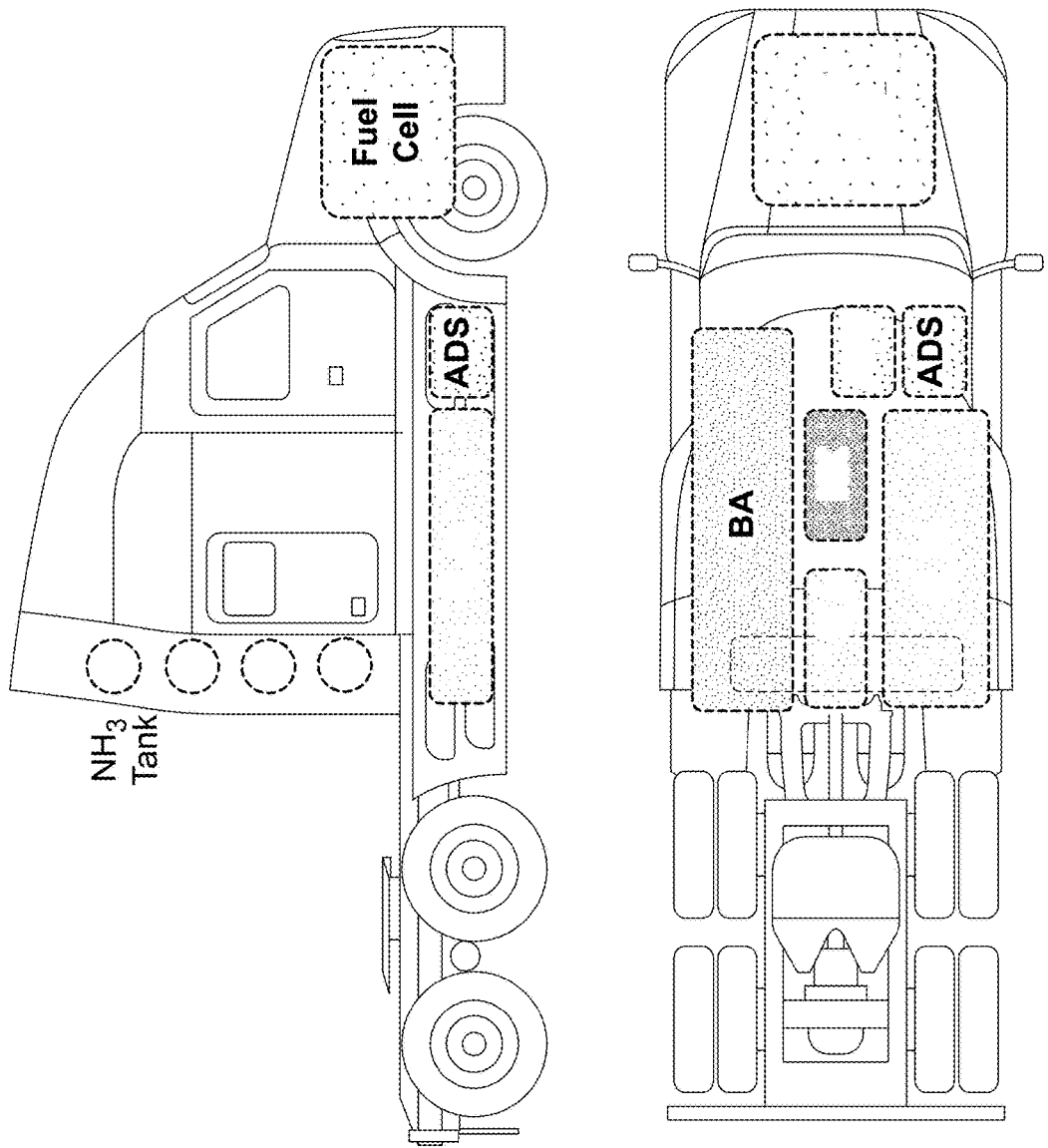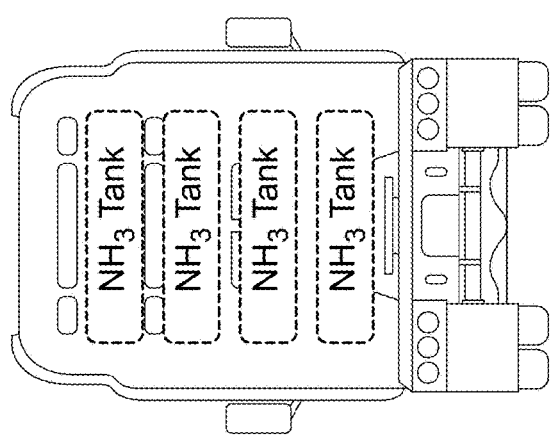
FIG. 32

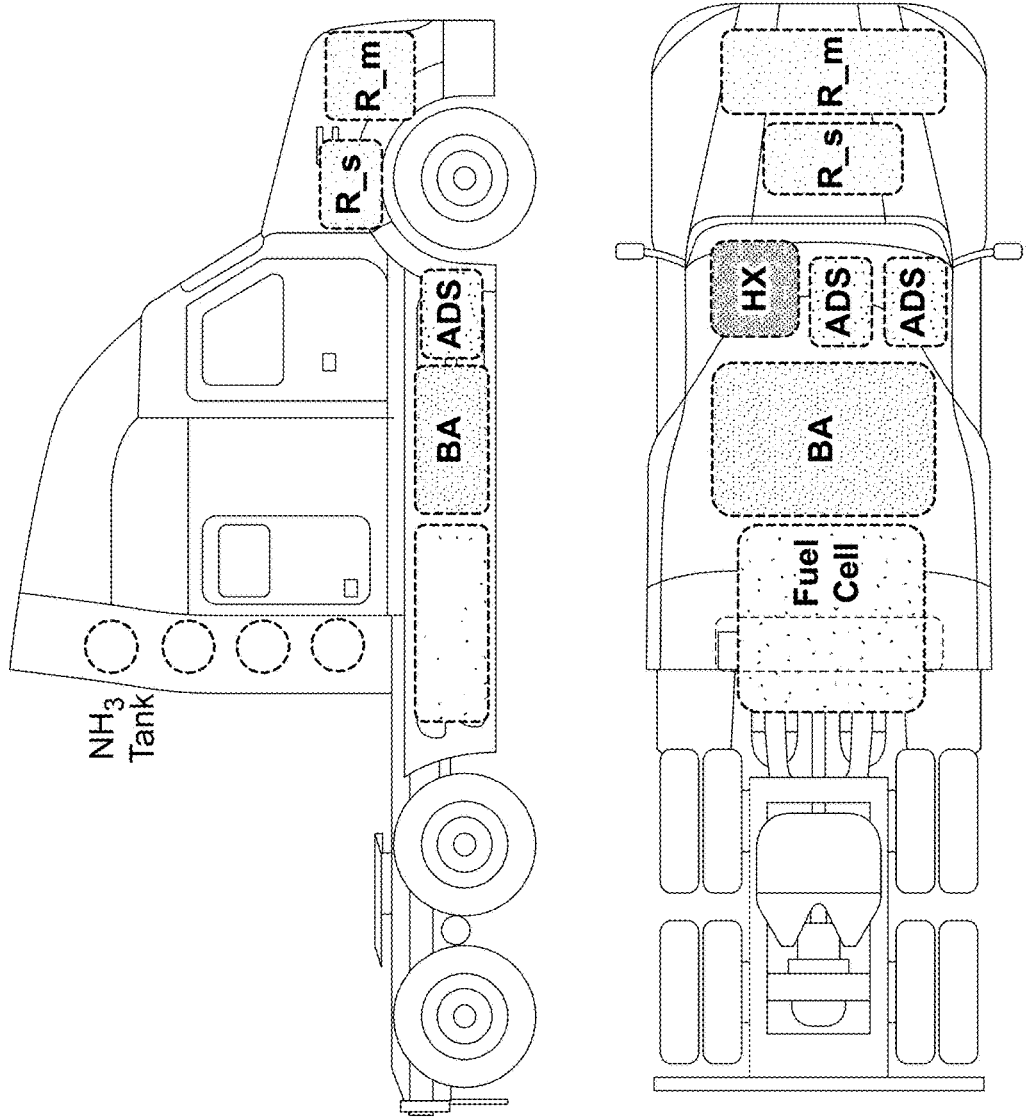
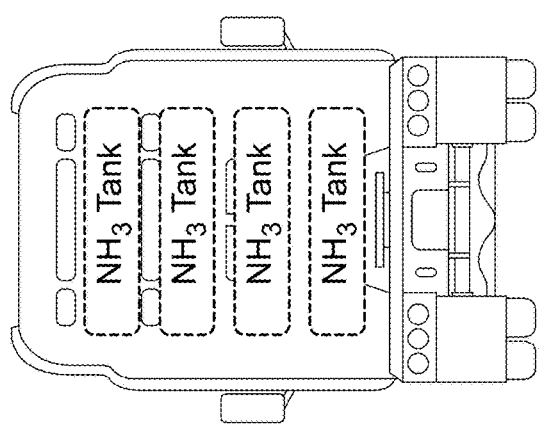
FIG. 33

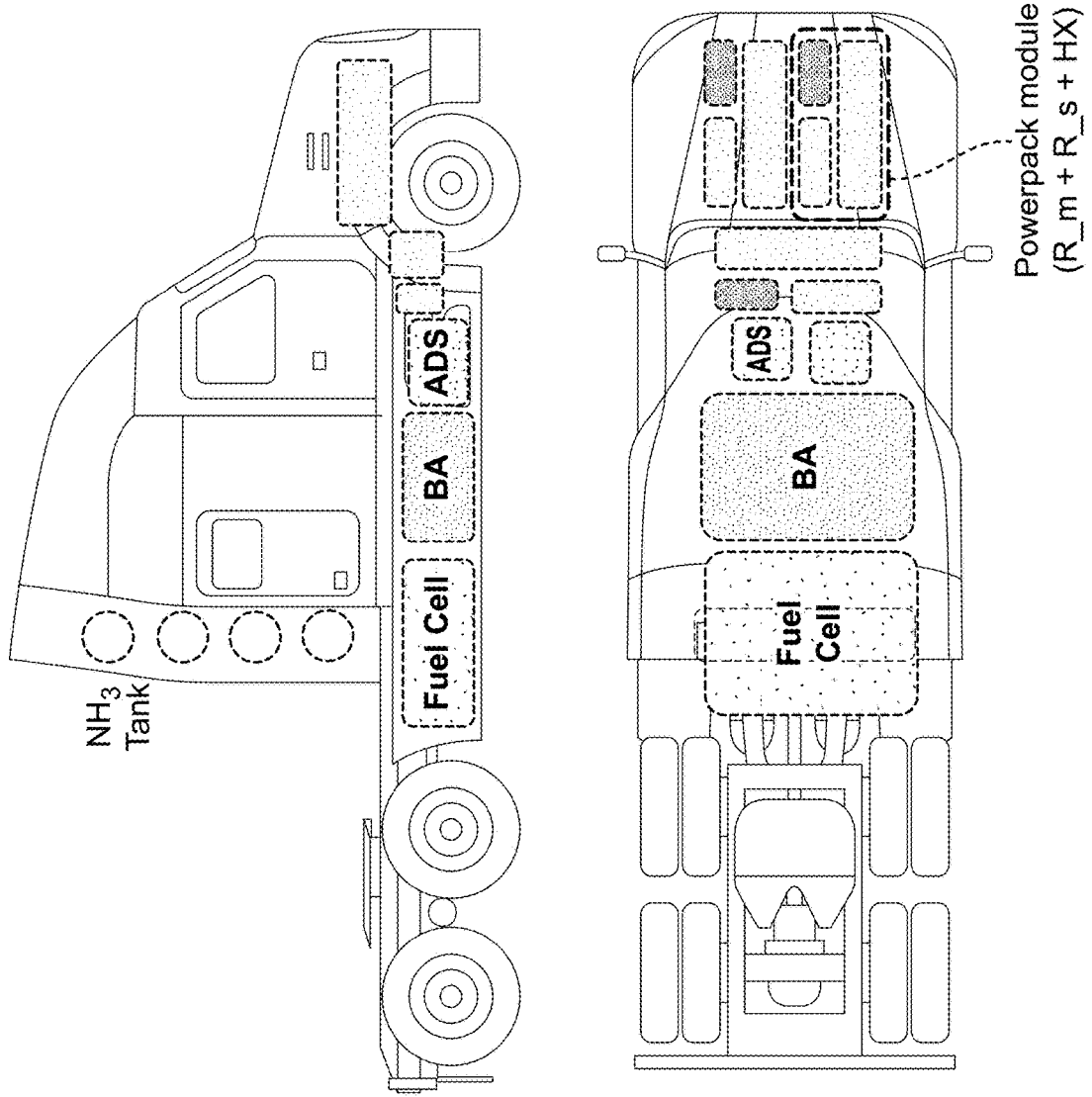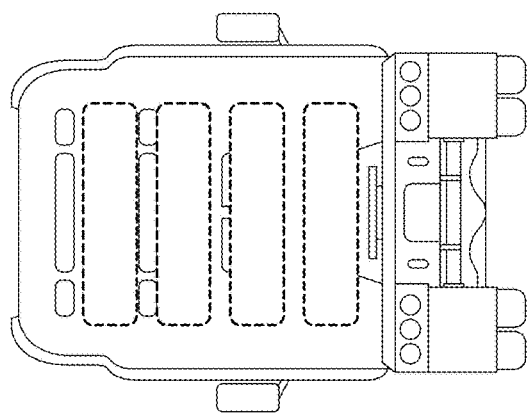
FIG. 35

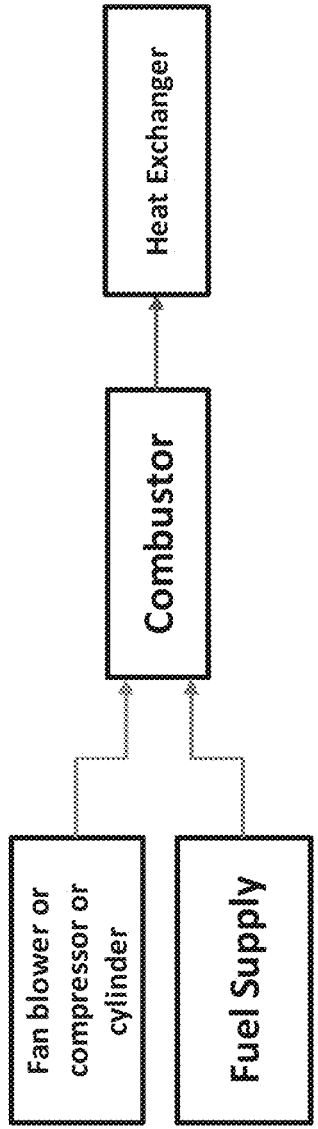
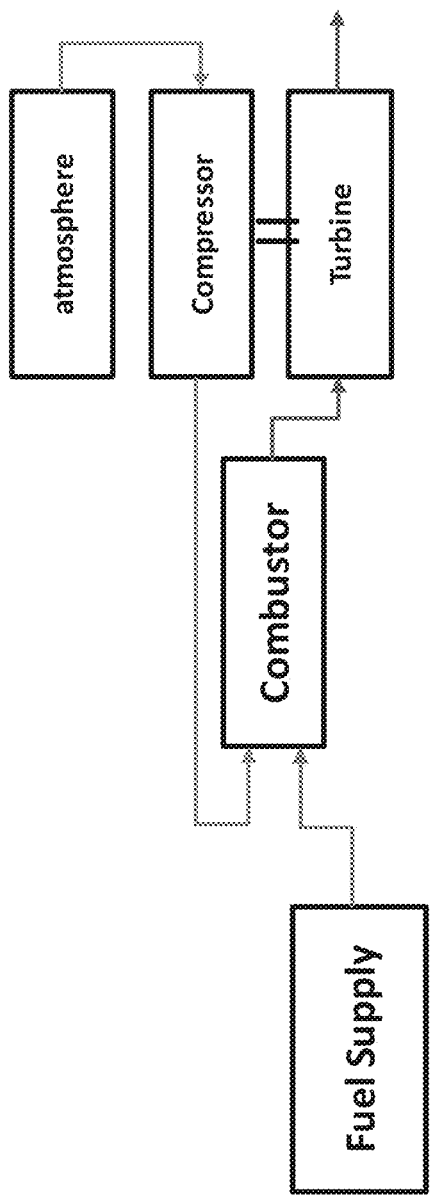
FIG. 37A
FIG. 37B

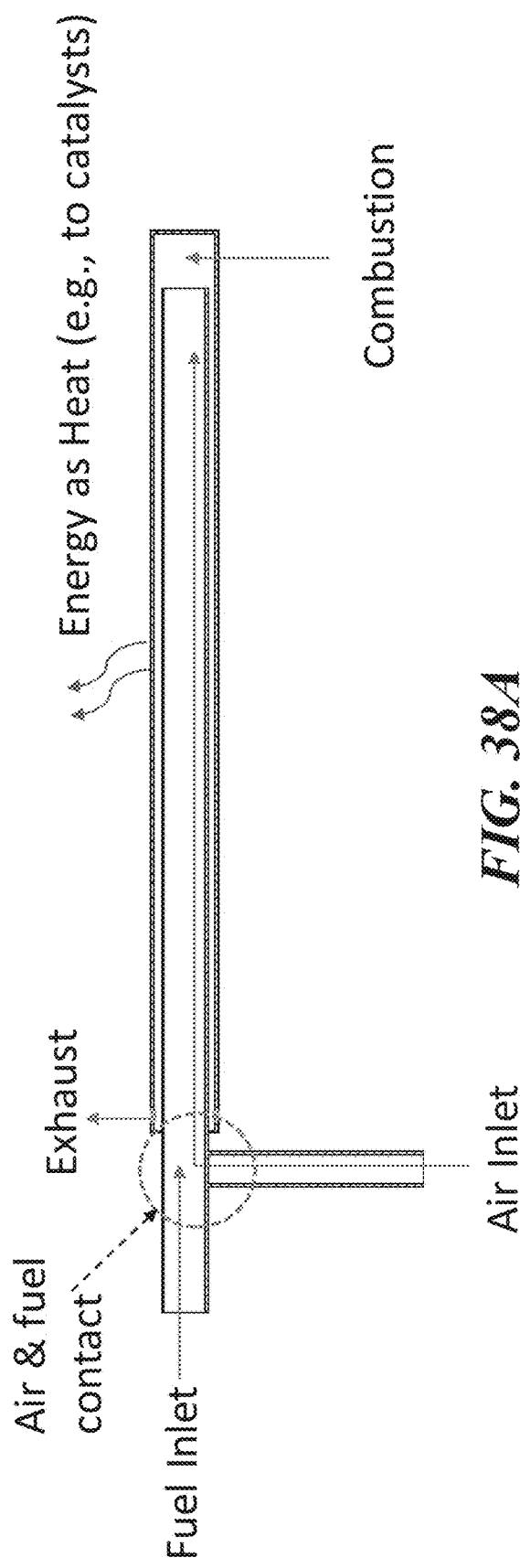
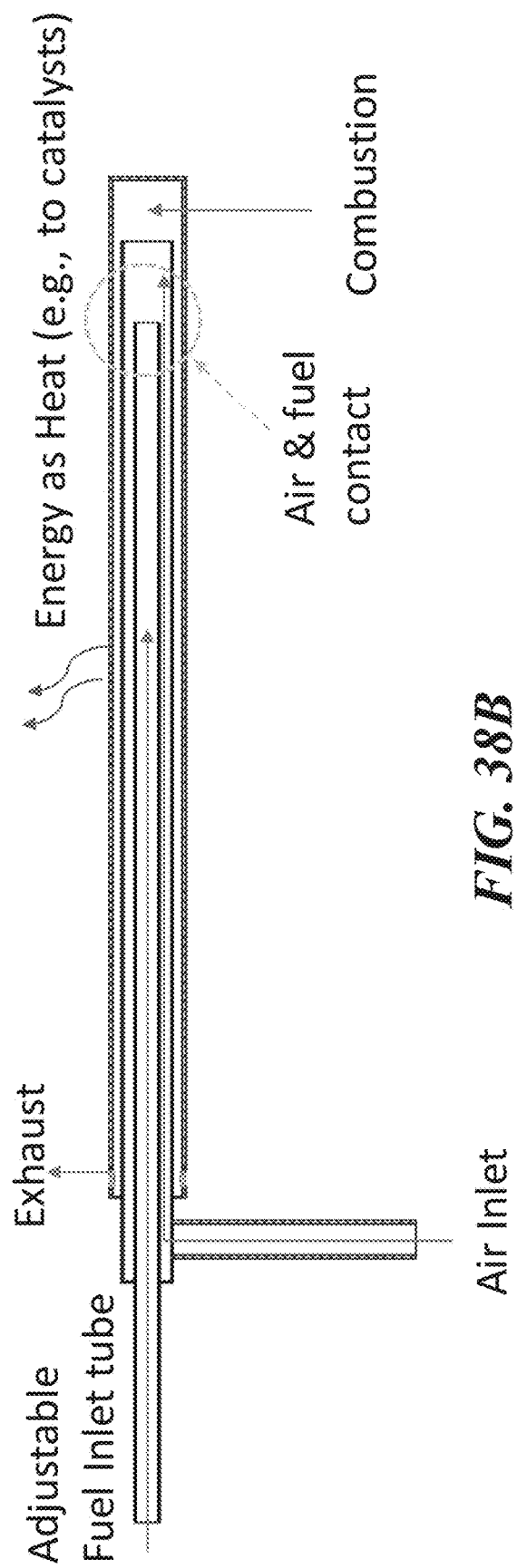
FIG. 38A
FIG. 38B

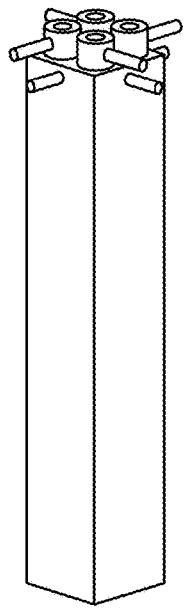 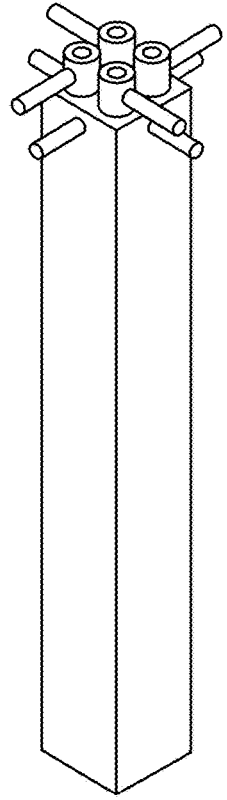 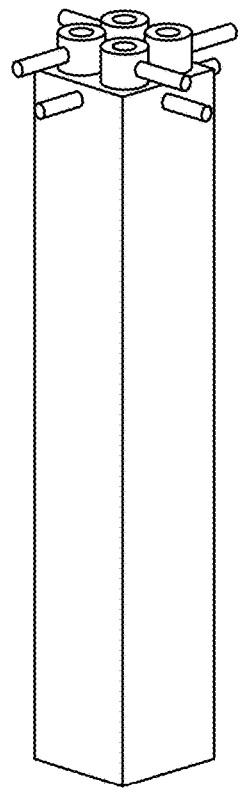 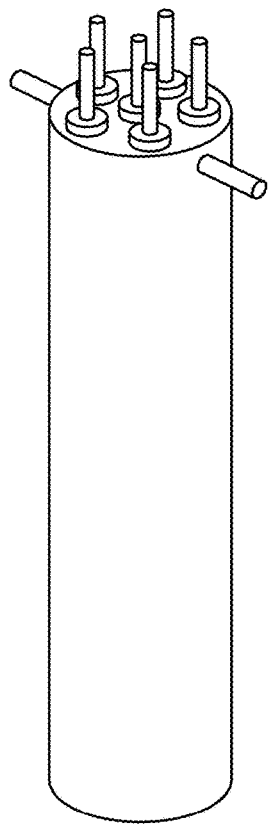
Design 1     Design 2     Design 3     Design 4
*FIG. 62A*     *FIG. 62B*     *FIG. 62C*     *FIG. 62D*

SYSTEMS AND METHODS FOR PROCESSING AMMONIA

CROSS-REFERENCE

This application is a continuation of U.S. patent application Ser. No. 18/454,638 filed Aug. 23, 2023, which is a continuation of U.S. patent application Ser. No. 17/889,256 filed Aug. 16, 2022 and U.S. patent application Ser. No. 17/889,260, filed Aug. 16, 2022, which are continuations of International Patent Application No. PCT/US2022/029264 filed May 13, 2022, which claims the benefit of U.S. Provisional Application No. 63/188,593, filed May 14, 2021, U.S. Provisional Application No. 63/215,843, filed Jun. 28, 2021, U.S. Provisional Application No. 63/236,048, filed Aug. 23, 2021, U.S. Provisional Application No. 63/247,054, filed Sep. 22, 2021, and U.S. Provisional Application No. 63/292,122, filed Dec. 21, 2021, and is a continuation of U.S. application Ser. No. 17/366,633, filed Jul. 2, 2021, which claims benefit of U.S. Provisional Application No. 63/188,593, filed May 14, 2021 and U.S. Provisional Application No. 63/209,530, filed Jun. 11, 2021, and is a continuation of U.S. application Ser. No. 17/401,993, filed Aug. 13, 2021, now U.S. Pat. No. 11,724,245 issued Aug. 15, 2023, each of which is incorporated herein by reference in its entirety for all purposes.

BACKGROUND

Various systems may be operated using a fuel source. The fuel source may have a specific energy corresponding to an amount of energy stored or extractable per unit mass of fuel. The fuel source may be provided to the various systems to enable such systems to generate energy and/or deliver power (e.g., for movement or transportation purposes).

SUMMARY

Hydrogen can be leveraged as a clean energy source to power various systems. Hydrogen can provide a distinct advantage over other types of fuel such as diesel, gasoline, or jet fuel, which have specific energies of about 45 megajoules per kilogram (MJ/kg) (heat), or lithium-ion batteries, which have a specific energy of about 0.95 MJ/kg (electrical). In contrast, hydrogen has a specific energy of over 140 MJ/kg (heat). As such, 1 kg of hydrogen can provide the same amount of energy as about 3 kg of gasoline or kerosene. Thus, hydrogen as a fuel source can help to reduce the amount of fuel (by mass) needed to provide a comparable amount of energy as other traditional sources of fuel. Further, systems that use hydrogen as a fuel source (e.g., as a combustion reactant) generally produce benign or nontoxic byproducts such as water while producing minimal or near zero greenhouse gas (e.g., carbon dioxide and nitrous oxide) emissions, thereby reducing the environmental impacts of various systems (e.g., modes of transportation) that use hydrogen as a fuel source.

Recognized herein are various limitations with hydrogen storage and production systems currently available. Although hydrogen has a relatively high gravimetric density (measured in MJ/kg), fuel storage systems for compressed and liquefied hydrogen are often complex due to the need to provide and maintain specialized storage conditions. For example, storage of hydrogen as a gas may require high-pressure tanks (e.g., 350-700 bar or 5,000-10,000 psi). Storage of hydrogen as a liquid may require cryogenic temperatures because the boiling point of hydrogen at a pressure of 1 atm is −252.8° C. Further recognized herein are various limitations with commercially available ammonia processing systems, which generally have slow startup times, non-ideal thermal characteristics, suboptimal ammonia conversion efficiencies, and high weight and volume requirements.

The present disclosure provides systems and methods to address at least the abovementioned shortcomings of conventional systems for processing ammonia and producing, storing, and/or releasing hydrogen for utilization as a fuel source (e.g., at a fueling station or a power generation system). The embodiments of the present disclosure relate generally to systems and methods for processing a source material to produce or extract a fuel source. The fuel source may comprise hydrogen. The source material may comprise any material or compound comprising hydrogen (e.g., a hydrocarbon). In some cases, the source material may comprise ammonia ($NH_3$).

The present systems and methods are advantageous in several ways. Some embodiments of the present systems and methods enable the decarbonization of long-distance transportation (e.g., using ammonia as a source material and hydrogen as a fuel source) where refueling can be difficult via other decarbonized methods (for example, on trucking routes longer than 500 miles, or on transoceanic shipping routes). Over such long-distance routes, using batteries to power motors may entail excessively long recharging times and excessive weight and volume requirements, which reduces revenues for ship operators by decreasing the space available for cargo. Additionally, using only hydrogen (e.g., that is stored as pure hydrogen and not converted from ammonia) over such long-distance routes may be unviable due to the specialized storage conditions for hydrogen, described previously, as well as the large volume requirements for the storage tanks. Thus, some embodiments of the present systems and methods, when utilizing ammonia as a source material and hydrogen as a fuel source, may generate high electrical power (5 kilowatts or greater) while comprising a high energy density (655 Wh/kg or greater by weight and 447 Wh/L or greater by volume).

Additionally, some embodiments of reactors in the present disclosure may be heated by the combustion of hydrogen extracted from ammonia (as opposed to heating the reactors by combusting hydrocarbons or ammonia, which may undesirably emit greenhouse gases, nitrogen oxides ($NO_x$), and/or particulate matter). In some embodiments, by decomposing or cracking ammonia into hydrogen, a separate tank may not be required for storing combustion fuel (e.g., hydrocarbons, hydrogen, or ammonia) for heating the reactor modules of the present disclosure.

Additionally, some embodiments of the present systems and methods may provide a stream of hydrogen that is highly purified of trace ammonia (e.g., 99% purity or higher), or a stream of hydrogen mixed with nitrogen including trace ammonia (e.g., below 1 ppm), by leveraging high ammonia conversion efficiency (achieved by reactor and catalyst designs of the present disclosure) with adsorbents to remove unconverted ammonia. In some embodiments, the highly pure stream of hydrogen (or hydrogen mixed with nitrogen) may be consumed by a proton exchange membrane fuel cell (PEMFC) or other power generation device (e.g., internal combustion engine [ICE] or solid oxide fuel cell [SOFC]).

Additionally, the present systems and methods may be simple to operate and provide a high degree of safety. In some embodiments, ammonia may be introduced using a single inlet from an ammonia tank (e.g., as opposed to a first inlet for a first reactor module, a second inlet for a second reactor module, and so on). In some embodiments, a single stream of ammonia passes all of the reactor modules (e.g., first passing a startup reactor, and then into a main reactor, or vice versa). In some embodiments, this configuration may transfer excess heat from the reactor modules to the ammonia input from the storage tank (facilitating the vaporization of liquid ammonia) and may ensure a sufficiently high ammonia conversion efficiency. In some embodiments, the ammonia flow rate may be controlled at the single inlet, and in the case of a major fault or dangerous event, the ammonia flow may be quickly shut off via the single inlet.

In one aspect, the present disclosure provides a system for processing ammonia. The system may comprise a first reactor module configured to receive a source material comprising ammonia, wherein the first reactor module comprises (i) a first catalyst and (ii) a startup heating and reforming unit, wherein the startup heating and reforming unit comprises one or more electrodes for passing a current through the first catalyst to heat the first catalyst, wherein the first catalyst is configured to produce or extract hydrogen from the ammonia when the first catalyst is heated using the startup heating and reforming unit; and a second reactor module in fluid communication with the first reactor module, wherein the second reactor module is configured to receive the source material comprising the ammonia, wherein the second reactor module comprises (i) a second catalyst and (ii) one or more main heating units for heating the second catalyst, wherein at least one of the one or more main heating units is configured to heat at least a portion of the second catalyst by combusting the hydrogen generated by the first reactor module, wherein the second catalyst is configured to produce or extract hydrogen from the ammonia when the second catalyst is heated using the one or more main heating units.

In some embodiments, the one or more ammonia fuel sources comprise one or more liquid fuel storage tanks, wherein the ammonia is stored as liquid ammonia in the one or more liquid fuel storage tanks.

In some embodiments, the liquid ammonia is stored at a temperature ranging from about 15 to about 30° C. and at an absolute pressure ranging from 7 to 12 bar. In some embodiments, the liquid ammonia is stored at a gauge pressure ranging from about atmospheric pressure to about 20 bar. In some embodiments, the liquid ammonia is stored at a temperature ranging from about −40 to about 20° C. and at an absolute pressure ranging from about 0.5 bar to about 9 bar.

In some embodiments, the one or more main heating units comprise an electrical heater or a combustion heater. In some embodiments, the one or more electrodes comprise one or more metal electrodes. In some embodiments, the one or more metal electrodes may comprise copper.

In some embodiments, at least one of the first catalyst and the second catalyst comprises a metal foam catalyst. In some embodiments, the metal foam catalyst comprises nickel, iron, chromium, cobalt, molybdenum, copper, or aluminum. In some embodiments, the metal foam catalyst comprises one or more alloys comprising nickel, iron, chromium, cobalt, molybdenum, copper, or aluminum. In some embodiments, the metal foam catalyst comprises a catalytic coating of one or more powder or pellet catalysts. In some embodiments, the catalytic coating comprises a metal material, a promoter material, a support material, or any combination thereof. In some embodiments, the metal material comprises ruthenium, nickel, rhodium, iridium, cobalt, iron, platinum, chromium, palladium, or copper. In some embodiments, the promoter material comprises at least one material selected from Li, Na, K, Rb, Cs, Mg, Ca, Ba, Sr, La, Ce, Pr, Sm, or Gd. In some embodiments, the support comprises at least one material selected from $Al_2O_3$, MgO, $CeO_2$, $ZrO_2$, $La_2O_3$, $SiO_2$, $Y_2O_3$, $TiO_2$, SiC, hexagonal BN (boron nitride), BN nanotubes, silicon carbide, one or more zeolites, $LaAlO_3$, $CeAlO_3$, $MgAl_2O_4$, $CaAl_2O_4$, or one or more carbon nanotubes.

In some embodiments, the catalytic coating comprises one or more ruthenium-based precursors. In some embodiments, the one or more ruthenium-based precursors comprise $RuCl_3$ or $Ru_3(CO)_{12}$. In some embodiments, the metal foam catalyst has an apparent electrical resistivity of at least about 8 micro ohm-meters ($\mu\Omega m$). In some embodiments, the metal foam catalyst is processed using one or more etching, leaching, or acidic treatments to enhance a surface area of the metal foam catalyst. In some embodiments, the metal foam catalyst is heat treated and thermally activated. In some embodiments, the metal foam catalyst is coated using a physical vapor deposition or chemical vapor deposition treatment.

In some embodiments, the first reactor module comprises a plurality of modular units that are stackable on top of each other. In some embodiments, each of the plurality of modular units comprises a metal foam catalyst and one or more reactor channels for directing ammonia to the metal foam catalyst. In some embodiments, the system may further comprise one or more insulated panels for separating the plurality of modular units, wherein the one or more insulated panels comprise electrical insulation coatings, wherein the electrical insulation coatings are positioned between the plurality of modular units.

In some embodiments, the hydrogen generated using the first reactor module is usable to power one or more fuel cells or to heat the second reactor module via combustion. In some embodiments, the first reactor module provides a startup time of at most about 5 minutes to reach a target temperature of at least about 550 degrees Celsius. In some embodiments, the first reactor module provides a startup time of at most about 60 minutes to reach a target temperature of at least about 550 degrees Celsius. In some embodiments, the first reactor module provides an ammonia conversion efficiency of at least about 90%. In some embodiments, the first reactor module has a power density of about 10 watts of electrical power per cubic centimeter of reactor bed volume. In some embodiments, the system has a system level electrical energy density of at least about 600 watt-hours per kilogram. In some embodiments, the system has a hydrogen storage capacity of at least about 5% by weight. In some embodiments, at least one of the first reactor module and the second reactor module is configured for self-heat generation from electricity or hydrogen combustion.

In some embodiments, the system may further comprise one or more fuel cells in fluid communication with at least one of the first reactor module and the second reactor module. In some embodiments, the system may further comprise a hybrid battery for load following and initial reactor heating power. In some embodiments, the hybrid battery is in electrical communication with at least one of the first reactor module and the second reactor module.

In some embodiments, the second reactor module is in fluid communication with the first reactor module to permit a transport of hydrogen, nitrogen, or ammonia between the first reactor module and the second reactor module. In some embodiments, the second reactor module is in thermal and/or fluid communications with the first reactor module.

In some embodiments, the source material is provided to the first reactor module and the second reactor module from a same source. In some embodiments, the source material is provided to the first reactor module and the second reactor module from different sources.

In some embodiments, the system may further comprise one or more springs adjacent to the catalyst and/or the one or more electrodes, wherein the one or more springs are configured to lighten or redistribute mechanical loads on the catalyst when the catalyst undergoes one or more thermal cycling procedures. In some embodiments, the one or more springs comprise one or more metal springs. In some embodiments, the one or more springs comprise one or more copper springs. In some embodiments, the one or more springs are configured to alleviate thermal stresses on the catalyst due to a thermal expansion or a thermal contraction of the catalyst during one or more thermal cycling procedures.

In another aspect, the present disclosure provides a method for processing ammonia, comprising: (a) providing (i) a first reactor module comprising a first catalyst and a startup heating and reforming unit and (ii) a second reactor module in fluid communication with the first reactor module, wherein the second reactor module comprises a second catalyst and one or more main heating units; (b) using the startup heating and reforming unit to pass a current through the first catalyst to heat the first catalyst, wherein the first catalyst is configured to produce or extract hydrogen from ammonia when heated; and (c) using at least one of the one or more main heating units to heat at least a portion of the second catalyst by combusting the hydrogen generated using the first reactor module and/or the second reactor module.

In some embodiments, the method may further comprise using the second catalyst to produce or extract hydrogen from ammonia, wherein the second catalyst is configured to produce or extract the hydrogen from the ammonia when heated. In some embodiments, the method may further comprise directing at least a portion of the hydrogen generated using the second catalyst to one or more fuel cells to generate electrical energy. In some embodiments, the method may further comprise directing at least a portion of the hydrogen generated using the first catalyst to one or more fuel cells to generate electrical energy.

In another aspect, the present disclosure provides a system comprising: a reactor module configured to receive a source material comprising ammonia, wherein the reactor module comprises a catalyst and a plurality of heating units for heating the catalyst, wherein the plurality of heating units comprises a first heating unit configured to heat at least a first portion of the catalyst by combustion and a second heating unit configured to heat at least a second portion of the catalyst using electrical heating, wherein the catalyst is configured to produce or extract hydrogen from the ammonia when the catalyst is heated using the plurality of heating units.

In some embodiments, the second heating unit is configured to heat the second portion of the catalyst by passing an electrical current through the second portion of the catalyst. In some embodiments, the system may further comprise a secondary reactor module in fluid and/or thermal communication with the reactor module, wherein the secondary reactor module comprises a secondary catalyst and a secondary heating unit, wherein the secondary heating unit is configured to heat the secondary catalyst, wherein the secondary catalyst is configured to produce or extract hydrogen from the ammonia when the secondary catalyst is heated using the secondary heating unit.

In some embodiments, the first heating unit of the reactor module is configured to heat the first portion of the catalyst by combusting hydrogen gas generated using the secondary reactor module. In some embodiments, the first heating unit is configured to heat the first portion of the catalyst by combusting leftover hydrogen gas from one or more fuel cells in fluid communication with the reactor module or the secondary reactor module. In some embodiments, the secondary heating unit comprises one or more electrodes for passing a current through the secondary catalyst to heat the secondary catalyst.

In some embodiments, a heat load distribution between the first heating unit and the second heating unit is adjustable to increase an ammonia cracking conversion efficiency and to enhance a thermal reforming efficiency of the reactor module. In some embodiments, the system may further comprise a controller configured to control an operation of the first heating unit and the second heating unit to adjust the heat load distribution within the reactor module. In some embodiments, the heat load distribution comprises a heating power ratio corresponding to a ratio between a heating power of the first heating unit and a heating power of the second heating unit.

In some embodiments, the reactor module has a thermal reforming efficiency of at least about 80%. In some embodiments, the reactor module has a thermal reforming efficiency of at least about 90%. In some embodiments, the reactor module has a thermal reforming efficiency of at least about 95%. In some embodiments, the reactor module comprises a cartridge heater design that utilizes one or more electrical insulation materials with a high heat transfer coefficient. In some embodiments, the one or more electrical insulation materials comprise boron nitride. In some embodiments, the reactor module comprises a reaction bed comprising one or more ammonia decomposition catalysts comprising a metal material, a promoter material, and a support material. In some embodiments, the first heating unit and the second heating unit are configured to heat different portions of the reaction bed. In some embodiments, the metal material comprises ruthenium, nickel, rhodium, iridium, cobalt, iron, platinum, chromium, palladium, or copper. In some embodiments, the promoter material comprises at least one material selected from Li, Na, K, Rb, Cs, Mg, Ca, Ba, Sr, La, Ce, Pr, Sm, or Gd. In some embodiments, the support comprises at least one material selected from $Al_2O_3$, MgO, $CeO_2$, $ZrO_2$, $La_2O_3$, $SiO_2$, $Y_2O_3$, $TiO_2$, SiC, hexagonal BN (boron nitride), BN nanotubes, silicon carbide, one or more zeolites, $LaAlO_3$, $CeAlO_3$, $MgAl_2O_4$, $CaAl_2O_4$, or one or more carbon nanotubes.

In some embodiments, the reactor module comprises one or more walls having a thickness that ranges from about 0.5 millimeters to about 1.5 millimeters to reduce thermal mass and to provide a faster and more dynamic temperature response. In some embodiments, the reactor module comprises one or more walls having a thickness that ranges from about 1.5 millimeters to about 10 millimeters (to increase structural integrity). In some embodiments, the system may further comprise one or more fuel cells in fluid communication with the reactor module, wherein the one or more fuel cells are configured to generate electrical energy using the hydrogen generated by the reactor module.

In some embodiments, the plurality of heating units comprises at least two or more heating units. In some embodiments, a heat load distribution between the at least two or more heating units is adjustable to increase an ammonia conversion efficiency and to enhance a thermal reforming efficiency of the reactor module. In some embodiments, each of the at least two or more heating units have one or more heating zones in the reactor module to allow for a continuous heat distribution within one or more regions in the reactor module. In some embodiments, the at least two or more heating units are configured to heat different zones in the reactor module. In some embodiments, the at least two or more heating units are configured to heat one or more same zones in the reactor module. In some embodiments, the first portion and the second portion are different portions of the catalyst. In some embodiments, the electrical heating comprises Joule heating.

In another aspect, the present disclosure provides a method, comprising: (a) providing a reactor module comprising a catalyst and a plurality of heating units for heating the catalyst, wherein the plurality of heating units comprises a first heating unit and a second heating unit, wherein the catalyst is configured to produce or extract hydrogen from ammonia when the catalyst is heated using the plurality of heating units; and (b) using (i) the first heating unit to heat at least a first portion of the catalyst by combustion and (ii) the second heating unit to heat at least a second portion of the catalyst by electrical heating.

In some embodiments, the method may further comprise using the catalyst to extract hydrogen from ammonia. In some embodiments, the method may further comprise directing the extracted hydrogen to one or more fuel cells to generate electrical energy. In some embodiments, using the first heating unit to heat at least the first portion of the catalyst comprises combusting hydrogen gas generated using a secondary reactor module. In some embodiments, using the second heating unit to heat at least the second portion of the catalyst comprises passing an electrical current through the second portion of the catalyst. In some embodiments, the method may further comprise adjusting a heat load distribution between the first heating unit and the second heating unit to increase an ammonia conversion efficiency and to enhance a thermal reforming efficiency of the reactor module.

In another aspect, the present disclosure provides a system for processing ammonia, comprising: one or more reactors for decomposing ammonia using one or more catalysts; one or more heat exchangers for heating at least an inlet flow or for cooling at least an exit flow of the one or more reactors; and one or more adsorption towers for filtering or removing one or more trace materials from the exit flow of the one or more reactors. In some embodiments, the one or more adsorption towers comprise one or more adsorbents having a cartridge form factor. In some embodiments, the one or more reactors comprise a startup reactor and a main reactor. The startup reactor may be configured to decompose ammonia into hydrogen and provide at least said hydrogen to the main reactor as a fuel for combustion heating. In some embodiments, the startup reactor is configured to heat the one or more catalysts using electrical heating, resistive heating, inductive heating, or Joule heating. In some embodiments, the startup reactor is in fluid communication and/or thermal communication with the main reactor. In some embodiments, the one or more adsorption towers comprise two or more adsorbent beds for on-demand adsorbent regeneration and continuous system operation.

In some embodiments, the system may further comprise one or more valves or flow control units for selectively diverting the reactor exit flow between a first adsorbent bed and a second adsorbent bed. In some embodiments, the system may further comprise a controller configured to control the one or more valves or flow control units to divert the reactor exit flow to a regenerated adsorbent bed. In some embodiments, the system may further comprise one or more additional heat exchangers for regenerating the one or more adsorbent towers. In some embodiments, the system may further comprise a pump or a blower configured to remove trace ammonia from the reactor exit flow and to combine a stream of the trace ammonia with an exit flow from a fuel cell in fluid communication with a combustion heater of the one or more reactors and/or the one or more adsorbent towers (e.g., during adsorbent regeneration). In some embodiments, the system may further comprise one or more fuel cells in fluid communication with the one or more reactors. In some embodiments, the system may further comprise one or more ammonia tanks in fluid communication with the one or more reactors. In some embodiments, the one or more heat exchangers for the exit flows and/or inlet flows of the reactors may be in thermal communications with an ammonia storage tank to provide heating energy for ammonia evaporation inside the ammonia storage tank. In some embodiments, the exit flows and/or inlet flows of the reactors may be in thermal communications with the flow from the ammonia storage tank for ammonia evaporation and/or to increase the temperature. In some embodiments, the system may further comprise an ammonia storage tank in thermal communication with one or more fuel cells to recover waste heat from the one or more fuel cells to provide heating energy for the ammonia evaporation in the ammonia storage tank. In some embodiments, the system may comprise one or more heat exchangers in thermal communication with one or more fuel cells to recover waste heat from the one or more fuel cells to provide heating energy for the ammonia evaporation inside the one or more heat exchangers. In some embodiments, the reactor inlet flow or the exit flow comprises at least one of hydrogen, nitrogen, and ammonia. In some embodiments, the one or more trace materials comprise ammonia. In some embodiments, the ammonia comprises unconverted ammonia. In some embodiments, the system may further comprise one or more additional heat exchangers in thermal communication with an ammonia storage tank to provide heating energy for ammonia evaporation inside the ammonia storage tank.

In some embodiments, the one or more reactors may be configured to be mounted to a vehicle. In some embodiments, the vehicle comprises a terrestrial vehicle, an aerial vehicle, or an aquatic vehicle (e.g., a boat, a ship, or any other type of maritime vehicle). In some embodiments, the one or more reactors are configured to be mounted in a front region, a back region, a side region, an inner region, an outer region, an upper region, or a lower region of the vehicle. In some embodiments, the one or more reactors, the one or more heat exchangers, and the one or more adsorption towers are configured to be mounted in different portions or regions of a vehicle. In some embodiments, the vehicle comprises a drone, an automobile, or a truck. In some embodiments, the vehicle is configured to be operated by a human or a computer. In some embodiments, the vehicle is autonomous or semi-autonomous.

In another aspect, the present disclosure provides a system comprising: (a) an ammonia storage tank; (b) a reactor in fluid communication with the ammonia storage tank, wherein the reactor is configured to decompose ammonia received from the ammonia storage tank to generate a reactor exit flow comprising hydrogen; (c) one or more adsorbents configured to filter out or remove unconverted ammonia from at least a portion of the reactor exit flow to provide a filtered reactor exit flow; (d) one or more fuel cells in fluid communication with at least one of the reactor and the one or more adsorbents, wherein the one or more fuel cells are configured to (i) receive the filtered reactor exit flow from the one or more adsorbents (ii) process the filtered reactor exit flow to generate electricity, and (iii) output a fuel cell exit flow comprising unconverted hydrogen; and (e) one or more combustors embedded at least partially within the reactor, wherein the one or more combustors are (i) in fluid communication with at least one of the ammonia storage tank, the reactor, the one or more adsorbents, and the one or more fuel cells, and (ii) configured to combust at least a portion of ammonia flow from the ammonia tank, the reactor exit flow, the filtered reactor exit flow, or the fuel cell exit flow to generate thermal energy for heating the reactor in a plurality of different regions to facilitate ammonia decomposition.

In some embodiments, the one or more combustors are configured to combust at least a portion of the reactor exit flow to heat the plurality of different regions within the reactor. In some embodiments, the reactor exit flow further comprises undecomposed ammonia. In some embodiments, the reactor exit flow further comprises nitrogen.

In some embodiments, the one or more combustors are configured to combust at least a portion of the fuel cell exit flow to heat the plurality of different regions within the reactor. In some embodiments, the fuel cell exit flow further comprises hydrogen. In some embodiments, the fuel cell exit flow further comprises nitrogen.

In some embodiments, the one or more combustors comprise one or more distinct combustion zones configured to heat the plurality of different regions within the reactor. In some embodiments, the one or more combustors comprise one or more air-fuel contact zones configured to mix a flow comprising hydrogen and a flow comprising oxygen to facilitate combustion.

In some embodiments, the one or more combustors comprise a cylindrical shape or a circular cross-section. In some embodiments, the one or more combustors are concentric to the reactor.

In some embodiments, the system further comprises an air supply unit in fluid communication with the one or more combustors, wherein the air supply unit is configured to supply at least oxygen to the one or more combustors. In some embodiments, the air supply unit comprises a fan, a blower, a compressor, a compressed cylinder, a venturi restriction, a turbine, or a turbocharging unit. In some embodiments, the air supply unit comprises a turbocharging unit driven by a combustor exit flow from the one or more combustors.

In some embodiments, the system comprises a mobile system with a volume of at most about 2 m$^3$.

In some embodiments, the one or more combustors comprise a rectangular shape or a rectangular cross-section.

In some embodiments, the one or more combustors comprise a high temperature refractory material configured to enhance combustor stability. In some embodiments, the high temperature refractory material comprises alumina, magnesia, silica, lime, steel, tungsten, molybdenum, tungsten carbide, or any combination thereof. In some embodiments, the high temperature refractory material comprises a metal oxide selected from the group consisting of: $Al_2O_3$, $SiO_2$, $ZrO_2$, $VO_2$, Ta, Ni alloy, Al alloy, Mo alloy, Cr alloy, Si alloy, or any combination thereof. In some embodiments, the refractory material is coated on one or more surfaces of the one or more combustors.

In some embodiments, the filtered reactor exit flow comprises at most about 100 ppm ammonia. In some embodiments, the filtered reactor exit flow comprises at most about 10 ppm ammonia.

In some embodiments, the one or more combustors comprise an atmospheric combustor, a naturally aspirated combustor, a swirl combustor, or a pressurized combustor. In some embodiments, the atmospheric combustor is configured to receive a supply of air or oxygen from a compressed cylinder or an air supply unit (e.g., fan, blower, compressor, etc.). In some embodiments, the naturally aspirated combustor is configured to receive a supply of air or oxygen from an ambient environment in part based on a vacuum induced within the combustor. In some embodiments, the pressurized combustor is configured to receive a supply of air or oxygen from an air supply unit (e.g., fan, blower, compressor, etc.). coupled to a turbine, wherein the turbine is driven by one or more exhaust gases from the pressurized combustor.

In some embodiments, the one or more combustors are configured to combust a mixture of air and fuel that is at least partially pre-mixed upstream of a combustion region. In some embodiments, the one or more combustors are configured to combust a mixture of air and fuel, wherein the air and the fuel are mixed at or near the combustion region to produce a flame. In some embodiments, the one or more combustors are configured to combust a mixture of air and fuel, wherein the air and the fuel are mixed at a set of premixing zones upstream of a combustion region to enhance heat distribution. In some embodiments, each premixing zone in the set of premixing zones is configured to pre-combust at least a portion of the mixture of air and fuel, thereby distributing heat more uniformly throughout the combustor and reducing one or more local hot spot temperatures. In some embodiments, the set of premixing zones comprises at least 1 premixing zone. In some embodiments, the set of premixing zones comprises at least 2 premixing zones. In some embodiments, the set of premixing zones comprises at least 3 premixing zones.

In some embodiments, the combustion fuel comprises at least one of the reactor exit flow, flow from the ammonia storage tank, the filtered reactor exit flow, or the fuel cell exit flow.

In some embodiments, the one or more combustors are configured to combust at least a portion of the ammonia flow from the ammonia storage tank to generate thermal energy for heating the reactor in a plurality of different regions to facilitate ammonia decomposition.

In another aspect, the present disclosure provides a system comprising: one or more reactors configured to crack ammonia provided to the one or more reactors to yield hydrogen, nitrogen, and/or ammonia; and one or more fuel cells in fluid communication with the one or more reactors, wherein the one or more fuel cells are configured to receive and process the hydrogen to generate electrical energy, wherein the one or more reactors and the one or more fuel cells are configured to be mounted on or to an aerial vehicle, wherein the one or more fuel cells are in electrical communication with one or more motors or drive units of the aerial vehicle to drive the one or more motors or drive units of the aerial vehicle.

In some embodiments, the one or more reactors comprise a startup reactor and a main reactor.

In some embodiments, the startup reactor is configured to crack at least a portion of the ammonia provided to the one or more reactors to yield hydrogen, nitrogen, and/or ammonia. In some embodiments, the startup reactor is in fluid communication with the main reactor, wherein the main reactor is configured to combust at least a portion of an exit flow from the startup reactor to heat the main reactor.

In some embodiments, the exit flow from the startup reactor comprises hydrogen and at least one of ammonia or nitrogen.

In some embodiments, the one or more reactors comprise two or more startup reactors and two or more main reactors.

In some embodiments, the system further comprises a controller configured to control a flow of the ammonia provided to the one or more reactors based on a desired power output from the one or more fuel cells.

In some embodiments, the system further comprises one or more adsorbents in fluid communication with the one or more reactors, wherein the one or more adsorbents are configured to process an exit flow from the one or more reactors to filter out or remove ammonia from the exit flow, wherein the exit flow comprises at least hydrogen and/or nitrogen.

In some embodiments, the adsorbents are in fluid communication with the one or more fuel cells, wherein the adsorbents are configured to direct the hydrogen and/or the nitrogen to the one or more fuel cells after filtering out or removing the ammonia from the exit flow of the one or more reactors.

In some embodiments, the system further comprises one or more combustors in fluid communication with the one or more fuel cells, wherein the one or more combustors are configured to combust an exit flow from the one or more fuel cells to heat the one or more reactors.

In some embodiments, the exit flow from the one or more fuel cells comprises unconverted hydrogen.

In some embodiments, the one or more fuel cells are in communication with an electrical load.

In some embodiments, the electrical load comprises the one or more motors or drive units of the aerial vehicle.

In some embodiments, the one or more combustors are positioned at least partially within the one or more reactors.

In some embodiments, the system further comprises an auxiliary battery for powering the one or more motors or drive units of the aerial vehicle.

In some embodiments, the system further comprises one or more heat exchangers for cooling an exit flow of the one or more reactors. In some embodiments, the system further comprises one or more heat exchangers for vaporizing and/or heating a flow from the one or more fuel storage tanks.

In some embodiments, the system further comprises one or more fuel storage tanks mounted on the aerial vehicle, wherein the fuel storage tanks are in fluid communication with the one or more heat exchangers and/or the one or more reactors to provide the ammonia.

In some embodiments, the one or more fuel cells are in thermal communication with the one or more fuel storage tanks and/or one or more heat exchangers to facilitate a transfer of thermal energy from the one or more fuel cells to the one or more fuel storage tanks and/or one or more heat exchangers to heat the one or more fuel storage tanks and/or one or more heat exchangers for ammonia evaporation.

In some embodiments, the one or more heat exchangers are in thermal communication with an exit flow from the one or more fuel cells to cool the heat exchangers and/or the exit flow from the one or more reactors, wherein the exit flow from the one or more fuel cells comprises at least air or oxygen.

In some embodiments, the system further comprises a controller operatively coupled to one or more valves for controlling (i) a flow of the ammonia to the one or more reactors or the one or more heat exchangers or (ii) a flow of hydrogen to the one or more fuel cells. In some embodiments, the controller is configured to provide dynamic power control by controlling an operation of the one or more valves.

In some embodiments, each of the one or more reactors is configured to crack at least about 30 liters of ammonia per minute.

In some embodiments, the system further comprises a controller and one or more sensors operatively coupled to the controller, wherein the controller is configured to monitor a temperature of the one or more reactors, a flow pressure of the ammonia and/or hydrogen, and/or an electrical output of the one or more fuel cells based on one or more measurements obtained using the one or more sensors. In some embodiments, the controller is configured to increase a power of an air supply unit to increase an air flow rate to one or more combustors of the one or more reactors when a temperature of the one or more reactors decreases or falls below a threshold temperature. In some embodiments, the controller is configured to modulate one or more valves connected to an ammonia storage tank to maintain or reach a threshold pressure point corresponding to a desired ammonia flow rate and power output.

In some aspects, the present disclosure provides a system for processing ammonia, comprising: one or more reactors for decomposing ammonia; one or more heating elements embedded in at least one of the one or more reactors; and one or more flow channels provided around or adjacent to the one or more heating elements to enhance flow field and heating uniformity, wherein the one or more heating elements are configured to heat a fluid comprising one or more reforming gases as the fluid flows along the one or more flow channels provided around or adjacent to the one or more heating elements.

In some embodiments, each of the one or more reactors is configured to output a volume or amount of hydrogen that is usable to generate at least about 25 kilowatts of power.

In some embodiments, the one or more reactors comprise one or more enclosed or partially enclosed regions which (i) comprise the one or more flow channels and (ii) surround the one or more heating elements, wherein the one or more enclosed or partially enclosed regions allow a passage of the one or more reforming gases around the one or more heating elements to facilitate heat transfer between the one or more heating elements and the one or more reforming gases.

In some embodiments, the one or more heating elements comprise a combustion heater, an electrical heater, or a hybrid heating unit comprising both the combustion heater and the electrical heater.

In some embodiments, the hybrid heating unit comprises the combustion heater and the electrical heater in series along a length of the at least one reactor.

In some embodiments, the hybrid heating unit comprises the combustion heater and the electrical heater in parallel orthogonal to a length of the at least one reactor.

In some embodiments, the system further comprises one or more catalysts configured to decompose or crack ammonia when heated by the one or more heating elements.

In some embodiments, the one or more catalysts are provided outside of or external to the one or more heating elements.

In some embodiments, the one or more heating elements comprise one or more external surfaces in thermal communication with the fluid flowing along or through the one or more flow channels, wherein the one or more catalysts are provided adjacent to and/or in thermal communication with the external surfaces of the one or more heating elements.

In some embodiments, the one or more catalysts are located or provided within the one or more flow channels.

In some embodiments, the one or more flow channels comprise a circular cross-section to enable uniform heating of the fluid.

In some embodiments, the one or more gas inlets are configured to distribute flow of the fluid into a plurality of flow channels within at least one reactor of the one or more reactors.

In some embodiments, the one or more heating elements are configured to provide a plurality of heating zones within the reactors, wherein the plurality of heating zones have different temperatures and/or heating power that are predetermined or adjustable.

In some embodiments, the one or more reactors comprise a cross-sectional shape comprising a circle, an ellipse, an oval, or any polygon comprising three or more sides.

In some embodiments, the one or more flow channels comprise a cross-sectional shape comprising a circle, an ellipse, an oval, or any polygon comprising three or more sides.

In some embodiments, the one or more reactors comprise a cross-sectional shape that is similar to a cross-sectional shape of a flow channel in the one or more flow channels.

In some embodiments, the one or more reactors comprise a cross-sectional shape that is different than a cross-sectional shape of a flow channel in the one or more flow channels.

In some embodiments, the one or more reactors comprise (i) a first flow path for passage of reforming gases from one or more gas inlets along a portion of the one or more heating elements and (ii) a second flow path for directing reformate gases to one or more gas outlets.

In some embodiments, the first flow path and the second flow path are oriented in different directions.

In some embodiments, the first flow path and the second flow path are positioned adjacent to each other to enable a transfer of thermal energy between (i) the one or more reforming gases entering the one or more reactors via the one or more gas inlets and (ii) one or more reformate gases exiting the one or more reactors via the gas outlets.

In some embodiments, the system further comprises a plurality flow channels, wherein a first flow channel of the plurality of flow channels associated with the first flow path, a second flow channel of the one or more flow channels associated with the second flow path, or both the first flow channel and the second flow channel have one or more internal extended surfaces configured to enhance heat transfer.

In some embodiments, each individual heating element of the one or more heating elements comprises one or more dedicated flow channels.

In some embodiments, the one or more heating elements each comprise different respective flow channels.

In some embodiments, the one or more heating elements are configured to (i) control temperatures and/or heating powers of different regions of the one or more heating elements or the one or more reactors or (ii) adjust a location of one or more heating zones within the one or more reactors to optimize ammonia thermal reforming efficiency and/or conversion efficiency. The fuel reforming or conversion capabilities of the reactors may be determined or computed based on measurements taken downstream of the one or more reactors.

In some embodiments, the system further comprises a plurality of different catalysts for decomposing ammonia, wherein the plurality of different catalysts is in thermal communication with at least one of the one or more heating elements.

In some embodiments, the plurality of different catalysts comprises a first catalyst with a first set of ammonia reforming properties and a second catalyst with a second set of ammonia reforming properties.

In some embodiments, the first catalyst and the second catalyst are in thermal communication with different heating elements, different locations or regions of a same heating element, or different heating zones generated by the one or more heating elements.

In some embodiments, the one or more flow channels comprise one or more baffles to induce turbulence, mixing, increase flow residence time, and/or enhance flow uniformity and heat transfer.

In some embodiments, the system further comprises a controller configured to control a flow of ammonia into the one or more flow channels by modulating one or more flow control units.

In some embodiments, the controller is configured to control the flow of ammonia based on a heating power input and/or temperatures to each of the one or more heating elements.

In some embodiments, the system further comprises a controller configured to control an operation or a temperature of the one or more heating elements.

In some embodiments, the system further comprises one or more heat exchanger(s) between one or more hot outlet flow(s) and one or more cold inlet flow(s) of the one or more reactors.

In some embodiments, each of the one or more reactors is configured to reform at least about 300 L/min of ammonia.

In some embodiments, each of the one or more reactors is configured to reform at least about 300 standard liters per minute (SLM) of ammonia.

In some embodiments, the system further comprises: one or more fuel cells in fluid communication with the one or more reactors, wherein the one or more fuel cells are configured to receive and process hydrogen generated by the decomposition of ammonia to produce electrical energy, wherein the system has an energy density of at least about 600 Wh/kg, at least about 400 Wh/L, or both.

In some embodiments, the system further comprises a plurality of reactors, wherein a first reactor in the plurality of reactors comprises an electrical heater, and wherein a second reactor in the plurality of reactors comprises a combustion heater, and wherein the first reactor and the second reactor are in fluidic communication in series or in parallel.

In another aspect, the present disclosure provides a system comprising: one or more reactors in fluid communication with one or more ammonia sources, wherein the one or more reactors comprise one or more catalysts; and a plurality of heating elements in thermal communication with the one or more catalysts, wherein the one or more reactors are configured to produce or generate hydrogen from ammonia provided by or received from the one or more ammonia sources using the one or more catalysts and the plurality of heating elements, wherein the plurality of heating elements comprise at least one electrical heater and at least one combustion heater.

In some embodiments, the one or more reactors comprise a first reactor and a second reactor in fluid communication with the first reactor.

In some embodiments, the first reactor comprises (i) a first catalyst and (ii) a startup heating unit configured to heat the first catalyst, wherein the first catalyst is configured to produce or extract the hydrogen from the ammonia.

In some embodiments, the startup heating unit comprises the at least one electrical heater.

In some embodiments, the at least one electrical heater comprises one or more electrodes for passing a current through the first catalyst to heat the first catalyst.

In some embodiments, the second reactor comprises (i) a second catalyst and (ii) one or more main heating units configured to heat the second catalyst, wherein the second catalyst is configured to produce or extract the hydrogen from the ammonia.

In some embodiments, the one or more main heating units comprise the at least one combustion heater.

In some embodiments, the at least one combustion heater is configured to heat at least a portion of the second catalyst by combusting the hydrogen generated by the first reactor.

In some embodiments, the system further comprises the one or more ammonia sources.

In some embodiments, the one or more ammonia sources comprise one or more liquid fuel storage tanks, wherein the ammonia is stored as liquid ammonia in the one or more liquid fuel storage tanks.

In some embodiments, the liquid ammonia is stored at a temperature ranging from about 15 to about 30° C. and at an absolute pressure ranging from 7 to 12 bar.

In some embodiments, the liquid ammonia is stored at a gauge pressure ranging from about atmospheric pressure to about 20 bar.

In some embodiments, the liquid ammonia is stored at a temperature ranging from about −40 to about 20° C. and at an absolute pressure ranging from about 0.5 bar to about 9 bar.

In some embodiments, the system further comprises one or more fuel cells in fluid communication with the one or more reactors.

In some embodiments, the system further comprises one or more adsorbents in fluid communication with the one or more reactors and the one or more fuel cells, wherein the one or more adsorbents are configured to filter out or remove unconverted ammonia from an exit flow from the one or more reactors.

In some embodiments, the one or more adsorbents are configured to provide a filtered reactor exit flow to the one or more fuel cells.

In some embodiments, the one or more fuel cells are configured to (i) receive the filtered reactor exit flow from the one or more adsorbents, (ii) process the filtered reactor exit flow to generate electricity, and (iii) output a fuel cell exit flow comprising unconverted hydrogen.

In some embodiments, one or more heating elements of the plurality of heating elements are in fluid and/or thermal communication with the fuel cell exit flow.

In some embodiments, the one or more heating elements are configured to combust the unconverted hydrogen in order to heat the one or more catalysts.

In some embodiments, the one or more reactors comprise one or more flow channels for the ammonia, wherein the one or more flow channels (i) surround at least one heating element of the plurality of heating elements and (ii) permit a flow of the ammonia around the at least one heating element to facilitate heat transfer between the heating element and the ammonia.

In some embodiments, the one or more reactors comprise one or more flow channels adjacent to the plurality of heating elements, wherein the flow channels permit a flow of the ammonia adjacent to or along the one or more heating elements to facilitate heat transfer between the one or more heating elements and the ammonia.

In some embodiments, each of the one or more flow channels is concentric or coaxial with a respective one of the one or more heating elements with respect to a longitudinal axis.

In some embodiments, the plurality of heating elements is in fluid communication and/or thermal communication with the ammonia flowing along or through the one or more flow channels.

In some embodiments, the one or more flow channels are provided around or adjacent to the heating elements to enhance flow field and heating uniformity.

In some embodiments, the heating elements are configured to heat the ammonia as the ammonia flows along or through the one or more flow channels provided around or adjacent to the heating elements.

In some embodiments, the at least one combustion heater is configured to combust an exit flow from the one or more reactors to generate thermal energy for heating the one or more reactors.

In some embodiments, the at least one combustion heater is configured to combust an exit flow from one or more adsorbents in fluid communication with the one or more reactors to generate thermal energy for heating the one or more reactors.

In some embodiments, the at least one combustion heater is configured to combust an exit flow from one or more fuel cells in fluid communication with the one or more reactors to generate thermal energy for heating the one or more reactors.

In some embodiments, the at least one combustion heater comprises a swirl combustor, a diffusion flame combustor, a micro-mixer combustor, or any combination thereof.

In some embodiments, an exhaust of the at least one combustion heater is usable to heat or preheat the ammonia.

In some embodiments, the at least one combustion heater is configured to combust a mixture of air and a combustion fuel comprising hydrogen.

In some embodiments, the at least one combustion heater comprises one or more zones for mixing or premixing the air and the combustion fuel upstream of a combustion region of the at least one combustion heater.

In some embodiments, each of the one or more zones is configured to combust or pre-combust at least a portion of the mixture of air and the combustion fuel to uniformly distribute heat throughout the combustion heater and reduce local hot spot temperatures.

In some embodiments, the plurality of heating elements comprises a hybrid heating unit comprising the at least one electrical heater and the at least one combustion heater.

In some embodiments, the first reactor comprises the at least one electrical heater, and the second reactor comprises the at least one combustion heater.

In some embodiments, the first reactor and the second reactor are in fluid communication in series so that a first exit flow of the first reactor enters the second reactor.

In some embodiments, the first reactor and the second reactor are in fluid communication in parallel so that a first exit flow of the first reactor and a second exit flow of the second reactor combine to form a combined exit flow.

In some embodiments, the one or more catalysts are provided adjacent to and/or in thermal communication with one or more external surfaces of the heating elements.

In some embodiments, the one or more reactors comprise a cross-sectional shape that is selected from the group consisting of a circle, an ellipse, an oval, and any polygon comprising three or more sides.

In some embodiments, the one or more reactors comprise one or more flow channels having a cross-sectional shape selected from the group consisting of a circle, an ellipse, an oval, and any polygon comprising three or more sides.

In some embodiments, each of the one or more reactors comprises a cross-sectional shape that is similar to a cross-sectional shape of a flow channel of each respective reactor of the one or more reactors.

In some embodiments, each of the one or more reactors comprise a cross-sectional shape that is different than a cross-sectional shape of a flow channel of each respective reactor of the one or more reactors.

In some embodiments, the one or more reactors comprise (i) a first flow path for a reforming gas comprising the ammonia and (ii) a second flow path for a reformate gas generated from processing of the reforming gas.

In some embodiments, the first flow path permits a flow of the reforming gas along at least a portion of the plurality of heating elements.

In some embodiments, the second flow path permits a flow of the reformate gas to one or more outlets of the reactors.

In some embodiments, the first flow path and the second flow path are oriented in different directions.

In some embodiments, the first flow path and the second flow path are in fluid communication with each other to enable heat transfer between the reforming gas and the reformate gas.

In some embodiments, the system further comprises one or more heat exchangers.

In some embodiments, the one or more heat exchangers are configured to exchange heat between an exit flow of the one or more reactors and a flow of the ammonia from the one or more ammonia sources.

In some embodiments, the one or more heat exchangers are configured to facilitate a transfer of thermal energy between (i) a flow of the ammonia from the one or more ammonia sources and (ii) one or more fuel cells in fluid communication with the one or more reactors, in order to evaporate the ammonia.

In some embodiments, the system further comprises one or more control units to modulate an exit flow of the one or more reactors and/or a temperature of the plurality of heating elements.

In some embodiments, the one or more control units comprise a controller and one or more sensors operatively coupled to the controller.

In some embodiments, the controller is configured to monitor and control (i) a temperature of the one or more reactors, (ii) a flow pressure of the ammonia and/or hydrogen, and/or (iii) an electrical output of one or more fuel cells in fluid communication with the one or more reactors, based at least in part on one or more measurements obtained using the one or more sensors.

In some embodiments, the controller is configured to reduce or increase an air flow rate, reduce or increase a combustion fuel flow rate, or reduce or increase both the air flow rate and the combustion fuel flow rate to the at least one combustion heater based on a temperature of the one or more reactors.

In some embodiments, the controller is configured to increase the air flow rate using a fan, a blower, or a compressor.

In some embodiments, the controller is configured to increase the combustion fuel flow rate by increasing ammonia flow rate or reducing fuel cell hydrogen consumption.

In some embodiments, the controller is configured to reduce or increase a power output of the one or more fuel cells based on a temperature of the one or more reactors.

In some embodiments, the controller is configured to increase a flow rate of the ammonia to the one or more reactors based on a temperature of the one or more reactors or power output of one or more fuel cells.

In some embodiments, the controller is configured to increase the flow rate of the ammonia using a valve and/or a pump.

In some embodiments, the system is configured to reform the ammonia at a rate of at least about 50 L/min STP of ammonia gas.

In some embodiments, the controller is configured to increase or decrease electrical power supplied to the at least one electrical heater based on a temperature of the one or more reactors.

In some embodiments, the system comprises an energy density of at least about 600 Wh/kg, or at least about 400 Wh/L.

In some embodiments, the system comprises an operating pressure that is less than about 30 bar.

In some embodiments, the system further comprises a pressure swing adsorption (PSA) unit to remove nitrogen from an exit flow of the one or more reactors.

In some embodiments, the PSA is located or positioned downstream of one or more adsorbents in fluid communication with the one or more reactors.

In some embodiments, the PSA unit produces a discharge stream comprising nitrogen and hydrogen, wherein the discharge stream is supplied to the at least one combustion heater.

In some embodiments, the filtered reactor exit flow comprises less than 100 ppm of ammonia.

In some embodiments, the one or more adsorbents are configured to regenerate by exchanging heat with one or more electrical heaters embedded in the one or more adsorbents, an exhaust from the at least one combustion heater, and/or an exit flow from the one or more reactors.

In some embodiments, the one or more adsorbents are replaceable with one or more new or regenerated adsorbents.

In some embodiments, the one or more catalysts comprise a support and at least one metal selected from ruthenium, nickel, rhodium, iridium, cobalt, iron, platinum, chromium, palladium, molybdenum, tantalum, or copper.

In some embodiments, the one or more catalysts are promoted with at least one metal selected from Li, Na, K, Rb, Cs, Mg, Ca, Ba, Sr, La, Ce, Pr, Sm, or Gd.

In some embodiments, the support comprises at least one material selected from $Al_2O_3$, MgO, $CeO_2$, $ZrO_2$, $La_2O_3$, $SiO_2$, $Y_2O_3$, $TiO_2$, SiC, hexagonal BN (boron nitride), BN nanotubes, silicon carbide, one or more zeolites, $LaAlO_3$, $CeAlO_3$, $MgAl_2O_4$, $CaAl_2O_4$, or one or more carbon nanotubes.

In some embodiments, the first reactor is configured to initiate a reforming process for the ammonia.

In some embodiments, the reforming process is initiated using the at least one electrical heater or an electrical current passed through the one or more catalysts.

In some embodiments, the at least one electrical heater or the electrical current is deactivated after the reforming process is initiated.

In some embodiments, the one or more fuel cells consume less than 90% of the hydrogen from the one or more reactors, and output one or more exit flows comprising the remaining unconverted hydrogen.

In some embodiments, an operating temperature of the one or more reactors is less than 900° C.

In some embodiments, the system further comprises one or more pumps to supply the ammonia and increase a flow pressure of the ammonia.

In some embodiments, the system does not produce carbon emissions.

In some embodiments, a fuel reforming or conversion of the one or more reactors is greater than about 90%.

In some embodiments, a fuel heating value to useful electrical energy output efficiency of the system is at least about 25% and at most about 50%.

In some embodiments, the system further comprises one or more electrical batteries, one or more DC/DC converters, and one or more motors to power a mobile vehicle.

In some embodiments, the one or more electrical batteries provide power to startup the system.

In some embodiments, the one or more electrical batteries are configured to provide power to startup the system by supplying the power to the at least one electrical heater.

In some embodiments, the system further comprises one or more fuel cells for generating power, wherein the power generated using the one or more fuel cells charges the one or more electrical batteries after a startup process is initiated or completed.

In some embodiments, the one or more fuel cells provide a substantially steady power or load for the mobile vehicle, and the one or more batteries enable dynamic load following capabilities.

In some embodiments, the mobile vehicle comprises an aerial vehicle, an unmanned aerial vehicle, a maritime or aquatic vehicle, or a terrestrial vehicle.

In some embodiments, the system further comprises one or more fuel cells for generating power, wherein the power generated using the one or more fuel cells is supplied to a stationary or non-mobile platform or network.

In some embodiments, the stationary or non-mobile platform or network comprises an electrical grid.

In some embodiments, the plurality of heating elements are embedded at least partially in the one or more reactors.

In another aspect, the present disclosure provides a system comprising: one or more reactors in fluid communication with one or more ammonia sources; and at least one heating element positioned at least partially within the one or more reactors, wherein the one or more reactors comprise a plurality of channels surrounding the at least one heating element to enhance flow field and heating uniformity for ammonia received from or provided by the one or more ammonia sources, wherein the plurality of channels provide a flow path for the ammonia that is adjacent to the at least one heating element to facilitate a transfer of thermal energy between the at least one heating element and the ammonia.

In some embodiments, the at least one heating element comprises a first heating element for heating a first portion of the ammonia and a second heating element for heating a second portion of the ammonia, wherein the plurality of channels comprises (i) a first channel for flowing the first portion of the ammonia through the one or more reactors and (ii) a second channel for flowing the second portion of the ammonia through the one or more reactors.

In some embodiments, the plurality of channels comprises two or more channels that are fluidically isolated from each other during heating of (i) the first portion of the ammonia using the first heating element and (ii) the second portion of the ammonia using the second heating element.

In some embodiments, the plurality of channels comprises a first channel extending along or around a portion of the first heating element and a second channel extending along or around a portion of the second heating element.

In some embodiments, the at least one heating element comprises an electrical heater or a combustion heater.

In some embodiments, the first heating element and the second heating element comprise a combustion heater.

In some embodiments, the first heating element comprises a combustion heater, and wherein the second heating element comprise an electrical heater.

In some embodiments, the at least one heating element comprises a plurality of combustion heaters configured to operate independently.

In some embodiments, the at least one heating element comprises a hybrid heating unit comprising a combustion heater and an electrical heater.

In some embodiments, the combustion heater and the electrical heater are arranged in series.

In some embodiments, the combustion heater and the electrical heater are arranged in parallel.

In some embodiments, the system further comprises one or more catalysts configured to decompose or crack the ammonia, wherein the at least one heating element is configured to heat the one or more catalysts to facilitate the decomposition or cracking of the ammonia.

In some embodiments, the one or more catalysts are provided outside of or external to the at least one heating element.

In some embodiments, the at least one heating element comprises one or more external surfaces, wherein the one or more catalysts are provided adjacent to and/or in thermal communication with the external surfaces of the at least one heating element.

In some embodiments, the one or more catalysts are located or provided within the plurality of channels.

In some embodiments, the at least one heating element is configured to provide a plurality of heating zones within the one or more reactors, wherein the plurality of heating zones have different temperatures and/or heating profiles.

In some embodiments, the one or more reactors comprise (i) a first flow path for passage of the ammonia through the one or more reactors for heating of the ammonia using the at least one heating element and (ii) a second flow path for directing reformate gases produced from decomposition or cracking of the ammonia to one or more outlets of the one or more reactors.

In some embodiments, the first flow path and the second flow path are oriented in different directions.

In some embodiments, the first flow path and the second flow path are positioned adjacent to each other to enable a transfer of thermal energy between (i) the ammonia entering the one or more reactors and (ii) the reformate gases exiting the one or more reactors.

In some embodiments, the at least one heating element comprises a plurality of heating elements each having one or more dedicated flow channels for the ammonia, wherein the plurality of channels comprise the one or more dedicated flow channels.

In some embodiments, the at least one heating element is configured to (i) control temperatures and/or heating profiles of different regions of the one or more reactors or (ii) adjust a location of one or more heating zones within the one or more reactors to optimize ammonia thermal reforming efficiency and/or conversion.

In some embodiments, the system further comprises a plurality of different catalysts for decomposing the ammonia, wherein the plurality of different catalysts is in thermal communication with the at least one heating element.

In some embodiments, the plurality of different catalysts comprises a first catalyst with a first set of ammonia reforming properties and a second catalyst with a second set of ammonia reforming properties.

In some embodiments, the first catalyst and the second catalyst are in thermal communication with different heating elements.

In some embodiments, the first catalyst and the second catalyst are in thermal communication with different locations or regions of a same heating element.

In some embodiments, the first catalyst and the second catalyst are in thermal communication with different heating zones generated by the at least one heating element.

In some embodiments, the one or more channels comprise one or more baffles to induce turbulence or mixing, increase flow residence time, and/or enhance flow uniformity and heat transfer.

In some embodiments, the system further comprises a controller configured to control a flow of the ammonia into the one or more channels by modulating one or more flow control units.

In some embodiments, the controller is configured to control the flow of ammonia based on a heating power input to the at least one heating element and/or a temperature of the at least one heating element.

In some embodiments, the system further comprises a controller configured to control an operation or a temperature of the at least one heating element.

In some embodiments, the system further comprises one or more heat exchanger(s) between one or more hot outlet flow(s) and one or more cold inlet flow(s) of the one or more reactors.

In some embodiments, each of the one or more reactors is configured to reform ammonia gas at a rate of at least about 50 L/min STP.

In some embodiments, the system further comprises one or more fuel cells in fluid communication with the one or more reactors, wherein the one or more fuel cells are configured to receive and process hydrogen generated from a decomposition of the ammonia to produce electrical energy.

In some embodiments, the system has an energy density of at least about 600 Wh/kg, at least about 400 Wh/L, or both.

In some embodiments, the one or more reactors comprise a plurality of reactors, wherein a first reactor of the plurality of reactors comprises an electrical heater, and wherein a second reactor of the plurality of reactors comprises a combustion heater, and wherein the first reactor and the second reactor are in fluidic communication with each other.

In some embodiments, the first reactor and the second reactor are arranged in parallel such that a first exit flow of the first reactor and a second exit flow of the second reactor collectively form a combined exit flow.

In some embodiments, the first reactor and the second reactor are arranged in series so that a first exit flow of the first reactor is configured to enter the second reactor.

In some embodiments, the system further comprises one or more fuel cells in fluid communication with the one or more reactors.

In some embodiments, the system further comprises one or more adsorbents in fluid communication with the one or more reactors and the one or more fuel cells, wherein the one or more adsorbents are configured to filter out or remove unconverted ammonia from an exit flow from the one or more reactors.

In some embodiments, the one or more adsorbents are configured to provide a filtered reactor exit flow to the one or more fuel cells.

In some embodiments, the one or more fuel cells are configured to (i) receive the filtered reactor exit flow from the one or more adsorbents, (ii) process the filtered reactor exit flow to generate electricity, and (iii) output a fuel cell exit flow comprising unconverted hydrogen.

In some embodiments, the at least one heating element is in fluid communication with the fuel cell exit flow.

In some embodiments, the at least one heating element is configured to combust the unconverted hydrogen in order to heat one or more catalysts provided in the one or more reactors.

In some embodiments, the system further comprises a pressure swing adsorption (PSA) unit configured to remove nitrogen from the exit flow of the one or more reactors.

In some embodiments, the PSA is located or positioned downstream of the one or more adsorbents in fluid communication with the one or more reactors.

In some embodiments, the PSA unit produces a discharge stream comprising nitrogen and hydrogen, wherein the discharge stream is supplied to the at least one heating element.

In some embodiments, the system further comprises one or more heat exchangers.

In some embodiments, the one or more heat exchangers are configured to exchange thermal energy between an exit flow of the one or more reactors and a flow of the ammonia from the one or more ammonia sources.

In some embodiments, the one or more heat exchangers are configured to facilitate a transfer of thermal energy between (i) an exit flow of the one or more reactors and (ii) an ambient environment, in order to cool the exit flow of the one or more reactors.

In some embodiments, the one or more heat exchangers are configured to facilitate a transfer of thermal energy between (i) a flow of the ammonia from the one or more ammonia sources and (ii) one or more fuel cells in fluid communication with the one or more reactors, in order to evaporate the ammonia.

In some embodiments, the one or more heat exchangers are configured to facilitate a transfer of thermal energy between (i) a flow of the ammonia from the one or more ammonia sources and (ii) an ambient environment, in order to evaporate the ammonia.

In some embodiments, the at least one heating element is configured to combust an exit flow from the one or more reactors to generate thermal energy for heating the one or more reactors.

In some embodiments, the at least one heating element is configured to combust an exit flow from one or more adsorbents in fluid communication with the one or more reactors to generate thermal energy for heating the one or more reactors.

In some embodiments, the at least one heating element is configured to combust an exit flow from one or more fuel cells in fluid communication with the one or more reactors to generate thermal energy for heating the one or more reactors.

In some embodiments, the at least one heating element is positioned in the one or more catalysts.

In another aspect, the present disclosure provides a system comprising: one or more reactors configured to at least partially decompose ammonia provided to the one or more reactors to yield hydrogen, nitrogen, and/or ammonia; and one or more fuel cells in fluid communication with the one or more reactors, wherein the one or more fuel cells are configured to receive and process the hydrogen to generate electrical energy, wherein the one or more reactors and the one or more fuel cells are configured to be mounted on or to an aerial vehicle, wherein the one or more fuel cells are in electrical communication with one or more motors or drive units of the aerial vehicle to drive the one or more motors or drive units of the aerial vehicle.

In some embodiments, the one or more reactors and the one or more fuel cells are configured to operate as an ammonia powerpack unit.

In some embodiments, the ammonia powerpack unit has a weight that is less than about 100 kilograms.

In some embodiments, the ammonia powerpack unit has a volume that is less than about 200 liters.

In some embodiments, the ammonia powerpack unit has an energy density of at least about 600 watt-hours per kilogram or at least about 400 watt-hours per liter.

In some embodiments, the one or more reactors comprise a first reactor and a second reactor in fluid communication with the first reactor.

In some embodiments, the first reactor is configured to decompose at least a portion of the ammonia provided to the one or more reactors to yield hydrogen, nitrogen, and/or ammonia.

In some embodiments, the second reactor is configured to combust at least a portion of an exit flow from the first reactor to heat or pre-heat the second reactor, wherein the exit flow from the first reactor comprises hydrogen and at least one of ammonia or nitrogen.

In some embodiments, the system further comprises one or more heating elements configured to provide thermal energy for at least partially decomposing the ammonia.

In some embodiments, the system further comprises one or more catalysts in thermal communication with the one or more heating elements, wherein the one or more catalysts are configured to facilitate the decomposing of the ammonia.

In some embodiments, the one or more heating elements comprise one or more electrical heaters and/or combustors.

In some embodiments, the one or more heating elements comprise a combustor in fluid communication with the one or more fuel cells, wherein the combustor is configured to combust an exit flow from the one or more fuel cells to heat the one or more reactors, wherein the exit flow comprises unconverted hydrogen.

In some embodiments, the system further comprises a controller configured to control a flow of the ammonia provided to the one or more reactors based on a desired power output from the one or more fuel cells.

In some embodiments, the system further comprises one or more adsorbents in fluid communication with the one or more reactors, wherein the one or more adsorbents are configured to process an exit flow from the one or more reactors to filter out or remove ammonia from the exit flow, wherein the exit flow comprises at least hydrogen and/or nitrogen.

In some embodiments, the adsorbents are in fluid communication with the one or more fuel cells, and wherein the adsorbents are configured to direct the hydrogen and/or the nitrogen to the one or more fuel cells after filtering out or removing the ammonia from the exit flow of the one or more reactors.

In some embodiments, the one or more fuel cells are in communication with an electrical load and/or one or more electrical batteries.

In some embodiments, the one or more fuel cells are configured to supply power to one or more electrical batteries in communication with an electrical load.

In some embodiments, the electrical load comprises the one or more motors or drive units of the aerial vehicle.

In some embodiments, the system further comprises one or more batteries for performing a startup of the one or more reactors, electrical pre-heating of the one or more reactors, and/or dynamic load following.

In some embodiments, the startup occurs within about 30 minutes or less.

In some embodiments, the system further comprises an auxiliary battery for powering the one or more motors or drive units of the aerial vehicle.

In some embodiments, the system further comprises one or more fuel cells capable of charging the auxiliary battery during operation.

In some embodiments, the system further comprises one or more heat exchangers for (i) cooling an exit flow of the one or more reactors and/or (ii) vaporizing or heating a flow of ammonia from one or more fuel storage tanks to the one or more reactors.

In some embodiments, the system further comprises one or more fuel storage tanks for storing and providing the ammonia to the one or more reactors, wherein the one or more fuel storage tanks are mounted on the aerial vehicle.

In some embodiments, the one or more fuel cells are in thermal communication with the one or more fuel storage tanks to facilitate a transfer of thermal energy from the fuel cells to the fuel storage tanks to heat and/or evaporate the ammonia.

In some embodiments, the one or more fuel cells are in thermal communication with one or more heat exchangers to facilitate a transfer of thermal energy from the fuel cells to the one or more heat exchangers to heat and/or evaporate the ammonia.

In some embodiments, the one or more heat exchangers are in thermal communication with an exit flow from the one or more fuel cells to cool the heat exchangers and/or the exit flow from the one or more reactors.

In some embodiments, the one or more heat exchangers are in thermal communication with an ambient environment to cool the one or more heat exchangers.

In some embodiments, the system further comprises a controller configured to modulate (i) a flow of ammonia to the one or more reactors or (ii) a flow of hydrogen to the one or more fuel cells.

In some embodiments, the controller is configured to provide dynamic power control by modulating the flow of ammonia or hydrogen.

In some embodiments, each of the one or more reactors is configured to decompose at least about 30 liters of STP ammonia gas per minute.

In some embodiments, the system further comprises one or more sensors operatively coupled to the controller, wherein the controller is configured to monitor a temperature of the one or more reactors, a flow pressure or a flow rate of the ammonia, a flow pressure or a flow rate of the hydrogen, and/or an electrical output of the one or more fuel cells, based on one or more measurements obtained using the one or more sensors.

In some embodiments, the controller is configured to increase an air supply unit power to increase an air flow rate to one or more combustors of the one or more reactors based on a temperature of the one or more reactors.

In some embodiments, the controller is configured to adjust an ammonia flow pressure to increase an ammonia flow rate and to provide additional hydrogen to one or more combustors of the one or more reactors based on a temperature of the one or more reactors.

In some embodiments, the controller is configured to increase an ammonia flow pressure to increase an ammonia flow rate to provide additional hydrogen to one or more combustors of the one or more reactors based on a temperature of the one or more reactors.

In some embodiments, the controller is configured to modulate one or more valves in fluid communication with one or more fuel storage tanks comprising the ammonia to maintain or reach a threshold pressure point corresponding to a desired ammonia flow rate and power output.

In another aspect, the present disclosure provides a method, comprising: (a) processing ammonia using one or more reactors to produce or generate hydrogen, wherein the one or more reactors comprise (i) one or more catalysts and (ii) a plurality of heating elements in thermal communication with the one or more catalysts, wherein the plurality of heating elements comprise at least one electrical heater and at least one combustion heater; and (b) providing the hydrogen to one or more fuel cells to produce electrical energy.

In some embodiments, the one or more reactors comprise a first reactor and a second reactor in fluid communication with the first reactor.

In some embodiments, the first reactor comprises (i) a first catalyst of the one or more catalysts and (ii) a startup heating and reforming unit configured to heat the first catalyst, wherein the first catalyst is configured to produce or extract the hydrogen from the ammonia.

In some embodiments, the startup heating and reforming unit comprises the at least one electrical heater.

In some embodiments, the at least one electrical heater comprises one or more electrodes for passing a current through the first catalyst to heat the first catalyst.

In some embodiments, the second reactor comprises (i) a second catalyst of the one or more catalysts and (ii) one or more main heating units configured to heat the second catalyst, wherein the second catalyst is configured to produce or extract the hydrogen from the ammonia.

In some embodiments, the one or more main heating units comprise the at least one combustion heater.

In some embodiments, the at least one combustion heater is configured to heat at least a portion of the second catalyst by combusting at least the portion of the hydrogen generated using the first reactor.

In some embodiments, the method further comprises, subsequent to (b), providing the electrical energy to an electrical load and/or one or more electrical batteries.

In some embodiments, the method further comprises, prior to (b), filtering or removing unconverted ammonia from an exit flow from the one or more reactors.

In some embodiments, the unconverted ammonia is filtered or removed from the exit flow using one or more adsorbents to produce a filtered reactor exit flow.

In some embodiments, the one or more fuel cells are configured to (i) receive the filtered reactor exit flow from the one or more adsorbents, (ii) process the filtered reactor exit flow to generate the electrical energy, and (iii) output a fuel cell exit flow comprising unconverted hydrogen.

In some embodiments, the method further comprises combusting the unconverted hydrogen from the one or more fuel cells in order to heat the one or more catalysts.

In some embodiments, the unconverted hydrogen is combusted using one or more of the plurality of heating elements.

In some embodiments, the method further comprises combusting an exit flow from the one or more reactors to generate thermal energy for heating the one or more reactors or the one or more catalysts.

In some embodiments, the method further comprises combusting an exit flow from one or more adsorbents in fluid communication with the one or more reactors to generate thermal energy for heating the one or more reactors or the one or more catalysts.

In some embodiments, the method further comprises using a heat exchanger to facilitate a transfer of thermal energy between (i) an exit flow of the one or more reactors and (ii) a flow of the ammonia from one or more ammonia sources.

In some embodiments, the method further comprises using a heat exchanger to facilitate a transfer of thermal energy between (i) a flow of the ammonia from one or more ammonia sources and (ii) an exit flow from the one or more fuel cells to evaporate the ammonia.

In some embodiments, the method further comprises using a controller to modulate an exit flow of the one or more reactors and/or a temperature of the plurality of heating elements.

In some embodiments, the method further comprises using a controller to monitor and control (i) a temperature of the one or more reactors, (ii) a flow pressure of the ammonia and/or the hydrogen, and/or (iii) an electrical output of the one or more fuel cells.

In some embodiments, the method further comprises using a controller to modulate an air flow rate to the at least one combustion heater, a combustion fuel flow rate to the at least one combustion heater, or both the air flow rate and the combustion fuel flow rate to the at least one combustion heater, based on a temperature of the one or more reactors.

In some embodiments, the method further comprises using a controller to modulate a power output or hydrogen consumption of the one or more fuel cells, based on a temperature of the one or more reactors.

In some embodiments, the method further comprises using a controller to modulate a flow rate of the ammonia to the one or more reactors, based on a temperature of the one or more reactors and/or fuel cell power output.

In some embodiments, the method further comprises using a pressure swing adsorption (PSA) unit to remove nitrogen from an exit flow of the one or more reactors.

In some embodiments, the PSA is located or positioned downstream of one or more adsorbents in fluid communication with the one or more reactors.

In some embodiments, the PSA unit produces a discharge stream comprising nitrogen and hydrogen, wherein the discharge stream is supplied to the at least one combustion heater.

In some embodiments, the method further comprises using the first reactor to initiate a reforming process for the ammonia.

In some embodiments, initiating the reforming process comprises providing an electrical current through at least a portion of the one or more catalysts or at least a portion of the one or more electrical heaters to heat the one or more catalysts and facilitate decomposition or cracking of the ammonia.

In another aspect, the present disclosure provides a system comprising: an ammonia processing unit comprising a plurality of reactors, wherein the plurality of reactors comprise one or more electrical reactors, wherein the one or more electrical reactors are configured to (i) process ammonia to generate hydrogen and (ii) provide at least a portion of the hydrogen to one or more combustion reactors and/or one or more fuel cells in fluid communication with the one or more electrical reactors and/or the one or more combustion reactors.

In some embodiments, the system further comprises the one or more combustion reactors.

In some embodiments, the one or more combustion reactors are configured to combust the hydrogen to heat the one or more combustion reactors to a predetermined threshold temperature.

In some embodiments, the one or more combustion reactors are configured to (i) process the ammonia to generate one or more combustion reactor exit flows and (ii) provide the one or more combustion reactor exit flows to the one or more fuel cells.

In some embodiments, the one or more combustion reactors comprise one or more swirl burners configured to mix or swirl (i) a first stream comprising a combustion fuel with (ii) a second stream comprising air to facilitate combustion of the combustion fuel in order to heat the one or more combustion reactors, optionally wherein the combustion fuel comprises the hydrogen.

In some embodiments, the one or more swirl burners comprise one or more flow channels for directing the first stream and the second stream along one or more helical or spiral flow paths to enhance combustion of the fuel.

In some embodiments, the one or more electrical reactors are heated or preheated using an electrical power source.

In some embodiments, the system further comprises a heat exchanger configured to facilitate a transfer of thermal energy between (i) an incoming flow of the ammonia to the ammonia processing unit and (ii) one or more exit flows from the one or more combustion reactors, in order to preheat and/or evaporate the ammonia.

In some embodiments, the one or more combustion reactors are configured to (i) heat or preheat the ammonia and (ii) provide the heated or preheated ammonia to the one or more electrical reactors or one or more combustion reactors for processing of the ammonia to generate hydrogen.

In some embodiments, the system further comprises the one or more fuel cells.

In some embodiments, the one or more fuel cells are configured to process (i) the hydrogen produced by the one or more electrical reactors and/or (ii) hydrogen produced by the one or more combustion reactors, to generate electricity.

In some embodiments, the one or more fuel cells are configured to produce one or more fuel cell exit flows comprising unconverted hydrogen.

In some embodiments, the one or more combustion reactors are configured to utilize the unconverted hydrogen as combustion fuel to facilitate ammonia decomposition and maintain self-sustained auto-thermal reforming.

In some embodiments, the plurality of reactors are arranged in a series configuration.

In some embodiments, the plurality of reactors are arranged in a parallel configuration.

In some embodiments, the plurality of reactors are provided in a modular configuration.

In some embodiments, the system further comprising a control unit configured to control an operation of the ammonia processing unit to regulate a fluid pressure at an inlet of the one or more fuel cells.

In some embodiments, the system further comprises a control unit configured to control an operation of the ammonia processing unit to regulate a fluid flow rate to the one or more fuel cells.

In some embodiments, the ammonia processing unit further comprises one or more valves, pumps, fans, blowers, or compressors for regulating an output or an operation of the ammonia processing unit.

In some embodiments, the ammonia processing unit is configured to process the ammonia for one or more mobile applications or platforms.

In some embodiments, the ammonia processing unit is configured to process the ammonia for one or more stationary applications or platforms.

In some embodiments, the ammonia processing unit is configured to be attached, coupled, or mounted to a vehicle.

In some embodiments, the ammonia processing unit is configured to be integrated with one or more electrical or mechanical components of a vehicle.

In another aspect, the present disclosure provides a method, comprising: (a) heating an electrical reactor to a first target temperature; (b) reforming ammonia using the electrical reactor to produce a fuel comprising at least hydrogen; (c) heating a combustion reactor to a second target temperature by combusting the fuel produced in (b); and (d) providing additional ammonia to the combustion reactor, wherein the combustion reactor is configured to (i) decompose the additional ammonia to generate additional hydrogen and (ii) provide the additional hydrogen to one or more fuel cells.

In some embodiments, the combustion reactor is configured for self-sustaining auto-thermal reforming at the second temperature.

In some embodiments, the method further comprises, subsequent to (c), turning off an electrical heater of the electrical reactor.

In some embodiments, (c) further comprises turning off an electrical heater of the electrical reactor.

In some embodiments, the method further comprises controlling an operation of the electrical reactor based on a temperature of the combustion reactor or an ammonia conversion efficiency of the combustion reactor.

In some embodiments, the method further comprises controlling a flow rate of the ammonia to the electrical reactor or the combustion reactor based on a temperature of the combustion reactor or an ammonia conversion efficiency of the combustion reactor.

In some embodiments, the method further comprises controlling an exit flow rate from the combustion reactor based on a temperature of the combustion reactor or an ammonia conversion efficiency of the combustion reactor.

In some embodiments, the method further comprises controlling an air flow rate to the combustion reactor based on a temperature of the combustion reactor or an ammonia conversion efficiency of the combustion reactor.

In some embodiments, the method further comprises, subsequent to (d), directing an exit flow from the one or more fuel cells to the combustion reactor to facilitate the decomposition of the additional ammonia.

In some embodiments, the exit flow from the one or more fuel cells comprises unconverted hydrogen.

In some embodiments, the method further comprises controlling an air flow rate or an ammonia flow rate to the combustion reactor to reach or maintain a predetermined temperature range.

In some embodiments, the method further comprises, prior to (b) and/or (c), preheating the ammonia.

In some embodiments, the ammonia is preheated using the combustion reactor or the electrical reactor.

In some embodiments, the ammonia is preheated using an exit flow from the combustion reactor.

In some embodiments, the ammonia is preheated using a combustion product gas.

In some embodiments, heat is exchanged between the ammonia and the combustion product gas in a counter flow or a parallel flow.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

In certain aspects, the present disclosure provides a system for ammonia ($NH_3$) decomposition, comprising: an ammonia reforming reactor and a plurality of heaters. In some embodiments, the ammonia reforming reactor comprises: a housing comprising a plurality of inner flow paths and an outer flow path, wherein the plurality of inner flow paths is in fluid communication with the outer flow path, and one or more $NH_3$ reforming catalysts capable of reforming $NH_3$ to generate a reformate stream, wherein the reformate stream comprises hydrogen and nitrogen, wherein the one or more $NH_3$ reforming catalysts are located in at least one of (i) the plurality of inner flow paths or (ii) the outer flow path. In some embodiments, each inner flow path is configured to be heated by at least one of the plurality of heaters. In some embodiments, each inner flow path is in thermal communication with the at least one of the plurality of heaters along a length of the inner flow path.

In some embodiments, the one or more $NH_3$ reforming catalysts comprise: a first $NH_3$ reforming catalyst that is configured to contact ammonia at a first temperature range to generate reformate; and a second $NH_3$ reforming catalyst that is configured to contact the ammonia at a second temperature range to generate additional reformate. In some embodiments, the second temperature range is greater than the first temperature range. In some embodiments, an ammonia conversion efficiency of the first $NH_3$ reforming catalyst is higher at the first temperature range compared to an ammonia conversion efficiency of the second $NH_3$ reforming catalyst at the first temperature range.

In some embodiments, the first $NH_3$ reforming catalyst and the second $NH_3$ reforming catalyst are in thermal communication with different heaters of the plurality of heaters. In some embodiments, the first $NH_3$ reforming catalyst and the second $NH_3$ reforming catalyst are in thermal communication with different heating regions of a same heater of the plurality of heaters. In some embodiments, the first $NH_3$ reforming catalyst comprises ruthenium (Ru), platinum (Pt), or palladium (Pd). In some embodiments, the second $NH_3$ reforming catalyst comprises nickel (Ni), cobalt (Co), molybdenum (Mo), iron (Fe), or copper (Cu). In some embodiments, each inner flow path is configured to be heated by at least two of the plurality of heaters. In some embodiments, the plurality of heaters comprises at least one electrical heater. In some embodiments, the plurality of heaters comprises at least one combustion heater. In some embodiments, the housing comprises a circular cross-sectional shape or a rectangular cross-sectional shape.

In some embodiments, the system further comprises a plurality of inlets for directing the $NH_3$ to the ammonia reforming reactor, wherein one or more respective inlets of the plurality of inlets is in fluid communication with a corresponding respective inner flow path of the plurality of inner flow paths. In some embodiments, the system further comprises at least one outlet configured to direct the reformate stream out of the ammonia reforming reactor, wherein the at least one outlet is in fluid communication with the at least one outer flow path. In some embodiments, at least one of the plurality of heaters is configured to control temperatures of different regions of the ammonia reforming reactor based on an ammonia conversion efficiency measured downstream of the ammonia reforming reactor. In some embodiments, at least one of the plurality of heaters is configured to adjust a location of a heating region in the ammonia reforming reactor based on an ammonia conversion efficiency measured downstream of the ammonia reforming reactor. In some embodiments, the system further comprises a baffle or fin configured to enhance heat transfer in or adjacent to at least one of the plurality of inner flow paths or the at least one outer flow path. In some embodiments, the system further comprises an ammonia storage tank and a fuel cell, wherein the system comprises a volumetric energy density of greater than about 400 Watt-hours (Wh) of electricity per liter and less than about 3000 Wh of electricity per liter.

The present disclosure also provides a method for $NH_3$ decomposition, comprising: contacting, in an ammonia reforming reactor, ammonia with one or more $NH_3$ reforming catalysts capable of reforming $NH_3$ to generate a reformate stream, wherein the reformate stream comprises hydrogen and nitrogen, wherein the ammonia reforming reactor comprises: (a) a housing comprising a plurality of inner flow paths and an outer flow path, wherein the plurality of inner flow paths is in fluid communication with the outer flow path; and (b) a plurality of heaters, wherein each inner flow path is configured to be heated by at least one of the plurality of heaters, wherein each inner flow path is in thermal communication with the at least one of the plurality of heaters along a length of the inner flow path, and wherein the one or more $NH_3$ reforming catalysts are located in at least one of (i) the plurality of inner flow paths and (ii) the outer flow path.

In some embodiments, the one or more $NH_3$ reforming catalysts comprise a first $NH_3$ reforming catalyst and a second $NH_3$ reforming catalyst. In some embodiments, the ammonia is contacted with the first $NH_3$ reforming catalyst at the first temperature range to generate reformate. In some embodiments, the ammonia is contacted with the second $NH_3$ reforming catalyst at a second temperature range to generate additional reformate. In some embodiments, the second temperature range is greater than the first temperature range. In some embodiments, an ammonia conversion efficiency of the first $NH_3$ reforming catalyst is higher at the first temperature range compared to an ammonia conversion efficiency of the second $NH_3$ reforming catalyst at the first temperature range.

In some embodiments, the first $NH_3$ reforming catalyst and the second $NH_3$ reforming catalyst are in thermal communication with different heaters of the plurality of heaters. In some embodiments, the first $NH_3$ reforming catalyst and the second $NH_3$ reforming catalyst are in thermal communication with different heating regions of a same heater of the plurality of heaters. In some embodiments, the first $NH_3$ reforming catalyst comprises ruthenium (Ru), platinum (Pt), or palladium (Pd). In some embodiments, the second NH₃ reforming catalyst comprises nickel (Ni), cobalt (Co), molybdenum (Mo), iron (Fe), or copper (Cu). In some embodiments, the plurality of heaters comprises at least one electrical heater. In some embodiments, the plurality of heaters comprises at least one combustion heater. In some embodiments, the housing comprises a circular cross-sectional shape or a rectangular cross-sectional shape.

In some embodiments, the method further comprises directing the NH₃ to the ammonia reforming reactor using a plurality of inlets, wherein one or more respective inlets of the plurality of inlets is in fluid communication with a corresponding respective inner flow path of the plurality of inner flow paths. In some embodiments, the method further comprises directing the reformate stream out of the ammonia reforming reactor using at least one outlet, wherein the at least one outlet is in fluid communication with the at least one outer flow path. In some embodiments, the method further comprises using at least one of the plurality of heaters, controlling temperatures of different heating regions of the ammonia reforming reactor based on an ammonia conversion efficiency measured downstream of the ammonia reforming reactor. In some embodiments, the method further comprises using at least one of the plurality of heaters, adjusting a location of a heating region in the ammonia reforming reactor based on an ammonia conversion efficiency measured downstream of the ammonia reforming reactor. In some embodiments, the method further comprises using a baffle or fin to enhance heat transfer in or adjacent to at least one of the plurality of inner flow paths or the at least one outer flow path.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 8 schematically illustrates a plot of gas temperature as a function of time for a fast startup reactor comprising one or more electrically conductive springs, in accordance with one or more embodiments of the present disclosure.

FIG. 12 schematically illustrates an example of a modular design for the startup reactor, in accordance with one or more embodiments of the present disclosure.

FIGS. 26-35 schematically illustrate various exemplary configurations for packaging and assembly of ammonia powerpack systems, in accordance with one or more embodiments of the present disclosure.

FIGS. 37A to 37C schematically illustrate configurations for supplying air to a combustor, in accordance with one or more embodiments of the present disclosure.

FIGS. 38A and 38B schematically illustrate combustor designs for contacting air and fuel, in accordance with one or more embodiments of the present disclosure.

FIGS. 62A-62D show digital renditions of various reactor designs having different dimensions, in accordance with one or more embodiments of the present disclosure.

DETAILED DESCRIPTION

Figure 1:
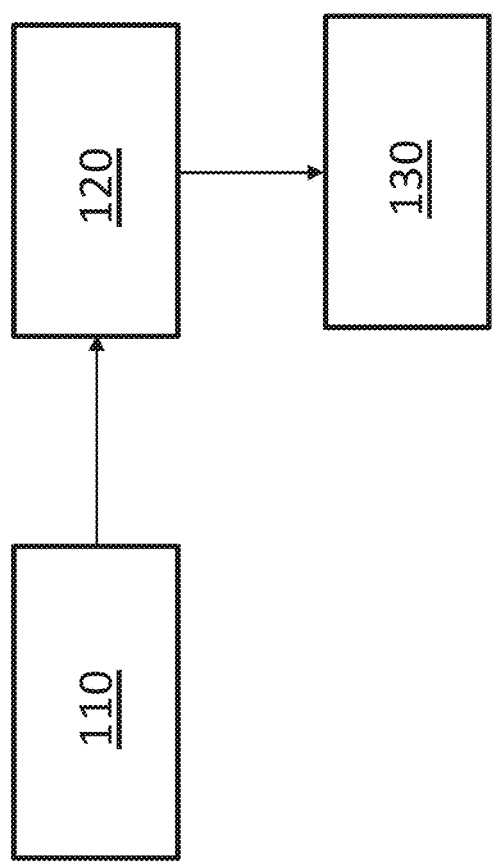
FIG. 1 schematically illustrates an exemplary system for processing ammonia to generate hydrogen fuel, in accordance with one or more embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" may apply to each of the numerical values in that series of numerical values. For example, greater than or equal to 1, 2, or 3 may be equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" may apply to each of the numerical values in that series of numerical values. For example, less than or equal to 3, 2, or 1 may be equivalent to less than or equal to 3, less than or equal to 2, or less than or equal to 1.

The term "at least one of A and B" and "at least one of A or B" may be understood to mean only A, only B, or both A and B. The term "A and/or B" may be understood to mean only A, only B, or both A and B.

The term "real time" or "real-time," as used interchangeably herein, generally refers to an event (e.g., an operation, a process, a method, a technique, a computation, a calculation, an analysis, a visualization, an optimization, etc.) that may be performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

The terms "decompose," "dissociate," "reform," "crack," and "break down," and their grammatical variations, may be construed interchangeably. For example, the expression "decomposition of ammonia" may be interchangeable with "dissociation of ammonia," "reforming of ammonia," "cracking of ammonia," etc.

The terms "heater," "heating element," and "heating unit," and their grammatical variations, may be construed interchangeably. For example, the expression "electrical heater" may be interchangeable with "electrical heating unit," "electrical heating element," etc.

The terms "combustion heater" and "combustor," and their grammatical variations, may be construed interchangeably.

The terms "reactor," "reformer," and "reactor module," and their grammatical variations, may be construed interchangeably. For example, the expression "electrical reactor" may be interchangeable with "electrical reactor module."

The terms "combustion reactor," "combustion heated reactor," "combustor reactor," and "C-reactor," and their grammatical variations, may be construed interchangeably.

The terms "electrical reactor," "electrically heated reactor," and "E-reactor," and their grammatical variations, may be construed interchangeably.

The terms "controller" and "control unit," and their grammatical variations, may be construed interchangeably.

The terms "ammonia conversion," "ammonia conversion rate," and "ammonia conversion efficiency," and their grammatical variations, may be construed as a fraction of ammonia that is converted to hydrogen and nitrogen, and may be construed interchangeably. For example, "ammonia conversion," "ammonia conversion rate," or "ammonia conversion efficiency" of 90% may represent 90% of ammonia being converted to hydrogen and nitrogen.

The term "auto-thermal reforming" may be construed as a condition where an ammonia decomposition reaction ($2NH_3 \rightarrow N_2+3H_2$; an endothermic reaction) is heated by a hydrogen combustion reaction ($2H_2+O_2 \rightarrow 2H_2O$; an exothermic reaction) using at least part of the hydrogen produced by the ammonia decomposition reaction itself. In some cases, the term "auto-thermal reforming" may be construed as a condition where an ammonia decomposition reaction is heated by a hydrogen combustion reaction using at least part of hydrogen produced by the ammonia decomposition reaction itself, electrical heating, or a combination of both, which may result in an overall positive electrical and/or chemical energy output. For example, if "auto-thermal reforming" is performed using a hydrogen combustion reaction and/or electrical heating, the hydrogen produced from the ammonia decomposition reaction may be enough to provide the hydrogen combustion reaction with combustion fuel, and/or to provide electrical energy for the electrical heating via hydrogen-to-electricity conversion devices (e.g., fuel cell, combustion engine, etc.). In some cases, the hydrogen provided for the hydrogen combustion reaction and/or electricity provided for the electrical heating to perform "auto-thermal reforming" may or may not use the hydrogen from the ammonia decomposition reaction (for example, the hydrogen may be provided by a separate hydrogen source, the electricity may be provided from batteries or a grid, etc.). In some cases, "auto-thermal reforming" may be construed as a condition where an ammonia decomposition reaction is heated by a combustion reaction (e.g., ammonia combustion, hydrocarbon combustion, etc.), electrical heating, or a combination of both, which may result in an overall positive electrical and/or chemical energy output. For example, if "auto-thermal reforming" is performed using a combustion reaction and/or electrical heating, the chemical energy (e.g., lower heating value) from the hydrogen produced from the ammonia decomposition reaction may be higher than the combustion fuel chemical energy (e.g., lower heating value), and/or may be enough to provide electrical energy for the electrical heating via hydrogen-to-electricity conversion devices (e.g., fuel cell, combustion engine, etc.).

Reactor

In an aspect, the present disclosure provides a system for processing a source material. The system may comprise a reactor or a reformer. The source material may be processed to generate a fuel source. The fuel source may comprise, for example, hydrogen and/or nitrogen. The fuel source may be provided to one or more hydrogen fuel cells with one or more air intakes, which may be configured to use the fuel source to generate electrical energy. Such electrical energy may be used to power various systems, vehicles, and/or devices.

Additionally or alternatively, the fuel source may be provided to one or more internal combustion engines (ICEs), which may be configured to consume the fuel source to generate mechanical energy (to power a drivetrain, propeller, or other propulsion device) and/or electrical energy (to power a grid or battery). The fuel source may be provided to an ICE in combination with another fuel such that the ICE operates as a dual-fuel (DF) engine. For example, the DF ICE may combust hydrogen with ammonia, hydrogen with diesel, hydrogen with natural gas, etc.

FIG. 1 schematically illustrates a block diagram of an exemplary method for processing a source material to produce electrical energy, in accordance with one or more embodiments of the present disclosure. A source material 110 may be provided to a reactor 120. The source material 110 may be a compound comprising one or more hydrogen atoms. The compound may be, for example, ammonia ($NH_3$). In some cases, the compound may comprise a hydrocarbon $C_xH_y$. The source material 110 may be provided to a reactor 120. The source material 110 may be in a gaseous state and/or a liquid state. The reactor 120 may be designed or configured to process the source material 110 to extract, produce, or release a fuel source 130 from the source material 110. In some cases, processing the source material 110 may comprise heating the source material 110 using the systems and methods of the present disclosure to extract, produce, or release the fuel source 130. The fuel source 130 may comprise hydrogen and/or nitrogen. The fuel source 130 may be provided to one or more fuel cells for the generation of electrical energy. Such electrical energy may be used to power various systems, vehicles, and/or devices, including, for example, terrestrial, aerial, or aquatic vehicles.

As described above, one or more fuel cells may be used to generate electrical energy from the fuel source 130, which may comprise hydrogen and/or nitrogen. In some cases, the one or more fuel cells may generate electricity through an electrochemical reaction between the fuel source 130 and oxygen ($O_2$). The fuels may comprise the hydrogen and/or the nitrogen in the fuel source 130. The electricity generated by the fuel cells may be used to power one or more systems, vehicles, or devices. In some embodiments, excess electricity generated by the fuel cells may be stored in one or more energy storage units (e.g., batteries) for future use. In some optional embodiments, the fuel cells may be provided as part of a larger electrochemical system. The electrochemical system may further comprise an electrolysis module. Electrolysis of a byproduct of the one or more fuel cells (e.g., water) may allow the byproduct to be removed by decomposing the byproduct into one or more constituent elements (e.g., oxygen and/or hydrogen). Electrolysis of the byproduct may also generate additional fuel (e.g., hydrogen) for the one or more fuel cells. In some embodiments, the one or more fuel cells may operate as a plurality of fuel cells (i.e., an array of fuel cells) such that the output power is scalable (e.g., to 50 kilowatts, 500 kilowatts, or several megawatts).

In any of the embodiments described herein, the one or more fuel cells may be configured to receive hydrogen from a hydrogen source. The hydrogen source may comprise one or more reactors or reformers as described elsewhere herein. In some non-limiting embodiments, the hydrogen source may not or need not comprise a reactor or a reformer. For example, the hydrogen source may comprise a hydrogen storage tank. The hydrogen storage tank may or may not be fluidically connected to a reactor or a reformer. In some cases, the hydrogen source may comprise a hydrogen generation system or subsystem. In any of the embodiments described herein, the one or more fuel cells may be configured to output electrical energy and/or provide an exit flow to one or more reactors, reformers, heat exchangers, or any other components of the systems described herein to facilitate an ammonia decomposition process, regardless of the type of hydrogen source used to provide or supply hydrogen to the one or more fuel cells.

Figure 2:
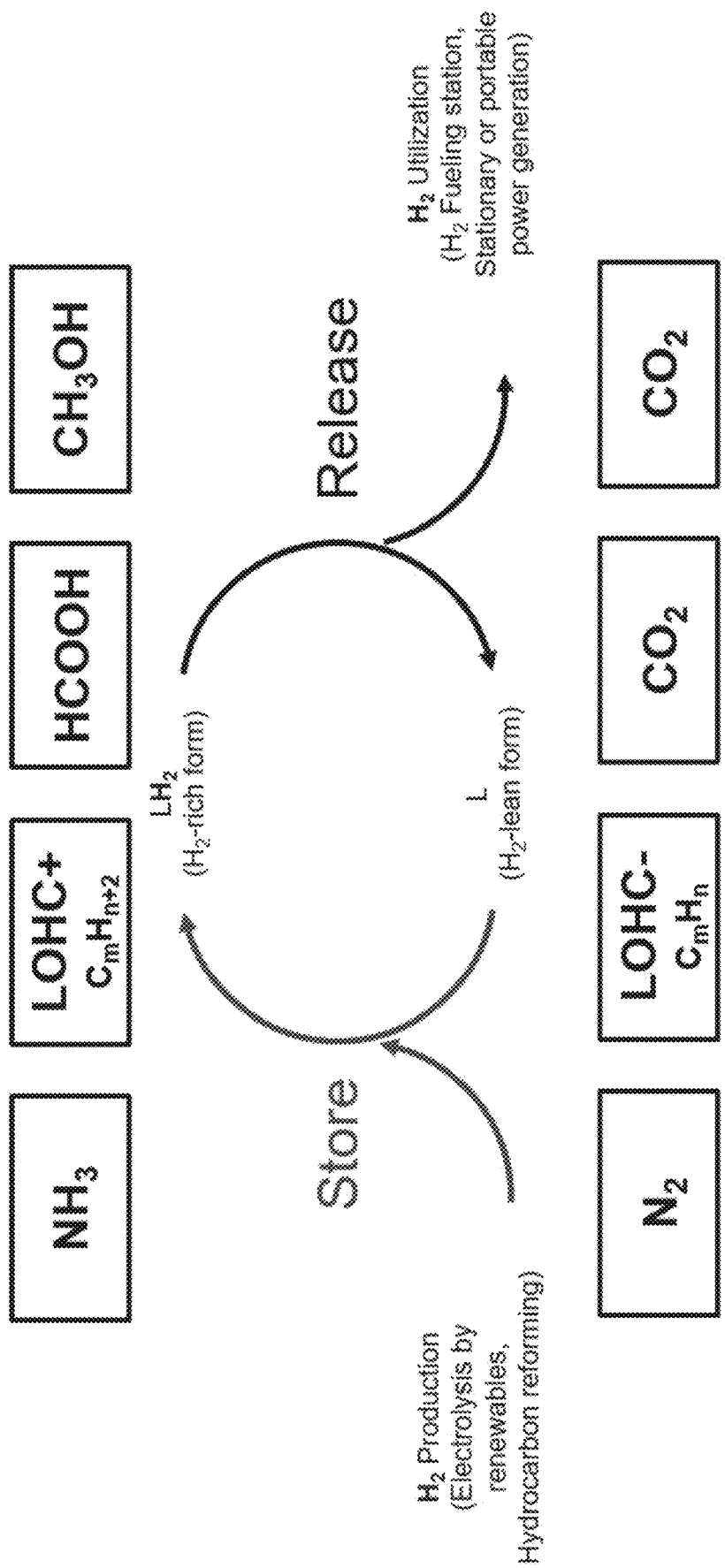
FIG. 2 schematically illustrates an exemplary method of hydrogen storage using liquid chemicals, in accordance with one or more embodiments of the present disclosure.

FIG. 2 schematically illustrates an exemplary method of hydrogen storage using liquid chemicals, in accordance with one or more embodiments of the present disclosure. Hydrogen, whether produced by electrolysis of renewables (e.g., green hydrogen) or through hydrocarbon reforming (e.g., blue hydrogen or grey hydrogen), may be stored using one or more liquid chemicals. In some non-limiting embodiments, the one or more liquid chemicals may comprise, for example, ammonia, a liquid organic hydrogen carrier (LOHC), formic acid (HCOOH), or methanol ($CH_3OH$). The one or more liquid chemicals may be stored in a hydrogen-rich form or a hydrogen-lean form. The one or more liquid chemicals comprising the hydrogen may be processed as described elsewhere herein to release the hydrogen stored in the liquid chemicals. Once released, the hydrogen may be used for power generation (e.g., stationary or portable power generation), or may be provided to a hydrogen fueling station.

Figure 3:
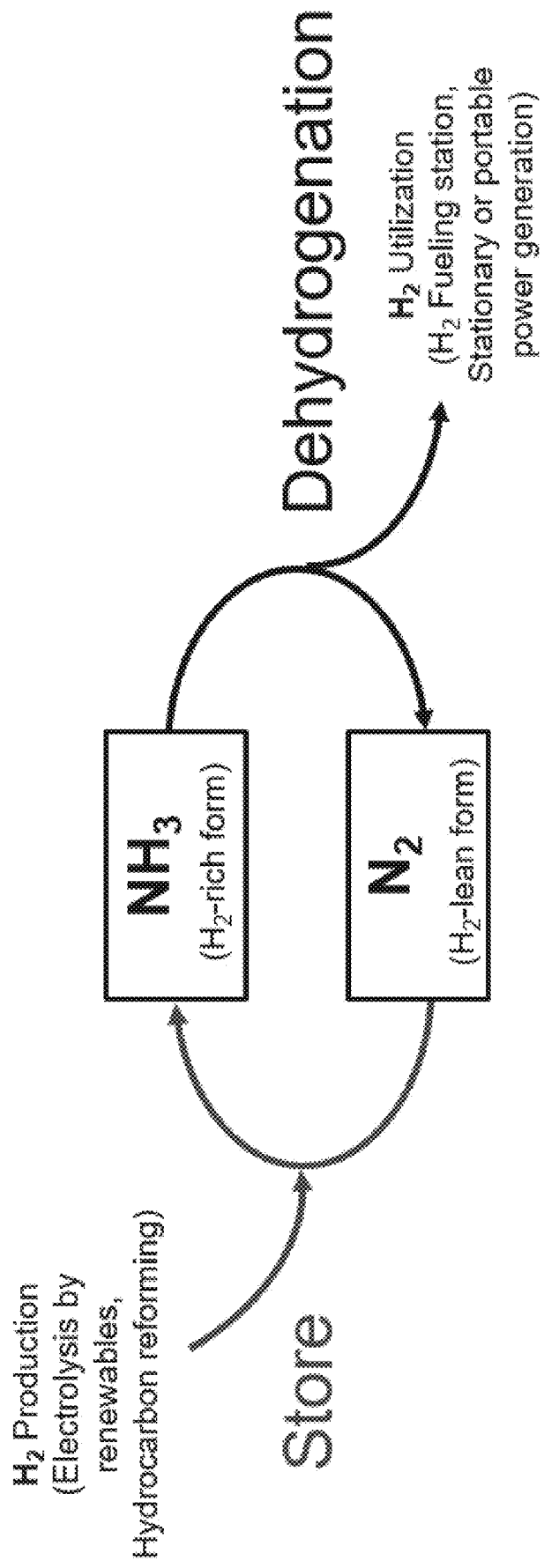
FIG. 3 schematically illustrates using ammonia as a hydrogen carrier, in accordance with one or more embodiments of the present disclosure.

FIG. 3 schematically illustrates using ammonia as a hydrogen carrier, in accordance with one or more embodiments of the present disclosure. Hydrogenation may be used to store the hydrogen in the one or more liquid chemicals. Hydrogenation may refer to the treatment of materials or substances with molecular hydrogen ($H_2$) to add one or more pairs of hydrogen atoms to various constituent compounds (e.g., one or more unsaturated compounds) making up the materials or substances. Hydrogenation may be performed using a catalyst, which may enable the reaction to occur under conditions closer to standard temperature and pressure (e.g., room temperature and sea-level atmospheric pressure). In some cases, the Haber-Bosch process (an artificial nitrogen fixation process) may be used to produce ammonia. The process may be used to convert atmospheric nitrogen ($N_2$) to ammonia ($NH_3$) by a reaction with hydrogen (e.g., $H_2$ produced or obtained by electrolysis) using a metal catalyst under high temperatures and pressures:

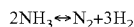

$2NH_3 \leftrightarrow N_2 + 3H_2$

As described above, the Haber-Bosch process may be used to produce ammonia, which can be used as a hydrogen carrier. Using ammonia as a hydrogen carrier may provide several benefits over storing and transporting pure hydrogen, including easy storage at relatively standard conditions (0.8 MPa, 20° C. in liquid form), and convenient transportation. Ammonia also has a relatively high hydrogen content (17.7 wt % or 120 grams of $H_2$ per liter of liquid ammonia). Further, the production of ammonia using the Haber-Bosch process can be powered by renewable energy sources (e.g., solar photovoltaic, solar-thermal, wind turbines, and/or hydroelectricity), which makes the production process environmentally safe and friendly, as $N_2$ is the only byproduct and there is no further emission of $CO_2$. Once the ammonia is produced, the ammonia may be processed to release the hydrogen through a dehydrogenation process (i.e., by dissociating, decomposing, reforming, or cracking the ammonia). The released hydrogen may then be provided to one or more fuel cells, such as a proton-exchange membrane fuel cell (PEMFC) having a proton-conducting polymer electrolyte membrane (i.e., a polymer electrolyte membrane [PEM] fuel cell). PEMFCs may have relatively low operating temperatures and/or pressure ranges (e.g., from about 50 to 100° C.). A proton exchange membrane fuel cell can be used to transform the chemical energy liberated during the electrochemical reaction of hydrogen and oxygen into electrical energy, as opposed to the direct combustion of hydrogen and oxygen gases to produce thermal energy. PEMFCs can generate electricity and operate on the opposite principle to PEM electrolysis, which consumes electricity. In some embodiments, the one or more fuel cells may be a solid oxide fuel cell (SOFC), a high-temperature PEM (HTPEM), or an alkaline fuel cell (AFC). The methods and systems disclosed herein may be implemented to achieve thermally efficient hydrogen production and may be scaled for application to high energy density power systems.

Figure 4:
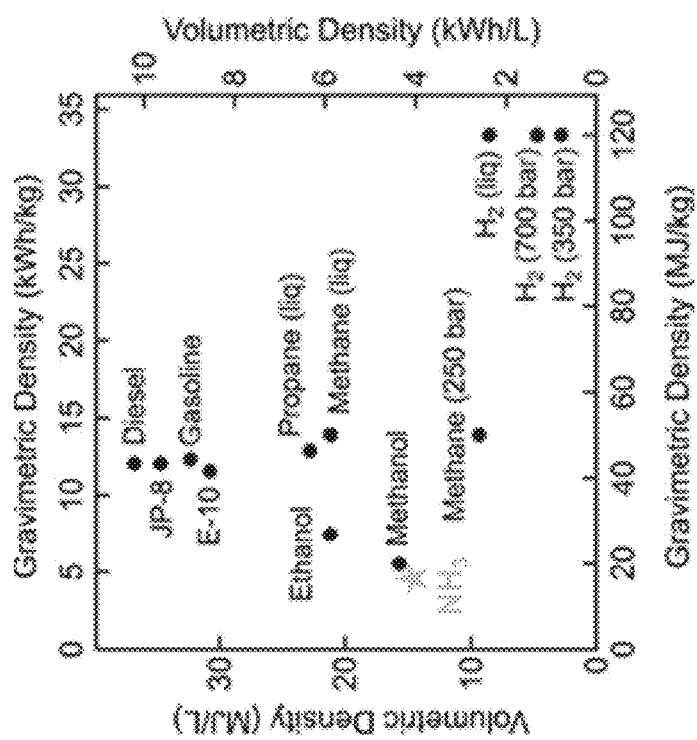
FIG. 4 schematically illustrates ammonia as an energy carrier and various density characteristics of ammonia in comparison to other types of fuel.

FIG. 4 schematically illustrates ammonia as an energy carrier and various density characteristics of ammonia in comparison to other types of fuel. The $H_2$ storage capacity of $NH_3$ is about 17.7 wt % and 120 grams of $H_2$ per liter of ammonia. Compared to other fuel types such as hydrogen, ammonia exhibits a favorable volumetric density in view of its gravimetric density. Further, in comparison to other types of fuel (including carbon-based fuels such as methane, propane, methanol, ethanol, gasoline, E-10 gasoline, JP-8 jet fuel, or diesel), the use of ammonia as a fuel may not produce harmful emissions such as $CO_2$, CO, or black carbon (soot), and may produce zero or negligible $NO_x$ (e.g., $NO_2$ or $N_2O$) emissions (especially in combination with a selective catalytic reduction [SCR] catalyst). Thus, the use of ammonia as an energy carrier allows some embodiments of the presently disclosed systems and methods to leverage the benefits of hydrogen fuel (e.g., environmentally safe and high gravimetric energy density) once the ammonia is decomposed into hydrogen, while taking advantage of (a) ammonia's greater volumetric density compared to hydrogen and (b) the ability to transport ammonia at standard temperatures and pressures without requiring the complex and highly pressurized storage vessels typically used for storing and transporting hydrogen.

In some cases, ammonia may be comprised or stored in a liquid fuel storage tank. In some cases, ammonia may be stored as liquid ammonia. In some cases, the liquid ammonia may be stored at a temperature ranging from about 15 to about 30° C. and at an absolute pressure ranging from 7 to 12 bar. In some cases, the liquid ammonia may be stored at a gauge pressure ranging from about atmospheric pressure to about 20 bar. In some cases, the liquid ammonia may be stored at a temperature ranging from about −40 to about 20° C. and at an absolute pressure ranging from about 0.5 bar to about 9 bar. In some cases, the liquid ammonia may be stored at a temperature of at least about −60, −50, 40, −30, −20, −10, 0, 10, 20, 30, 40, 50, or 60 degrees Celsius. In some cases, the liquid ammonia may be stored at a temperature of at most about −60, −50, 40, −30, −20, −10, 0, 10, 20, 30, 40, 50, or 60 degrees Celsius. In some cases, the liquid ammonia may be stored at an absolute pressure of at least about 1, 2, 3, 4, 5, 6, 7, 8, 9, 10, 15, 20, 25, 30, 35, or 40 bar. In some cases, the liquid ammonia may be stored at an absolute pressure of at most about 1, 2, 3, 4, 5, 6, 7, 8, 9, 10, 15, 20, 25, 30, 35, 40, 45, or 50 bar.

Figure 5:
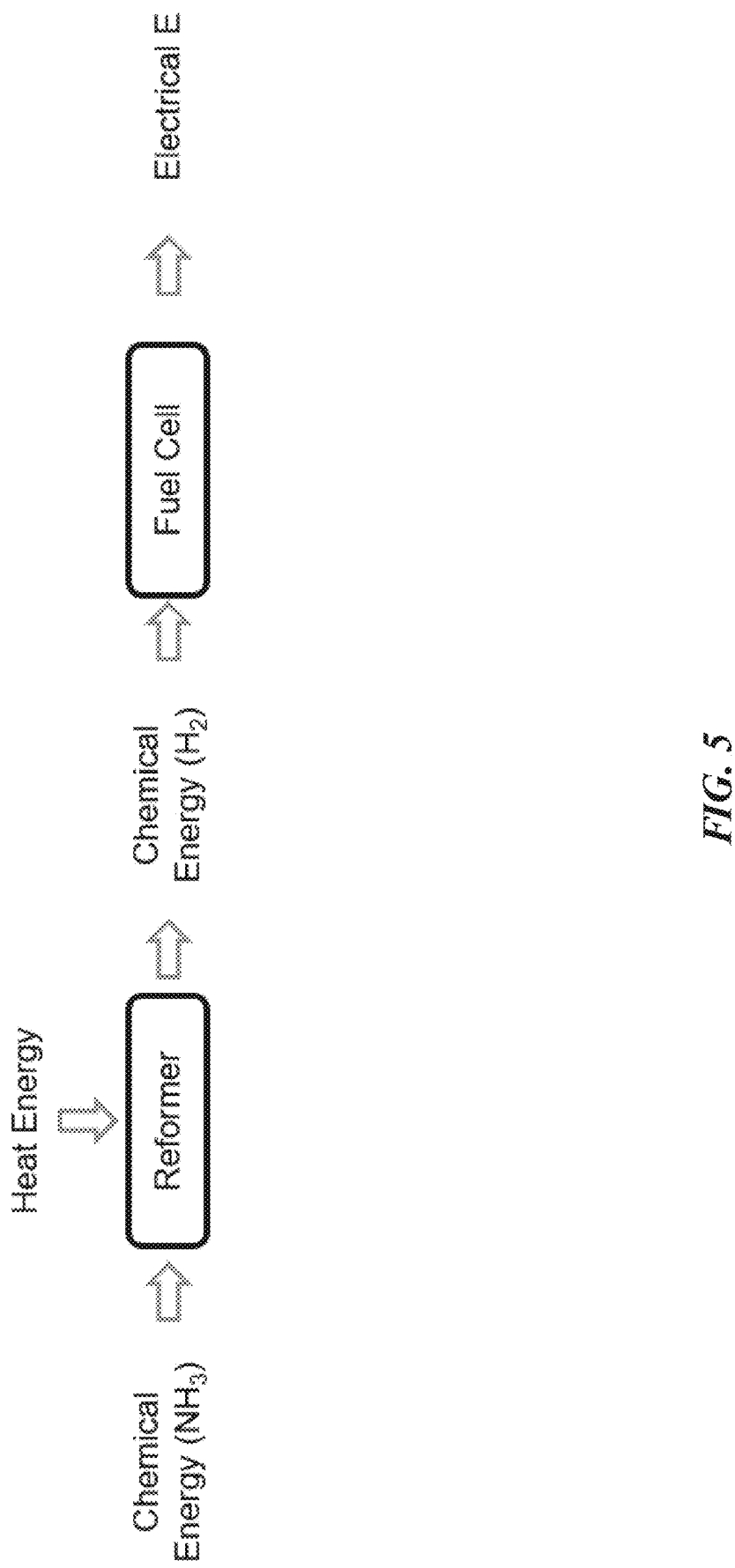
FIG. 5 schematically illustrates a power system using ammonia as a fuel for fuel cells, in accordance with one or more embodiments of the present disclosure. In one or more embodiments of the present disclosure, the power system may comprise a proton-exchange membrane fuel cell (PEMFC)

FIG. 5 schematically illustrates a power system using ammonia as a fuel source to generate hydrogen, which may be provided to one or more fuel cells (e.g., proton-exchange membrane fuel cells [PEMFCs]) to generate electrical energy, in accordance with one or more embodiments of the present disclosure. The power system may comprise a reformer configured to perform a catalytic decomposition or cracking of ammonia to extract and/or produce hydrogen. Such a reformer may be operated using heat energy. In some cases, the power system may comprise a combustor that generates heat energy to drive the operation of the reformer. In some cases, the heat energy may be generated from the combustion of a chemical compound (e.g., hydrogen or a hydrocarbon). The hydrogen that is generated and/or extracted using the reformer may be provided to one or more fuel cells, which may produce electrical energy to power one or more systems, sub-systems, or devices requiring electrical energy to operate. In some cases, the hydrogen generated and/or extracted using the reformer may be provided to one or more other reactors or reformers. In such cases, the one or more other reactors or reformers may be configured to combust the hydrogen to generate thermal energy. Such thermal energy may be used to heat the one or more other reactors or reformers to facilitate a further catalytic decomposition or cracking of ammonia to extract and/or produce additional hydrogen.

Fast Startup Reactor Module

In some embodiments, the systems of the present disclosure may comprise a power pack and a load following module. The power pack and load following module may facilitate heat transfer for the catalyst, faster reactor start-up times, and optimized thermal management, packaging optimization, and dynamic load following. In some cases, the power pack may comprise a load following module that enables fast startup. Such load following module may be integrated with one or more structural elements or subsystems of the power pack. The load following reactors described herein may be configured to adjust power output (e.g. of a fuel cell) based on a demand for power (e.g., an electrical load coupled to the fuel cell), and may adjust power output fast enough to avoid the use of an extra battery system. Such demand may be determined based on feedback provided by one or more end users operating a system or a device that requires power or based on one or more sensor readings indicating a lack of sufficient power or a need for additional power. The one or more sensor readings may be obtained using one or more sensors provided on or operatively coupled to a system or device that is operated using electrical energy generated by one or more fuel cells (that consume hydrogen produced by the reactors).

Figure 6:
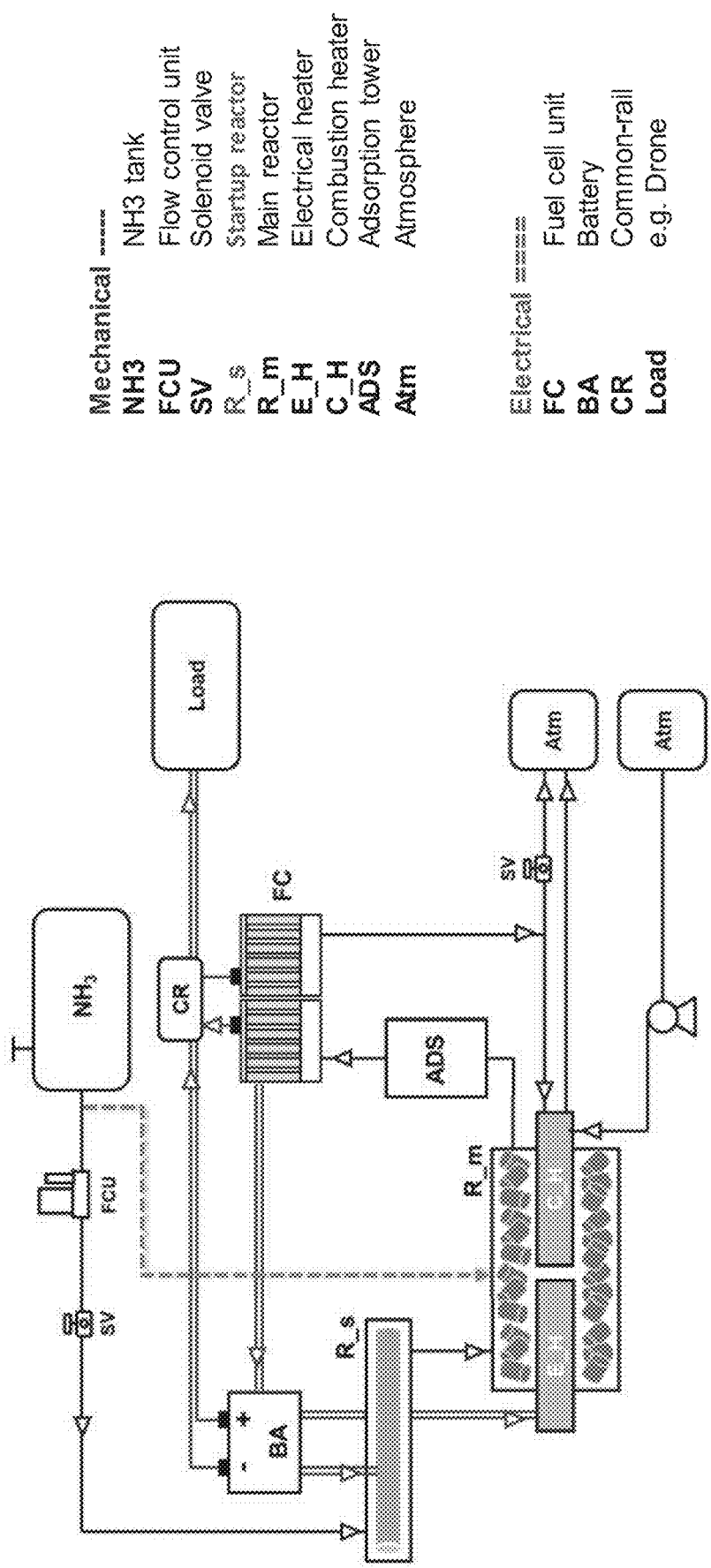
FIG. 6 schematically illustrates a system architecture for an exemplary ammonia power pack, in accordance with one or more embodiments of the present disclosure.

FIG. 6 schematically illustrates a system architecture for an exemplary ammonia power pack, in accordance with one or more embodiments of the present disclosure. The system architecture may comprise a power pack and a load following module as described above. In some cases, the system may have a system level energy density of at least about 600 watt-hours per kilogram. In some cases, the system may have a hydrogen storage capacity of at least about 5% by weight. The system illustrated in FIG. 6 may comprise a startup reactor R_s. Ammonia may be provided to the startup reactor via one or more fuel lines. The flow of ammonia to the startup reactor may be controlled using one or more flow control units FCU and/or one or more valves SV (e.g., a solenoid valve). The startup reactor R_s may be configured to heat up a catalyst directly using resistance heating (i.e., by passing current through the catalyst itself or through the catalyst support). This particular configuration may reduce thermal mass and generate heat where one or more reactions occur, which may reduce the startup times needed to reach the desired reaction temperatures for ammonia decomposition. In some embodiments, the desired temperature may range from about 400 degrees Celsius to about 600 degrees Celsius. The heat generated using the startup reactor R_s may be used to heat up the catalyst or a portion thereof. The heat generated using the startup reactor R_s may also be used to decompose or crack a portion of the ammonia to generate hydrogen, which may be directly provided to one or more fuel cells for the generation of electricity. In some cases, the hydrogen generated from decomposing the ammonia may be combusted to heat up the main reactor R_m. In some cases, the heat generated using the startup reactor R_s may be used to heat up the main reactor R_m or a portion thereof. In such cases, the startup reactor R_s and the main reactor R_m may be in thermal communication with each other to enable a transfer of heat energy between the two reactors. The main reactor R_m may comprise one or more heating units. The one or more heating units may comprise, for example, an electrical heater and/or a combustion heater. The heat generated using the startup reactor R_s may be used to supplement the heat generated using the electrical heater and/or the combustion heater of the main reactor R_m. The main reactor R_m may be configured to use the heat generated using the electrical heater, the combustion heater, the startup reactor R_s, and/or the combustion of any hydrogen produced using the startup reactor R_s to decompose the ammonia provided to the system to generate and/or extract hydrogen from the ammonia. The extracted hydrogen may be provided to one or more fuel cells FC for the generation of electrical energy. In some cases, an adsorption tower ADS may be used to process (e.g., refine or purify) the hydrogen before the hydrogen is provided to the one or more fuel cells. The electricity produced using the hydrogen and the one or more fuel cells may be used to power an electric load (e.g., an aerial vehicle such as a drone or aircraft).

In some cases, the main reactor R_m and the startup reactor R_s may be configured to receive ammonia from a same source. The same source may be in fluid communication with both the main reactor R_m and the startup reactor R_s (e.g., via separate piping, ducting, or flow channels). Alternatively, the same source may be in fluid communication with the main reactor R_m via the startup reactor R_s, or the startup reactor R_s via the main reactor R_m. In other cases, the main reactor R_m and the startup reactor R_s may be configured to receive ammonia from different sources. In such cases, the main reactor R_m may be configured to receive ammonia from a first source, and the startup reactor R_s may be configured to receive ammonia from a second source. The first source and the second source may or may not be in fluid communication with one another. In some cases, the main reactor R_m and/or the startup reactor R_s may be configured to receive ammonia from multiple sources.

Figure 7A:
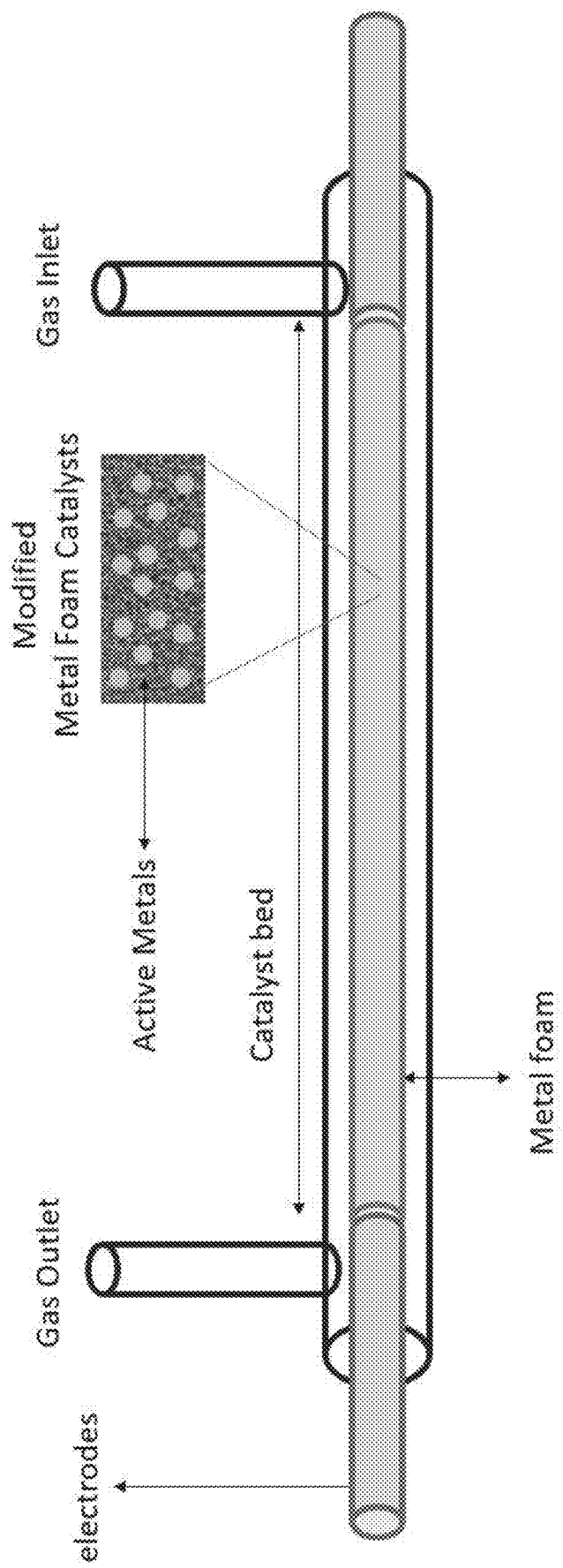
FIG. 7A schematically illustrates an example of an electrically heated fast startup reactor, in accordance with one or more embodiments of the present disclosure.

FIG. 7A schematically illustrates an example of a fast startup reactor, in accordance with one or more embodiments of the present disclosure. Such fast startup reactor may correspond to and/or comprise the startup reactor R_s shown in FIG. 6. The fast startup reactor may comprise a housing with electrical insulation and/or thermal insulation. The housing may comprise a cylindrical or tube shape. The housing may comprise a cross-sectional shape. The cross-sectional shape may be a circle, an oval, an ellipse, or any polygon having three or more sides. The housing may comprise, for example, a ceramic material such as quartz or a metallic material such as aluminum or steel.

The housing may comprise an inner volume containing a catalyst bed and/or one or more electrodes (e.g., one or more copper electrodes). The one or more electrodes may be in electrical communication with the catalyst bed or a portion thereof. The housing may comprise an enclosed or partially enclosed volume that is configured to contain a gas (e.g., ammonia) to enable processing of the gas. In cases where the gas comprises ammonia, such processing may comprise cracking or decomposing the ammonia (or a portion of the ammonia). The fast startup reactor may comprise a gas inlet configured to receive the ammonia. The fast startup reactor may further comprise a catalyst bed comprising one or more catalysts. The one or more catalysts may comprise, for example, a modified metal foam catalyst. Additional types of catalyst materials that are compatible with the fast startup reactor may be used. The catalyst materials may be subjected to or may undergo one or more enhancements and/or treatments (as shown and described in FIG. 9). In some cases, the metal foam catalyst may comprise a nickel chromium aluminum (NiCrAl) foam. The fast startup reactor may further comprise a gas outlet configured to direct one or more gases (e.g., ammonia, nitrogen, and/or hydrogen) to another system or subsystem. In some cases, the gas outlet may be configured to direct hydrogen gas produced by the fast startup reactor to one or more fuel cells. In some cases, the gas outlet may be configured to direct hydrogen-nitrogen or hydrogen-nitrogen-ammonia mixture to the gas inlet of the main reactor R_m shown and described in FIG. 6. In other cases, the gas outlet may be configured to direct hydrogen gas produced by the fast startup reactor to one or more combustors to generate heat energy that can be used to power or heat the main reactor R_m shown and described in FIG. 6.

Figure 7B:
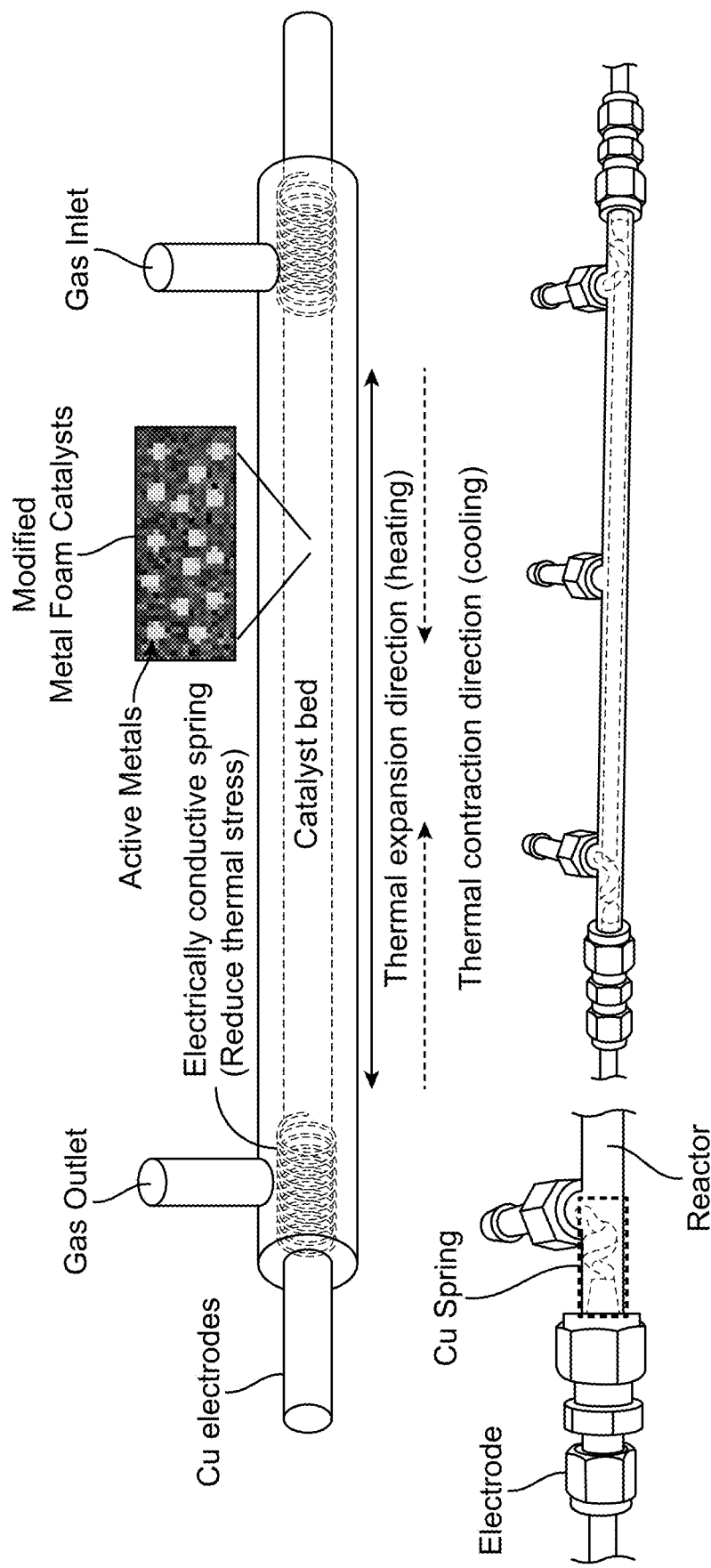
FIG. 7B schematically illustrates an example of an electrically heated fast startup reactor comprising one or more electrically conductive springs, in accordance with one or more embodiments of the present disclosure.

FIG. 7B schematically illustrates an example of a fast startup reactor comprising one or more electrically conductive springs, in accordance with one or more embodiments of the present disclosure. The one or more electrically conductive springs may be provided adjacent to the catalyst bed. In some cases, the one or more electrically conductive springs may be provided on opposite ends of the catalyst bed. The one or more electrically conductive springs may be in physical, electrical, and/or thermal communication with the catalyst bed and/or the one or more electrodes. The one or more electrically conductive springs may be configured to reduce thermal stresses on the foam catalyst when the foam catalyst is subjected to thermal cycling. The one or more electrically conductive springs may be configured to accommodate thermal expansions during heating of the catalyst and thermal contractions during cooling of the catalyst. The one or more electrically conductive springs may serve to lighten and/or redistribute the mechanical load on the catalyst bed so that the catalyst bed may withstand multiple thermal cycles without breaking or fracturing. In some cases, the one or more springs may be configured to alleviate thermal stresses on the catalyst due to a thermal expansion or a thermal contraction of the catalyst during one or more thermal cycling procedures. The one or more springs may comprise, for example, copper or steel springs. The use of the one or more electrically conductive springs may allow the startup reactor to provide fast startup capabilities with reduced or minimal thermal stresses on the catalyst bed during rapid temperature changes.

FIG. 8 schematically illustrates a plot of gas temperature as a function of time for a fast startup reactor comprising one or more electrically conductive springs as shown in FIG. 7B. In some instances, the fast startup reactor comprising the one or more thermal springs may be used to heat up the ammonia gas to 500 degrees Celsius in less than 5 minutes. In some instances, the fast startup reactor comprising the one or more thermal springs may be used to heat the ammonia gas to about 600 degrees Celsius in less than 60 minutes. In some cases, when 112 watts of heating power is provided to the catalyst, the ammonia gas may be heated to 500 degrees Celsius in less than 300 seconds. In some cases, when 157 watts of heating power is provided to the catalyst, the ammonia gas may be heated to 500 degrees Celsius in less than 200 seconds.

Figure 9:
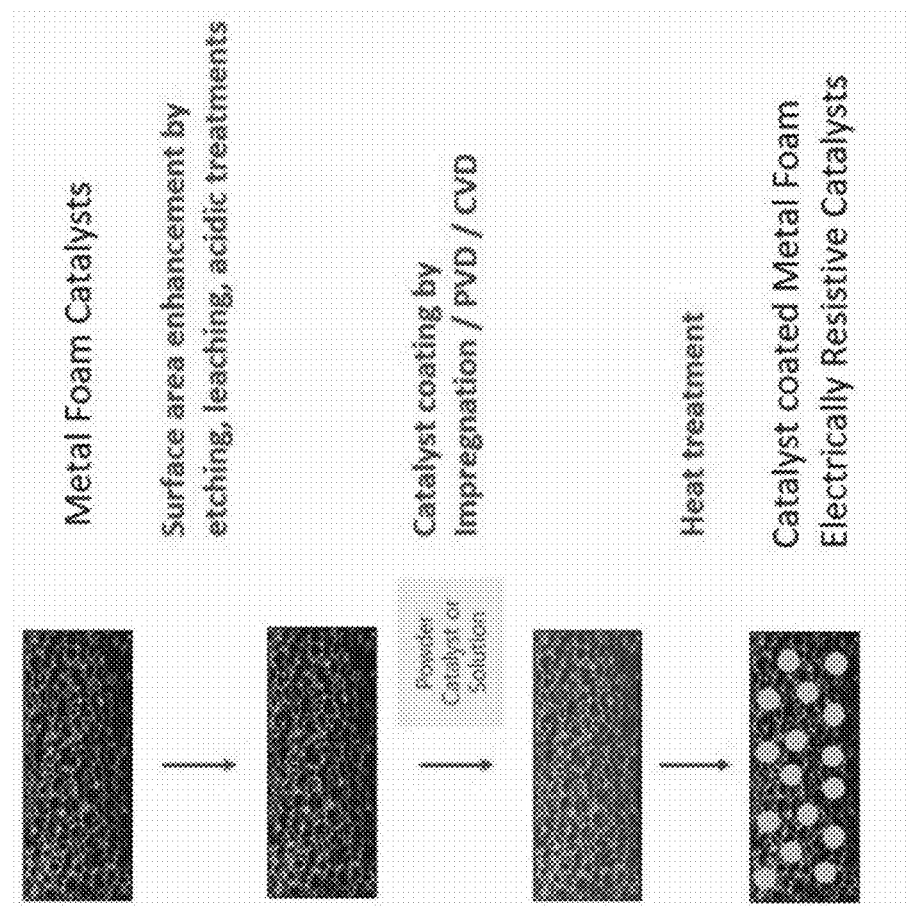
FIG. 9 schematically illustrates various enhancements and treatments for catalyst materials that may be used for the fast startup reactor, in accordance with one or more embodiments of the present disclosure.

FIG. 9 schematically illustrates various types of enhancements and/or treatments for metal foam catalyst materials that may be used for the fast startup reactor, in accordance with one or more embodiments of the present disclosure. Compatible metal foam catalysts may comprise any metal alloy comprising nickel, chromium, iron, and/or aluminum, i.e., Ni/Cr—X, Ni/Cr—X/Al—Y, and/or Ni/Fe—X/Cr—Y/Al—Z, where X, Y, and/or Z ranges from 0 to 100. A surface of the metal foam catalysts may be processed (e.g., by etching, alloying, leaching, and/or using one or more acidic treatments) to enhance a surface area of the catalyst material. The metal foam catalysts may also undergo a catalyst coating operation (e.g., by impregnation, PVD, or CVD) and/or one or more heat treatment operations (e.g., sintering, annealing, and/or calcining). Such processing of the metal foam catalyst material may produce a catalyst coated metal foam comprising one or more electrically resistive catalysts.

Figure 10:
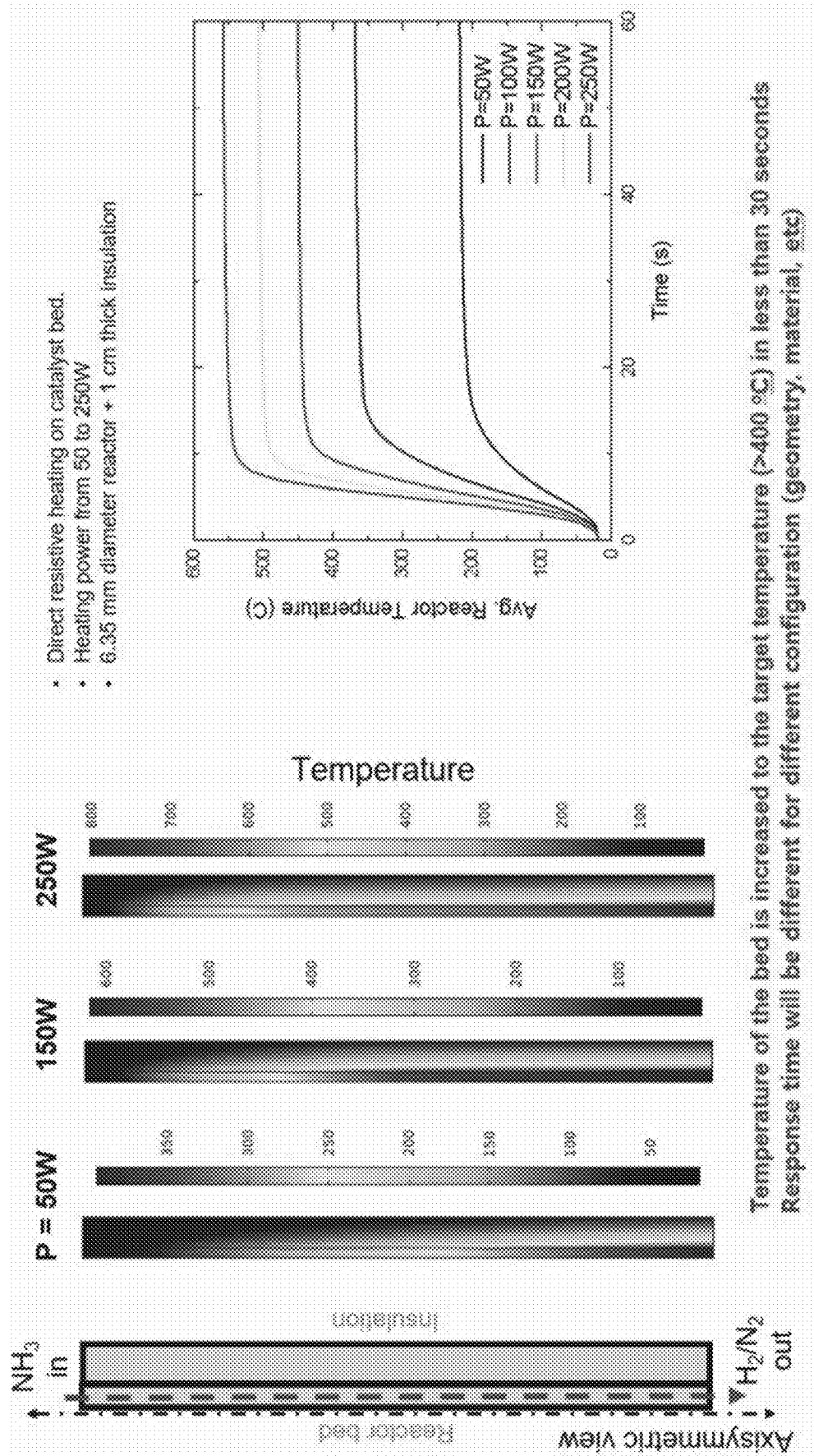
FIG. 10 schematically illustrates startup time simulation data for the startup reactor, in accordance with one or more embodiments of the present disclosure.

FIG. 10 schematically illustrates startup time simulation data for the systems and methods of the present disclosure. As used herein, startup time may correspond to an amount of time needed to increase the temperature of the reactor bed to a target temperature. The target temperature may be at least about 100 degrees Celsius, 200 degrees Celsius, 300 degrees Celsius, 400 degrees Celsius, or more. For reactor systems comprising the fast startup reactors disclosed herein, the average reactor temperature may be increased to the target temperature in less time than other conventional reactor systems. For instance, when the heating power for the presently disclosed systems is adjusted to at least about 150 watts for direct resistive heating of the catalyst bed, the reactor and/or the catalyst bed may be heated to a target temperature of at least about 400 degrees Celsius in under 30 seconds.

Figure 11:
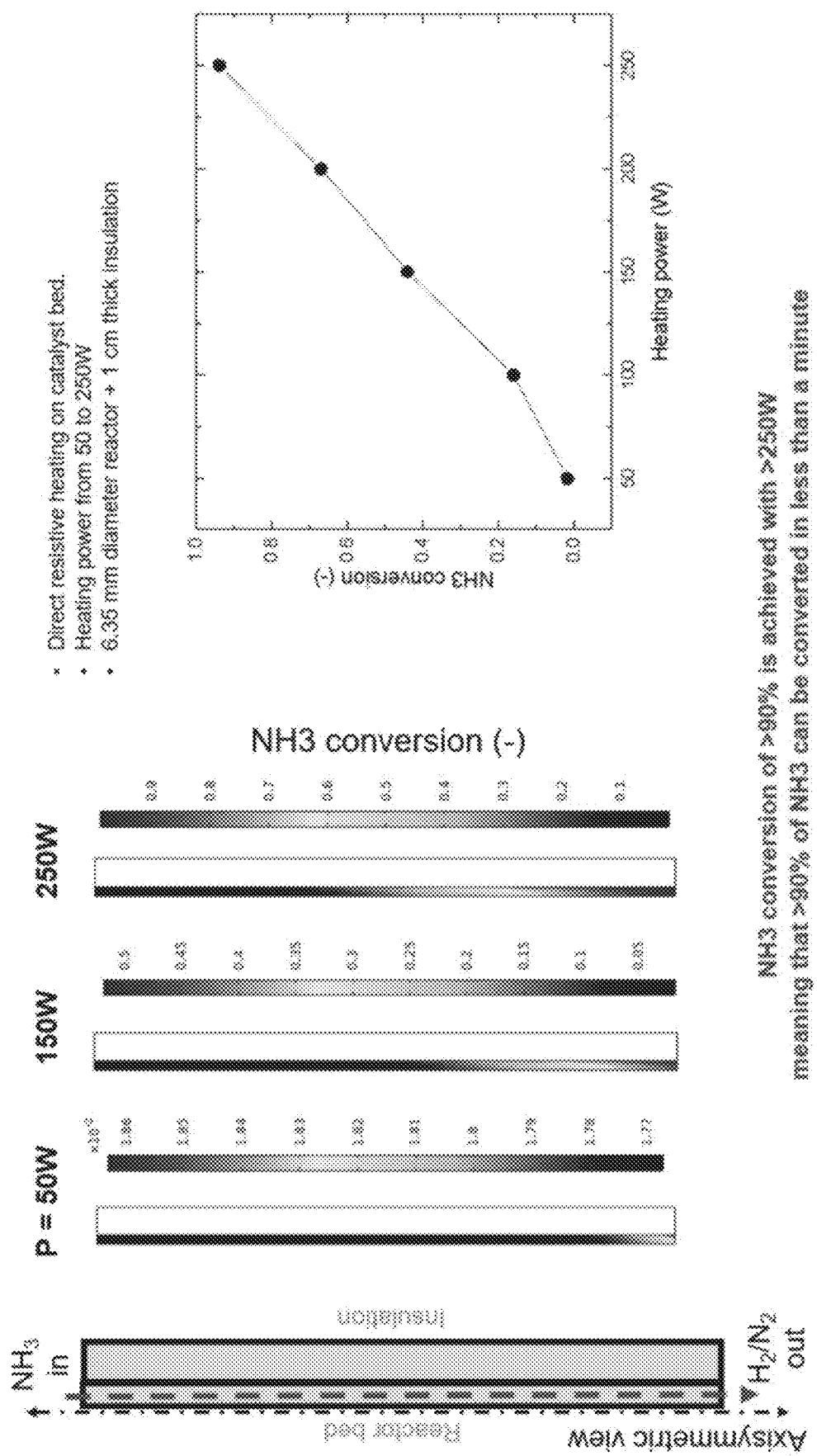
FIG. 11 schematically illustrates ammonia conversion simulation data for the startup reactor, in accordance with one or more embodiments of the present disclosure.

FIG. 11 schematically illustrates ammonia conversion efficiency simulation data for the systems and methods of the present disclosure. As used herein, ammonia conversion efficiency may correspond to a fraction of ammonia (by mass or moles) converted into one or more constituent components (e.g., hydrogen or nitrogen). For reactor systems comprising the fast startup reactors disclosed herein, the ammonia conversion efficiency may be greater than that of other conventional reactor systems. For instance, when the heating power for the presently disclosed startup reactor is adjusted to at least about 250 watts for direct resistive heating of the catalyst bed, the systems disclosed herein may achieve an ammonia conversion efficiency that is greater than 90%, which indicates that more than 90% of the ammonia may be converted into one or more constituent components in less than a minute.

FIG. 12 schematically illustrates an example of a modular design for the startup reactor, in accordance with one or more embodiments of the present disclosure. In some instances, the startup reactor may comprise a modular design that allows a plurality of layers comprising multiple reactor channels to be stacked on top of each other. Each of the layers may comprise a metal foam catalyst and insulation (e.g., thermal insulation and/or electrical insulation). In some cases, a separator may be provided in between the one or more layers. In some cases, the separator may be electrically insulated using electrical insulation coatings such as boron nitride (BN) or other ceramic type materials. The plurality of layers may be arranged such that the gas inlets and gas outlets for each layer align on one side. Further, the plurality of layers may be arranged such that the corresponding electrodes for each layer protrude in or out from the same side. The gas inlets and gas outlets may be provided on a first side of each layer, and the electrodes may be provided on a second side of each layer. The stackable and modular design shown in FIG. 12 may enhance scalability of the startup reactor and may enable direct heating of the metal foam catalysts. The modular configuration may also reduce a distance between the catalyst materials and one or more heat source for each layer. In some embodiments, a metal housing with electrical insulation (e.g., an insulation coating comprising boron nitride) may be used to improve the heating performance and ammonia conversion efficiency of the startup reactor.

Figure 13:
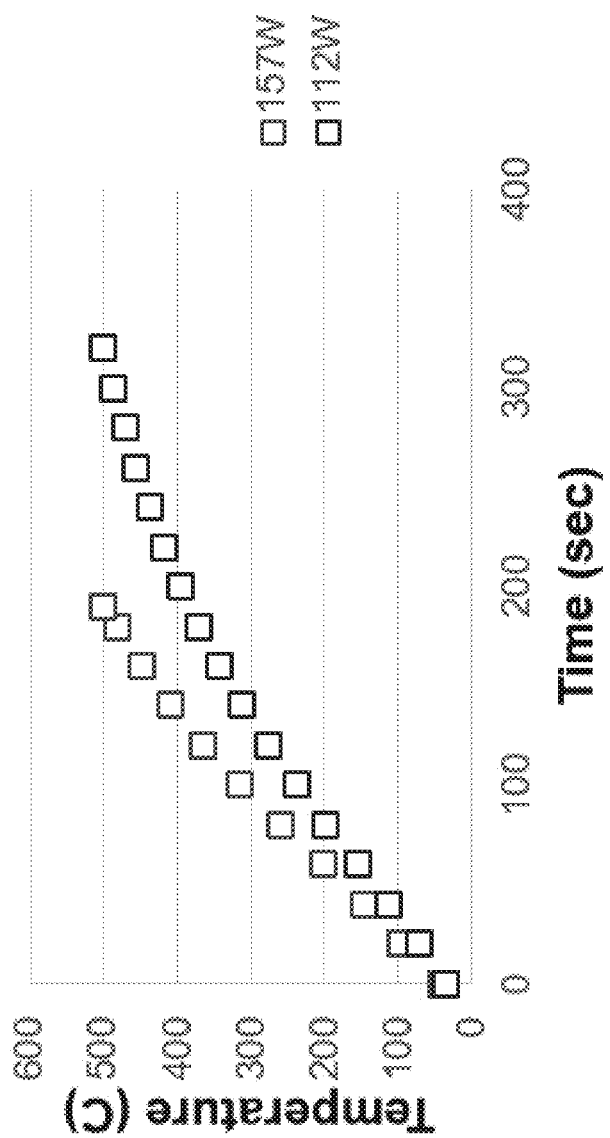
FIG. 13 schematically illustrates transient time and transient reactor temperature data for the startup reactor, in accordance with one or more embodiments of the present disclosure.

FIG. 13 schematically illustrates transient time and transient reactor temperature data for the modular startup reactor design. The transient time required to reach a target temperature may be greater than or equal to that of a single reactor unit due to the larger heat capacity of the modular startup reactor design, however, the modular startup reactor designs may still reach a target temperature of about 500 degrees Celsius in less than about 5 minutes. In some cases, when 112 watts of heating power is provided, the reactor may be heated to 500 degrees Celsius in less than about 300 seconds. In some cases, when 157 watts of heating power is provided, the reactor may be heated to 500 degrees Celsius in less than about 200 seconds.

In one aspect, the present disclosure provides a system comprising a first reactor module configured to receive a source material comprising ammonia. The first reactor module may comprise a first catalyst and a startup heating and reforming unit. The startup heating and reforming unit may comprise one or more electrodes for passing a current through the first catalyst to heat the first catalyst (e.g., by resistive heating or Joule heating). The one or more electrodes may comprise, for example, one or more copper electrodes. In some cases, the first catalyst may be used to generate hydrogen from the ammonia when the first catalyst is heated using the startup heating and reforming unit.

In some embodiments, the system may further comprise a second reactor module in thermal and/or fluid communication with the first reactor module. The second reactor module may comprise a second catalyst and one or more main heating units for heating the second catalyst. In some cases, at least one of the one or more main heating units may be configured to heat at least a portion of the second catalyst based on a combustion of the hydrogen generated by the first reactor module. In some cases, the second catalyst may be used to generate hydrogen from ammonia when the second catalyst is heated using the one or more main heating units. In some embodiments, the one or more main heating units may comprise, for example, an electrical heater and/or a combustion heater.

As described above, the system may comprise a first reactor module and a second reactor module. The term "module," as used herein, generally refers to a functional unit for performing one or more operations of a process (e.g., an ammonia cracking or decomposition process). A module may include one or more functional units. In some cases, a module may comprise a reactor or a reformer. In some cases, the reactor or reformer may comprise a catalyst and/or one or more heating units for heating the catalyst. In some cases, the reactor or reformer may include at least one fluid input and/or at least one fluid output. The at least one fluid input may be used to transport ammonia to the reactor or reformer. The at least one fluid output may be used to transport hydrogen (or a mixture of hydrogen and nitrogen, and optionally, trace ammonia) to one or more fuel cells.

In some cases, at least one of the first catalyst and the second catalyst may comprise a metal foam catalyst. The metal foam catalyst may comprise nickel, iron, chromium, and/or aluminum. In some cases, the metal foam catalyst may comprise one or more alloys comprising nickel, iron, chromium, and/or aluminum.

In some embodiments, the metal foam catalyst may comprise a catalytic coating of one or more powder or pellet catalysts. The catalytic coating may comprise a metal material, a promoter material, and/or a support material. In some embodiments, the metal foam catalyst may be porous such that inner surfaces of the metal foam catalyst are covered by the catalytic coating. The metal material may comprise, for example, ruthenium, nickel, rhodium, iridium, cobalt, iron, platinum, chromium, palladium, and/or copper. In some embodiments, the promoter material may comprise at least one material selected from Li, Na, K, Rb, Cs, Mg, Ca, Ba, Sr, La, Ce, Pr, Sm, or Gd. In some embodiments, the support may comprise at least one material selected from $Al_2O_3$, MgO, $CeO_2$, $ZrO_2$, $La_2O_3$, $SiO_2$, $Y_2O_3$, $TiO_2$, SiC, hexagonal BN (boron nitride), BN nanotubes, silicon carbide, one or more zeolites, $LaAlO_3$, $CeAlO_3$, $MgAl_2O_4$, $CaAl_2O_4$, or one or more carbon nanotubes.

In some embodiments, the catalytic coating may comprise one or more ruthenium-based precursors. The one or more ruthenium-based precursors may comprise, for example, $RuCl_3$ or $Ru_3(CO)_{12}$. In any of the embodiments described herein, the metal foam catalyst may have an apparent electrical resistivity of at least about 8 micro ohm-meters ($\mu\Omega m$).

In some cases, the metal foam catalyst may be processed using one or more etching, alloying, leaching, or acidic treatments to enhance a surface area of the metal foam catalyst. In some cases, the metal foam catalyst may be heat treated (e.g., by sintering, calcining, and/or annealing). In some cases, the metal foam catalyst may be coated using a physical vapor deposition treatment and/or a chemical vapor deposition treatment. In some embodiments, the first reactor module may comprise a plurality of modular units that are stackable on top of each other. Each of the plurality of modular units may comprise a metal foam catalyst and one or more reactor channels for directing ammonia to the metal foam catalyst. The one or more reactor channels may comprise any suitable design or configuration that permits ammonia gas to be directed to a surface or internal volume of the metal foam catalyst. In some cases, the system may further comprise one or more insulated panels for separating the plurality of modular units. The plurality of modular units (and the metal foam catalysts with each of the modular units) may be in thermal communication with one or more heat sources. In some cases, a first modular unit of the plurality of modular units may be in thermal communication with a first heat source, and a second modular unit of the plurality of modular units may be in thermal communication with a second heat source. The first heat source may be the same as the second heat source. Alternatively, the first heat source may be different than the second heat source (e.g., the first heat source may provide heat energy by combustion, and the second heat source may provide heat energy by resistive heating or Joule heating). In some cases, a first modular unit and a second modular unit of the plurality of modular units may be in thermal communication with the same heat source. In other cases, the first modular unit and the second modular unit of the plurality of modular units may be in thermal communication with different heat sources.

In some embodiments, the plurality of modular units may be stacked together to scale the amount of hydrogen produced in parallel. In some cases, the plurality of modular units may be arranged such that edges of the modular units are flush with respect to each other. In other cases, the positions and/or orientations of the modular units may be adjusted relative to each other to achieve a desired spatial configuration or profile that fits within a target volume.

In some cases, the first reactor module may be in fluid communication with the second reactor module. Such fluid communication may permit ammonia or other gases (e.g., hydrogen and/or nitrogen) to flow between the first reactor module and the second reactor module. In some cases, the hydrogen generated using the first reactor module may be combusted to heat or partially heat the second reactor module or one or more components of the second reactor module (e.g., the catalyst of the second reactor module). In some cases, the hydrogen generated using the first reactor module may be directed or diverted to one or more fuel cells to power the fuel cells. The fuel cells may use the hydrogen generated using the first reactor module and/or the second reactor module to generate electricity.

In some embodiments, the first reactor module may provide a startup time of at most about 5 minutes to reach a target temperature of at least about 550 degrees Celsius. In some embodiments, the first reactor module may provide a startup time of at most about 60 minutes to reach a target temperature of at least about 550 degrees Celsius. The first reactor module may provide an ammonia conversion efficiency of at least about 90%. In some cases, the first reactor module may have a power density of about 10 watts of electrical power per cubic centimeter of reactor bed volume.

In some cases, at least one of the first reactor module and the second reactor module may be configured for self-heat generation (i.e., auto-thermal reforming) from electricity or hydrogen combustion. In some instances, the first reactor module and/or the second reactor module may be configured to combust the hydrogen respectively produced by the first and second reactor modules to generate additional thermal energy. Such additional thermal energy may be used to heat the catalysts of the first reactor module and/or the second reactor module.

In some embodiments, the system may further comprise one or more fuel cells in fluid communication with at least one of the first reactor module and the second reactor module. The one or more fuel cells may be configured to receive hydrogen generated using the first reactor module and/or the second reactor module, and to use the hydrogen to produce electrical energy.

In some cases, the system may further comprise a hybrid battery for load following and initial reactor heating power. The hybrid battery may be placed in electrical communication with at least one of the first reactor module and the second reactor module. In some cases, the hybrid battery may be used to pass a current through a catalyst of the first reactor module and/or the second reactor module to enable resistive heating or Joule heating. In some cases, the hybrid battery may be configured to adjust an amount of current provided to the first reactor module and/or the second reactor module. In some cases, the hybrid battery may be configured to provide different currents to the first reactor module and the second reactor module.

Figure 64A:
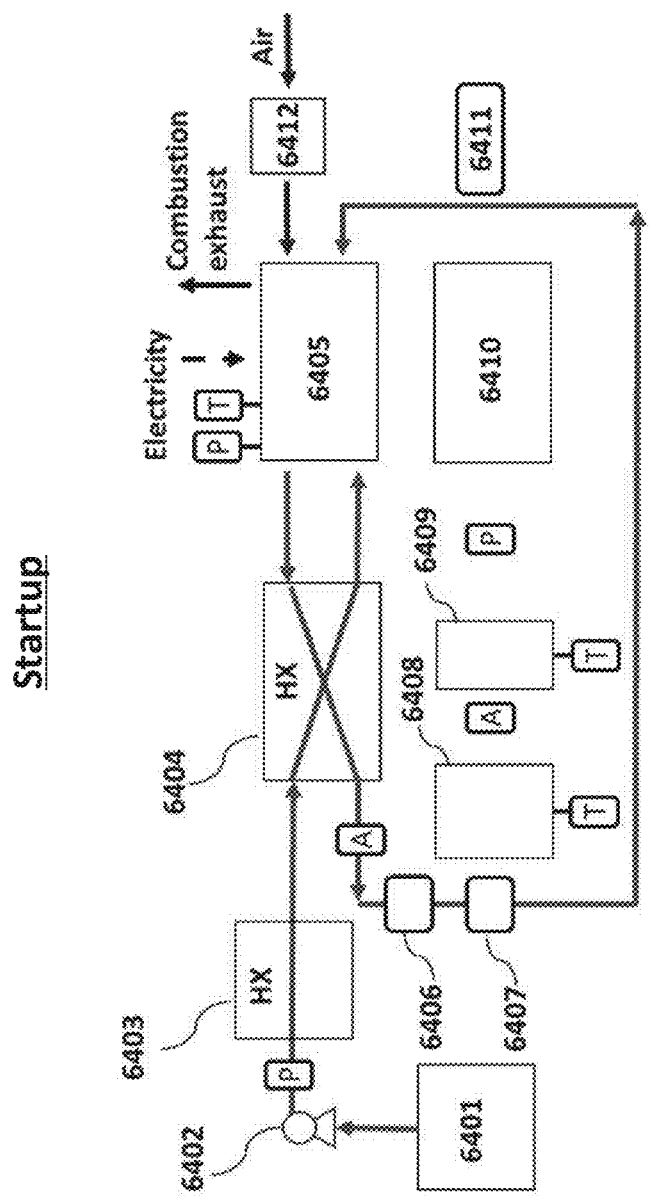
FIGS. 64A and 64B schematically illustrates a system configuration for processing ammonia during startup and operation, in accordance with one or more embodiments of the present disclosure.

FIG. 64A schematically illustrates a system configuration for processing ammonia during a startup operation, in accordance with one or more embodiments of the present disclosure. In some cases, the ammonia reactor/reformer (6405) may be heated with an electricity input. In some cases, flow produced by the ammonia reactor/reformer (6405) may pass through a heat exchanger (6404) to be supplied to one or more combustors in the ammonia reactor/reformer (6405) as a combustion fuel. In some cases, flow produced by the ammonia reactor/reformer (6405) may pass through a heat exchanger (6404) to be supplied at least in part back to the ammonia reactor/reformer (6405). In some cases, an air-cooled heat exchanger (6403) may be used to evaporate ammonia, before the ammonia is supplied to the heat exchanger (6404) and/or the ammonia reactor/reformer (6405). In some cases, one or more air supply units (6412) may supply air to the one or more combustors in the ammonia reactor/reformer (6405) for a combustion reaction.

Figure 64B:
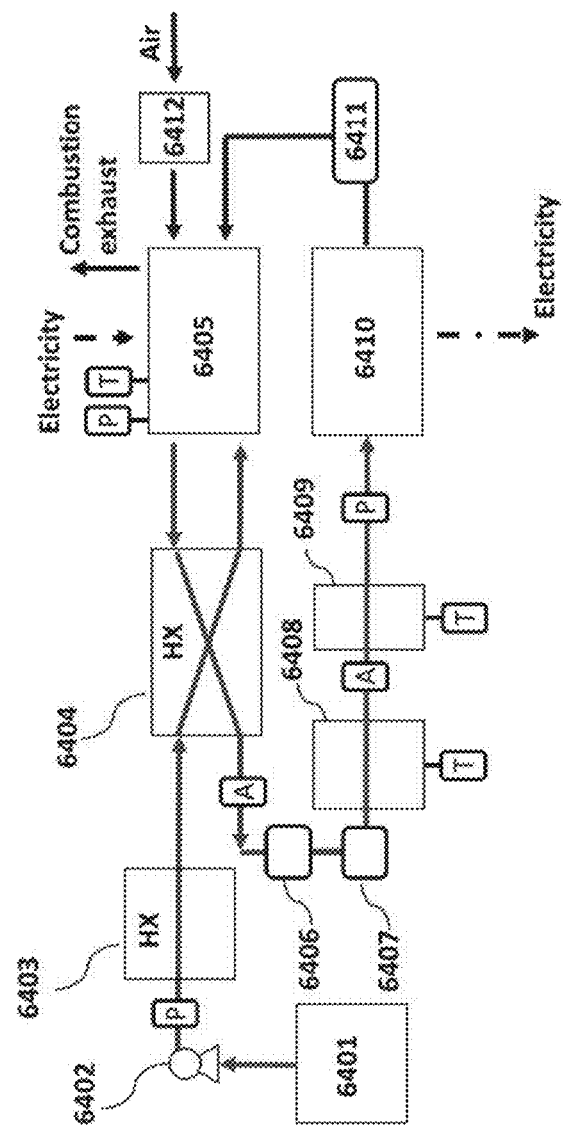

FIG. 64B schematically illustrates a system configuration for processing ammonia during a steady or post-startup operation, in accordance with one or more embodiments of the present disclosure. In some cases, flow produced by the ammonia reactor/reformer (6405) may pass through a heat exchanger (6404) to be supplied at least in part to (i) one or more adsorbents (6408 and 6409) and the fuel cell system (6410), and/or (ii) be supplied to one or more combustors in the ammonia reactor/reformer (6405). In some cases, flow produced by the ammonia reactor/reformer (6405) may pass through a heat exchanger (6404) to be supplied at least in part back to the ammonia reactor/reformer (6405). In some cases, capturing the heat from the flow produced by the ammonia reactor/reformer (6405) back to the ammonia reactor/reformer (6405) may improve ammonia conversion efficiencies. In some cases, passing the flow produced by the ammonia reactor/reformer (6405) through a heat exchanger (6404) may improve ammonia conversion efficiencies when the heat exchanger is used to heat input ammonia for the ammonia reactor/reformer (6405). In some cases, the flow produced by the ammonia reactor/reformer (6405) may pass through a heat exchanger (6404), one or more adsorbents (6408 and 6409) and a fuel cell system (6410) to be supplied to one or more combustors in the ammonia reactor/reformer (6405) as a combustion fuel. In some cases, one or more air supply units (6412) supply air to the one or more combustors in the ammonia reactor/reformer (6405) for a combustion reaction. In some cases, the flow produced by the ammonia reactor/reformer (6405) may pass through a heat exchanger (6404), and the flow may then be supplied to the one or more combustors in the ammonia reactor/reformer (6405) as a combustion fuel. In some cases, the fuel cell system (6410) may consume hydrogen and generate useful electricity. In some cases, at least part of the ammonia reactor/reformer (6405) may be heated with an electricity input. In some cases, the ammonia reactor/reformer (6405) may not be heated electrically. In some cases, the one or more adsorbents may comprise a temperature sensor attached thereto, which may indicate and/or monitor the quality or the capacity of the adsorbent over time. Shown is a pressure sensor (P); a temperature sensor (T); an ammonia sensor (A); a liquid fuel storage tank (6401); a liquid fuel supply unit (6402) (e.g., valve, pump, mass flow controllers, etc.); an optional air-cooled/heated heat exchanger (6403) (this heat exchanger may be coupled to the fuel cell heat dissipation unit and/or ambient to evaporate liquid fuel); a heat exchanger (6404) (e.g., gas to gas, liquid to gas, liquid/gas two phase flow to gas heat exchangers); an ammonia reactor/reformer (6405); an optional mass flow controller or mass flow meter (6406); a flow regulator unit (6407) (e.g., 3-way valve, valve, back pressure regulator, etc.); an adsorbent (6408); an optional adsorbent (6409); a fuel cell system (6410); a gas supply unit (6411) (e.g., valve, mass flow controllers, check valve, etc.); and an air supply unit (6412) (e.g., fan, blower, compressor, etc.).

In some cases, the system may further comprise a selective catalytic reduction (SCR) system (e.g., SCR catalyst) to remove nitrous oxides ($NO_x$) from one or more combustion exhaust streams. In some cases, the SCR system may receive ammonia (e.g., to use as a reducing agent to reduce $NO_x$) from the one or more ammonia tanks. In some cases, the SCR system may receive urea from one or more urea tanks. In some cases, the SCR system may receive a mixture of urea and water from one or more urea and water mixture tanks. In some cases, the SCR system may receive urea and water from one or more urea tanks and one or more water tanks.

Figure 65:
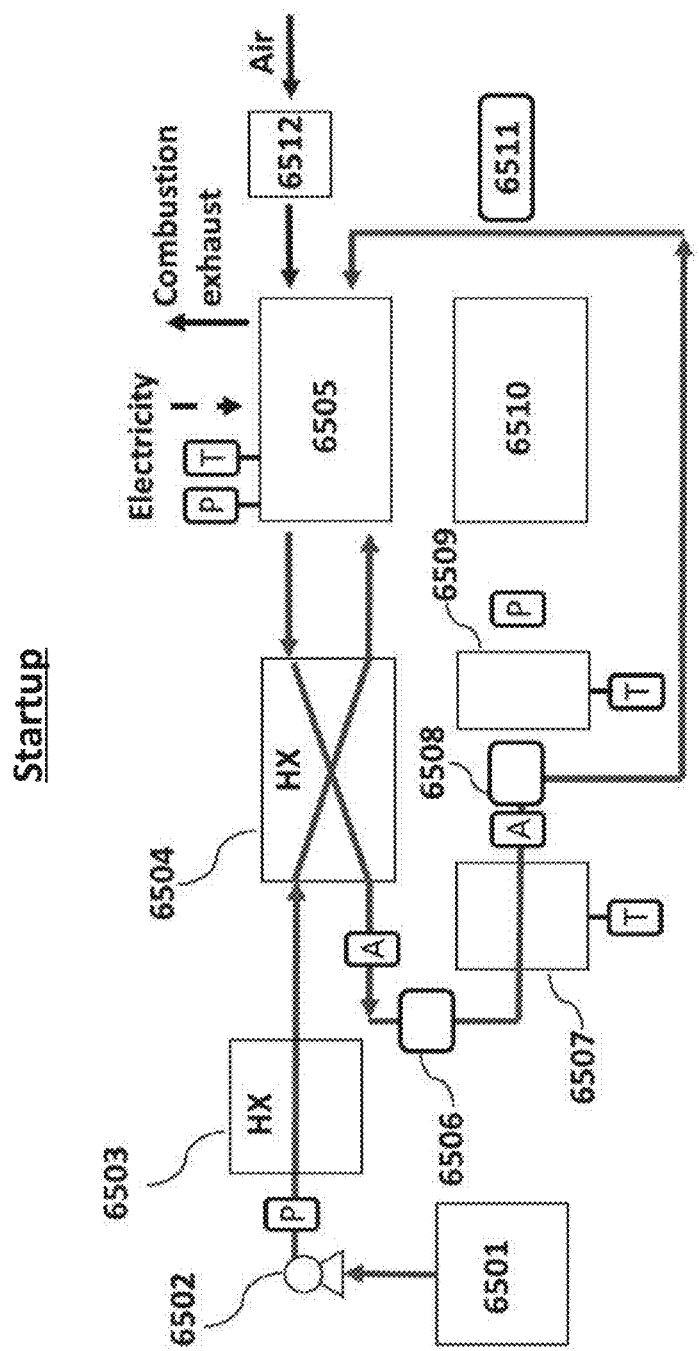
FIG. 65 schematically illustrates a system configuration for processing ammonia during startup, in accordance with one or more embodiments of the present disclosure.

FIG. 65 schematically illustrates a system configuration for processing ammonia during a startup operation, in accordance with one or more embodiments of the present disclosure. In some cases, the ammonia reactor/reformer (6505) is heated with an electricity input. In some cases, flow produced by the ammonia reactor/reformer (6505) may pass through a heat exchanger (6504) and at least one adsorbent (6507) to be supplied to one or more combustors in the ammonia reactor/reformer (6505) as a combustion fuel. In some cases, flow produced by the ammonia reactor/reformer (6505) may pass through a heat exchanger (6504) to be supplied at least part back to the ammonia reactor/reformer (6505). In some cases, air cooled heat exchanger (6503) may be used to evaporate ammonia before the ammonia is supplied to the heat exchanger (6504) and/or ammonia reactor/reformer (6505). In some cases, one or more air supply units (6512) may supply air to the one or more combustors in the ammonia reactor/reformer (6505) for a combustion reaction. Shown is a pressure sensor (P); a temperature sensor (T); an ammonia sensor (A); a liquid fuel storage tank (6501); a liquid fuel supply unit (6502) (e.g., valve, pump, mass flow controllers, etc.); an optional air-cooled/heated heat exchanger (6503) (e.g., coupled to the fuel cell heat dissipation unit and/or ambient to evaporate liquid fuel); a heat exchanger (6504) (e.g., gas to gas, liquid to gas, liquid/gas two phase flow to gas heat exchangers); ammonia reactor/reformer (6505); an optional mass flow controller or mass flow meter (6506); an adsorbent (6507); a flow regulator unit (6508) (e.g., 3-way valve, valve, back pressure regulator, etc.); an optional adsorbent (6509); a fuel cell system (6510); a gas supply unit (6511) (e.g., valve, mass flow controllers, check valve, etc.); and an air supply unit (6512) (e.g., fan, blower, compressor, etc.).

Figure 66:
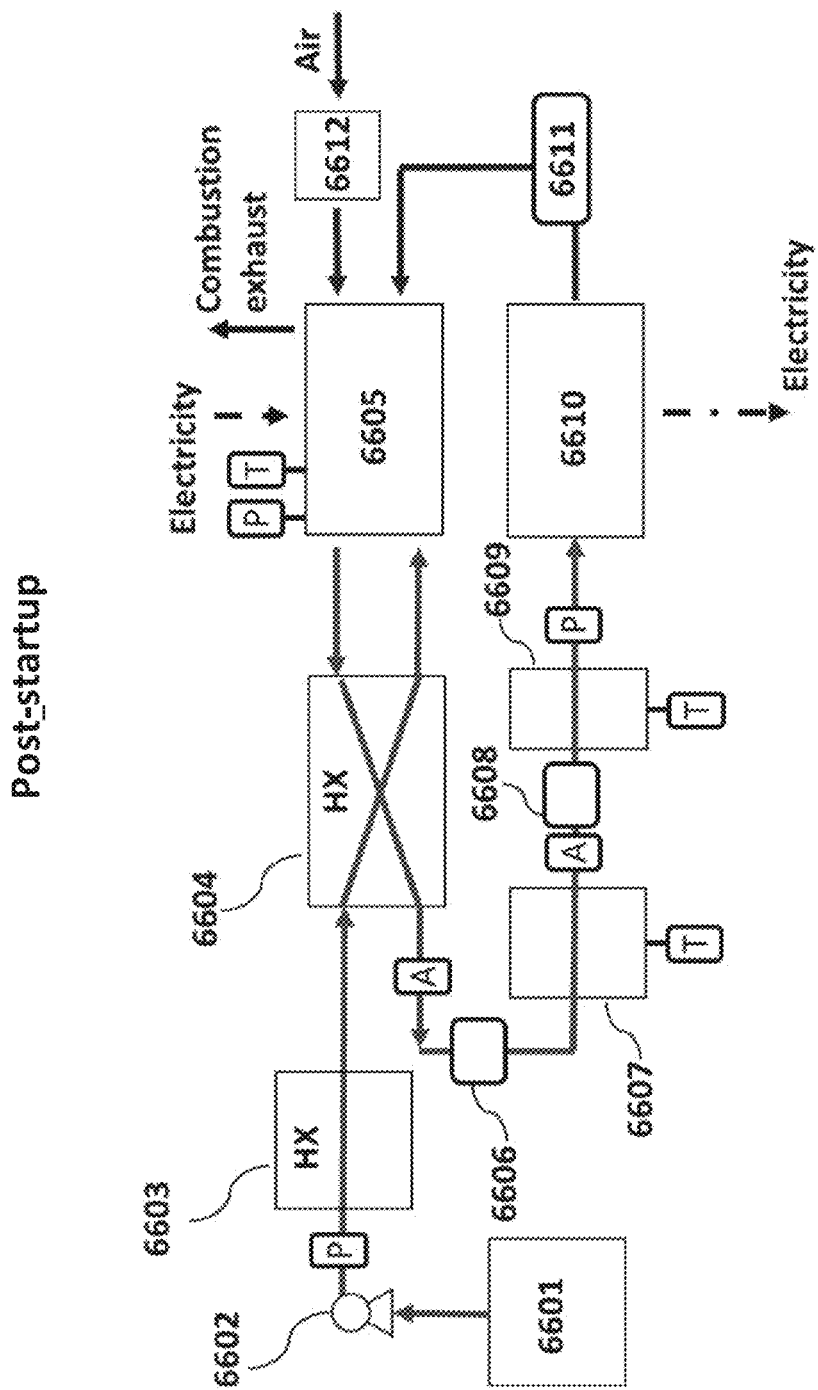
FIG. 66 schematically illustrates a system configuration for processing ammonia during operation, in accordance with one or more embodiments of the present disclosure.

FIG. 66 schematically illustrates a system configuration for processing ammonia during a steady or post-startup operation, in accordance with one or more embodiments of the present disclosure. In some cases, flow produced by the ammonia reactor/reformer (6605) may pass through a heat exchanger (6604) to be supplied at least in part to (i) one or more adsorbents (6607 and 6609), and then (ii) the fuel cell system (6610) and/or the one or more combustors in the ammonia reactor/reformer (6605). In some cases, flow produced by the ammonia reactor/reformer (6605) may pass through a heat exchanger (6604) to be supplied at least in part back to the ammonia reactor/reformer (6605). In some cases, capturing the heat from the flow produced by the ammonia reactor/reformer (6605) back to the ammonia reactor/reformer (6605) may improve ammonia conversion efficiencies. In some cases, passing the flow produced by the ammonia reactor/reformer (6605) through a heat exchanger (6604) may improve ammonia conversion efficiencies when the heat exchanger is used to heat input ammonia for the ammonia reactor/reformer (6605). In some cases, the flow produced by the ammonia reactor/reformer (6605) may be supplied to one or more combustors in the ammonia reactor/reformer (6605) as a combustion fuel. In some cases, the flow produced by the ammonia reactor/reformer (6605) may pass through a heat exchanger (6604), one or more adsorbents (6607 and 6609), and the fuel cell system (6610) to be supplied to one or more combustors in the ammonia reactor/reformer (6605) as a combustion fuel. In some cases, one or more air supply units (6612) may supply air to the one or more combustors in the ammonia reactor/reformer (6605) for a combustion reaction. In some cases, the fuel cell system (6610) may consume hydrogen and generate useful electricity. In some cases, at least part of the ammonia reactor/reformer (6605) may be heated with an electricity input. In some cases, the ammonia reactor/reformer (6605) may not be heated electrically. Shown is a pressure sensor (P); a temperature sensor (T); an ammonia sensor (A); a liquid fuel storage tank (6601); a liquid fuel supply unit (6602) (e.g., valve, pump, mass flow controllers, etc.); an optional air-cooled/heated heat exchanger (6603) (e.g., coupled to the fuel cell heat dissipation unit and/or ambient to evaporate liquid fuel); a heat exchanger (6604) (e.g., gas to gas, liquid to gas, liquid/gas two phase flow to gas heat exchangers); ammonia reactor/reformer (6605); an optional mass flow controller or mass flow meter (6606); an adsorbent (6607); a flow regulator unit (6608) (e.g., 3-way valve, valve, back pressure regulator, etc.); an optional adsorbent (6609); a fuel cell system (6610); a gas supply unit (6611) (e.g., valve, mass flow controllers, check valve, etc.); and an air supply unit (6612) (e.g., fan, blower, compressor, etc.).

Figure 67:
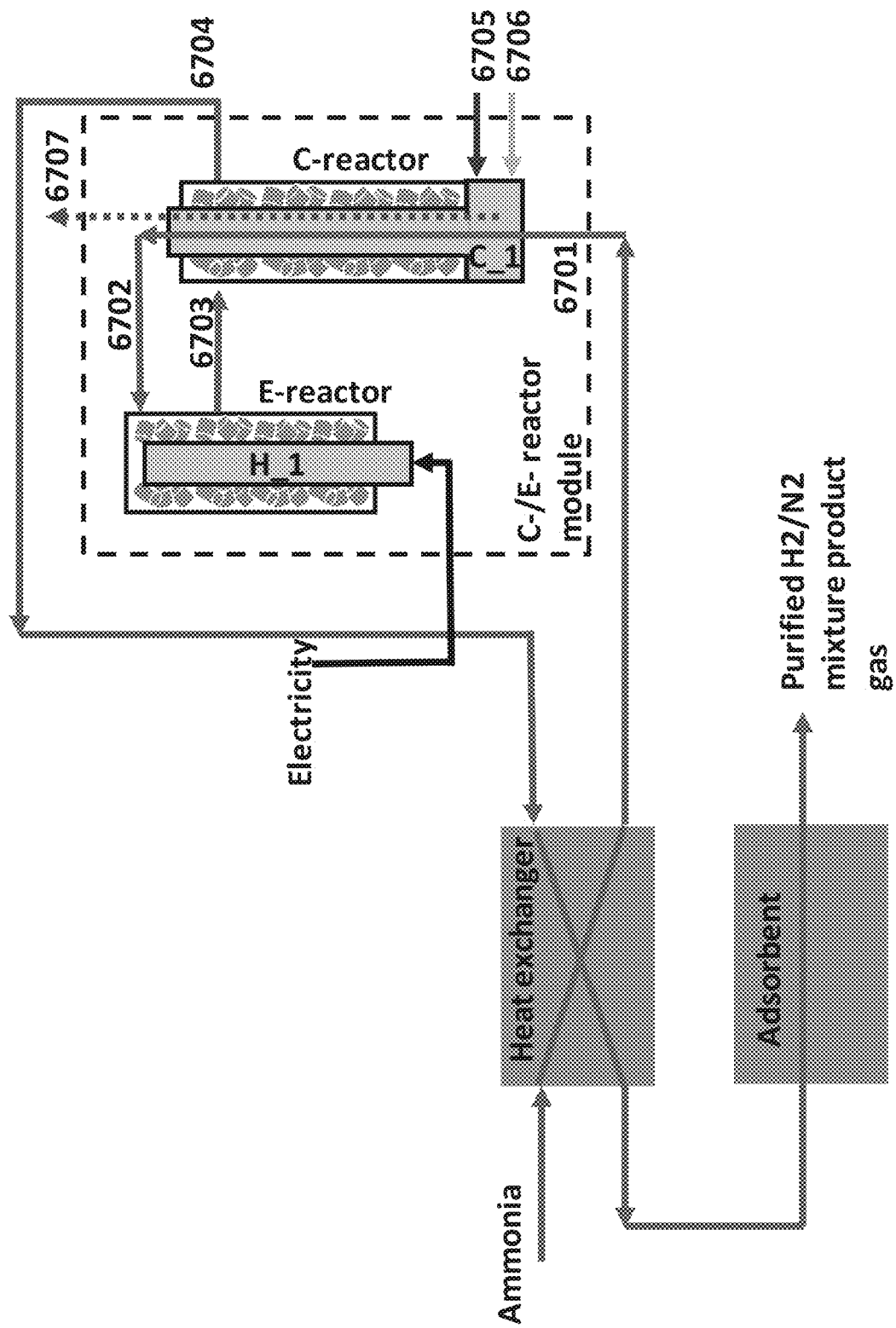
FIG. 67 schematically illustrates an example of a system reactor and/or hotbox configuration, in accordance with one or more embodiments of the present disclosure.

FIG. 67 schematically illustrates an example of a system reactor and/or hotbox configuration, in accordance with one or more embodiments of the present disclosure. One or more combustion reactors and one or more electrical reactors may be configured for ammonia reforming. In some cases, an ammonia stream (6701) may pass through a conduit that is concentric to the combustion reactor such that the ammonia stream (6701) is pre-heated by heat from the combustion reactor. In the configuration shown in FIG. 67, the ammonia stream (6701) may flow in parallel (e.g., along the same direction) to the reactants and products of the combustion reaction, and heat may transfer across the walls of the conduit (from the reactants and products of the combustion reaction) to the ammonia stream (6701). In some cases, preheated ammonia (6702) may enter the electrical reactor for ammonia reforming. In some cases, an exit stream (6703) (e.g., comprising 50% or more $H_2/N_2$ and 50% or less $NH_3$ by molar fraction) may then exit from the electrical reactor and enter the combustion reactor for further ammonia reforming. In some cases, an exit stream (6704) (e.g., comprising 98% or more $H_2/N_2$ and 2% or less $NH_3$ by molar fraction) may exit the combustion reactor, and enter a heat exchanger to heat the ammonia stream (6701) being input to the combustion reactor and the electrical reactor. In some cases, the exit stream (6703) from the electrical reactor may enter the combustion reactor in proximity to a region of the combustion reactor such that the exit stream (6703) is further reformed in the combustion reactor adjacent to the region. In some cases, the region of the combustion reactor may comprise a relatively low thermal gradient between the ammonia and the combustion gases (compared to another region of the combustion reactor). In some cases, the region of the combustion reactor may comprise relatively low amount of combustion gases for combusting to generate heat, compared to another region of the combustion reactor. Shown is an electrical reactor ("E-reactor"); at least partially embedded electrical heater (E_1) in the electrical reactor; a combustion reactor ("C-reactor"); at least partially embedded combustion heater (C_1) in the combustion reactor; ammonia preheating through combustor in 6701; preheated ammonia combustor out/E-reactor in (6702); E-reactor out/C-reactor in (6703); C-reactor out (6704); combustion fuel comprising hydrogen (6705); air in (6706); and combustion exhaust (6707); one or more catalysts in the electrical reactor; and one or more catalysts in the combustion reactor. The one or more catalysts in the electrical reactor may be the same or different as the one or more catalysts in the combustion reactor. Locations of the inlet ports and the outlet ports of the reactors in the flow diagram may be changed for various designs. In some cases, both the inlet ports and the outlet ports may be positioned at similar locations on the reactor or opposite locations on the reactor along the length.

Figure 68:
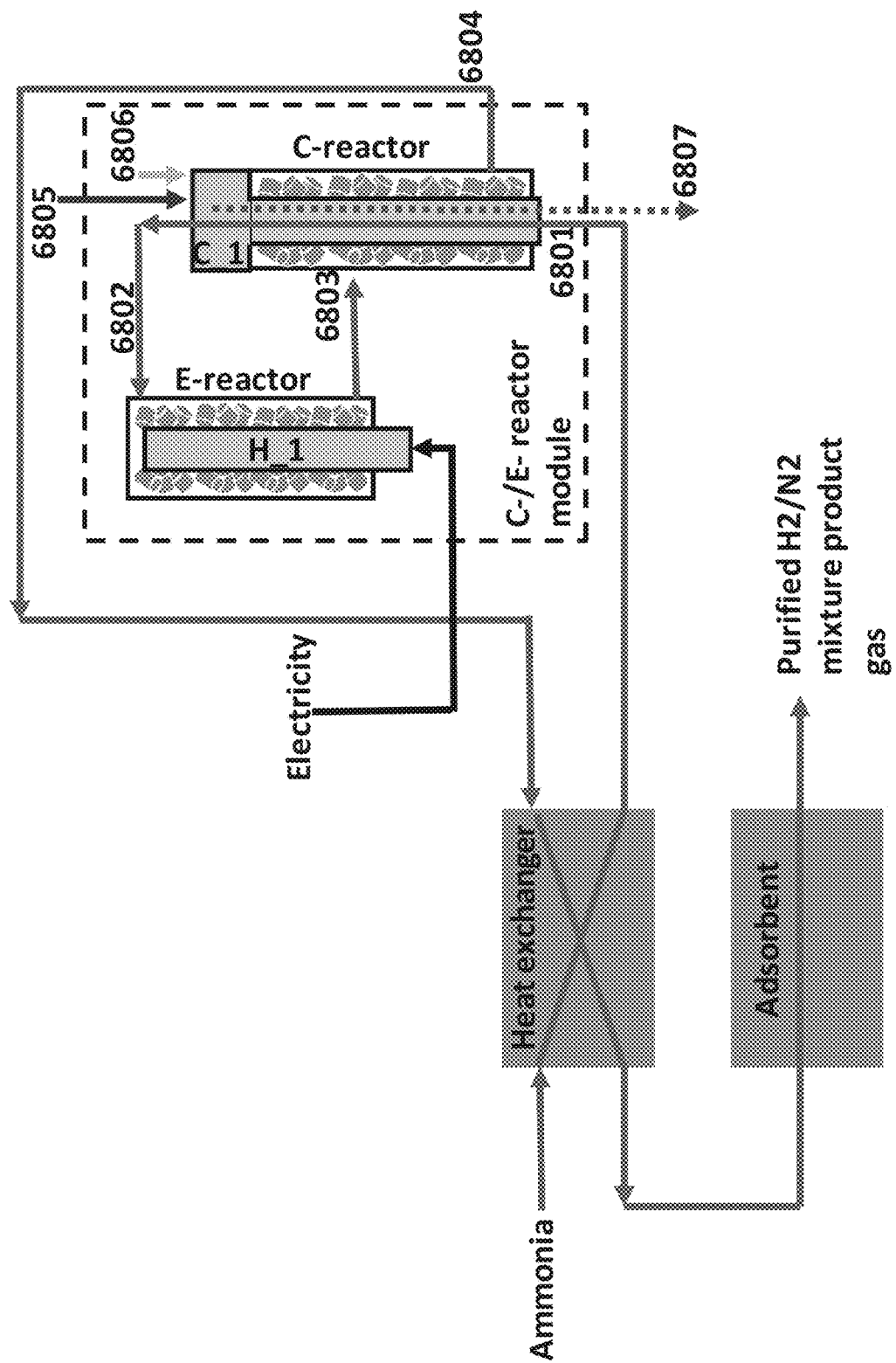
FIG. 68 schematically illustrates an example of a system reactor and/or hotbox configuration, in accordance with one or more embodiments of the present disclosure.

FIG. 68 schematically illustrates an example of a system reactor and/or hotbox configuration, in accordance with one or more embodiments of the present disclosure. In some cases, one or more combustion reactors and one or more electrical reactors may be configured for ammonia reforming. In some cases, an ammonia stream (6801) may pass through a conduit that is concentric to the combustion reactor such that the ammonia stream (6801) is pre-heated using thermal energy from the combustion reactor. In the configuration shown in FIG. 68, the ammonia stream (6801) may flow counter (e.g., in an opposite direction) to the reactants and products of the combustion reaction, and heat may transfer across the walls of the conduit (from the reactants and products of the combustion reaction) to the ammonia stream (6801). In some cases, preheated ammonia (6802) may enter the electrical reactor for ammonia reforming. In some cases, an exit stream (6803) (e.g., comprising 50% or more $H_2/N_2$ and 50% or less $NH_3$ by molar fraction) may then exit from the electrical reactor and enter the combustion reactor for further ammonia reforming. In some cases, an exit stream (6804) may then exit the combustion reactor (e.g., comprising 98% or more $H_2/N_2$ and 2% or less $NH_3$ by molar fraction) and enter a heat exchanger to heat up the ammonia stream (6801) being input to the combustion reactor and the electrical reactor. In some cases, ammonia may be heated by a combustion reactor and an electrical reactor in sequence, and then flowed through a heat exchanger to heat up the ammonia stream (6801) being input to the combustion reactor and the electrical reactor. In some cases, the exit stream (6803) from the electrical reactor may be flowed through in proximity to a region of the combustion reactor to further reform in the combustion reactor. In some cases, ammonia output from the electrical reactor may be flowed through an entry portion (near 6803) of the combustion reactor and exit at a point that is distant from the entry portion (near 6804). Shown is an electrical reactor ("E-reactor"); at least partially embedded electrical heater (E_1) in the electrical reactor; a combustion reactor ("C-reactor", C_1); at least partially embedded combustion heater (C_1) in the combustion reactor; ammonia preheating through combustor in (6801); preheated ammonia through combustor out/E-reactor in (6802); E-reactor out/C-reactor in (6803); C-reactor out (6804); combustion fuel comprising hydrogen (6805); air in (6806); combustion exhaust (6807); one or more catalysts in the electrical reactor; and one or more catalysts in the combustion reactor. The one or more catalysts in the electrical reactor may be the same or different as the one or more catalysts in the combustion reactor. Locations of the inlet and the outlet ports of the reactors in the flow diagram may be changed for various designs. In some cases, both the inlet ports and the outlet ports may be positioned at similar locations on the reactor or opposite locations on the reactor along the length.

Figure 69:
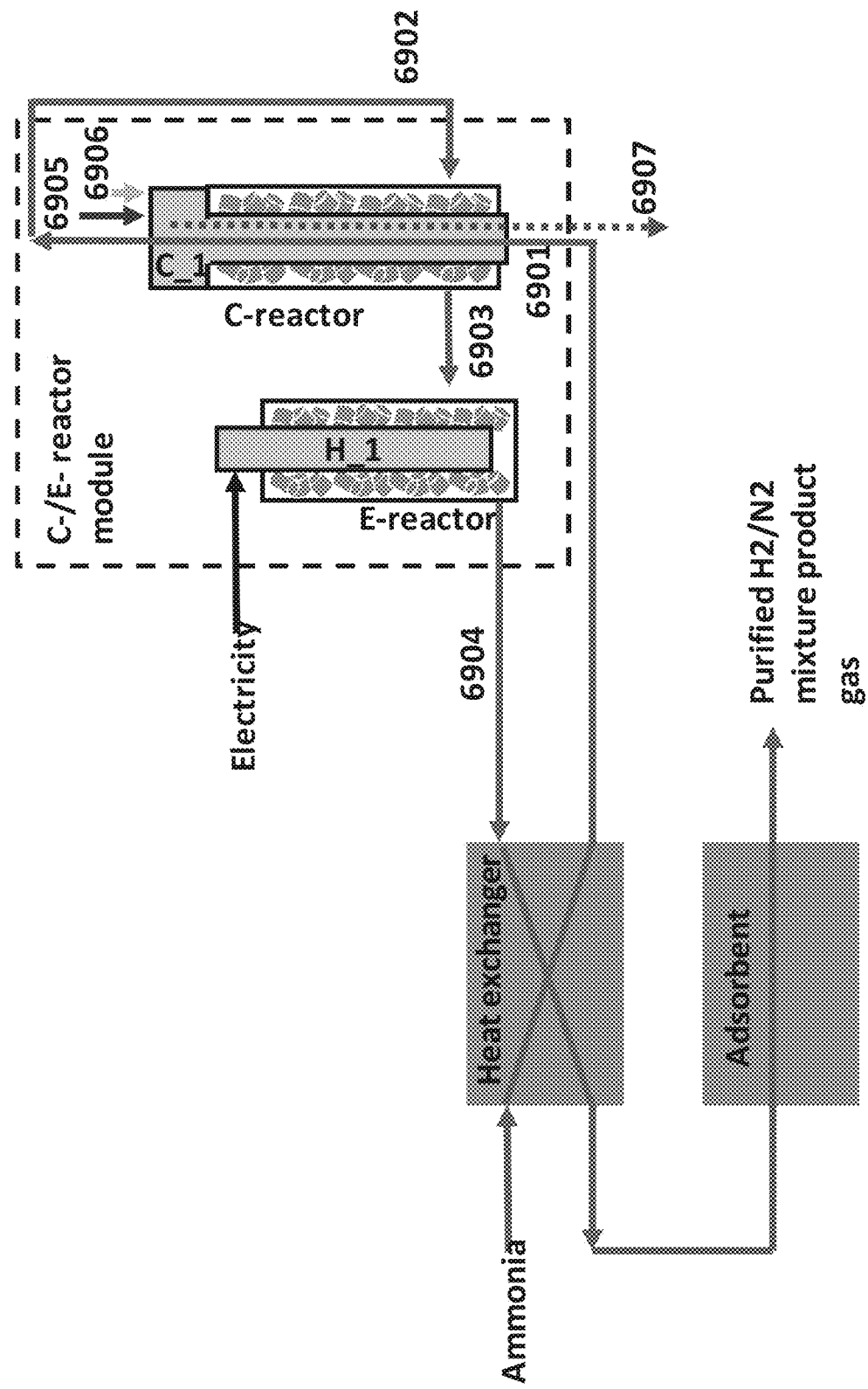
FIG. 69 schematically illustrates an example of a system reactor and/or hotbox configuration, in accordance with one or more embodiments of the present disclosure.

FIG. 69 schematically illustrates an example of a system reactor and/or hotbox configuration, in accordance with one or more embodiments of the present disclosure. One or more combustion reactors and one or more electrical reactors may be configured for ammonia reforming. In some cases, an ammonia stream (6901) may pass through a conduit that is concentric to the combustion reactor such that the ammonia stream (6901) is pre-heated using thermal energy from the combustion reactor. In the configuration shown in FIG. 69, the ammonia stream (6901) may flow counter (e.g., in an opposite direction) to the reactants and products of the combustion reaction, and heat may transfer across the walls of the conduit (from the reactants and products of the combustion reaction) to the ammonia stream (6901). In some cases, preheated ammonia (6902) enters the combustion reactor for ammonia reforming. In some cases, an exit stream (6903) (e.g., comprising 50% or more $H_2/N_2$ and 50% or less $NH_3$ by molar fraction) may then exit from the combustion reactor and enter the electrical reactor for further ammonia reforming. In some cases, an exit stream (6904) may then exit the electrical reactor (e.g., comprising 98% or more $H_2/N_2$ and 2% or less $NH_3$ by molar fraction) and enter a heat exchanger to heat up the ammonia stream (6901) being input to the combustion reactor and the electrical reactor. In some cases, ammonia output from the combustion reactor may be recycled (6902) to a portion of the combustion reactor that is relatively cold compared to another portion of the combustion reactor to heat up the relatively cold portion. In some cases, the relatively cold portion may be in proximity to where the ammonia makes first contact with combustion gases of the combustion reactor. In some cases, the ammonia output from the combustion reactor after recycling through the combustion reactor (6903) may be further heated by the electrical reactor before being input to a heat exchanger. Shown is an electrical reactor ("E-reactor"); at least partially embedded electrical heater (E_1) in the electrical reactor; a combustion reactor ("C-reactor"); at least partially embedded combustion heater (C_1) in the combustion reactor; ammonia preheating through combustor in (6901); ammonia preheating through combustor out/C-reactor in (6902); C-reactor out/E-reactor in (6903); E-reactor out (6904); combustion fuel comprising hydrogen (6905); air in (6906); combustion exhaust (6907); one or more catalyst in the electrical reactor; and one or more catalyst in the combustion reactor. One or more catalyst in the electrical reactor may be the same or different with the one or more catalyst in the combustion reactor. Locations of the inlet ports and the outlet ports of the reactors in the flow diagram may be changed for various designs. In some cases, both the inlet ports and the outlet ports may be positioned at similar locations on the reactor or opposite locations on the reactor along the length.

Figure 70:
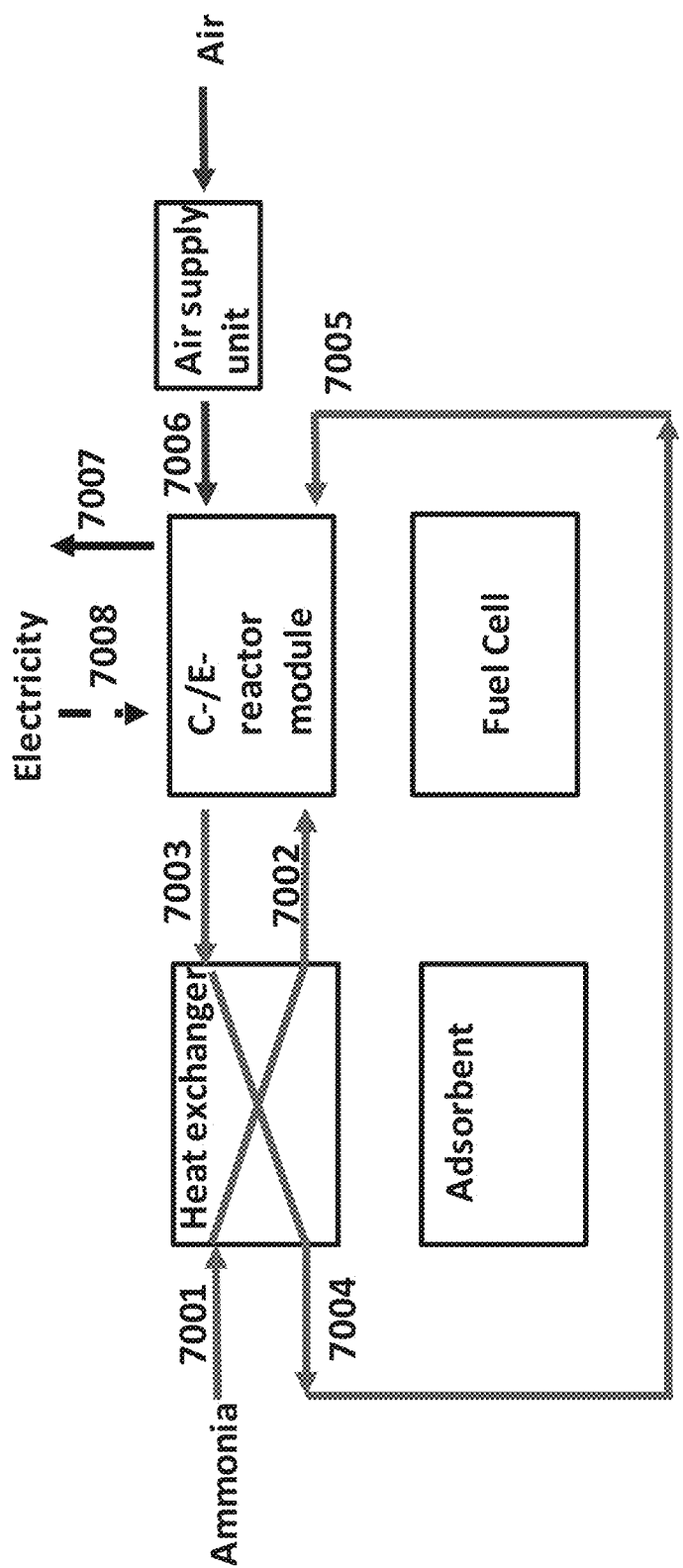
FIG. 70 schematically illustrates an example of a system reactor and/or hotbox configuration during startup, in accordance with one or more embodiments of the present disclosure.

FIG. 70 schematically illustrates an example of a system reactor and/or hotbox configuration during a startup operation, in accordance with one or more embodiments of the present disclosure. In some cases, the output stream comprising hydrogen and/or nitrogen from the combustor reactor, electrical reactor, or both may be flowed through a heat exchanger to be used as a combustion fuel in the combustor reactor. Shown is liquid, liquid/gas two phase, or gaseous ammonia (7001); ammonia gas (7002); product gas comprising hydrogen, nitrogen, and ammonia (7003); cooled product gas (7004); combustion fuel gas comprising hydrogen and nitrogen (7005); air (7006); combustion exhaust (7007); and electricity into C-/E-reactor module (7008).

Figure 71:
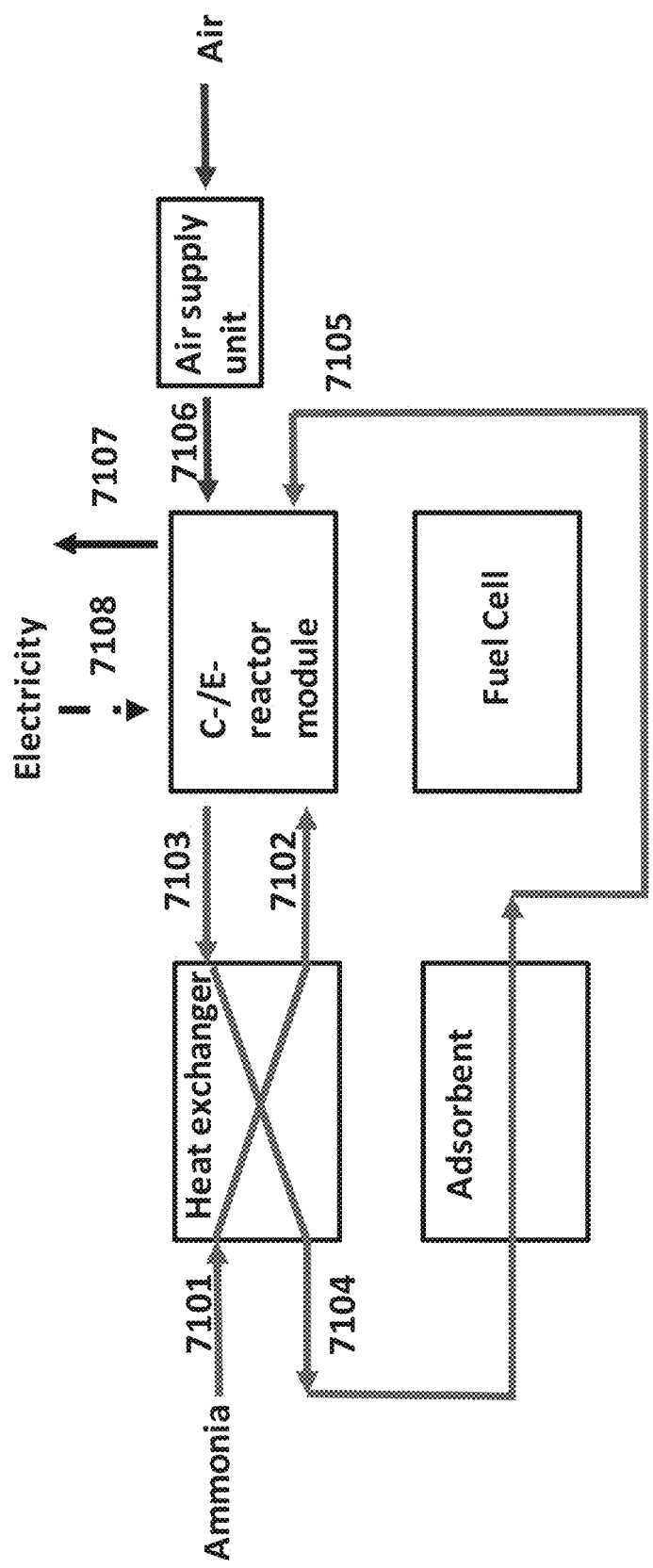
FIG. 71 schematically illustrates an example of a system reactor and/or hotbox configuration during startup, in accordance with one or more embodiments of the present disclosure.

FIG. 71 schematically illustrates an example of a system reactor and/or hotbox configuration during startup, in accordance with one or more embodiments of the present disclosure. In some cases, the output stream comprising hydrogen and/or nitrogen from the combustor reactor, electrical reactor, or both may be flowed through a heat exchanger and then an adsorbent to be used as a combustion fuel in the combustor reactor. In the example shown in FIG. 71, the adsorbent may remove trace amounts of ammonia (e.g., 10,000 ppm by volume) from the output stream (7104) to improve combustion characteristics of the filtered stream (7105) input into the C-/E-reactor module (7108). Shown is liquid, liquid/gas two phase, or gaseous ammonia (7101); ammonia gas (7102); product gas comprising hydrogen, nitrogen, and ammonia (7103); cooled product gas (7104); filtered combustion fuel gas comprising hydrogen and nitrogen (7105); air (7106); combustion exhaust (7107); electricity into C-/E-reactor module (7108).

Figure 72:
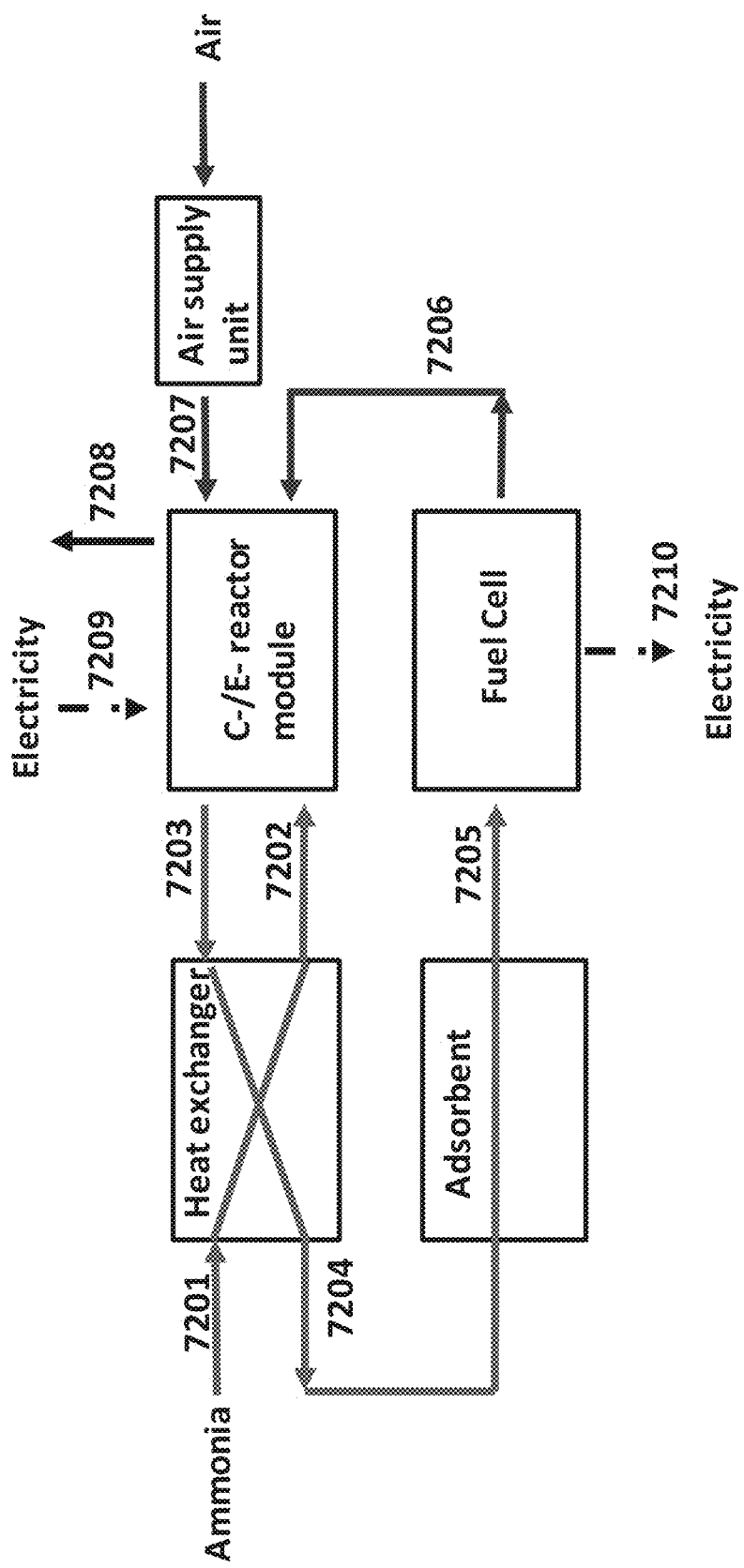
FIG. 72 schematically illustrates an example of a system reactor and/or hotbox configuration during operation, in accordance with one or more embodiments of the present disclosure.

FIG. 72 schematically illustrates an example of a system reactor and/or hotbox configuration during a steady or post-startup operation, in accordance with one or more embodiments of the present disclosure. In some cases, the output stream (7203) comprising hydrogen and nitrogen from the combustor reactor, electrical reactor, or both may be flowed through a heat exchanger and then an adsorbent. The output stream (7206) (comprising hydrogen that is not used by the fuel cell, and/or nitrogen) of a fuel cell may be used as a combustion fuel for the combustor reactor. In some cases, the output stream (7206) of a fuel cell may comprise about 10 to 40% the hydrogen from the output stream (7203) from the combustor reactor, electrical reactor, or both. In some cases, the output stream (7206) of a fuel cell may comprise about 5 to 50% of the hydrogen from the output stream (7203) from the combustor reactor, electrical reactor, or both. In some cases, the output stream (7206) of a fuel cell may comprise about 1, 5, 10, 20, 30, 40, 50, 60, 70, 80, 90, or 100% of the hydrogen from the output stream (7203) from the combustor reactor, electrical reactor, or both. Shown is liquid, liquid/gas two phase, or gaseous ammonia (7201); ammonia gas (7202); product gas comprising hydrogen, nitrogen, and ammonia (7203); cooled product gas (7204); filtered product gas (7205); combustion fuel gas comprising unconverted hydrogen from fuel cell and nitrogen (7206); air (7207); combustion exhaust (7208); optional electricity into C-/E-reactor module (7209); and electricity output from fuel cell (7210).

Figure 73:
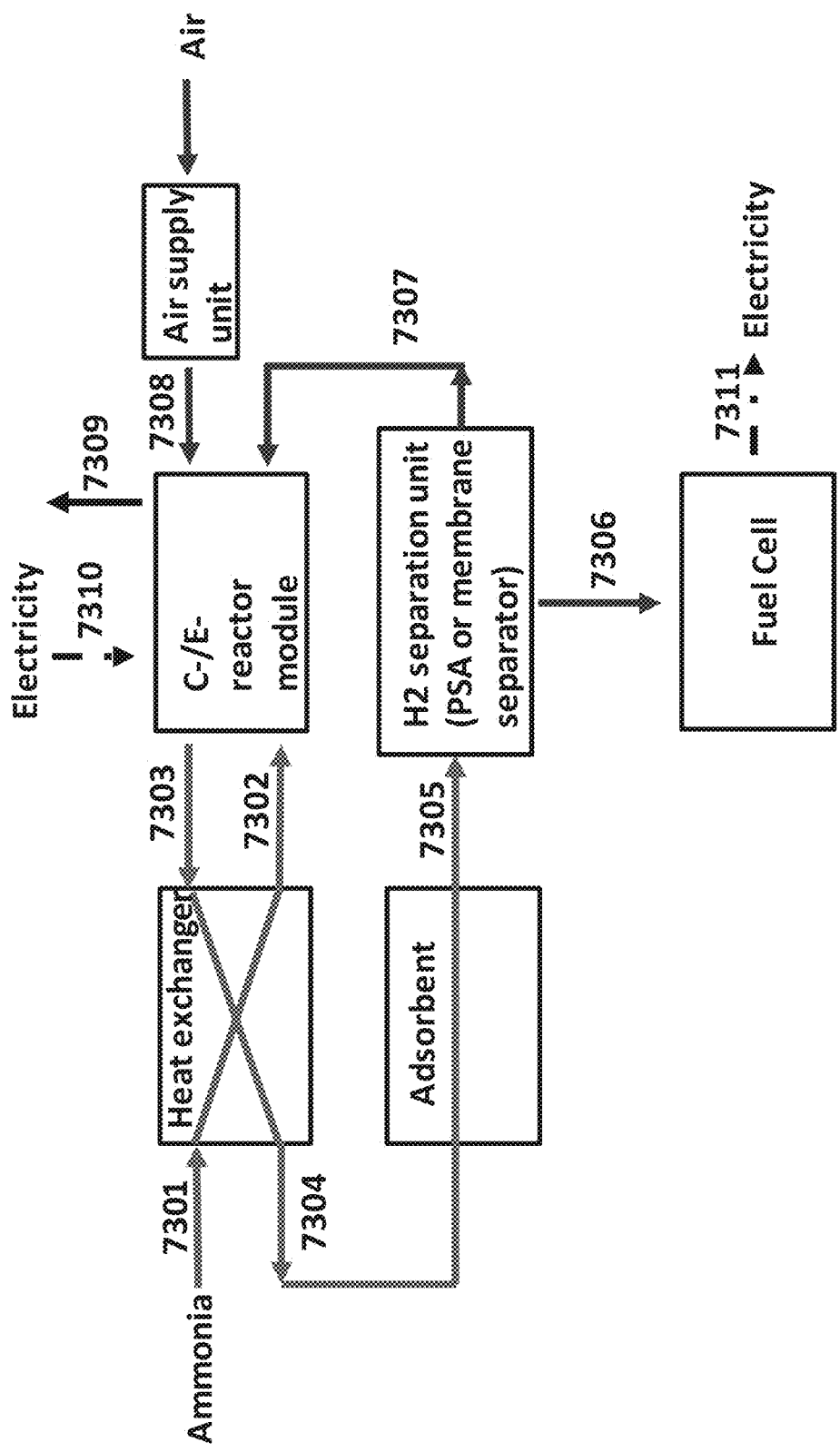
FIG. 73 schematically illustrates an example of a system reactor and/or hotbox configuration during operation, in accordance with one or more embodiments of the present disclosure.

FIG. 73 schematically illustrates an example of a system reactor and/or hotbox configuration during a steady or post-startup operation, in accordance with one or more embodiments of the present disclosure. In some cases, the output stream (7303) comprising hydrogen and nitrogen from the combustor reactor, electrical reactor, or both may be flowed through a heat exchanger and then an adsorbent and then a hydrogen separation unit (e.g., pressure swing adsorption [PSA] system or a membrane separation system). In some cases, product flow (7306) from the hydrogen separation unit comprising purified hydrogen may be input to a fuel cell. In some cases, an exit flow or discharge stream (7307) from the hydrogen separation unit comprising hydrogen and nitrogen may be used as a combustion fuel for the combustor reactor. In some cases, an exit flow or discharge stream (7307) of a hydrogen separation unit may comprise about 10 to 40% of the hydrogen from the output stream (7303) from the combustor reactor, electrical reactor, or both. In some cases, an exit flow or discharge stream (7307) of a hydrogen separation unit may comprise about 5 to 50% of the hydrogen from the output stream (7303) from the combustor reactor, electrical reactor, or both. In some cases, an exit flow or discharge stream (7307) of a hydrogen separation unit may comprise about 0, 1, 5, 10, 20, 30, 40, 50, 60, 70, 80, 90, or 100% of the hydrogen from the output stream (7303) from the combustor reactor, electrical reactor, or both. Shown is liquid, liquid/gas two phase, or gaseous ammonia (7301); ammonia gas (7302); product gas comprising hydrogen, nitrogen, and ammonia (7303); cooled product gas (7304); filtered product gas (7305); filtered product gas comprising mostly hydrogen (7306); hydrogen separation unit discharge stream comprising hydrogen and nitrogen (7307); air (7308); combustion exhaust (7309); optional electricity into combustor/electrical reactor module (7310); and electricity output from fuel cell (7311).

Figure 83:
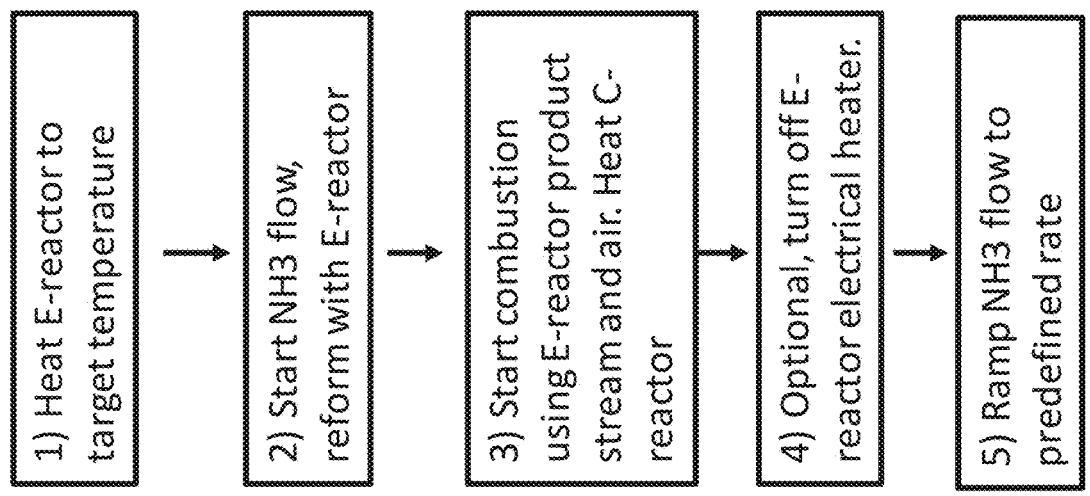
FIG. 83 shows a process flow diagram for a startup process, in accordance with one or more embodiments of the present disclosure.

FIG. 83 shows a flow diagram for a startup method, in accordance with one or more embodiments of the present disclosure. In some cases, the startup method may comprise (1) heating an electrical reactor to an electrical reactor target temperature; (2) inputting ammonia into the electrical reactor and reforming ammonia with the electrical reactor; (3) combusting at least a portion of an electrical reactor exit flow with air to heat a combustor reactor; (4) optionally, turning off the electrical reactor; and/or (5) increasing an ammonia flow rate to at least a predefined flow rate. In some cases, process (1) and (2) may be performed in sequence or in parallel. In some cases, at least two processes in processes (1)-(5) may be performed in sequence or in parallel. Once condition (5) is reached, and self-sustained auto-thermal reforming is maintained (i.e., a steady-state condition), the ammonia flow rate may be further increased above a predefined rate depending on operating requirements (e.g., fuel cell output power, reactor temperature(s), combustor temperature(s), reactor pressure(s), ammonia flowrate, etc.) while maintaining auto-thermal reforming. Process (4) may be executed or un-executed depending on combustor reactor temperature and ammonia conversion efficiency. Electrical reactor may be used to balance temperature distribution. In some cases, if the fuel cell efficiency is high, electricity may be used as a main source of heating power as well.

Figure 84:
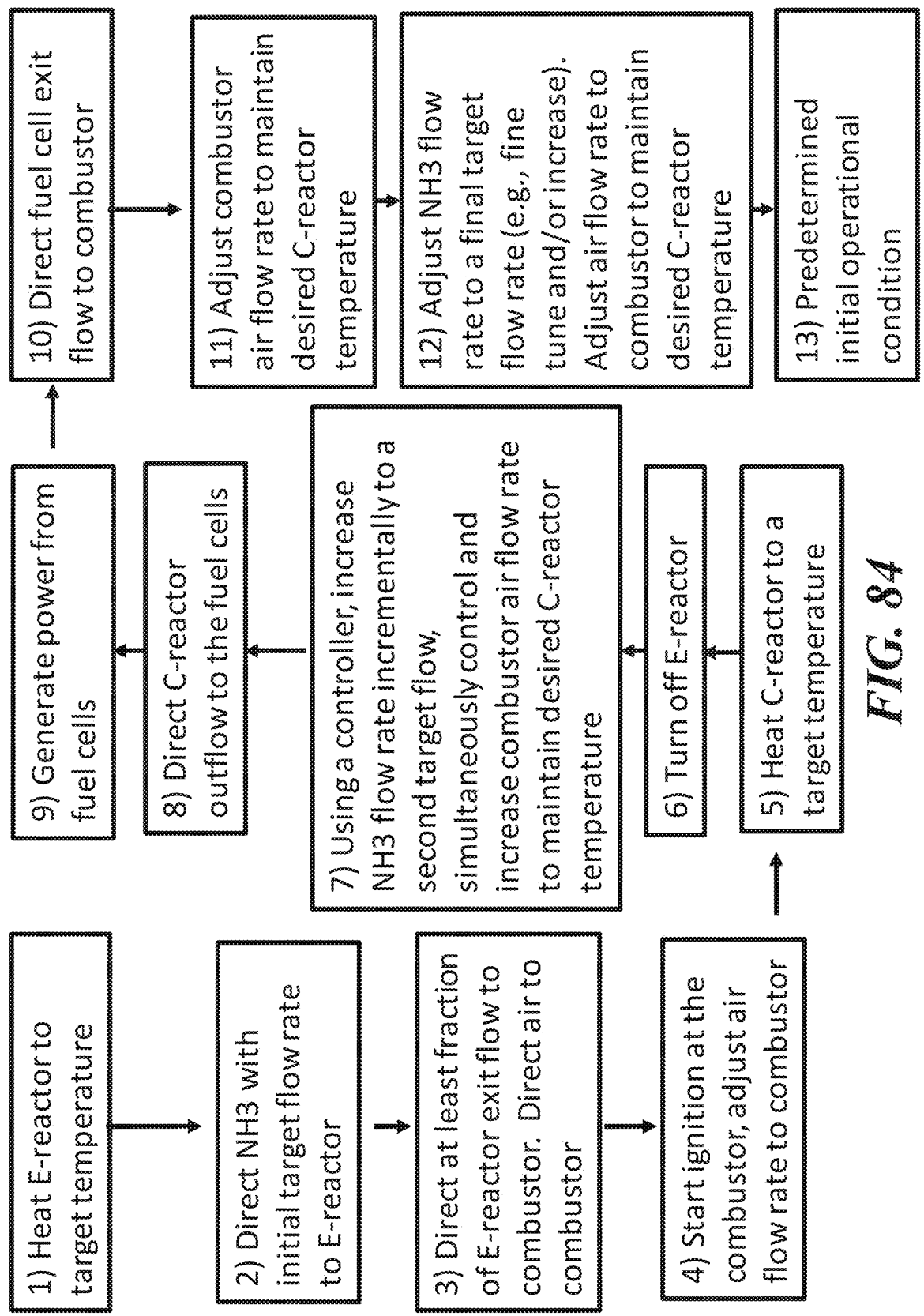
FIG. 84 shows a process flow diagram for a startup process, in accordance with one or more embodiments of the present disclosure.

FIG. 84 shows a flow diagram for a startup method, in accordance with one or more embodiments of the present disclosure. In some cases, the startup method may comprise (1) heating an electrical reactor to at least an electrical reactor target temperature; (2) inputting ammonia with at least an initial target flow rate to the electrical reactor; (3) inputting (i) air, and (ii) at least a fraction of an exit flow from the electrical reactor to a combustor reactor; (4) igniting, at the combustor reactor and adjusting the flow rate of air into the combustor reactor; (5) heating the combustor reactor to at least a first target combustor reactor temperature; (6) turning off the electrical reactor; (7) using a controller, increasing the ammonia flow rate incrementally to at least a second target flow rate and simultaneously controlling and increasing the combustor reactor air flow rate to maintain at least a second target combustor reactor temperature. In some cases, the second target combustor reactor temperature may be the same or different as the first target combustor reactor temperature; (8) inputting at least a portion of an exit flow from the combustor reactor to a fuel cell; (9) reacting the exit flow from the combustor reactor in the fuel cell to generate electrical power; (10) inputting at least a portion of an exit flow from the fuel cell to the combustor reactor; (11) adjusting the combustor reactor air flow rate to maintain at least a third target combustor reactor temperature. In some cases, the third target combustor reactor temperature may be the same or different as the first target combustor reactor temperature or the second target combustor reactor temperature; (12) adjusting the ammonia flow rate to at least a third target flow rate (e.g., by fine-tuning or decreasing/increasing the ammonia flow rate), and/or adjusting the combustor reactor air flow rate to maintain at least a fourth target combustor reactor temperature. In some cases, the fourth target combustor reactor temperature may be the same or different as the first target combustor reactor temperature, the second target combustor reactor temperature, or the third target combustor reactor temperature; and/or (13) achieving a predetermined initial operational condition (i.e., a steady-state condition). In some cases, at least two processes in processes (1)-(13) may be performed in sequence or in parallel. In some cases, the startup process may be performed without process (1), (2), (3), (4), (5), (6), (7), (8), (9), (10), (11), (12), or a combination thereof. Combustor reactor outflow may pass through adsorbents and heat exchanger to remove unconverted ammonia and cool down and/or recuperate heat before entering the fuel cells. Process (6) may be executed anywhere in the flow chart as long as the combustor reactor temperature is above predetermined threshold temperature. Process (6) may be unexecuted if the combustor reactor temperature falls below predetermined threshold temperature. Process (9) may be executed anywhere after process (8).

Figure 85:
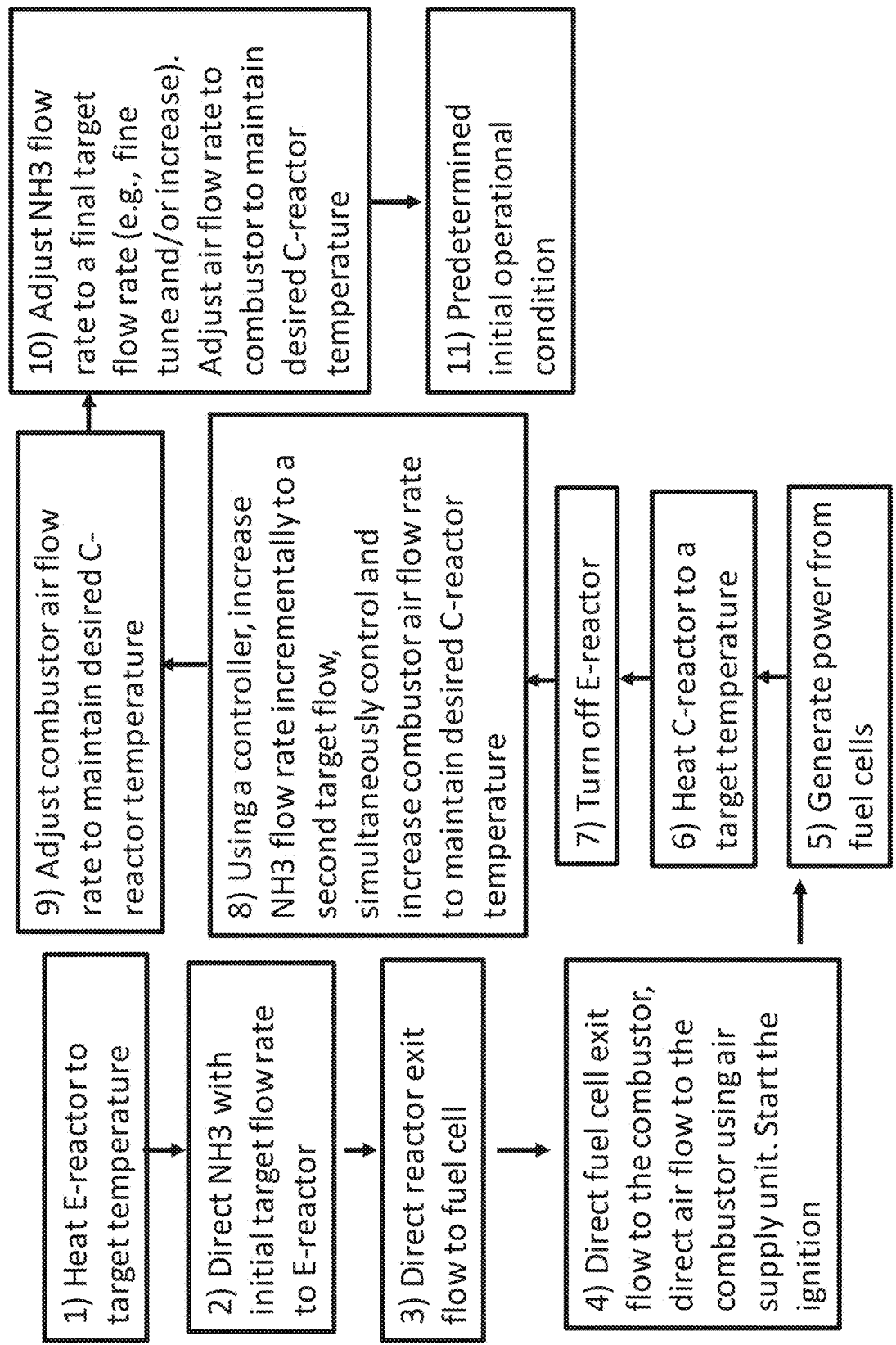
FIG. 85 shows a process flow diagram for a startup process, in accordance with one or more embodiments of the present disclosure.

FIG. 85 shows a flow diagram for a startup method, in accordance with one or more embodiments of the present disclosure. In some cases, a startup method may comprise (1) heating an electrical reactor to at least an electrical reactor target temperature; (2) inputting ammonia with at least an initial target flow rate into the electrical reactor; (3) inputting an exit flow from the electrical reactor to a fuel cell; (4) inputting (i) air and (ii) an exit flow from the fuel cell to a combustor reactor, and igniting the exit flow and the air in the combustor reactor; (5) reacting the hydrogen in the exit flow from the electrical reactor and/or the combustor reactor to generate power from the fuel cell; (6) heating the combustor reactor to at least a first combustor reactor target temperature; (7) turning off the electrical reactor; (8) using a controller, increasing the ammonia flow rate incrementally to at least a second target flow rate and simultaneously controlling (e.g., increasing) the flow rate of the air to maintain at least a second target combustor reactor temperature. In some cases, the second target combustor reactor temperature may be the same or different as the first target combustor reactor temperature; (9) adjusting the flow rate of air to maintain at least a third target combustor reactor temperature. In some cases, the third target combustor reactor temperature may be the same or different as the first target combustor reactor temperature or the second target combustor reactor temperature; (10) adjusting the flow rate of ammonia to at least a second target flow rate (e.g., by fine-tuning or decreasing/increasing the ammonia flow rate) and adjusting the flow rate of air to the combustor reactor to maintain at least a fourth combustor reactor temperature. In some cases, the fourth target combustor reactor temperature may be the same or different as the first target combustor reactor temperature, the second target combustor reactor temperature, or the third target combustor reactor temperature; and/or (13) achieving a predetermined initial operational condition. In some cases, at least two processes in processes (1)-(13) may be performed in sequence or in parallel. In some cases, the startup process may be performed without process (1), (2), (3), (4), (5), (6), (7), (8), (9), (10), (11), (12), or a combination thereof. Reactor exit flow may pass through adsorbents and heat exchanger to remove unconverted ammonia and cool down and/or recuperate heat before entering the fuel cells. Process (7) may be executed anywhere in the flow chart as long as the C-reactor temperature is above predetermined threshold temperature. Process (7) may be unexecuted if the C-reactor temperature falls below predetermined threshold temperature. Process (5) may be executed anywhere after process (3).

Figure 86:
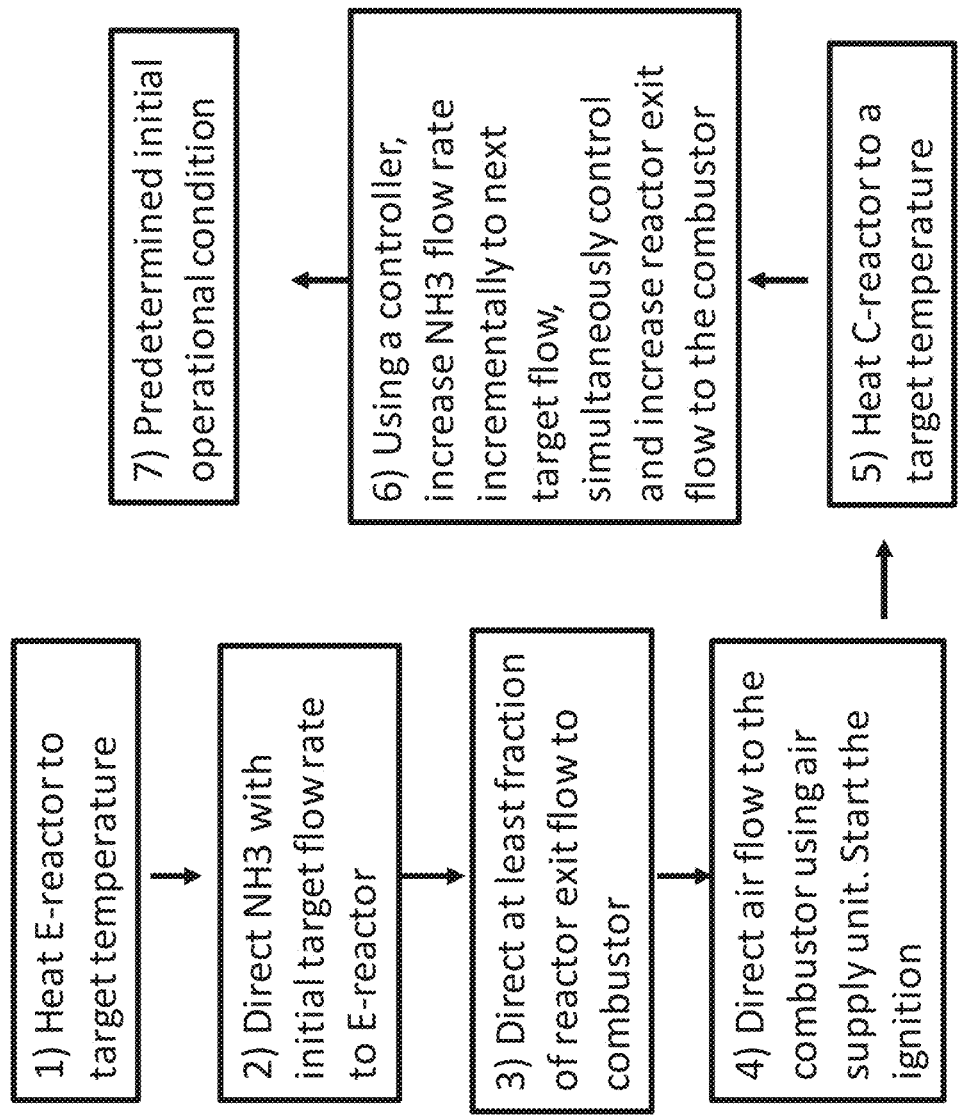
FIG. 86 shows a process flow diagram for a startup process, in accordance with one or more embodiments of the present disclosure.

FIG. 86 shows a flow diagram for a startup method, in accordance with one or more embodiments of the present disclosure. In some cases, a startup method may comprise (1) heating an electrical reactor to an electrical reactor target temperature; (2) inputting ammonia with at least an initial target flow rate to the electrical reactor; (3) inputting at least a fraction of an exit flow from the electrical reactor to a combustor reactor; (4) inputting air into the combustor reactor using an air supply unit, and igniting the exit flow from the electrical reactor and the air in the combustor reactor; (5) heating the combustor reactor to a first target combustor reactor temperature; (6) using a controller, increasing the ammonia flow rate incrementally to at least a second target flow rate and simultaneously controlling (e.g., increasing) the flow rate of air into the combustor reactor to maintain at least a second target combustor reactor temperature. In some cases, the second target combustor reactor temperature may be the same or different from the first target combustor reactor temperature; and (7) achieving a predetermined initial operational condition. In some cases, at least two processes in processes (1)-(6) may be performed in sequence or in parallel. In some cases, the startup process may be performed without process (1), (2), (3), (4), (5), (6), or a combination thereof. Reactor exit flow may pass through adsorbents and heat exchanger to remove unconverted ammonia and cool down and/or recuperate heat before entering the fuel cells. E-reactor may be turned off if the C-reactor temperature is above predetermined threshold temperature.

It is noted herein that any of the steps or processes described with respect to FIGS. 83-86 may be combined with the others of the steps or processes described with respect to FIGS. 83-86, and that the examples described with respect to FIGS. 83-86 should not be construed as limiting the disclosure.

Figure 87:
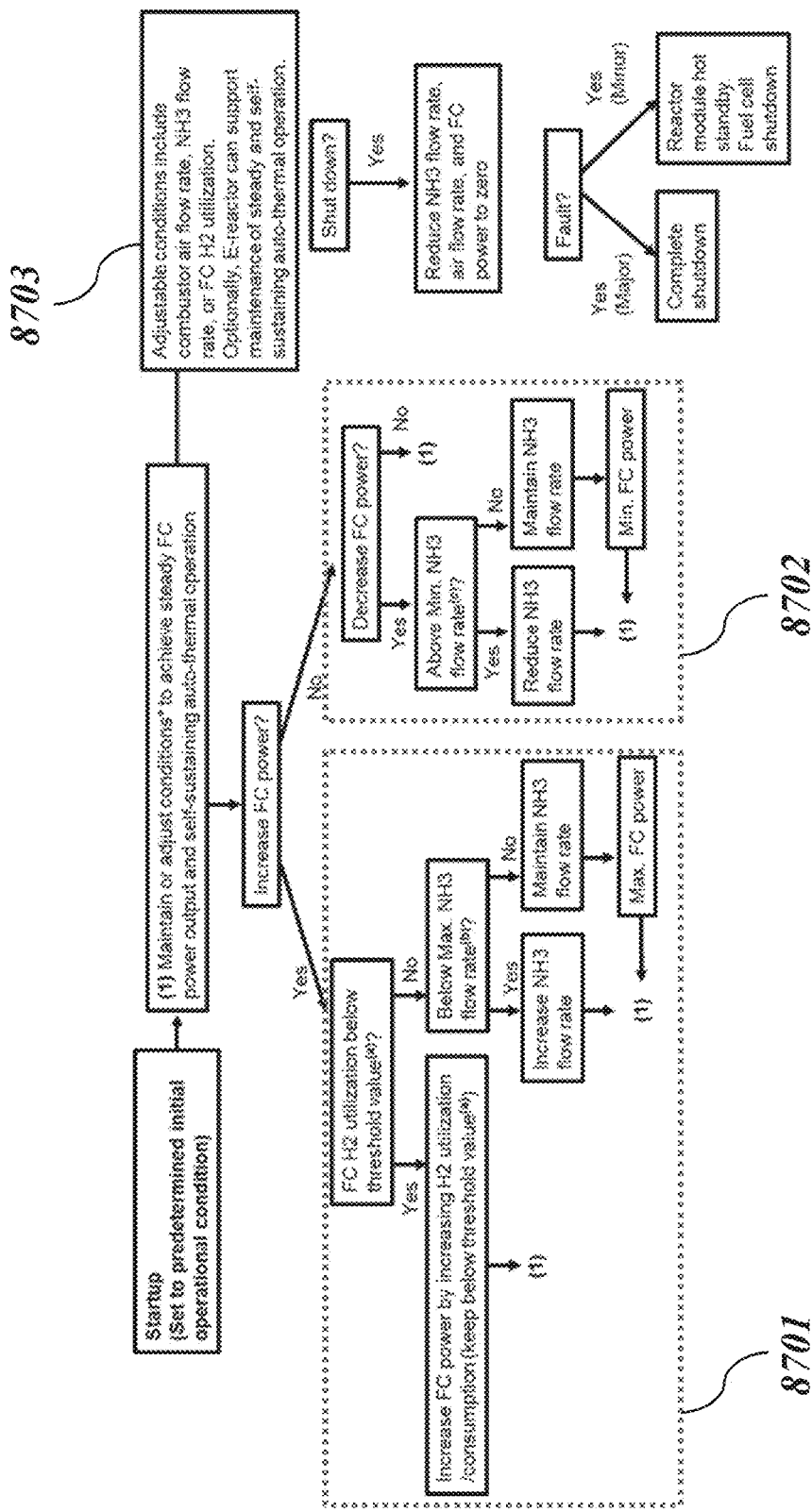
FIG. 87 shows a process flow diagram for a post-startup operation process, in accordance with one or more embodiments of the present disclosure.

FIG. 87 shows a flow diagram for a post-startup operation method, in accordance with one or more embodiments of the present disclosure. For a set of given system operational parameters, self-sustaining auto-thermal operational conditions may be predetermined (e.g., min./max. $NH_3$ flow rates, corresponding FC power and hydrogen consumption rates, battery min./max. states of charge [SOC], min./max. air flow rates, etc.). In some aspects, the present disclosure provides a method for maintaining and/or adjusting operational parameters of a system comprising a fuel cell to maintain and/or adjust power output for the fuel cell. In some cases, the method may comprise monitoring the power output for the fuel cell, and automatically adjusting (increasing or decreasing) the power output (e.g., by monitoring the electrical load coupled to the fuel cell). In some cases, the method may adjust various operational parameters (8703), including, but not limited to: air flow rate for the combustor reactor, ammonia flow rate into the system or any component thereof (e.g., combustor reactor, electrical heater, etc.), and/or fuel cell hydrogen utilization. "*" indicates adjustable conditions include combustor air flow rate, ammonia ($NH_3$) flow rate, fuel cell (FC) $H_2$ utilization, or E-reactor power. "a" indicates predetermined achievable fuel cell (FC) hydrogen utilization or consumption rate from the FC inlet flow to maintain self-sustaining auto-thermal reforming for a given FC inlet flow rate. "b" indicates predetermined maximum $NH_3$ flow rate. "c" indicates predetermined minimum $NH_3$ flow rate. Incremental or decremental change in $NH_3$ flow rate may be based on predetermined value and/or percentage of current value. In some cases, a controller may control $NH_3$ flow rate, control air flow rate, control flow pressures, control valves, control FC power output, control battery power output, control E-reactor power input, or any combination thereof. In some cases, a sensor may measure temperatures, pressures, fuel cell power output, battery power outputs, battery SOC, fuel cell hydrogen consumption, and $NH_3$ conversion efficiency.

In some cases, the method may comprise increasing the power output of the fuel cell (8701). In some cases, the method may comprise comparing hydrogen utilization rate of the fuel cell to a predetermined threshold value. In some cases, the method may comprise increasing the power output of the fuel cell by increasing the hydrogen utilization and/or consumption (while still keeping the hydrogen utilization at a level lower than the predetermined threshold value) when the hydrogen utilization rate of the fuel cell is lower than the predetermined threshold value. In some cases, the method may comprise comparing the ammonia flow rate into the system to a predetermined ammonia flow rate value when the hydrogen utilization rate of the fuel cell is equal to or above the predetermined threshold value. In some cases, the predetermined ammonia flow rate value may be a maximum ammonia flow rate value for the system. In some cases, the method may comprise increasing the ammonia flow rate when the ammonia flow rate into the system is less than the predetermined ammonia flow rate value. In some cases, the method may comprise maintaining the ammonia flow rate when the ammonia flow rate into the system is greater than the predetermined ammonia flow rate value. In some cases, the method may comprise increasing the power output of the fuel cell when the ammonia flow rate into the system is greater than the predetermined ammonia flow rate value.

In some cases, the method may comprise decreasing the power output of the fuel cell (8702). In some cases, the method may comprise comparing the ammonia flow rate into the system to a predetermined ammonia flow rate value. In some cases, the predetermined ammonia flow rate value may be a minimum ammonia flow rate value for the system. In some cases, the method may comprise reducing the ammonia flow rate when the ammonia flow rate into the system is above the predetermined ammonia flow rate value. In some cases, the method may comprise maintaining the ammonia flow rate when the ammonia flow rate into the system falls below or at the predetermined ammonia flow rate value. In some cases, the method may comprise decreasing the power output of the fuel cell when the ammonia flow rate into the system falls below the predetermined ammonia flow rate value.

In some cases, the method may comprise a shutdown process. In some cases, the shutdown process may comprise reducing any one of or a combination of ammonia flow rate, air flow rate, and fuel cell power to zero.

In some cases, the method may comprise a fault detection system. In some cases, the fault detection system may detect a fault. In some cases, a fault may be categorized as a major fault or a minor fault. An example of a major fault may include a fracture of a reactor vessel or a leakage of ammonia above predetermined leakage levels. An example of a minor fault may include the temperature of a reactor or a heater being offset (e.g., by 10% or more) from a target temperature, or an increase in ammonia concentration in the one or more inlet streams to the one or more adsorbents or the fuel cell system above predetermined threshold concentrations. In some cases, when a major fault is detected by the fault detection system, a shutdown process may be initiated. In some cases, when a minor fault is detected by the fault detection system, a reactor in the system may operate in a standby mode while maintaining a predetermined temperature. In some cases, when a minor fault is detected by the fault detection system, a fuel cell in the system may be shutdown. In some cases, in the event that the fuel cell power needs to be turned off intermittently, the event may be classified as a minor fault. In some cases, a hot standby mode (e.g., without the fuel cell outputting power) may be maintained until the shut-down process is executed. In some cases, the hot standby mode (e.g., without the fuel cell outputting power) may be maintained until fuel cell power output is executed.

Figure 88:
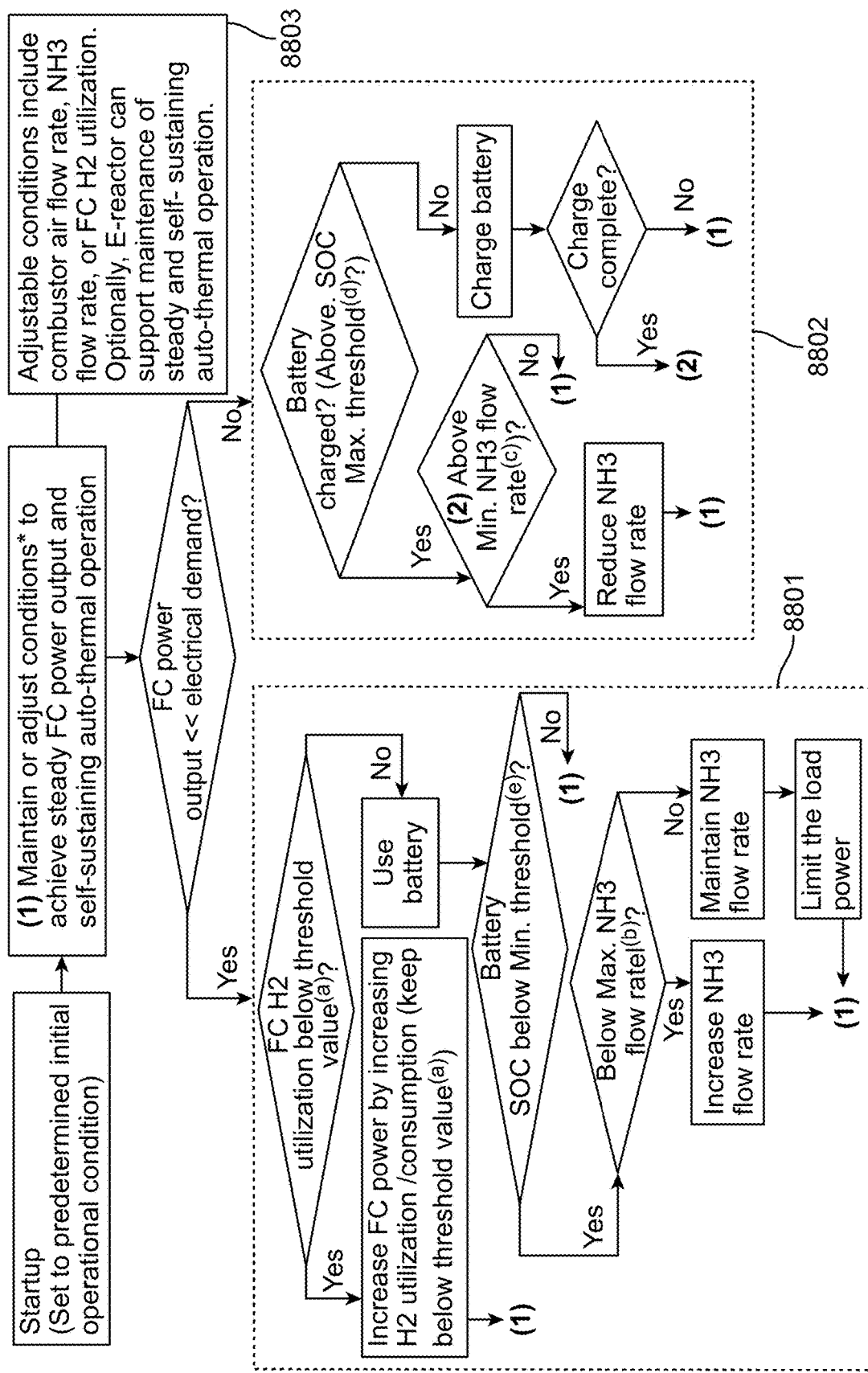
FIG. 88 shows a process flow diagram for a post-startup operation process, in accordance with one or more embodiments of the present disclosure.

FIG. 88 shows a process flow diagram for a post-startup operation process, in accordance with one or more embodiments of the present disclosure. Based on a set of given system operational parameters, self-sustaining auto-thermal operational conditions may be predetermined (e.g., min./max. $NH_3$ flow rates, corresponding FC power and hydrogen consumption rates, battery min./max. SOCs, min./max. air flow rates, etc.). In some aspects, the present disclosure provides a method for maintaining and/or adjusting operational parameters of a system comprising a fuel cell to maintain and/or adjust power output for the fuel cell. In some cases, the method may comprise determining whether the power output for the fuel cell is greater or lower than an electrical energy or power demand. In some cases, the method may adjust various operational parameters (8803), including, but not limited to: air flow rate for the combustor reactor, ammonia flow rate into the system or any component thereof (e.g., combustor reactor, electrical heater, etc.), and/or fuel cell hydrogen utilization. "*" indicates adjustable conditions include combustor air flow rate, $NH_3$ flow rate, fuel cell (FC) $H_2$ utilization, or E-reactor power. "a" indicates predetermined achievable Fuel Cell hydrogen utilization or consumption rate from the FC inlet flow to maintain self-sustaining auto-thermal reforming for a given FC inlet flow rate. "b" indicates predetermined Maximum $NH_3$ flow rate. "c" indicates predetermined Minimum $NH_3$ flow rate. "d" indicates predetermined Maximum battery state of charge. "e" indicates predetermined Minimum battery state of charge. Incremental or decremental change in $NH_3$ flow rate is based on predetermined value and/or percentage of current value. In some cases, a controller may control $NH_3$ flow rate, control air flow rate, control flow pressures, control valves, control FC power output, control battery power output, control E-reactor power input, or any combination thereof. In some cases, a sensor may measure temperatures, pressures, fuel cell power output, battery power outputs, battery SOC, fuel cell hydrogen consumption, and $NH_3$ conversion efficiency.

In some cases, the method may comprise increasing the power output of the fuel cell (8801). In some cases, the method may comprise comparing hydrogen utilization rate of the fuel cell compared to a predetermined threshold value. In some cases, the method may comprise increasing the power output of the fuel cell by increasing the hydrogen utilization and/or consumption (while still keeping the hydrogen utilization at a level lower than the predetermined threshold value). In some cases, the method may comprise using a battery to supplement the power output from the fuel cell to meet the electrical energy or power demand. In some cases, the method may comprise comparing the ammonia flow rate into the system to a predetermined ammonia flow rate value. In some cases, the predetermined ammonia flow rate value may be a maximum ammonia flow rate value for the system. In some cases, the method may comprise increasing the ammonia flow rate. In some cases, the method may comprise maintaining the ammonia flow rate. In some cases, the method may comprise increasing the power output of the fuel cell. In some cases, the method may comprise limiting an electrical load associated with the electrical energy or power demand.

In some cases, the method may comprise decreasing the power output of the fuel cell (8802). In some cases, the method may comprise determining if a battery has a state of charge (SOC) that is above a predetermined threshold value. In some cases, the method comprises comparing the ammonia flow rate into the system to a predetermined ammonia flow rate value. In some cases, the predetermined ammonia flow rate value may be a minimum ammonia flow rate value for the system. In some cases, the method may comprise reducing the ammonia flow rate. In some cases, the method may comprise maintaining the ammonia flow rate. In some cases, the method may comprise charging the battery using electrical energy or power generated by the fuel cell. In some cases, the method may comprise determining if the battery is fully charged.

Figure 82:
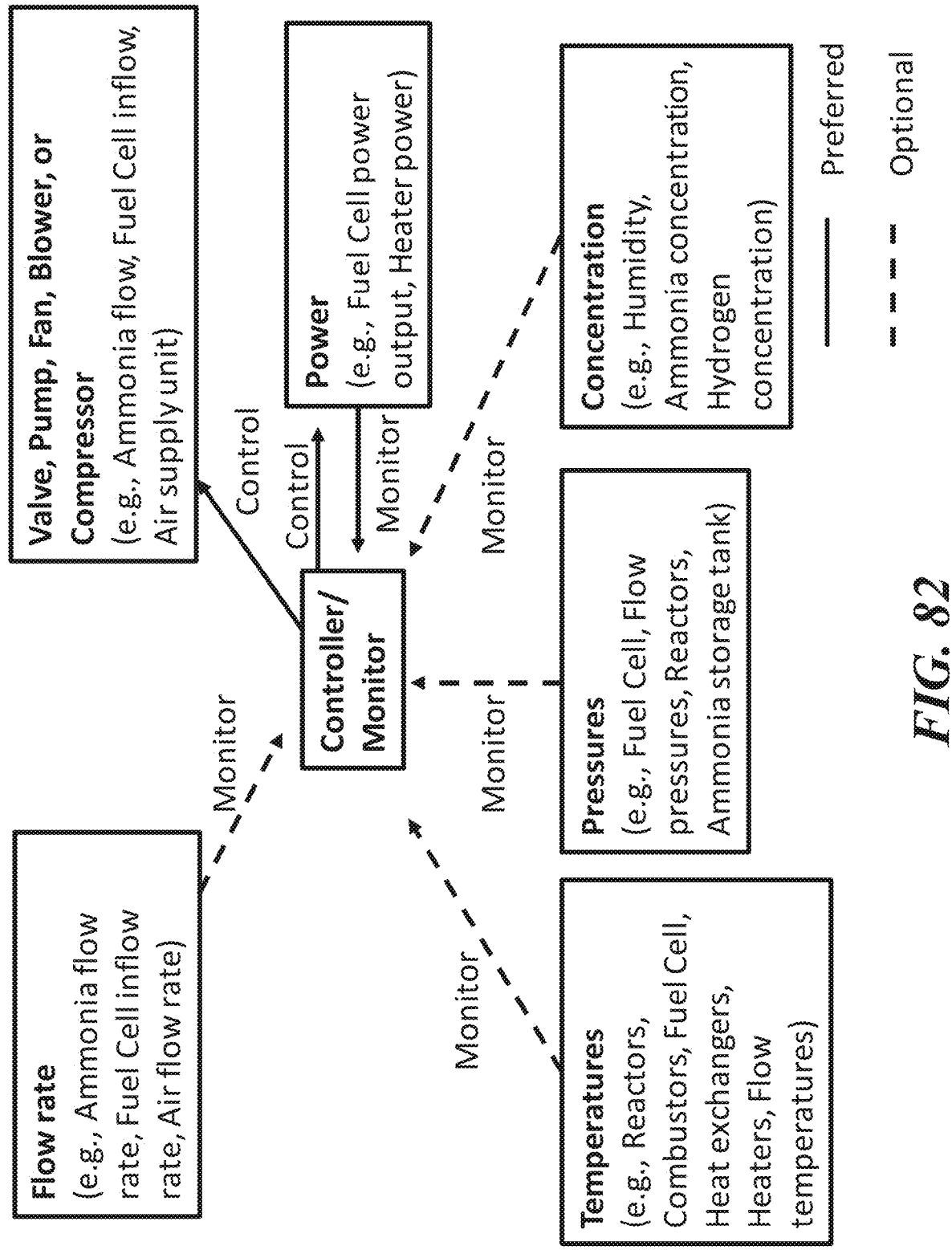
FIG. 82 shows a block diagram for system control using a controller, in accordance with one or more embodiments of the present disclosure.

FIG. 82 shows a controller, in accordance with one or more embodiments of the present disclosure. In some cases, a controller may monitor and/or control various operational parameters. In some cases, a controller may monitor and/or control a flow rate of ammonia into a system, a flow rate of gas into a fuel cell, a flow rate of air into a combustor, any flow into or out of a system or system component disclosed herein, or any combination thereof. In some cases, a controller may monitor and/or control a temperature of a reactor (e.g., an electrical reactor or a combustor reactor), a fuel cell, a heat exchanger, flows between components of the system, any system component, or any combination thereof. In some cases, a controller may monitor and/or control one or more valves, one or more pumps, one or more fans, one or more blowers, one or more compressors, or any combination thereof to adjust an ammonia flow rate, a flow rate of a gas into a fuel cell, flow rate from an air supply unit, any flow into or out of a system or system component disclosed herein, or any combination thereof. In some cases, a controller may monitor and/or control a power output or input of one or more system components disclosed herein, for example, one or more fuel cells, one or more heaters, or any combination thereof. In some cases, a controller may monitor and/or control a concentration of a substance in an environment or within a system, for example, humidity, ammonia concentration, hydrogen, or any combination thereof in the environment or in any system component or flows between disclosed herein. In some cases, a controller may monitor and/or control a pressure of a system component or any flows in between, for example, a reactor, a fuel cell, ammonia storage tank, and any flows in between. In some cases, a controller may be communicatively coupled to one or more optional monitors (i.e., sensors). In some cases, a controller may be communicatively coupled to one or more optional monitors in addition to a preferred monitor and controls. In some cases, a controller may be communicatively coupled to two or more optional monitors.

Hybrid Heating

Figure 14:
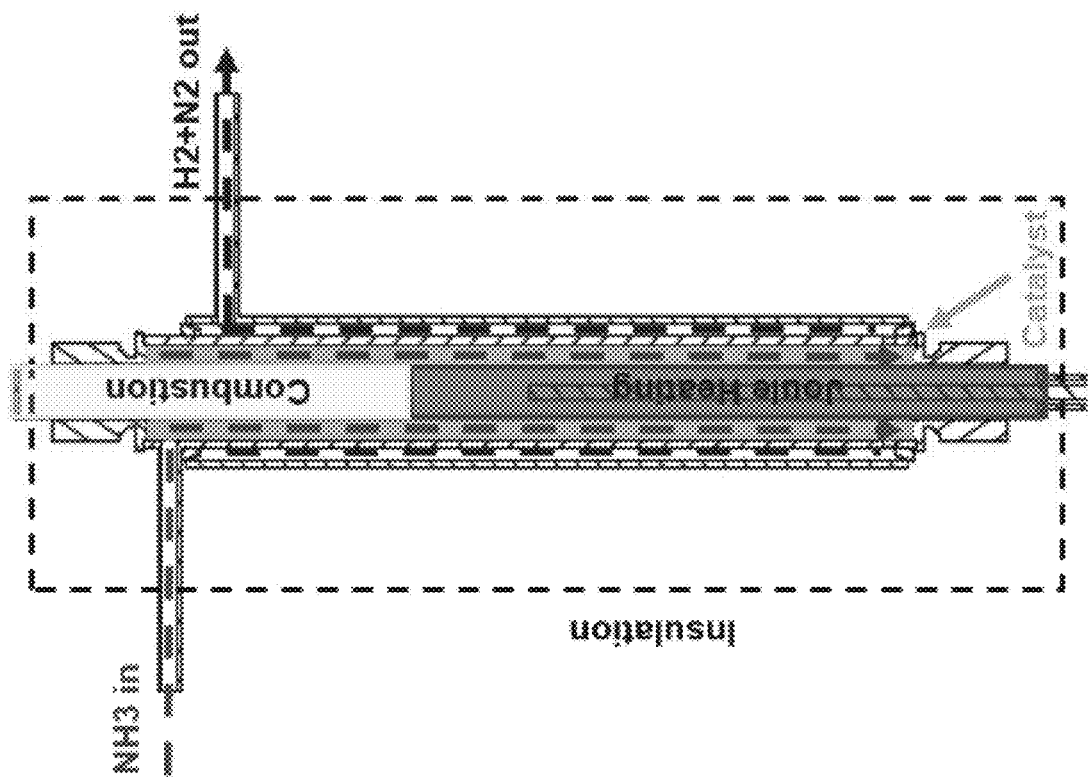
FIG. 14 schematically illustrates an example of a main reactor with hybrid heating, in accordance with one or more embodiments of the present disclosure.

FIG. 14 schematically illustrates an example of a main reactor with hybrid heating, in accordance with one or more embodiments of the present disclosure. Such a hybrid heating design may improve heat transfer while minimizing reactor heat loss and may decrease startup time. The hybrid heating design may also reduce a weight and a volume of the reactor and improve thermal management characteristics of the system while providing an optimized heat source for ammonia conversion.

The hybrid heating design for the main reactor may comprise one or more heat sources. The heat sources may be, for example, the heating units described elsewhere herein. The heat sources may comprise the startup heating and reforming unit and/or the one or more main heating units. In some cases, the one or more heat sources may comprise two or more heat sources or heating units. In some cases, the two or more heat sources may be the same. In other cases, the two or more heat sources may be different. For example, a first heat source may be configured for joule heating, and a second heat source may be configured for combustion heating. In some cases, the hybrid heating reactor may comprise a separator (e.g., a physical component or structure) that is provided between the first heat source and the second heat source. The separator may or not may not facilitate a transfer of thermal energy across the separator.

In one example, the main reactor with the hybrid heating design may be configured to receive ammonia through an inlet. The ammonia may be directed through the main reactor, which may comprise a catalyst material that is heated using the two or more heat sources. The catalyst material may be heated directly or indirectly using the first heat source when the ammonia is directed through a first portion of the main reactor. The catalyst material may be heated directly or indirectly using the second heat source when the ammonia is directed through a second portion of the main reactor. Heating the catalyst material in the presence of the ammonia may produce hydrogen and/or nitrogen. The hydrogen and/or nitrogen may then be directed towards an outlet, which may be in fluid communication with one or more hydrogen fuel cells. In some embodiments, the hydrogen and/or nitrogen may be directed towards an outlet, which may be in fluid communication with one or more combustion engines and/or combustors.

In some embodiments, the main reactor with the hybrid heating design may be configured to combust leftover hydrogen gas from the reactor (e.g., the main reactor or the fast startup reactor) or from one or more fuel cells to heat the ammonia and/or the catalyst material. In some cases, the reactor walls or fluid channel walls may be designed to permit heat exchange across the walls of the reactor or between the fluid flows. In some cases, the heat sources or heating units may comprise a powder material with a high heat transfer coefficient to enhance heat transfer. In some cases, a heat exchanger may be incorporated into or integrated with one or more components of the main reactor, which may result in the main reactor being more compact and efficient. Further, the main reactor may comprise one or more walls with a thickness ranging from about 0.5 millimeters to about 1.2 millimeters, which may reduce thermal mass. In some embodiments, the main reactor may comprise one or more walls with a thickness ranging from about 1 millimeters to about 30 millimeters, which may increase structural integrity. The main reactor with the hybrid heating design may be configured to minimize heat loss while providing fast hydrogen extraction and fast load following.

Figure 15A:
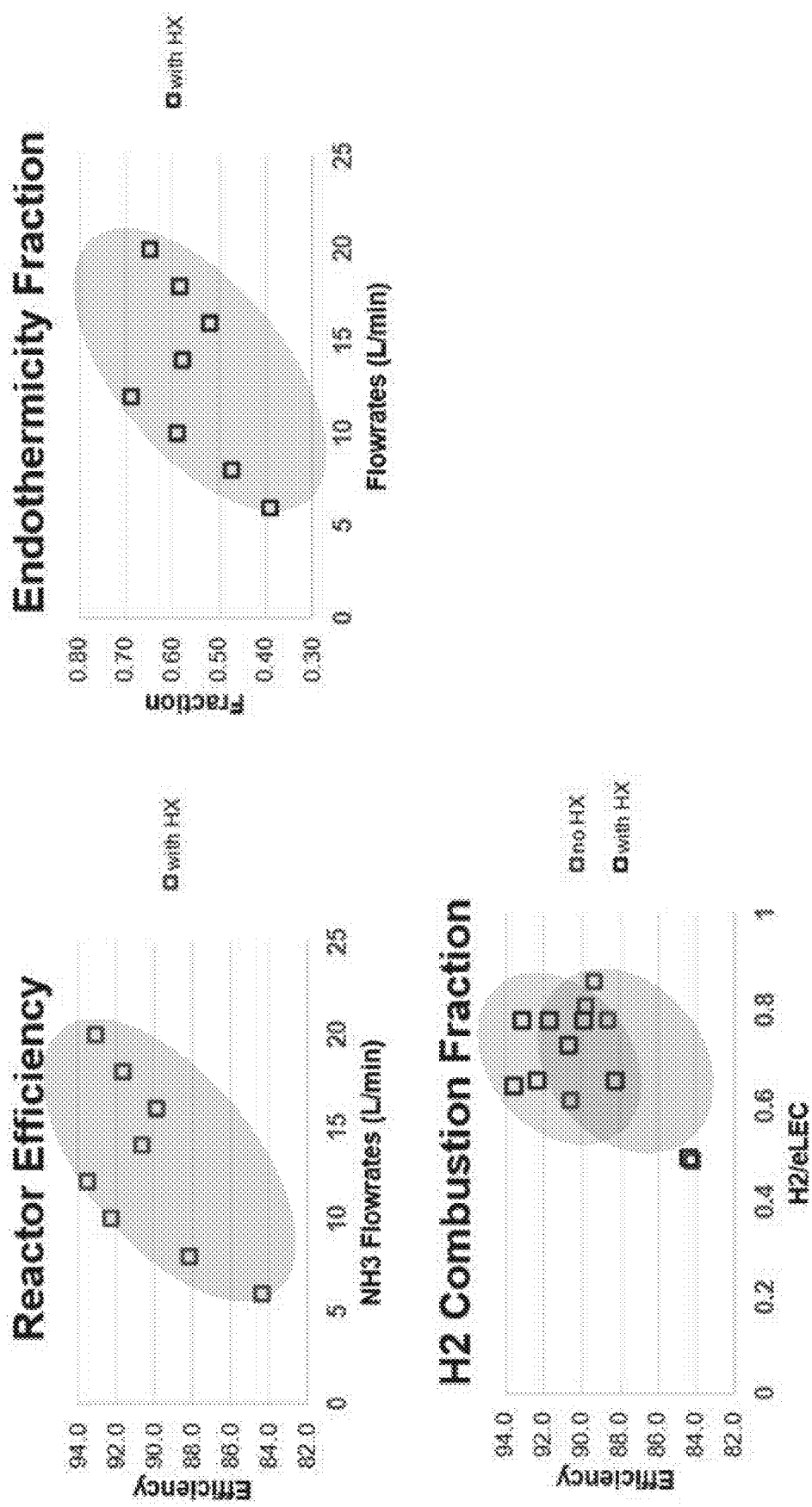
FIGS. 15A and 15B schematically illustrate reactor thermal reforming efficiency, endothermicity fraction, hydrogen combustion fraction, and power output fuel cell data for the present systems and methods, in accordance with one or more embodiments of the present disclosure.

FIG. 15A schematically illustrates reactor thermal reforming efficiency, endothermicity fraction, and hydrogen combustion fraction data for the systems and methods of the present disclosure. Hybrid heating of the reactor may provide higher thermal reforming efficiency compared to other conventional reactors across a variety of different ammonia flow rates. Further, the hybrid heating reactor systems disclosed herein exhibit a more favorable endothermicity fraction compared to other conventional reactors. In some cases, integrating or incorporating a heat exchanger with the hybrid heating reactor may further improve a hydrogen combustion fraction for the hybrid heating reactor.

Figure 15B:
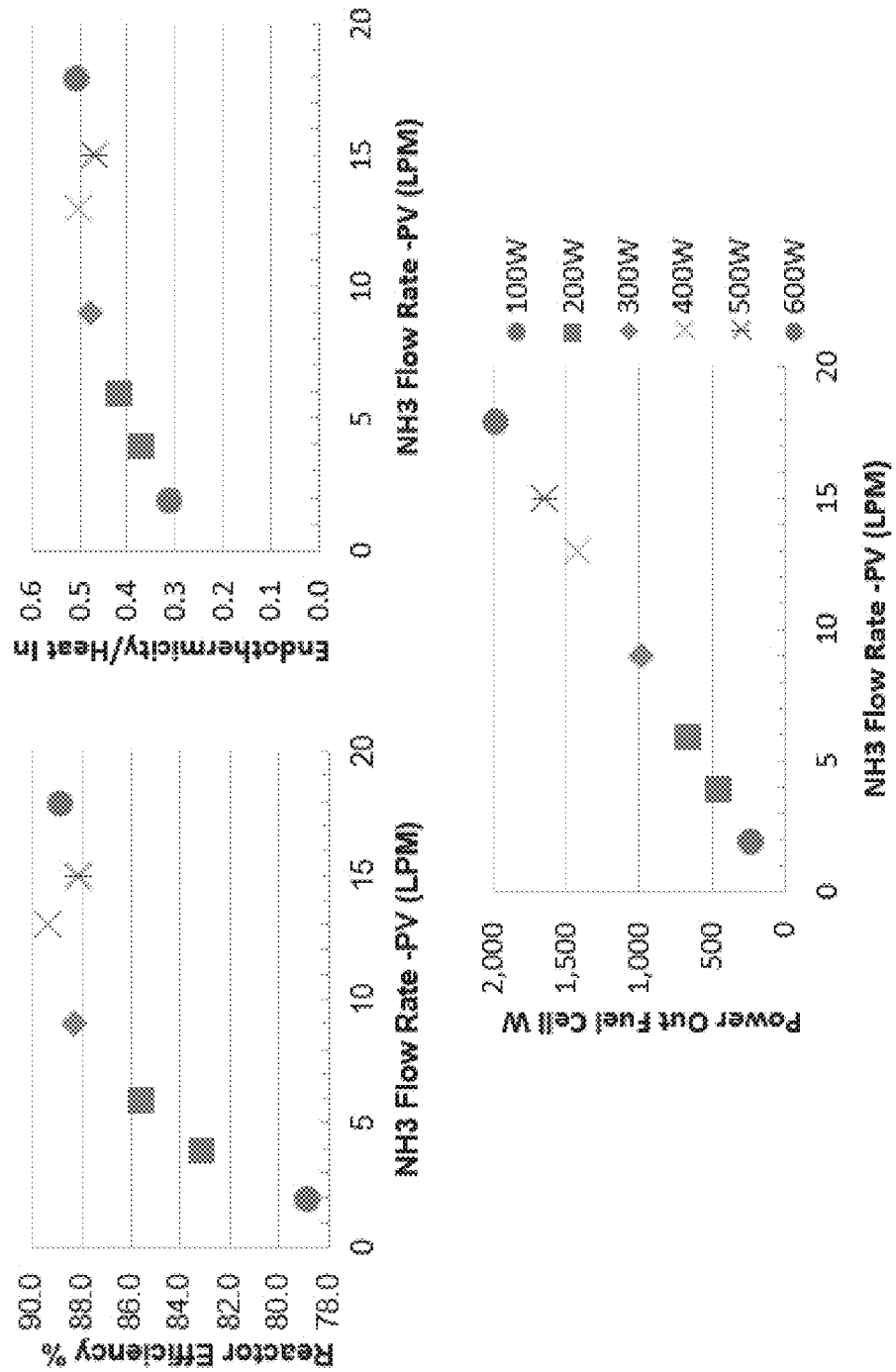

FIG. 15B schematically illustrates additional data for reactor thermal reforming efficiency, endothermicity/heat in fraction, and fuel cell power output in watts, as a function of ammonia flow rate, for various heating power ranging from 100 watts to 600 watts. As used herein, reactor thermal reforming efficiency may correspond to a ratio of usable chemical energy out (e.g., $H_2$) to chemical energy ($NH_3$) and heat energy into the reactor. In some cases, the reactor thermal reforming efficiency may reach about 90% for ammonia flow rates ranging from about 10 liters per minute to about 20 liters per minute, when a heating power of 300 watts, 400 watts, 500 watts, or 600 watts is provided to the reactor. As used herein, endothermicity fraction may correspond to the amount of heat energy absorbed by the reactor during an endothermic reaction over the total amount of heat or thermal energy into the system (i.e., the total amount of heat or thermal energy provided or supplied to the reactor or the catalyst bed by one or more heating units). In some cases, the endothermicity fraction may reach about 0.5 for ammonia flow rates ranging from about 10 liters per minute to about 20 liters per minute, when a heating power of 300 watts, 400 watts, 500 watts, or 600 watts is provided to the reactor. The power output of the one or more fuel cells described herein may reach about 2 kilowatts (KW) for ammonia flow rates ranging from about 15 liters per minute to about 20 liters per minute, when a heating power of 600 watts is provided to the reactor.

Figure 16:
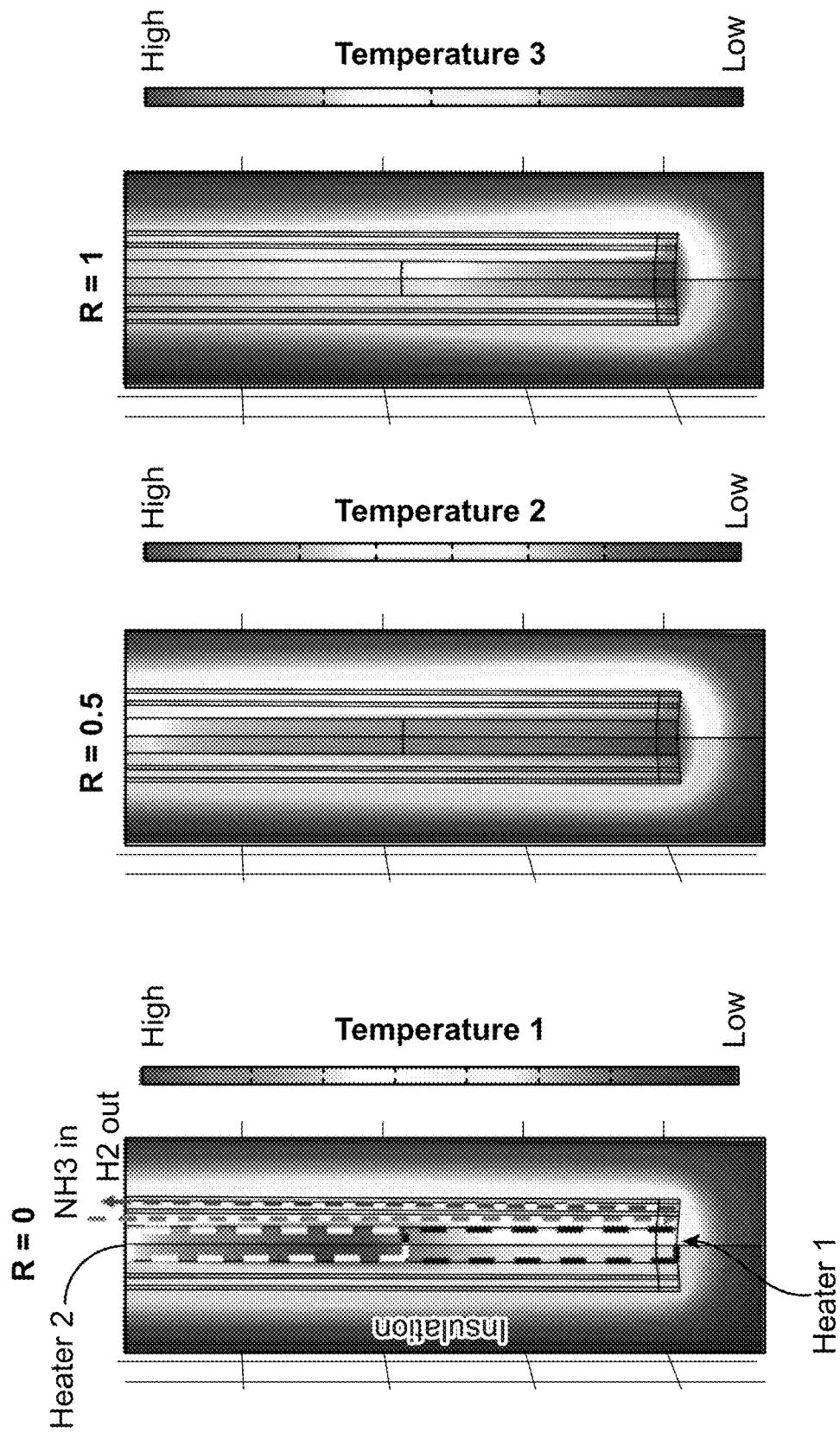
FIG. 16 schematically illustrates hybrid heating simulation data for the present systems and methods, in accordance with one or more embodiments of the present disclosure.

FIG. 16 schematically illustrates hybrid heating simulation data for the systems and methods of the present disclosure. As described elsewhere herein, the hybrid heating reactor may comprise two or more heaters configured for different modes of heating (e.g., combustion or joule electrical heating). The hybrid heating reactor may exhibit a heating power ratio (R) that ranges from 0 to 1. A heating power ratio of 0 indicates that all power is provided to a first heater of the hybrid heating reactor, whereas a power ratio of 1 indicates that all power is provided to a second heater of the hybrid heating reactor. A power ratio of 0.5 indicates that power is provided equally to the first heater and the second heater. The heating power ratio (R) for the reactor may be determined as follows:

$$P\_heater\_1 = P\_total * (R)$$

$$P\_heater\_2 = P\_total * (1 - R)$$

The hybrid heating data shown in FIG. 16 was generated based on a total heating power (P_total) of 315 watts of thermal energy and an ammonia mass flow rate of 0.1 grams per second. The hybrid heating data shows significantly different heat utilization with different heating power ratios.

Figure 17:
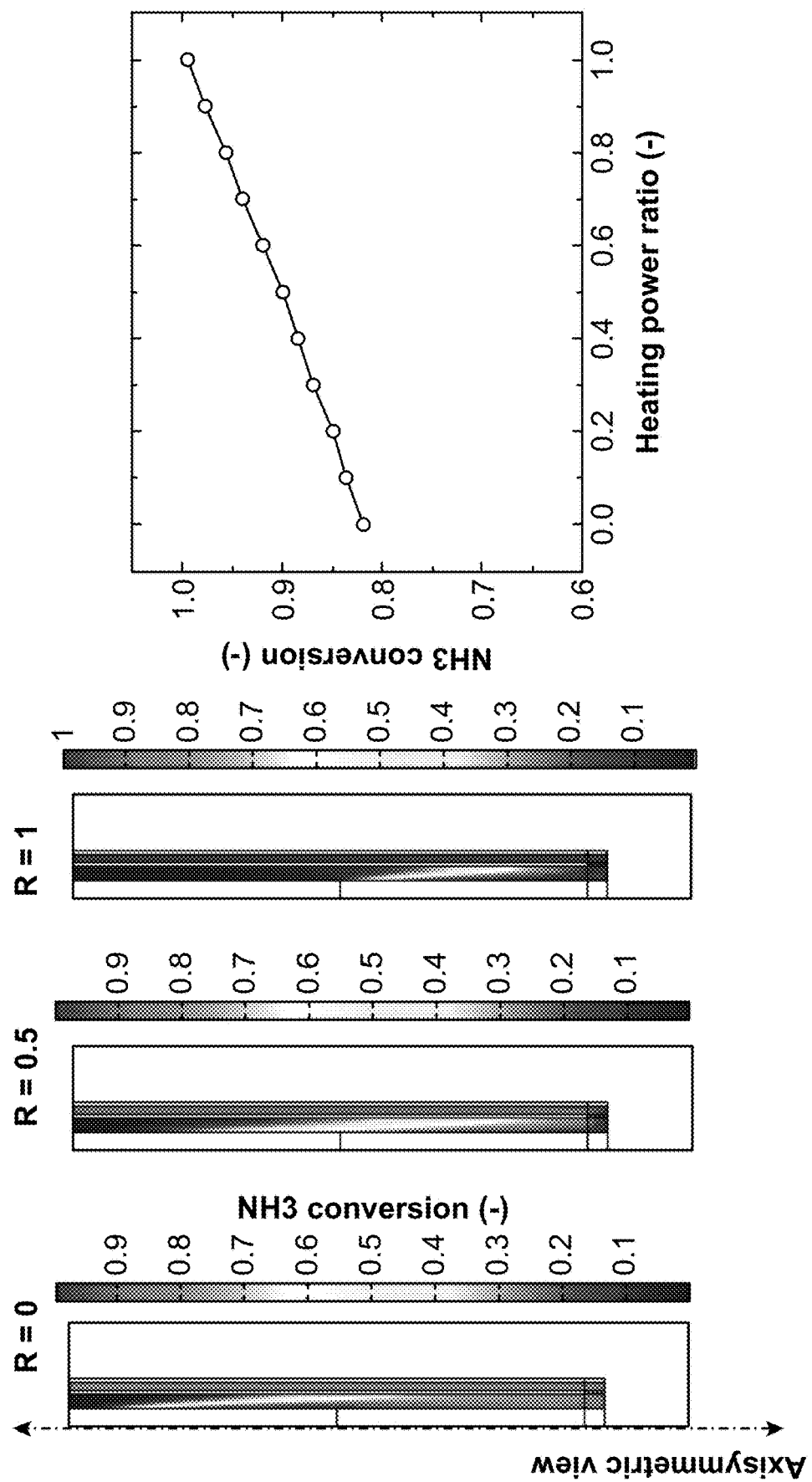
FIG. 17 schematically illustrates heating power ratio simulation data for the present systems and methods, in accordance with one or more embodiments of the present disclosure.

FIG. 17 schematically illustrates heating power ratio simulation data for the systems and methods of the present disclosure. Due to differences in heat utilization, ammonia conversion efficiencies may change based on the heating power ratio. The heating power ratio may be represented as a ratio between combustion and joule heating. As the heating power ratio increases, the ammonia conversion efficiency may also increase (e.g., linearly and/or proportionally).

In another aspect, the present disclosure provides a system comprising a reactor module configured to receive a source material comprising ammonia. The reactor module may comprise a catalyst and a plurality of heating units for heating the catalyst. In some embodiments, the plurality of heating units may comprise a first heating unit configured to heat at least a first portion of the catalyst by combusting hydrogen and a second heating unit configured to heat at least a second portion of the catalyst using electrical heating. The term "electrical heating," as used herein, generally refers to heating performed at least in part by flowing electrons through a material (e.g., an electrical conduit). The electrical conduit may be a resistive load. In some examples, electrical heating may comprise Joule heating (i.e., heating that follows Ohm's law). Joule heating, also known as resistive, resistance, or Ohmic heating, may comprise passing an electric current through a material (e.g., the electrical resistor, the catalyst, the catalyst material, or the catalyst bed) to produce heat or thermal energy. In some cases, the catalyst may be used to generate hydrogen from the source material comprising the ammonia when the catalyst is heated using the plurality of heating units. In some embodiments, the first portion and the second portion may be the same portion of the catalyst. In other embodiments, the first portion and the second portion may be different portions of the catalyst. In some cases, the first portion and the second portion may overlap or partially overlap.

In some cases, the first heating unit of the reactor module may be configured to heat a first portion of the catalyst based on a combustion of hydrogen gas generated using the secondary reactor module. In some cases, the first heating unit may be configured to heat the first portion of the catalyst based on a combustion of leftover hydrogen gas from (i) one or more fuel cells in fluid communication with the reactor module or (ii) a secondary reactor module (e.g., the fast startup reactor module described elsewhere herein). In some cases, the second heating unit may be configured to heat a second portion of the catalyst by passing an electrical current through the second portion of the catalyst. In some cases, the first portion of the catalyst and the second portion of the catalyst may be contiguous (i.e., physical connected). In other cases, the first portion of the catalyst and the second portion of the catalyst may be separated by a third portion of the catalyst. The third portion of the catalyst may be positioned between the first and second portions of the catalyst. In some cases, the first and second portions of the catalyst may be in thermal communication with each other (either directly or indirectly via the third portion of the catalyst). In other cases, the first and second portions of the catalyst may not or need not be in thermal communication with each other.

In some embodiments, the system may further comprise a secondary reactor module in fluid and/or thermal communication with the reactor module. The secondary reactor module may comprise a secondary catalyst and a secondary heating unit. The secondary heating unit may be configured to heat the secondary catalyst. In some cases, the secondary heating unit may comprise one or more electrodes for passing a current through the secondary catalyst to heat the secondary catalyst. The secondary catalyst may be used to generate hydrogen from ammonia when the secondary catalyst is heated using the secondary heating unit.

In some embodiments, the heat load distribution between the first heating unit and the second heating unit of the main reactor may be adjustable to increase an ammonia conversion efficiency and/or to enhance a thermal efficiency of the reactor module. The heat load distribution may comprise a heating power ratio corresponding to a ratio between a heating power of the first heating unit and a heating power of the second heating unit. The heating power of the first heating unit and the second heating unit may be adjusted in order to achieve a desired ammonia conversion efficiency and thermal efficiency. In some cases, the system may further comprise a controller or processor configured to control an operation of the first heating unit and the second heating unit to adjust the heat load distribution within the reactor module. In some cases, such adjustments in the heat load distribution may be implemented in real-time based on one or more sensor measurements (e.g., temperature measurements) or based on a performance of the reactor module (e.g., ammonia conversion efficiency and/or thermal efficiency of the reactor module). In some cases, heaters with two or more heating zones may be used to control power and heat distribution within the heater. In some cases, the system may comprise a plurality of heating units. The plurality of heating units may comprise at least two or more heating units. In some cases, a heat load distribution between the at least two or more heating units may be adjustable to increase an ammonia conversion efficiency and to enhance a thermal reforming efficiency of the reactor module. In some cases, each of the at least two or more heating units may have one or more heating zones in the reactor module to allow for a continuous heat distribution within one or more regions in the reactor module. In some cases, the at least two or more heating units may be configured to heat different zones in the reactor module. In some cases, the at least two or more heating units may be configured to heat one or more same zones in the reactor module.

In some embodiments, the reactor module may comprise a reaction bed comprising one or more ammonia decomposition catalysts comprising a metal material, a promoter material, and a support material. The first heating unit and the second heating unit may be configured to heat different portions of the reaction bed. In some cases, the metal material may comprise, for example, ruthenium, nickel, rhodium, iridium, cobalt, iron, platinum, chromium, palladium, or copper. In some embodiments, the promoter material may comprise at least one material selected from Li, Na, K, Rb, Cs, Mg, Ca, Ba, Sr, La, Ce, Pr, Sm, or Gd. In some embodiments, the support may comprise at least one material selected from $Al_2O_3$, MgO, $CeO_2$, $ZrO_2$, $La_2O_3$, $SiO_2$, $Y_2O_3$, $TiO_2$, SiC, hexagonal BN (boron nitride), BN nanotubes, silicon carbide, one or more zeolites, $LaAlO_3$, $CeAlO_3$, $MgAl_2O_4$, $CaAl_2O_4$, or one or more carbon nanotubes.

In some embodiments, the reactor module may comprise a cartridge heater design that utilizes one or more electrical insulation materials with a high heat transfer coefficient. In some cases, the one or more electrical insulation materials may comprise, for example, boron nitride.

In some embodiments, the reactor module may comprise one or more walls having a thickness that ranges from about 0.5 millimeters to about 1.5 millimeters to reduce thermal mass and to provide a faster and more dynamic temperature response. In some embodiments, the reactor module may comprise one or more walls having a thickness that ranges from about 1.5 millimeters to about 30 millimeters to increaser the structural integrity. In some embodiments, the reactor module may have a thermal reforming efficiency of at least about 90%. In some cases, the reactor module may have a thermal reforming efficiency of at least about 95%. As used herein, the term "thermal efficiency" or "thermal reforming efficiency" may refer to a percentage of the total thermal and chemical energy provided to a system that gets converted to chemical energy of $H_2$. In some cases, "thermal efficiency" or "thermal reforming efficiency" may correspond to a heating value of hydrogen over a heating value of ammonia and an actual heat input. In some cases, "thermal efficiency" or "thermal reforming efficiency" may correspond to $H_2$ chemical energy out over $NH_3$ chemical energy in plus heat in.

In some cases, the system may further comprise one or more fuel cells in fluid communication with the reactor module. The one or more fuel cells may be configured to generate electrical energy using the hydrogen generated by the reactor module. In some cases, the one or more fuel cells may be in fluid communication with the reactor module and/or the secondary reactor module. The secondary reactor module may comprise, for example, the fast startup reactor module described above. The one or more fuel cells may be configured to generate electrical energy using the hydrogen generated by the reactor module and/or the secondary reactor module.

Methods

In another aspect, the present disclosure provides a method for processing ammonia to generate hydrogen. The method may comprise providing a source material comprising ammonia to a first reactor module. The first reactor module may comprise a first catalyst and a startup heating and reforming unit. The startup heating and reforming unit may comprise one or more electrodes for passing a current through the first catalyst to heat the first catalyst. The method may further comprise heating the first catalyst by using the startup heating and reforming unit to pass a current through at least a portion of the first catalyst. The first catalyst may be used to generate hydrogen from the ammonia when the first catalyst is heated using the startup heating and reforming unit.

In some embodiments, the method may comprise providing the hydrogen generated using the first reactor module to one or more fuel cells. The method may further comprise using the one or more fuel cells to generate electricity.

In other embodiments, the method may comprise providing the hydrogen generated using the first reactor module to a second reactor module that is in fluid communication with the first reactor module. The second reactor module may also be configured to receive a source material comprising ammonia. The source material may be provided to the first reactor module and the second reactor module from a same source. In some cases, the source material may be provided to the first reactor module and the second reactor module from different sources. The second reactor module may comprise a second catalyst and one or more main heating units for heating the second catalyst. The method may further comprise heating at least a portion of the second catalyst using the one or more main heating units. In some cases, the method may comprise heating the second catalyst by combusting at least a portion of the hydrogen generated by the first reactor module. Once heated, the second catalyst may be used to generate additional hydrogen from the ammonia received by the second reactor module.

In some embodiments, the method may further comprise providing the hydrogen generated using the second reactor module to one or more fuel cells. In some cases, the method may further comprise using the one or more fuel cells to generate electricity. The electricity may be used to power one or more systems or devices requiring electrical power to operate (e.g., various terrestrial, aerial, or aquatic vehicles).

In another aspect, the present disclosure provides a method for processing ammonia to generate hydrogen. The method may comprise providing a source material comprising ammonia to a reactor module. The reactor module may comprise a catalyst and a plurality of heating units for heating the catalyst. The plurality of heating units may comprise a first heating unit configured to heat at least a first portion of the catalyst by combustion and a second heating unit configured to heat at least a second portion of the catalyst using Joule heating. In some cases, the first portion and the second portion of the catalyst may be contiguous or adjacent to each other. In other cases, the first portion and the second portion of the catalyst may be separated by a third portion of the catalyst, or a barrier (e.g., a physical barrier or a thermal barrier).

In some embodiments, the method may further comprise heating a first portion of the catalyst by combusting hydrogen. In some embodiments, the method may further comprise heating a second portion of the catalyst by passing a current through the second portion of the catalyst. Once heated, the catalyst may be used to generate hydrogen from the source material comprising the ammonia. In some cases, the hydrogen that is combusted to heat the first portion of the catalyst may be generated using a secondary reactor module. Such secondary reactor module may be configured to generate (i.e., produce or extract) the hydrogen from a source material comprising ammonia. The secondary reactor module may comprise a secondary catalyst and a secondary heating unit. In some cases, the secondary heating unit may be configured to heat the secondary catalyst by passing a current through the secondary catalyst. Once heated, the secondary catalyst may be used to generate hydrogen from the source material received by the secondary reactor module.

In some embodiments, the method may further comprise providing the hydrogen generated using the reactor module to one or more fuel cells. In some cases, the method may further comprise using the one or more fuel cells to generate electricity. The electricity may be used to power one or more systems or devices requiring electrical power to operate (e.g., various terrestrial, aerial, or aquatic vehicles).

In some embodiments, the method may further comprise providing the hydrogen generated using the reactor module to one or more combustion engines. In some cases, the method may further comprise using the one or more combustion engines to generate mechanical work. The mechanical work may be used to power one or more systems or devices requiring power to operate (e.g., various terrestrial, aerial, or aquatic vehicles).

Computer Systems

Figure 18:
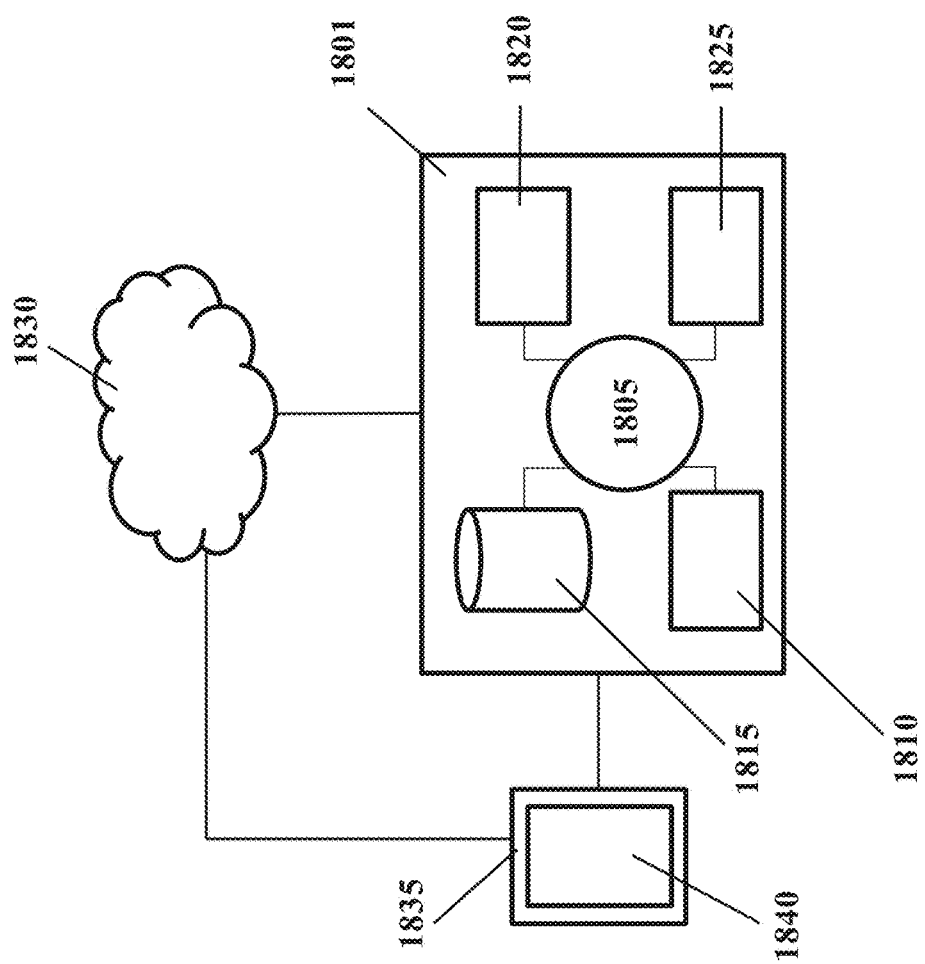
FIG. 18 schematically illustrates a computer system that is programmed or otherwise configured to implement the present system and methods, in accordance with one or more embodiments of the present disclosure.

In an aspect, the present disclosure provides computer systems that are programmed or otherwise configured to implement methods of the disclosure. FIG. 18 shows a computer system 1801 (i.e., a controller or computing device) that may be programmed or otherwise configured to implement a system and/or method for processing ammonia. The computer system 1801 may be configured to, for example, (i) control a flow of a source material comprising ammonia to one or more reactors, (ii) control an operation of one or more heating units to heat one or more catalysts of the one or more reactors, which one or more catalysts may be used to generate hydrogen from the source material comprising the ammonia after being heated by the one or more heating units, and (iii) control a flow of hydrogen generated from the ammonia to one or more fuel cells to generate electricity. The computer system 1801 may control a flow of the source material to the reactors and/or a flow of the hydrogen from the reactors to the one or more fuel cells by modulating one or more flow control mechanisms (e.g., one or more valves). The computer system 1801 may control an operation of the one or more heating units by modulating an amount of current that is passed through the one or more catalysts. The computer system 1801 may be an electronic device of a user or a computer system that is remotely located with respect to the electronic device. The electronic device may be a mobile electronic device.

The computer system 1801 may include a central processing unit (CPU, also "processor" and "computer processor" herein) 1805, which may be a single core or multi core processor, or a plurality of processors for parallel processing. The computer system 1801 also may include memory or memory location 1810 (e.g., random-access memory, read-only memory, flash memory), electronic storage unit 1815 (e.g., hard disk, solid state disk, etc.), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 may be a data storage unit (or data repository) for storing data. The computer system 1801 may be operatively coupled to a computer network ("network") 1830 with the aid of the communication interface 1820. The network 1830 may be the Internet, an internet and/or extranet, or an intranet and/or extranet that is in communication with the Internet. The network 1830 in some cases may be a telecommunication and/or data network. The network 1830 may include one or more computer servers, which may enable distributed computing, such as cloud computing. The network 1830, in some cases with the aid of the computer system 1801, may implement a peer-to-peer network, which may enable devices coupled to the computer system 1801 to behave as a client or a server.

The CPU 1805 may execute a sequence of machine-readable instructions, which may be embodied in a program or software. The instructions may be stored in a memory location, such as the memory 1810. The instructions may be directed to the CPU 1805, which may subsequently program or otherwise configure the CPU 1805 to implement methods of the present disclosure. Examples of operations performed by the CPU 1805 may include fetch, decode, execute, and writeback.

The CPU 1805 may be part of a circuit, such as an integrated circuit. One or more other components of the system 1801 may be included in the circuit. In some cases, the circuit may be an application specific integrated circuit (ASIC).

The storage unit 1815 may store files, such as drivers, libraries and saved programs. The storage unit 1815 may store user data, e.g., user preferences and user programs. The computer system 1801 in some cases may include one or more additional data storage units that are located external to the computer system 1801 (e.g., on a remote server that is in communication with the computer system 1801 through an intranet or the Internet).

The computer system 1801 may communicate with one or more remote computer systems through the network 1830. For instance, the computer system 1801 may communicate with a remote computer system of a user (e.g., an individual operating the reactor, an entity monitoring the operation of the reactor, or an end user operating a device or a vehicle that may be powered using electrical energy derived or produced from the hydrogen generated using the reactor). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user may access the computer system 1801 via the network 1830.

Systems and methods as described in the present disclosure may be implemented by way of machine (e.g., computer processor) executable code stored on an electronic storage location of the computer system 1801, such as, for example, on the memory 1810 or electronic storage unit 1815. The machine executable or machine-readable code may be provided in the form of software. During use, the code may be executed by the processor 1805. In some cases, the code may be retrieved from the storage unit 1815 and stored on the memory 1810 for ready access by the processor 1805. In some cases, the electronic storage unit 1815 may be precluded, and machine-executable instructions are stored on memory 1810.

The code may be pre-compiled and configured for use with a machine having a processor adapted to execute the code or may be compiled during runtime. The code may be supplied in a programming language that can be selected to enable the code to execute in a pre-compiled or as-compiled fashion.

Aspects of the systems and methods provided herein, such as the computer system 1801, may be embodied in programming. Various aspects of the technology may be thought of as "products" or "articles of manufacture" typically in the form of machine (or processor) executable code and/or associated data that is carried on or embodied in a type of machine readable medium. Machine-executable code may be stored on an electronic storage unit, such as memory (e.g., read-only memory, random-access memory, flash memory) or a hard disk. "Storage" type media may include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media may include dynamic memory, such as main memory of such a computer platform. Tangible transmission media may include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore may include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1801 may include or be in communication with an electronic display 1835 that comprises a user interface (UI) 1840 for providing, for example, a portal for a user to monitor or track an operation or a performance of the one or more reactors, or one or more components of the reactors. In some cases, the performance of the one or more reactors may comprise, for example, an ammonia conversion efficiency or a thermal efficiency of the one or more reactors. The portal may be provided through an application programming interface (API). A user or entity may also interact with various elements in the portal via the UI. Examples of UI's include, without limitation, a graphical user interface (GUI) and web-based user interface.

Methods and systems of the present disclosure may be implemented by way of one or more algorithms. An algorithm may be implemented by way of software upon execution by the central processing unit 1805. For example, the algorithm may be configured to control an operation of the one or more reactors based on one or more sensor readings (e.g., temperature measurements, flow rates, etc.), or based on a performance of the one or more reactors. In some cases, the algorithm may be configured to (i) control a flow of a source material comprising ammonia to one or more reactors, (ii) control an operation of one or more heating units to heat one or more catalysts of the one or more reactors, the one or more catalysts being capable of producing or extracting hydrogen from the source material comprising the ammonia after being heated by the one or more heating units, and/or (iii) control a flow of hydrogen generated from the ammonia to one or more fuel cells to generate electricity. In some cases, the algorithm may be configured to control, modify, or adjust the heat load distribution between a first heating unit and a second heating unit of the reactor to increase an ammonia conversion efficiency and to enhance a thermal efficiency of the reactor module. The heat load distribution may comprise a heating power ratio corresponding to a ratio between a heating power of the first heating unit and a heating power of the second heating unit. The algorithm may use various monitor or sensor readings or various parameters associated with a performance of the reactors to adjust the heating power of the first heating unit and the second heating unit in order to achieve a desired ammonia conversion efficiency and/or reactor thermal efficiency.

System Configurations

Figure 19:
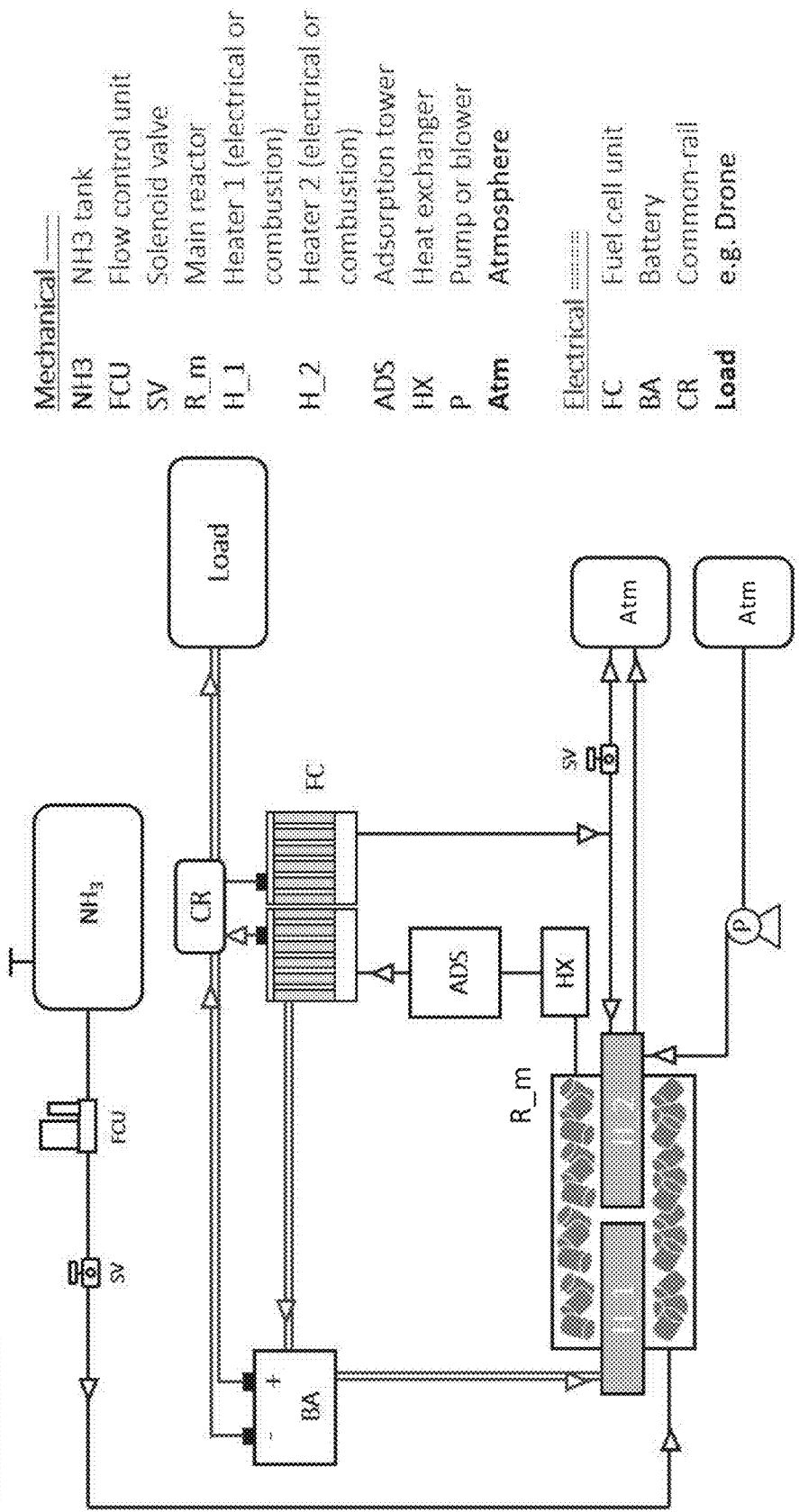
FIGS. 19-25 schematically illustrate various examples of system architectures for ammonia processing and ammonia powerpack systems, in accordance with one or more embodiments of the present disclosure.

FIG. 19 illustrates a compact ammonia powerpack system comprising a heat exchanger for exit flows from the main reactor R_m. The exit flow from the main reactor R_m may be cooled using the heat exchanger (HX) before entering an adsorption tower (ADS). The heat exchanger may be used to facilitate a transfer of thermal energy between the exit flow (which may comprise hydrogen, nitrogen, and/or a low ppm of unconverted ammonia) and a heat sink (e.g., ammonia storage tank) or a fluid medium (e.g., ambient air). The heat exchanger may be in thermal communication with ambient air to cool the exit flow from the main reactor R_m to less than about 50 degrees Celsius. Alternatively, the heat exchanger may be in thermal communication with one or more ammonia storage tanks to cool the exit flow from the main reactor R_m to less than about 50 degrees Celsius and to provide heating energy for ammonia evaporation in the storage tanks. Alternatively, the heat exchanger may be in thermal communication with one or more ammonia inflows to cool the exit flow from the main reactor R_m to less than about 50 degrees Celsius and to provide heat or thermal energy for ammonia evaporation in the heat exchanger. The cooled exit flow may be directed to one or more adsorption towers to remove any traces of ammonia from the cooled exit flow before the exit flow is directed to one or more fuel cells. The adsorption towers may help to preserve a performance and/or a longevity of the one or more fuel cells since ammonia can be detrimental to the performance of fuel cells. The adsorption towers may comprise one or more adsorbents which may be replaceable (e.g., a cartridge form factor) after a certain number of cycles or operations. The one or more adsorbents may be configured to filter out or remove unconverted ammonia and/or nitrogen from an exit flow from the one or more reactors.

Figure 20:
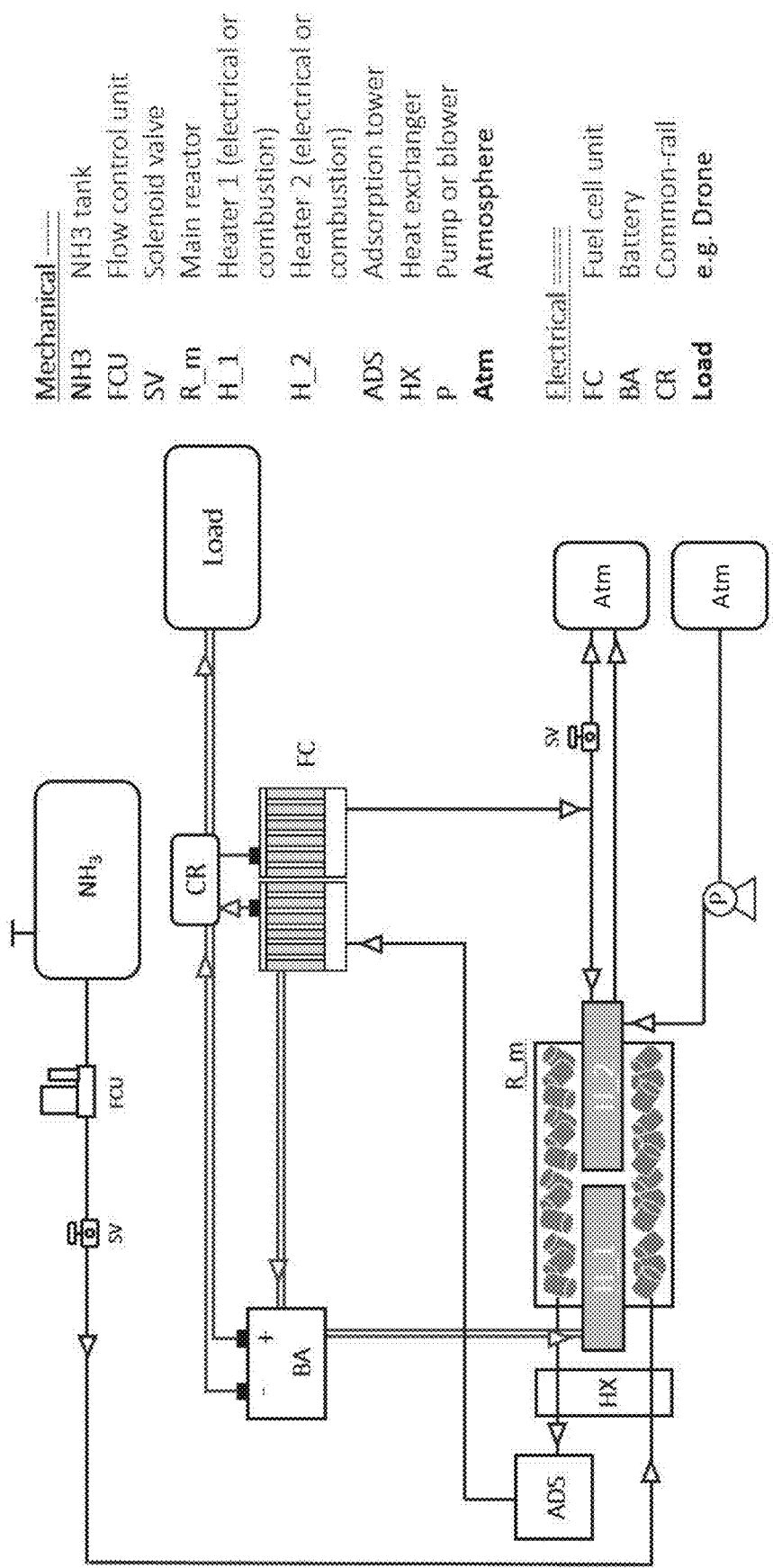

FIG. 20 illustrates an ammonia powerpack system comprising a heat exchanger for cooling the exit flows of the main reactor R_m using the inlet flows. The heat exchanger may be in thermal communications with the ammonia storage tank to facilitate cooling of the exit flow from R_m and to provide thermal energy for ammonia evaporation in the storage tank. In some embodiments, the ammonia storage tank may be in thermal communications with the fuel cell to recover waste heat from the fuel cell to provide heating energy for the ammonia evaporation within the ammonia storage tank. The inlet and exit flows of the reactor may be in thermal communication with each other via the heat exchanger for heat recovery. In some cases, the inlet flows (which may comprise ammonia from one or more ammonia tanks) may be heated or pre-heated before entering the main reactor R_m. The inlet flows may be heated or pre-heated via a transfer of thermal energy between the inlet flows and the exit flows. The exit flows may comprise hydrogen and/or nitrogen that is produced by a decomposition of the ammonia in the inlet flows. The transfer of thermal energy between the exit flows and the inlet flows and/or the ammonia storage tank may cool the exit flows before the exit flows enter an adsorption tower that is upstream of one or more fuel cells configured to utilize at least a portion of the exit flows (e.g., hydrogen) to generate electrical energy.

Figure 21:
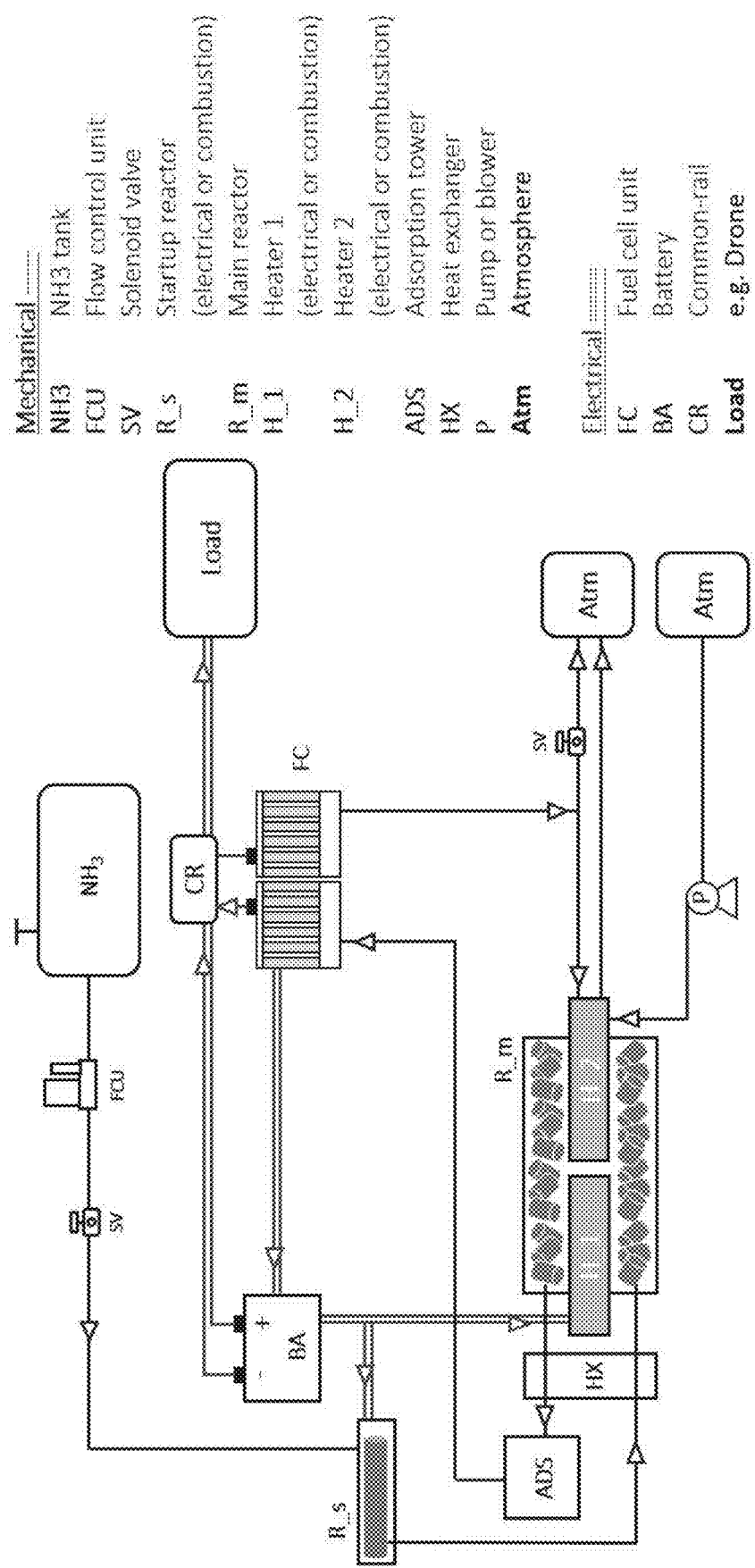

FIG. 21 illustrates an ammonia powerpack system comprising a heat exchanger for cooling both inlet flows and exit flows of the main reactor R_m. The ammonia powerpack system may further comprise a startup reactor R_s as described elsewhere herein. The startup reactor may be configured to decompose ammonia within a predetermined amount of time of starting the reactor. The predetermined amount of time may be at most about 5 minutes or less. In some embodiments, the predetermined amount of time may be at most about 60 minutes or less. The startup reactor may be powered by electrical energy (e.g., by passing a current through an electrically conductive catalyst material for heat generation). The startup reactor may comprise a catalyst that is configured to decompose ammonia when heated to a threshold temperature (e.g., above 350 degrees Celsius). The decomposition of the ammonia may produce hydrogen, which may be directed from the startup reactor R_s to the heating units of the main reactor R_m for combustion heating, as described elsewhere herein. In some cases, during high power demands, the startup reactor may operate as a load following unit. The inlet flows into the main reactor R_m may comprise ammonia, nitrogen, and/or hydrogen. The inlet flows into the main reactor R_m may comprise ammonia from one or more ammonia tanks, or nitrogen, hydrogen, and/or unconverted ammonia from the startup reactor R_s.

Figure 22:
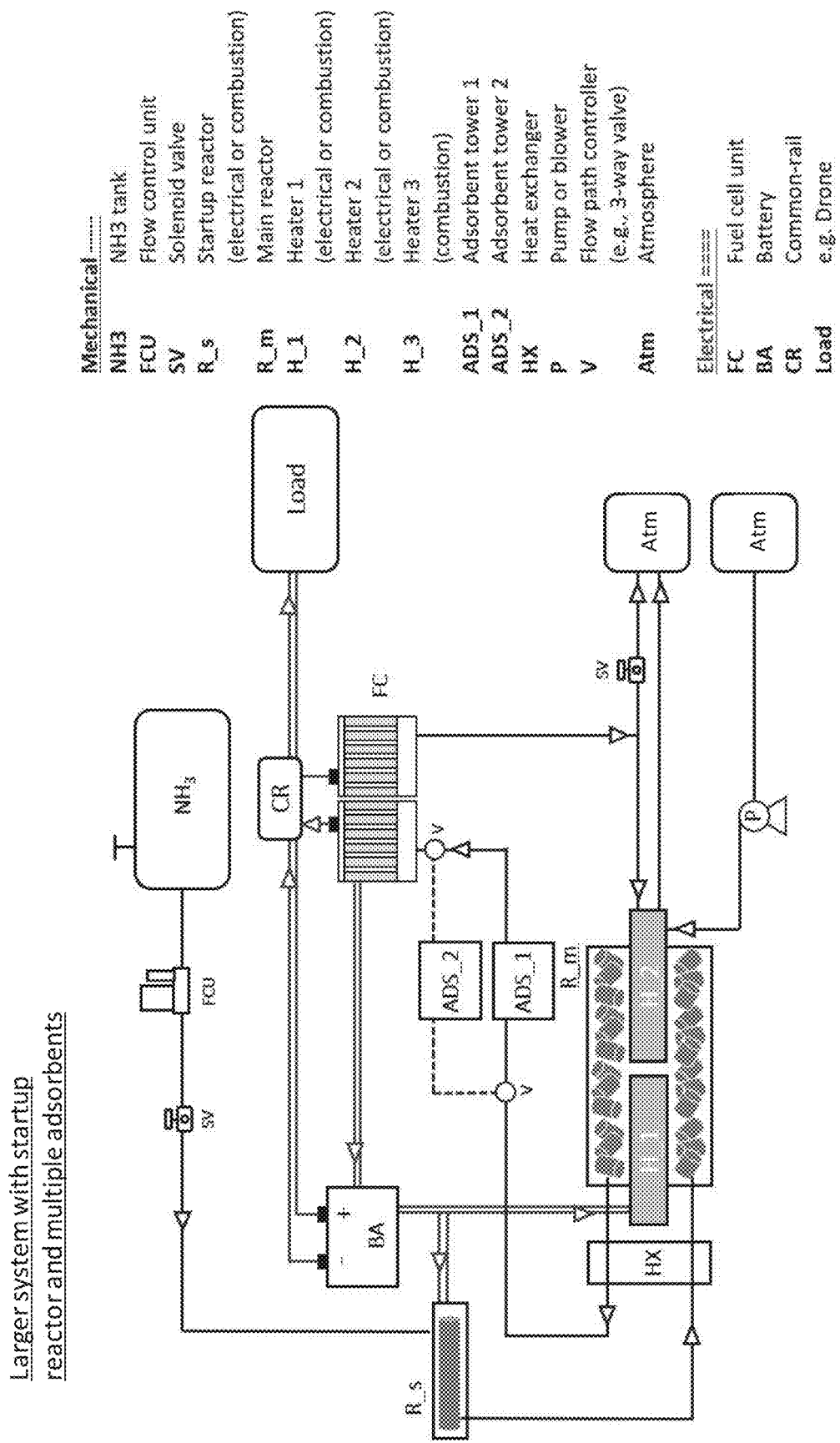

FIG. 22 illustrates an ammonia power pack to power a larger system (e.g., a system with power requirements of at least about 100 kilowatts or more). The power pack system may comprise a startup reactor R_s, a main reactor R_m, and a plurality of adsorbent towers (ADS). In some cases, the adsorbent towers may comprise an adsorbent material provided in a cartridge form factor. However, the adsorbent material may not or need not be in a cartridge form factor. In some cases, a two adsorbent bed may be utilized for on-demand adsorbent regeneration and continuous operation of the ammonia powerpack system. In some instances, a first adsorbent tower may be used or operated for a first time period, and a second adsorbent tower may be on standby ready to be used or operated. Once the first ADS is fully discharged, the system may switch a flow path of the exit flow from the main reactor R_m to the second ADS. The second ADS may be used to remove any traces of ammonia from the exit flow before the exit flow is directed to the one or more fuel cells. While the second ADS is being used, the first ADS may be regenerated. Once the second ADS is fully discharged, the first ADS may be regenerated and ready for use in another cycle or operation. In any of the embodiments described herein, two, three, four, five, six, seven, eight, nine, ten, or more adsorption towers may be used.

Figure 23:
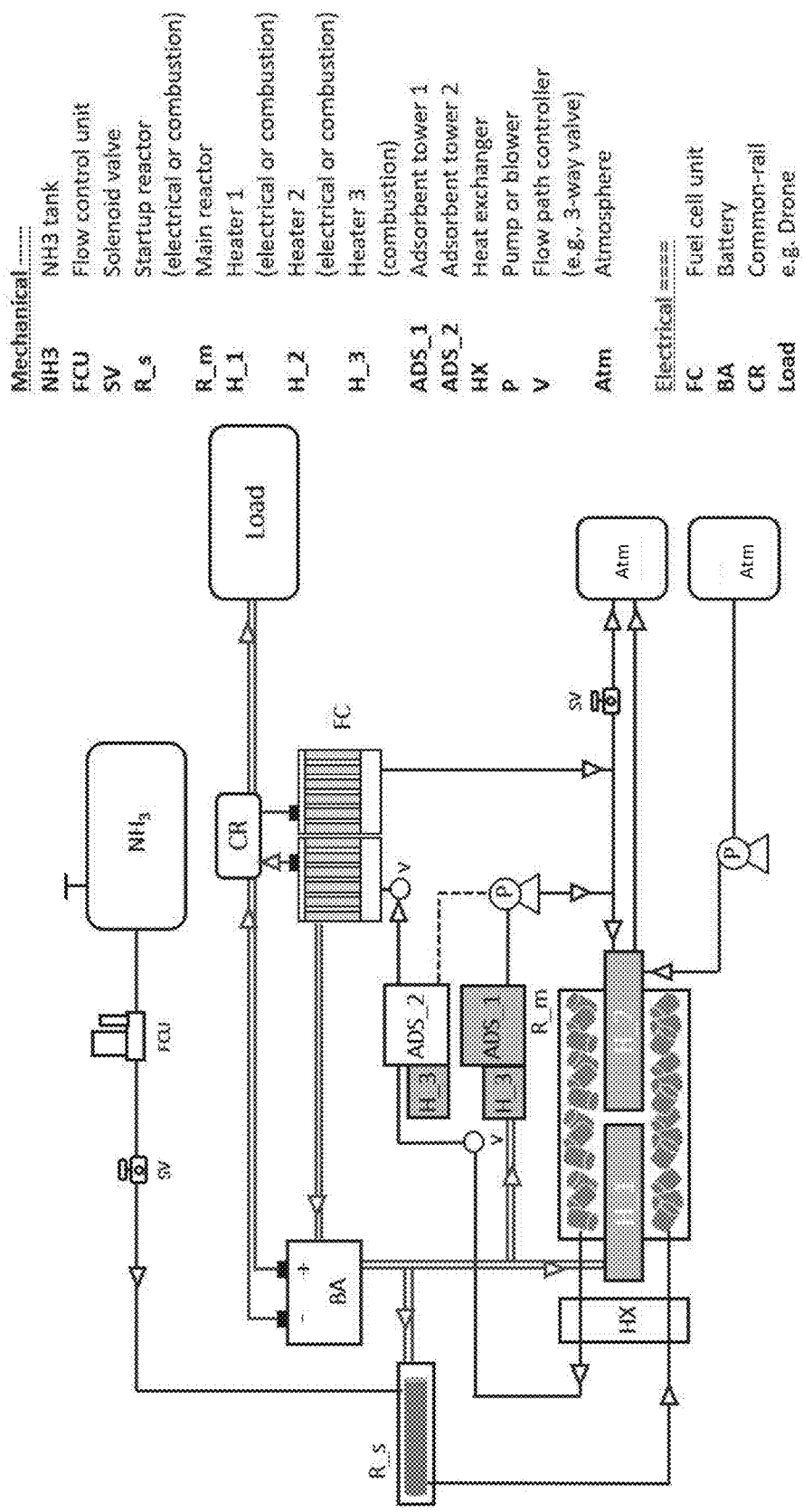

As shown in FIG. 23, in some cases one or more additional heat exchangers may be provided. The one or more additional heat exchangers may be used to regenerate the various adsorbent beds. For example, adsorbent bed 1 (ADS_1) may be regenerated using an embedded electrical heater (H_3). A pump or blower may be used to remove regenerated ammonia and to combine a stream of the regenerated ammonia with an exit flow from a fuel cell (which may comprise unconverted $H_2$ and/or $N_2$). The ammonia may be dumped into the fuel cell exit stream. The fuel cell exit stream and ammonia combination may be directed to the main reactor R_m for combustion in order to heat the main reactor R_m for further ammonia decomposition.

After the adsorbent is regenerated, the adsorbent bed may be cooled down for a following cycle. For example, when adsorbent bed 2 (ADS_2) is being regenerated, the fluid flow path between ADS_2 may be closed or restricted using a valve, and the fluid path designated with a dotted line (i.e., the dotted line between ADS_2 and the pump or blower P) may permit regenerated ammonia from ADS_2 to be directed towards a combustion reaction stream that is provided to H_2 for combustion heating of main reactor R_m. In such cases, ADS_1 may then permit the flow of the main reactor R_m exit flow through ADS_1 towards the fuel cell.

Figure 24:
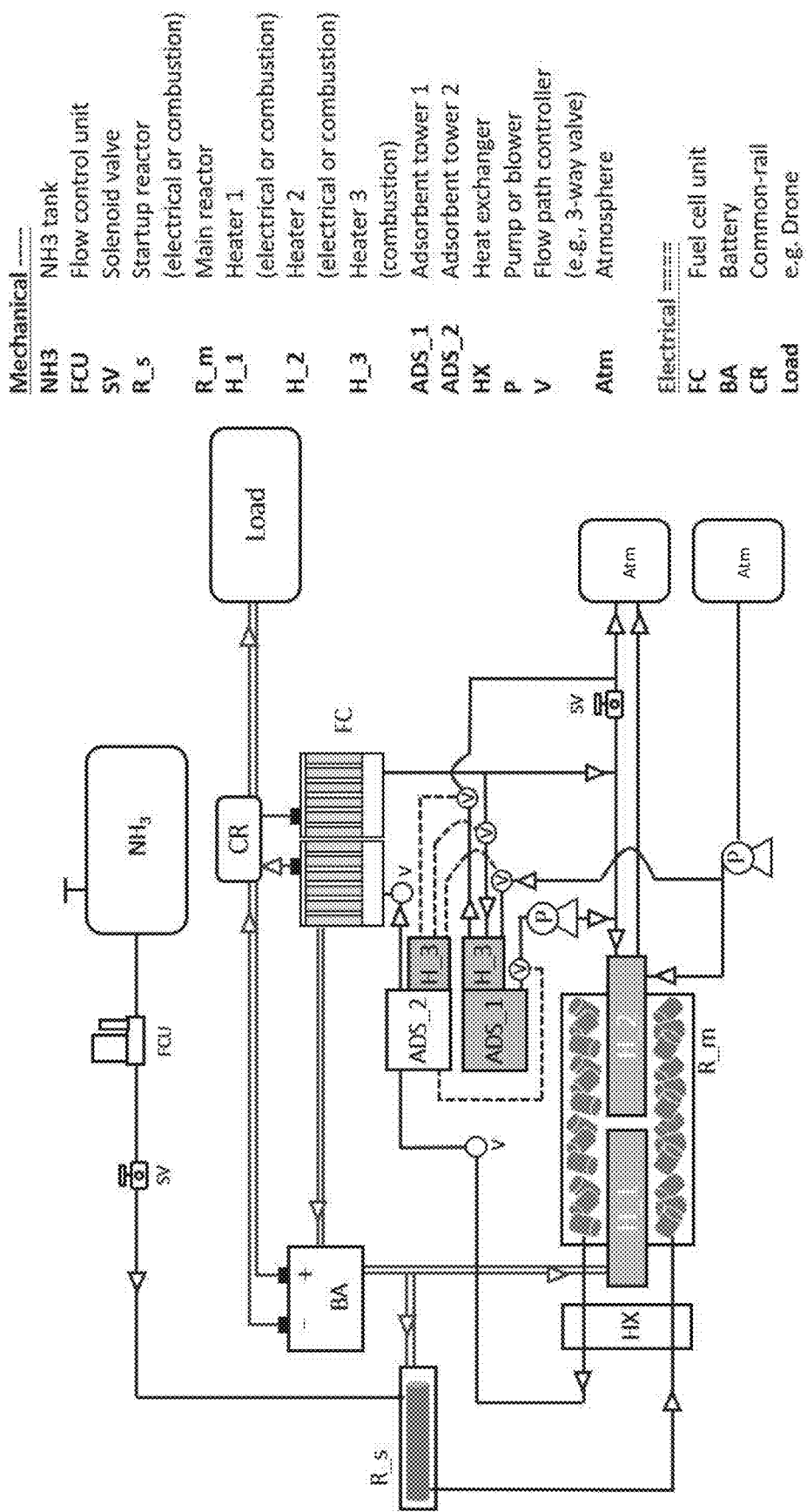

As shown in FIG. 24, in some cases one or more additional heat exchangers may be provided. The one or more additional heat exchangers may be used to regenerate the various adsorbent beds. For example, adsorbent bed 1 may be regenerated using an embedded combustion heater (H_3). In some cases, combusted byproducts from H_3, mostly water vapor, may be dumped to the atmosphere. A pump or blower may be used to remove regenerated ammonia and to combine a stream of the regenerated ammonia with an exit flow from the fuel cell (which may comprise unconverted $H_2$ and/or $N_2$). The ammonia may be dumped into the fuel cell exit stream. The fuel cell exit stream and ammonia combination may be directed to the main reactor R_m for combustion in order to heat the main reactor R_m, removal of the desorbed ammonia from adsorbents, and/or for further ammonia decomposition. In some embodiments, exhaust streams from the one or more combustion reactors or heaters (e.g., H_2 in FIG. 24), may be used for adsorbent regeneration.

In some cases, ambient air (e.g., a portion of air from the main reactor (R_m) combustor heater (H_2) air intake) and the $H_2$ and/or $N_2$ from the fuel cell exit flow may be drawn or directed to the adsorbent combustion heaters H_3 for regeneration. In some cases, one or more flow control units (e.g., valves) may be used to direct the fuel cell exit flow to different combustion heaters H_3. In some embodiments, regenerated ammonia, unconverted hydrogen, and/or nitrogen exiting from a first adsorbent combustion heater H_3 may be vented to ambient. After the one or more adsorbent beds are regenerated, the adsorbent beds may be cooled down for one or more following cycles, thereby enabling continuous operation.

Figure 25:
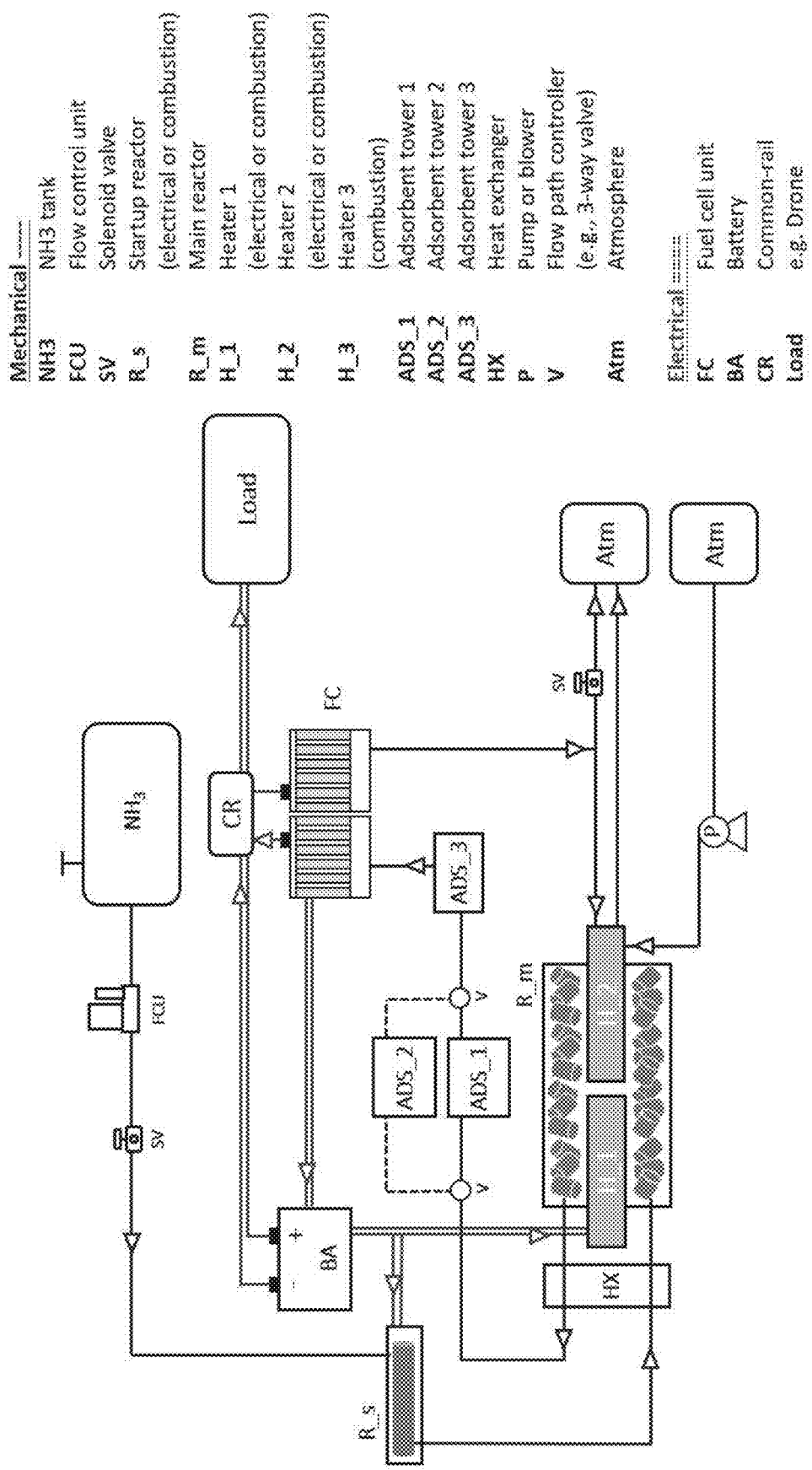

As shown in FIG. 25, in some cases three or more adsorption towers may be used in a single ammonia powerpack system. The powerpack system illustrated in FIG. 25 may be adapted for larger system configurations (e.g., electrical vehicles with a power requirement of 100 KW or more). In some configurations, a two adsorbent bed may be available for on-demand adsorbent regeneration and continuous operation. One more additional adsorbent beds (e.g., ADS_3) may be utilized as a safety feature for the fuel cell (e.g., in case regeneration of ADS_1 and ADS_2 are incomplete during operation of the ammonia powerpack system). In some cases, the adsorbent material in ADS_1 and ADS_2 may be the same, and the adsorbent material in ADS_3 may be different than that of ADS_1 and ADS_2. In some embodiments, a combination of different adsorbent materials may be used to increase the $NH_3$ adsorption efficiency or capacity of the overall system.

Additional Embodiments

In some cases, the ammonia powerpack system may comprise a startup reactor for dynamic load following (e.g., by controlling ammonia flow rates and electrical heating). In some cases, the ammonia powerpack system may comprise a main reactor for dynamic load following (e.g., by controlling ammonia flow rates, and the amount of $H_2$ combustion or electrical heating or a combination of both).

In some cases, the ammonia powerpack system may comprise an electric battery for dynamic load following. The main reactor may be configured to maintain constant power output, and an on-board electric battery may provide dynamic load following capabilities, (i.e., discharges when load is high and charges when load is low).

In some cases, the ammonia powerpack system may comprise an emergency shut off capability. The emergency shut off capability may be implemented using a sensor that is configured to monitor ammonia ppm levels at the adsorbent bed inlet and fuel cell inlet and shut off or reduce ammonia flow rates if the ammonia ppm level is above a certain threshold limit (e.g., ~10 ppm for fuel cell inlet).

In some cases, the ammonia powerpack system may comprise an adsorbent switch with one or more embedded ammonia sensors. The ammonia sensors may be configured to monitor ammonia concentration within the adsorbent. The $N_2$ and/or $H_2$ exit flow from the reactor may switch to the next adsorbent when ammonia levels are above a certain threshold level (e.g., at least about 10 ppm).

In some cases, the adsorbent material may comprise a combination of adsorbents (e.g., zeolites) and metal salts (e.g., $MgCl2$), which may further lower the ammonia ppm level of the main reactor exit flow.

In some cases, the ammonia powerpack system may permit ammonia flow control in order to maintain and/or adjust reactor temperatures (e.g., an increase in ammonia flow rate may decrease the reactor temperature). This control may prevent or reduce the risk of overheating and maintain an optimal temperature for ammonia decomposition.

In any of the embodiments described herein, the ammonia power pack unit may comprise one or more reactors and one or more fuel cells attached, secured or affixed to a common frame so that the reactor(s) and the fuel cell(s) may be configured to operate as an integrated powerpack system.

Packaging and Assembly

In another aspect, the present disclosure provides various exemplary configurations for packaging and assembly of ammonia powerpack systems. The ammonia powerpack systems may have any of the components or system configurations described elsewhere herein.

As shown in FIG. 26, in some cases the ammonia powerpack system may comprise one or more fuel cell units. The ammonia powerpack system may further comprise one or more ammonia tanks coupled to or positioned adjacent to the one or more fuel cell units. In some cases, the one or more ammonia tanks may be placed on top of the one or more fuel cell units. The ammonia powerpack system may further comprise a main reactor R_m and a startup reactor R_s as described above. The ammonia tank may be in fluid communication with the main reactor R_m and/or the startup reactor R_s. Ammonia may flow from the ammonia tank to the startup reactor R_s and/or the main reactor R_m. The main reactor R_m and the startup reactor R_s may be coupled to or positioned adjacent to one or more sides of the fuel cell unit. In some cases, the main reactor R_m and the startup reactor R_s may be positioned on different sides of the fuel cell unit. The main reactor R_m and the startup reactor R_s may be in fluid communication with each other such that one or more fluids or materials from the startup reactor R_s may flow to the main reactor R_m. In some cases, the fuel cell unit may also be in fluid communication with the main reactor R_m. In some cases, unconverted hydrogen from the fuel cell unit may be directed to the main reactor R_m for combustion heating to heat the main reactor. In some cases, a battery unit may be operatively coupled to the fuel cell unit, the main reactor R_m, the startup reactor R_s, the ammonia tank, and/or any valves or other flow control units for controlling a flow of various fluids or materials between the components of the ammonia powerpack system. The battery unit may be coupled to a portion of the fuel cell unit.

In some cases, the ammonia powerpack system may comprise a heat exchanger and/or an adsorbent tower as described elsewhere herein. The heat exchanger and the adsorbent tower may be in fluid communication with the main reactor R_m. The heat exchanger and the adsorbent tower may be coupled to or positioned adjacent to a portion of the fuel cell unit. In some embodiments, the heat exchanger and the adsorbent tower may be positioned on a first side of the fuel cell unit. In some cases, the main reactor R_m may be positioned on a second side of the fuel cell unit, the startup reactor R_s may be positioned on a third side of the fuel cell unit, and the battery unit may be positioned on a fourth side of the fuel cell unit. The ammonia tank may be positioned on a fifth side of the fuel cell unit. The ammonia powerpack configuration shown in FIG. 26 may be utilized for a compact system (e.g., a system with power requirements less than about 100 kilowatts).

Figure 27:
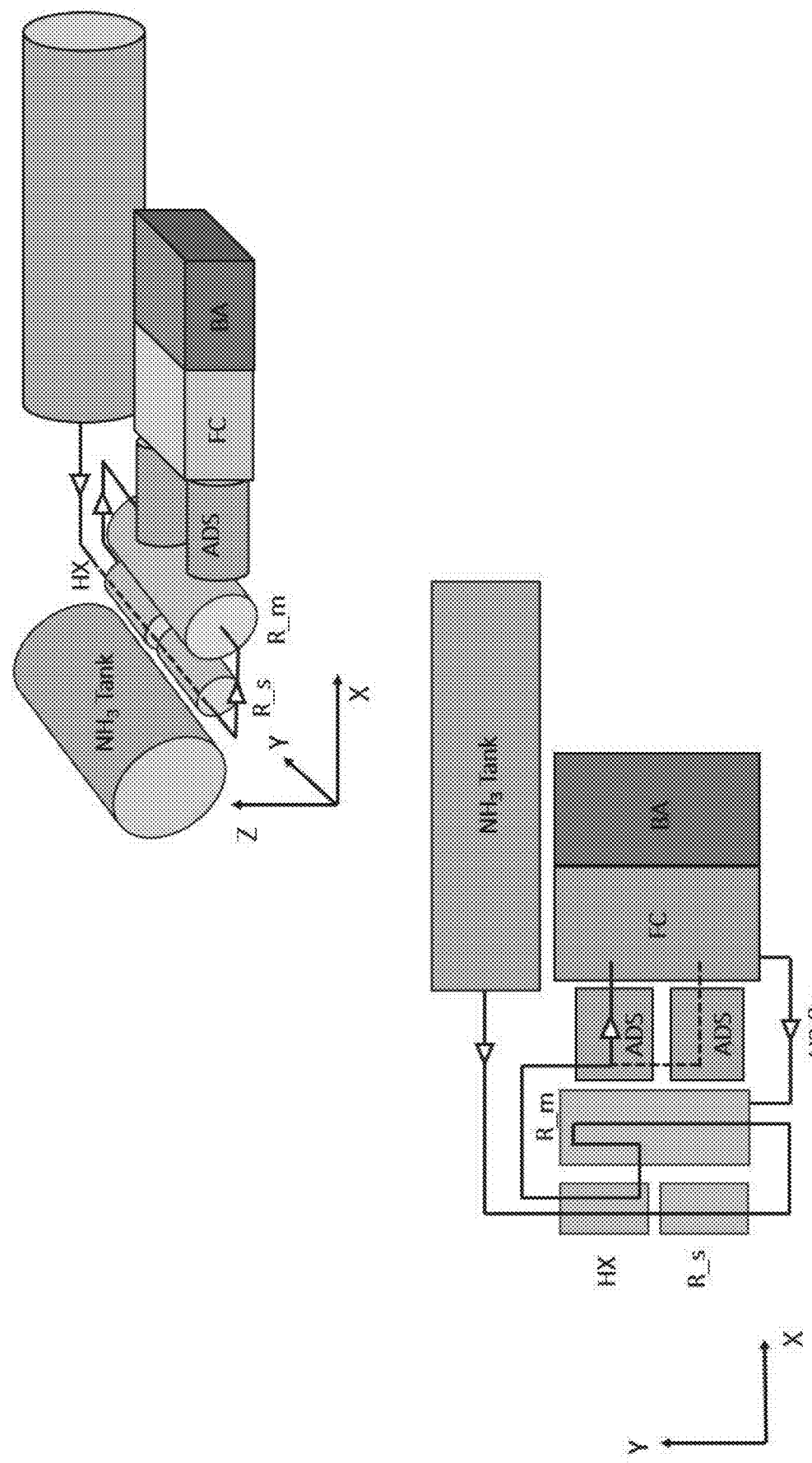

As shown in FIG. 27, in some cases the ammonia powerpack system may be adapted for a larger system (e.g., a system with power requirements exceeding 100 kilowatts). The ammonia powerpack system may comprise an ammonia tank, a heat exchanger, a startup reactor R_s, a main reactor R_m, one or more adsorption towers, a fuel cell unit, and a battery unit. The heat exchanger, the startup reactor R_s, the main reactor R_m, the one or more adsorption towers, the fuel cell unit, and the battery unit may be positioned adjacent to the ammonia tank. The ammonia tank may be in fluid communication with the heat exchanger. Ammonia from the ammonia tank may flow through the heat exchanger and into the startup reactor R_s for processing. Hydrogen and/or nitrogen produced from the decomposition of ammonia may be directed from the startup reactor to the main reactor. The hydrogen extracted from the ammonia by the startup reactor may be combusted in the main reactor for heating of the main reactor. In some cases, ammonia from the ammonia tank and/or unconverted ammonia from the startup reactor may be directed to the main reactor R_m for ammonia cracking or decomposition. Once the ammonia is cracked using the main reactor R_m, products including hydrogen and nitrogen may be directed from the main reactor to the heat exchanger to cool the exit flow before the hydrogen and/or nitrogen of the exit flow is directed to one or more adsorbent towers. In some cases, the exit flow may comprise unconverted ammonia in addition to the hydrogen and/or nitrogen. In such cases, the exit flow may be directed to a first adsorbent tower during a first time period, and to a second adsorbent tower during a second time period, to remove the unconverted ammonia. The first time period may correspond to a time during which the second adsorbent tower is being regenerated. The second time period may correspond to a time during which the first adsorbent tower is being regenerated. The adsorbent towers may be used to remove any excess ammonia before the exit flow comprising hydrogen and/or nitrogen is directed to the fuel cell unit. The fuel cell unit may be configured to use the hydrogen to generate electrical energy. In some cases, unconverted hydrogen may be directed back to the main reactor R_m for combustion heating to heat the main reactor.

FIG. 28 schematically illustrates an ammonia powerpack system that may be adapted for use on an aerial vehicle. The aerial vehicle may comprise, for example, a manned aerial vehicle, an unmanned aerial vehicle, an aircraft, an airplane, a helicopter, or a drone. The configuration of the ammonia powerpack system shown in FIG. 28 may be similar to the configuration shown in FIG. 26. In some cases, the ammonia power pack system may be integrated into a body of the aerial vehicle. In other cases, the ammonia power pack system may be placed on top of or underneath a body of the aerial vehicle.

FIG. 29 schematically illustrates another example of an ammonia powerpack system that may be adapted for use on an aerial vehicle. The ammonia powerpack system may comprise an ammonia tank, one or more fuel cell units, a battery unit, a startup reactor R_s, a main reactor R_m, a heat exchanger, and an adsorbent tower. The one or more fuel cell units, the battery unit, the startup reactor R_s, the main reactor R_m, the heat exchanger, and the adsorbent tower may be positioned around the ammonia tank. The ammonia powerpack system may be placed on top of or underneath a portion of the aerial vehicle. Alternatively, the ammonia powerpack system may be integrated with a structural portion or a component of the aerial vehicle.

FIG. 30 schematically illustrates an example of an ammonia powerpack system that may be adapted for use on a terrestrial vehicle, such as a car or an automobile. The ammonia powerpack system may comprise one or more fuel cells, one or more adsorbent towers, a startup reactor R_s and/or a main reactor R_m, a heat exchanger, a battery unit, and an ammonia tank. The one or more fuel cells may be placed in or near a front portion of the vehicle (e.g., in an engine bay of the vehicle). The adsorbent towers, the startup reactor R_s, the main reactor R_m, and the heat exchanger may be placed in or near an underside region of the vehicle. The ammonia tank may be placed near a rear end of the vehicle. The battery unit may be positioned between the ammonia tank and the other components of the ammonia powerpack system.

FIG. 31 schematically illustrates another example of an ammonia powerpack system that may be adapted for use on a terrestrial vehicle, such as a car or an automobile. The ammonia powerpack system may comprise one or more fuel cells, one or more adsorbent towers, a startup reactor R_s and/or a main reactor R_m, a heat exchanger, a battery unit, and an ammonia tank. The one or more fuel cells and the one or more adsorbent towers may be placed in or near an underside region of the vehicle. The ammonia tank and the battery unit may be placed near an axle of the vehicle (e.g., a rear wheel axle of the vehicle). The startup reactor R_s, the main reactor R_m, and the heat exchanger may be placed in or near a front portion of the vehicle (e.g., in an engine bay of the vehicle).

FIGS. 32-35 schematically illustrate examples of an ammonia powerpack system that may be adapted for use on a terrestrial vehicle, such as a truck or a semi-trailer truck. The ammonia powerpack system may comprise one or more fuel cells, one or more adsorbent towers, one or more startup reactors, one or more main reactors, one or more heat exchangers, one or more battery units, and/or one or more ammonia tanks.

In some cases, the one or more ammonia tanks may be coupled to or integrated into a rear portion of a tractor unit of the truck. The tractor unit (also known as a prime mover, truck, semi-truck, semi-tractor, rig, big rig, or simply, a tractor) may comprise a heavy-duty towing engine that provides motive power for hauling a towed or trailered load. As shown in FIG. 32, in some cases, the one or more fuel cell units may be positioned in or near a front portion of the tractor unit (e.g., in the engine bay of the tractor unit). In such cases, the one or more adsorbent towers, the one or more startup reactors, the one or more main reactors, the one or more heat exchangers, and the one or more battery units may be placed in or near an underside region of the tractor unit. In other cases, for example as shown in FIG. 33, the one or more startup reactors and the one or more main reactors may be positioned in or near a front portion of the tractor unit (e.g., in the engine bay of the tractor unit). In such cases, the one or more adsorbent towers, the one or more heat exchangers, the one or more battery units, and the one or more fuel cell units may be placed in or near an underside region of the tractor unit.

Figure 34:
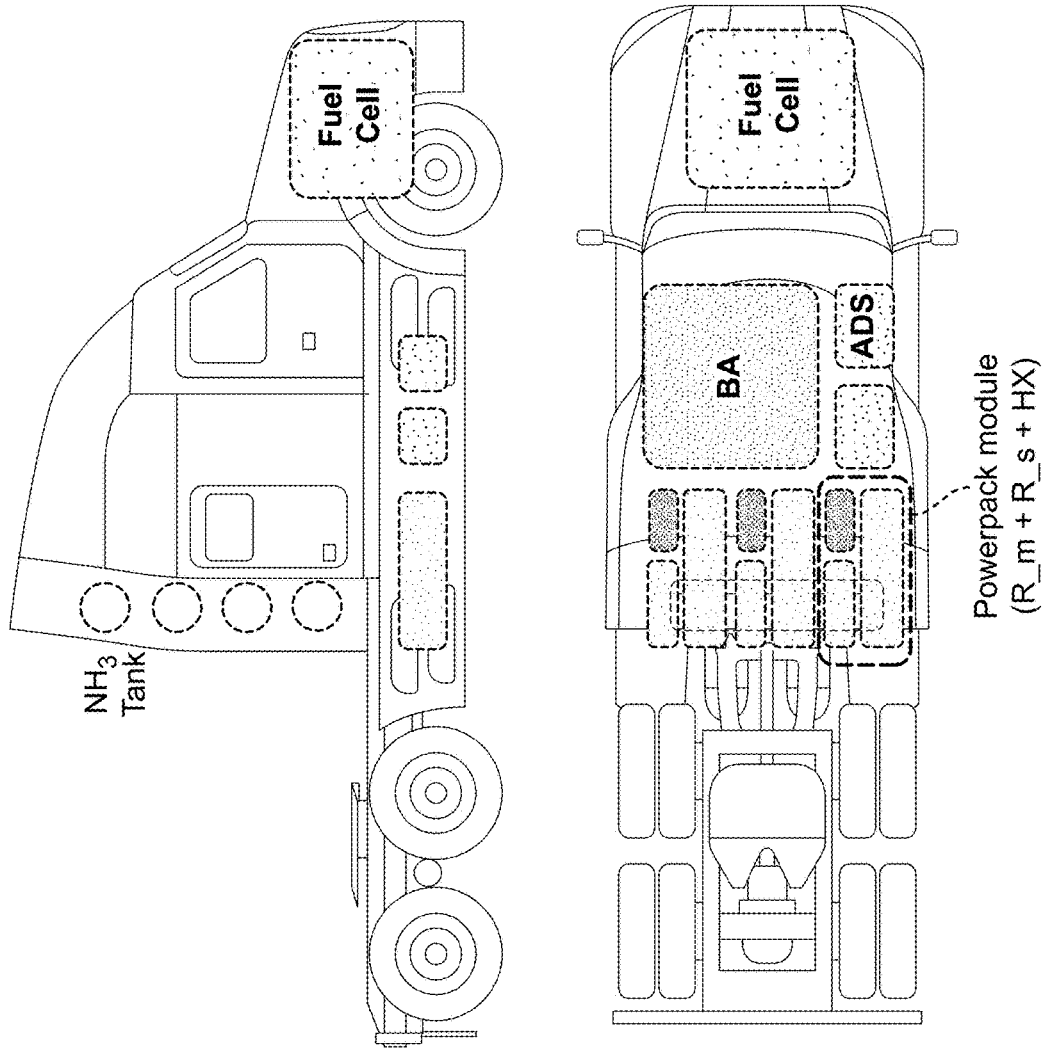

FIG. 34 schematically illustrates an example of an ammonia powerpack system that may be adapted for use on a terrestrial vehicle, such as a truck or a semi-trailer truck. In some instances, as shown in FIG. 34, the ammonia powerpack system may comprise a plurality of powerpack modules. The plurality of powerpack modules may comprise at least one powerpack comprising a main reactor R_m, a startup reactor R_s, and a heat exchanger. The plurality of powerpack modules may be positioned in or near an underside region of the tractor unit. The plurality of powerpack modules may be distributed along the underside of the tractor unit. In some cases, the one or more fuel cells may be positioned in or near a front portion of the tractor unit (e.g., in the engine bay of the tractor unit). In some cases, the one or more adsorbent towers and the one or more battery units may be positioned between the one or more fuel cells and the plurality of powerpack modules.

FIG. 35 schematically illustrates another example of an ammonia powerpack system that may be adapted for use on a terrestrial vehicle, such as a truck or a semi-trailer truck. As shown in FIG. 35, the ammonia powerpack system may comprise a plurality of powerpack modules. The plurality of powerpack modules may comprise at least one powerpack comprising a main reactor R_m, a startup reactor R_s, and a heat exchanger. The plurality of powerpack modules may be positioned in or near a front portion of the tractor unit (e.g., in the engine bay of the tractor unit). In some cases, one or more of the powerpack modules may be positioned near an axle (e.g., a front axle) of the tractor unit. In some cases, one or more of the powerpack modules may be positioned in or near an underside region of the tractor unit. In some cases, the one or more fuel cells, the one or more battery units, and/or the one or more adsorbent towers may be positioned in or near an underside of the tractor unit. In some cases, the one or more adsorbent towers and the one or more battery units may be positioned between the one or more fuel cells and the plurality of powerpack modules.

In some cases, the plurality of powerpack modules may be positioned adjacent to each other. In other cases, the plurality of powerpack modules may be located remote from each other (i.e., in or on different sides, regions, or sections of a vehicle). In some cases, the plurality of powerpack modules may be oriented in a same direction. In other cases, at least two of the plurality of powerpack modules may be oriented in different directions. In any of the embodiments described herein, the plurality of powerpack modules may be positioned and/or oriented appropriately to maximize volumetric efficiency and minimize a physical footprint of the plurality of powerpack modules. In any of the embodiments described herein, the plurality of powerpack modules may be positioned and/or oriented to conform with a size and/or a shape of the vehicle in or on which the powerpack modules are positioned or provided. In any of the embodiments described herein, the plurality of powerpack modules may be positioned and/or oriented to conform with a size and/or a shape of the vehicle to which the powerpack modules are coupled or mounted.

In any of the embodiments described herein, the components of the powerpacks disclosed herein may be positioned in or on different sides, regions, or sections of a vehicle. In some cases, a first subset of the powerpack components may be positioned remotely from a second subset of the powerpack components. The components of the powerpack system may be positioned and/or oriented appropriately to maximize volumetric efficiency and minimize a physical footprint of the powerpack system. The components of the powerpack system may be positioned and/or oriented to conform with a size and/or a shape of the vehicle in or on which the powerpack system is positioned or provided. The components of the powerpack system may be positioned and/or oriented to conform with a size and/or a shape of the vehicle to which the powerpack system is coupled or mounted.

Figure 80B:
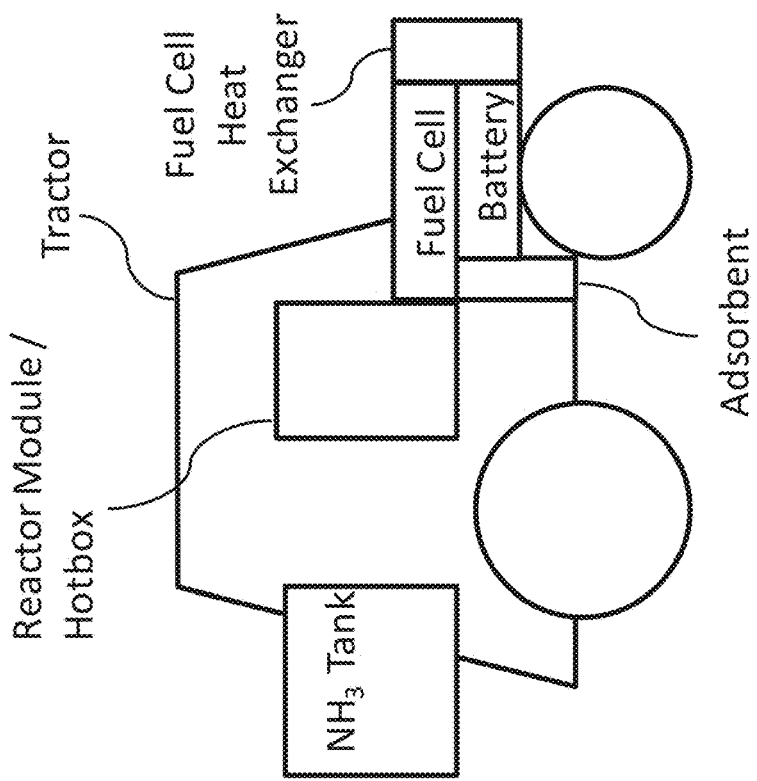
FIG. 80B schematically illustrates a tractor having a mounted powerpack, in accordance with one or more embodiments of the present disclosure.
Figure 80A:
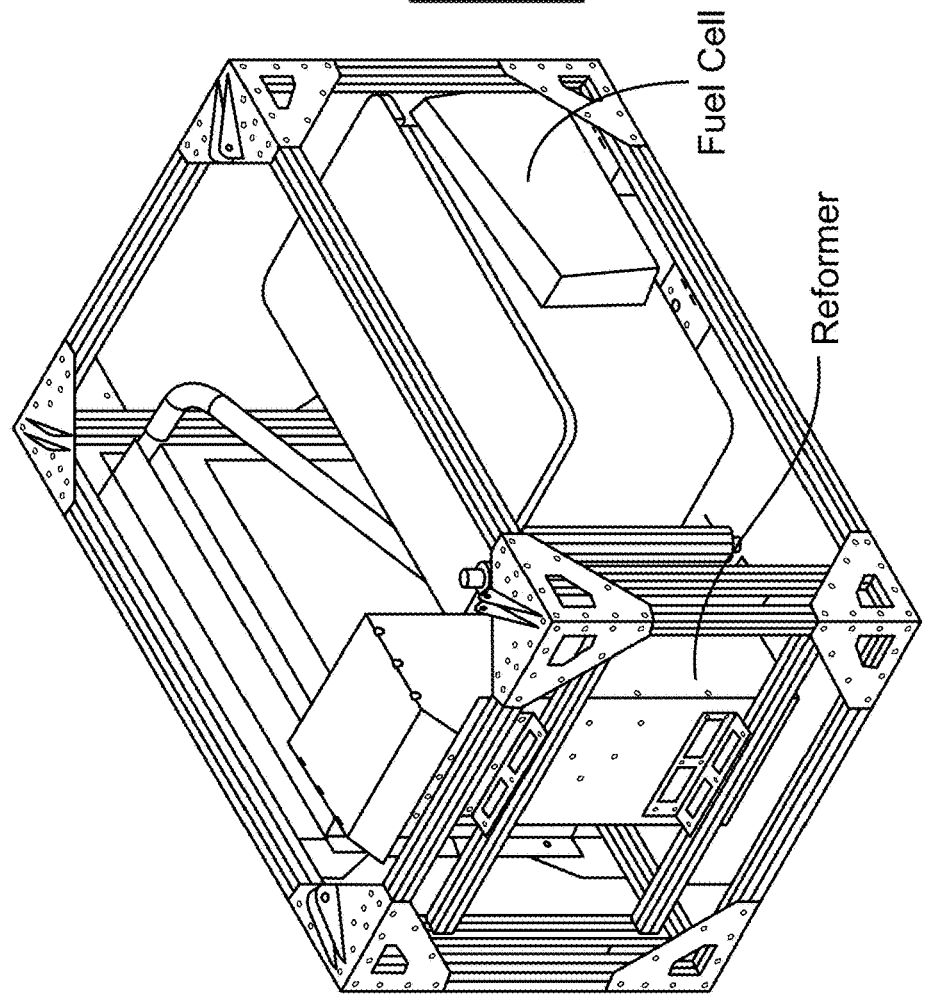
FIG. 80A shows a powerpack, in accordance with one or more embodiments of the present disclosure.

FIG. 80A shows a powerpack, in accordance with one or more embodiments of the present disclosure. In some cases, a powerpack comprising a reformer and a fuel cell may be mounted on the tractor. FIG. 80B schematically illustrates a tractor having a mounted powerpack, in accordance with one or more embodiments of the present disclosure. In some cases, a powerpack comprising a reformer and a fuel cell may be mounted within a chassis of a tractor. In some cases, a powerpack comprising a reformer and a fuel cell may be positioned in a hood or a boot of a tractor. In some cases, the components of the powerpack may be mounted to or integrated with various portions or structural components of the tractor. The components may be mounted to different regions or portions of the tractor to optimize weight balance and/or center of gravity. In some cases, one or more auxiliary batteries may support tractor power demand and/or may power a startup process. In some cases, an ammonia storage tank may be positioned on a rear side of the vehicle. In some cases, fuel cell heat rejection via a heat exchanger (or radiator) may be used to evaporate the liquid ammonia fuel before entering a reactor.

Figure 36A:
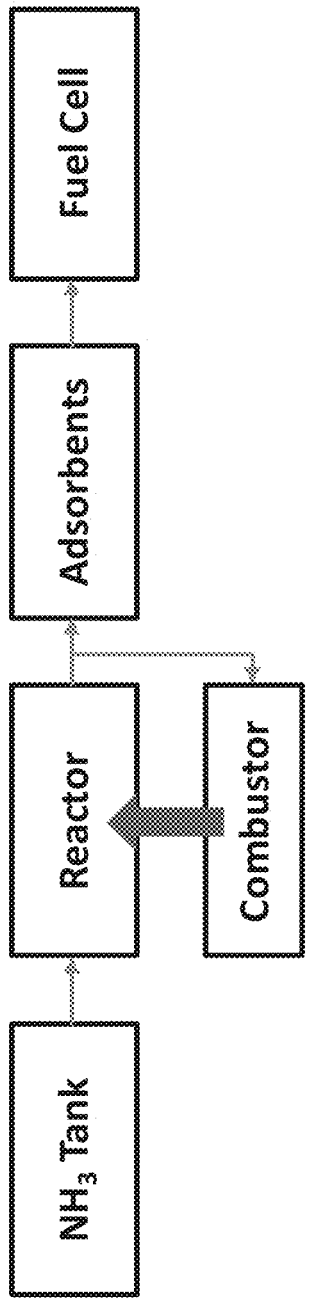
FIGS. 36A to 36C schematically illustrate configurations for supplying combustible hydrogen gas to a combustor, in accordance with one or more embodiments of the present disclosure.
Figure 36B:
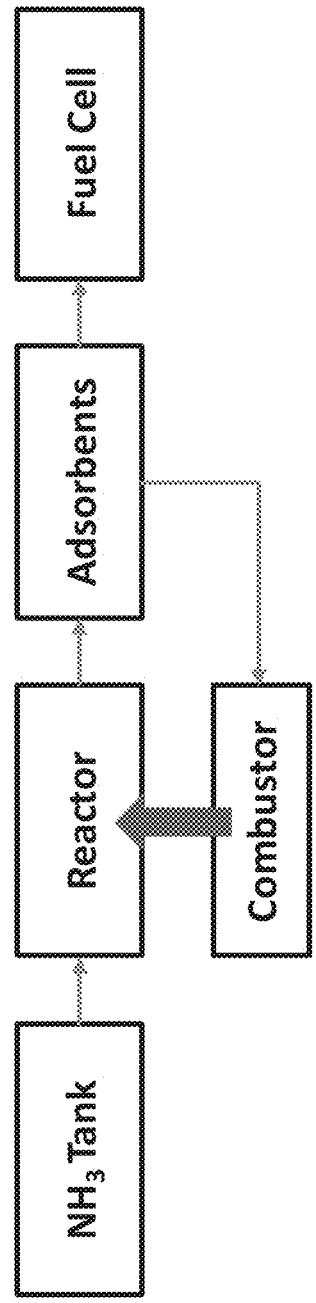
Figure 36C:
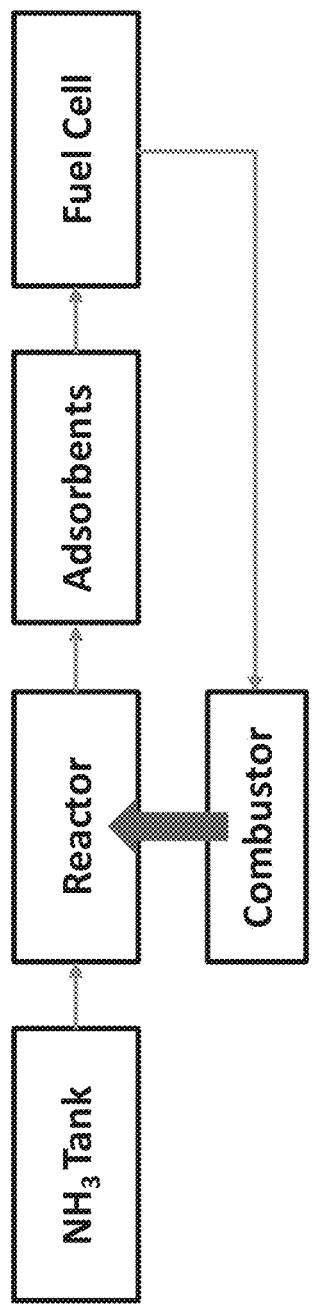

In another aspect, the present disclosure provides a system for decomposing ammonia to generate hydrogen. The system may comprise one or more reactors and one or more combustors for heating the one or more reactors, as described in greater detail below. FIGS. 36A-36C schematically illustrates some exemplary systems for decomposing ammonia, in accordance with one or more embodiments of the present disclosure.

The system may comprise any number of the various components disclosed herein. In some cases, the system may comprise an ammonia tank. In some cases, the system may comprise a reactor. In some cases, the reactor may be in fluid communication with the ammonia tank. In some cases, the system may comprise one or more adsorbents. In some cases, the system may comprise one or more fuel cells.

The reactor may comprise any number of reactor structures or reactor configurations disclosed herein and may be configured to perform any number of the various functions of reactors disclosed herein. In some cases, the reactor may be configured to decompose ammonia received from the ammonia tank to generate a reactor exit flow comprising at least hydrogen.

In some cases, the reactor exit flow further may comprise undecomposed ammonia. In some cases, the reactor exit flow further may comprise nitrogen.

The reactor exit flow may comprise various flow rates. In some cases, the reactor exit flow may comprise a flow rate of at least about 10 liters per minute (e.g., at standard temperature and pressure) to at most about 20 liters per minute. In some cases, the reactor exit flow may comprise a flow rate of at least about 0.1 liters per minute (lpm) to at most about 100 lpm. In some cases, the reactor exit flow may comprise at least about 10 lpm to at most about 500 lpm. In some cases, the reactor exit flow may comprise at least about 100 lpm to at most about 1000 lpm. In some cases, the reactor exit flow may comprise at least about 500 lpm to at most about 10,000 lpm.

The reactor exit flow may comprise various temperatures. In some cases, the reactor exit flow may comprise a temperature of at least about 100, 200, 300, 400, 500, or 600° C. In some cases, the reactor exit flow may comprise a temperature of at most about 100, 200, 300, 400, 500, or 600° C. In some cases, the reactor exit flow may comprise a temperature of at least about 20° C. to at most about 1000° C. In some cases, the reactor exit flow may comprise a temperature of at least about 100° C. to at most about 500° C.

The reactor exit flow may comprise various pressures. In some cases, the reactor exit flow may comprise a pressure of at least about 1 bar to at most about 5 bar. In some cases, the reactor exit flow may comprise a pressure of at least about 0.1 bar (gauge) to at most about 20 bar (gauge). In some cases, the reactor exit flow may comprise a pressure of at least about 1 bar (gauge) to at most about 100 bar (gauge).

Hydrogen may comprise various fractions of the reactor exit flow. In some cases, hydrogen may comprise at least about 0.1 mole fraction to at most about 0.75 mole fraction of the reactor exit flow.

Undecomposed ammonia may comprise various fractions of the reactor exit flow. In some cases, undecomposed ammonia may comprise at most about 0.9 mole fraction ammonia of the reactor exit flow. In some cases, undecomposed ammonia may comprise at most about 0.05 mole fraction ammonia of the reactor exit flow. In some cases, undecomposed ammonia may comprise at most about 0.005 mole fraction ammonia of the reactor exit flow. In some cases, undecomposed ammonia may comprise at most about 0.0005 mole fraction ammonia of the reactor exit flow.

Nitrogen may comprise various fractions of the reactor exit flow. In some cases, nitrogen may comprise at least about 0.05 mole fraction to at most about 0.25 mole fraction of the reactor exit flow.

The one or more adsorbents may comprise any number of adsorbent structures or adsorbent configurations disclosed herein and may be configured to perform any number of the various functions of adsorbents disclosed herein. In some cases, the one or more adsorbents may be configured to filter out or remove unconverted ammonia from at least a portion of the reactor exit flow to provide a filtered reactor exit flow.

The one or more adsorbents may be configured to filter out or remove various fractions of the unconverted ammonia from at least a portion of the reactor exit flow. In some cases, the one or more adsorbents may be configured to filter out or remove at least about 10 ppm to at most about 100,000 ppm of the unconverted ammonia. In some cases, the one or more adsorbents may be configured to produce filtered product stream with less than 10 ppm of ammonia.

The one or more adsorbents may be configured to filter out or remove various portions of the reactor exit flow. In some cases, the one or more adsorbents may be configured to filter out or remove at least about 10 ppm to at most about 100,000 ppm ammonia of the reactor exit flow. In some cases, the one or more adsorbents may be configured to filter out or remove at least about 10 ppm to at most about 500,000 ppm ammonia of the reactor exit flow.

The filtered reactor exit flow may comprise various flow rates. In some cases, the filtered reactor exit flow may comprise a flow rate of at least about 10 lpm (standard temperature and pressure) to at most about 20 lpm. In some cases, the filtered reactor exit flow may comprise a flow rate of at least about 0.1 liters per minute (lpm) to at most about 100 lpm. In some cases, the filter reactor exit flow may comprise a flow rate of at least about 100 lpm to at most about 500 lpm. In some cases, the filter reactor exit flow may comprise a flow rate of at least about 200 lpm to at most about 1000 lpm.

The filtered reactor exit flow may comprise various temperatures. In some cases, the filtered reactor exit flow may comprise a temperature of at least about 100, 200, 300, 400, 500, or 600° C. In some cases, the filtered reactor exit flow may comprise a temperature of at most about 100, 200, 300, 400, 500, or 600° C. In some cases, the filtered reactor exit flow may comprise a temperature of at least about 20° C. to at most about 1000° C. In some cases, the filtered reactor exit flow may comprise a temperature of at least about 100° C. to at most about 500° C.

The filtered reactor exit flow may comprise various pressures. In some cases, the filtered reactor exit flow may comprise a pressure of at least about 0.1 bar (gauge) to at most about 100 bar.

Hydrogen may comprise various fractions of the filtered reactor exit flow. In some cases, hydrogen may comprise at least about 0.1 mole fraction to at most about 0.75 mole fraction of the filtered reactor exit flow.

Undecomposed ammonia may comprise various fractions of the filtered reactor exit flow. In some cases, the filtered reactor exit flow may comprise at most about 100 ppm ammonia. In some cases, the filtered reactor exit flow may comprise at most about 10 ppm ammonia. In some cases, the filtered reactor exit flow may comprise at most about 1 ppm ammonia. In some cases, the filtered reactor exit flow may comprise at least about 0.1 ppm ammonia to at most about 1000 ppm ammonia. In some cases, the filtered reactor exit flow may comprise less than 0.1 ppm ammonia.

Nitrogen may comprise various fractions of the filtered reactor exit flow. In some cases, nitrogen may comprise at least about 0.05 mole fraction to at most about 0.25 mole fraction of the filtered reactor exit flow.

In some cases, the one or more fuel cells may be in fluid communication with the reactor. In some cases, the one or more fuel cells may be in fluid communication with the one or more adsorbents. In some cases, the one or more fuel cells may be configured to receive the filtered reactor exit flow from the one or more adsorbents. In some cases, the one or more fuel cells may be configured to process the filtered reactor exit flow to generate electricity. In some cases, the one or more fuel cells may be configured to output a fuel cell exit flow comprising unconverted hydrogen. In some cases, the fuel cell exit flow may further comprise hydrogen. In some cases, the fuel cell exit flow may further comprise nitrogen.

The one or more fuel cells may generate various amounts of electricity. In some cases, the one or more fuel cells may generate at least about 400 W to at most about 600 W of electricity. In some cases, the one or more fuel cells may generate at least about 10 W to at most about 1 MW of electricity. In some cases, the one or more fuel cells may generate at least about 100 kW to at most about 1000 kW of electricity. In some cases, the one or more fuel cells may generate at least about 1 MW to at most about 10 MW of electricity.

The fuel cell exit flow may comprise various flow rates. In some cases, the fuel cell exit flow may comprise a temperature of at least about 100, 200, 300, 400, 500, or 600° C. In some cases, the fuel cell exit flow may comprise a temperature of at most about 100, 200, 300, 400, 500, or 600° C. In some cases, the fuel cell exit flow may comprise a temperature of at least about 20° C. to at most about 1000° C. In some cases, the fuel cell exit flow may comprise a temperature of at least about 100° C. to at most about 500° C.

The fuel cell exit flow may comprise various pressures. In some cases, the fuel cell exit flow may comprise a pressure of at least about 0.01 bar (gauge) to at most about 10 bar (gauge).

Hydrogen may comprise various fractions of the fuel cell exit flow. In some cases, hydrogen may comprise at least about 0.01 mole fraction to at most about 0.75 mole fraction of the fuel cell exit flow.

Undecomposed ammonia may comprise various fractions of the fuel cell exit flow. In some cases, undecomposed ammonia may comprise at least about 1 ppm to at most about 100 ppm of the fuel cell exit flow. In some cases, undecomposed ammonia may comprise at least about 0.01 ppm to at most about 1 ppm of the fuel cell exit flow.

Nitrogen may comprise various fractions of the fuel cell exit flow. In some cases, nitrogen may comprise at least about 0.25 mole fraction to at most about 1 mole fraction of the fuel cell exit flow.

Combustor Designs

In some cases, the one or more combustors may be in fluid communication with the ammonia tank. In some cases, the one or more combustors may be in fluid communication with the reactor. In some cases, the one or more combustors may be in fluid communication with the one or more adsorbents. In some cases, the one or more combustors may be in fluid communication with the one or more fuel cells. In some cases, the one or more combustors may be in fluid communication with the ammonia tank, the reactor, the one or more adsorbent, the one or more fuel cells, or any combination thereof.

In some cases, the one or more combustors may be configured to combust at least a portion of the reactor exit flow to generate thermal energy for heating the reactor and/or a catalyst material within the reactor, as shown in FIG. 36A. In some cases, the one or more combustors may be configured to combust at least a portion of the filtered reactor exit flow to generate thermal energy for heating the reactor, as shown in FIG. 36B. In some cases, the one or more combustors may be configured to combust at least a portion of the fuel cell exit flow to generate thermal energy for heating the reactor, as shown in FIG. 36C. In some cases, the one or more combustors may be configured to combust at least a portion of the reactor exit flow to heat the plurality of different regions within the reactor. In some cases, the one or more combustors may be configured to combust at least a portion of the fuel cell exit flow to heat the plurality of different regions within the reactor.

Various portions of the reactor exit flow may be combusted by the one or more combustors. In some cases, at least about 5% to at most about 50% of the hydrogen from the reactor exit flow may be combusted by the one or more combustors.

Various portions of the filtered reactor exit flow may be combusted by the one or more combustors. In some cases, at least about 5% to at most about 50% of the hydrogen from the filtered reactor exit flow may be combusted by the one or more combustors.

Various portions of the fuel cell exit flow may be combusted by the one or more combustors. In some cases, at least about 10% to at most about 100% of the hydrogen from the fuel cell exit flow may be combusted by the one or more combustors.

In some cases, the system may further comprise an air supply unit. In some cases, the air supply unit may be in fluid communication with the one or more combustors. In some cases, the air supply unit may be configured to supply at least oxygen to the one or more combustors. In some cases, the air supply unit may be configured to supply air from the atmosphere to the one or more combustors.

The air supply unit may supply oxygen to the one or more combustors at various flow rates. In some cases, the air supply unit may supply oxygen at a flow rate of at least about 10 lpm to at most about 100 lpm. In some cases, the air supply unit may supply oxygen at a flow rate of at least about 100 lpm to at most about 1000 lpm.

The air supply unit may supply oxygen to the one or more combustors at various pressures. In some cases, the air supply unit may supply oxygen at a pressure of at least about 0.1 bar (gauge) to at most about 20 bar (gauge).

In some cases, the air supply unit may comprise a fan or a blower, as shown in FIG. 37A. In some cases, the air supply unit may comprise a compressor, as shown in FIG. 37B, to provide pressured air from the atmosphere. In some cases, the air supply unit may comprise a turbine, as shown in FIG. 37B. In some cases, the air supply unit may comprise a turbocharging unit, as shown in FIG. 37B. In some cases, the air supply unit may comprise a compressed cylinder. In such cases, the air supply unit may be configured to provide pressurized air from the cylinder to the one or more combustors. In some cases, the air supply unit may comprise a venturi restriction. The venturi restriction may be used to create a differential pressure between the venturi restrictions and another region of the air supply unit. The differential pressure may be used to draw air from the atmosphere into the venturi restriction.

Figure 37C:
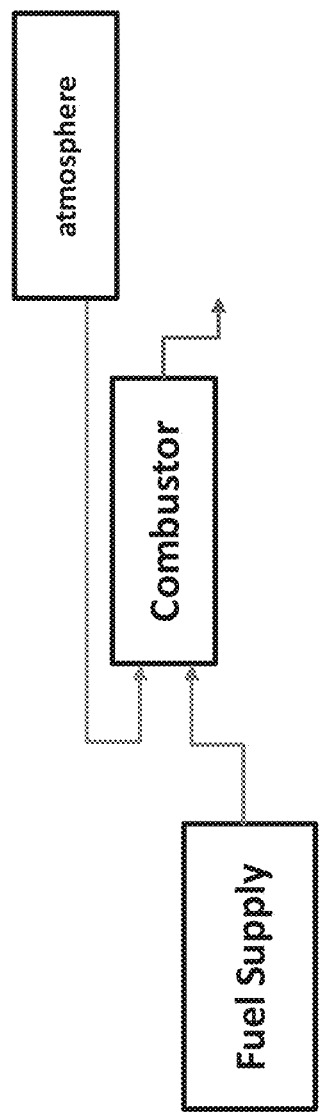

In some cases, the one or more combustors may comprise an atmospheric combustor as shown in FIG. 37C. In some cases, the atmospheric combustor may be configured to receive a supply of air or oxygen from a compressed cylinder or a fan blower.

In some cases, the one or more combustors may comprise a naturally aspirated combustor. In some cases, the naturally aspirated combustor may be configured to receive a supply of air or oxygen from an ambient environment in part based on a vacuum induced within the combustor.

In some cases, the one or more combustors may comprise a pressurized combustor. In some cases, the pressurized combustor may be configured to receive a supply of air or oxygen from a compressor coupled to a turbine. In some cases, the turbine may be driven by one or more exhaust gases from the pressurized combustor.

Figure 42:
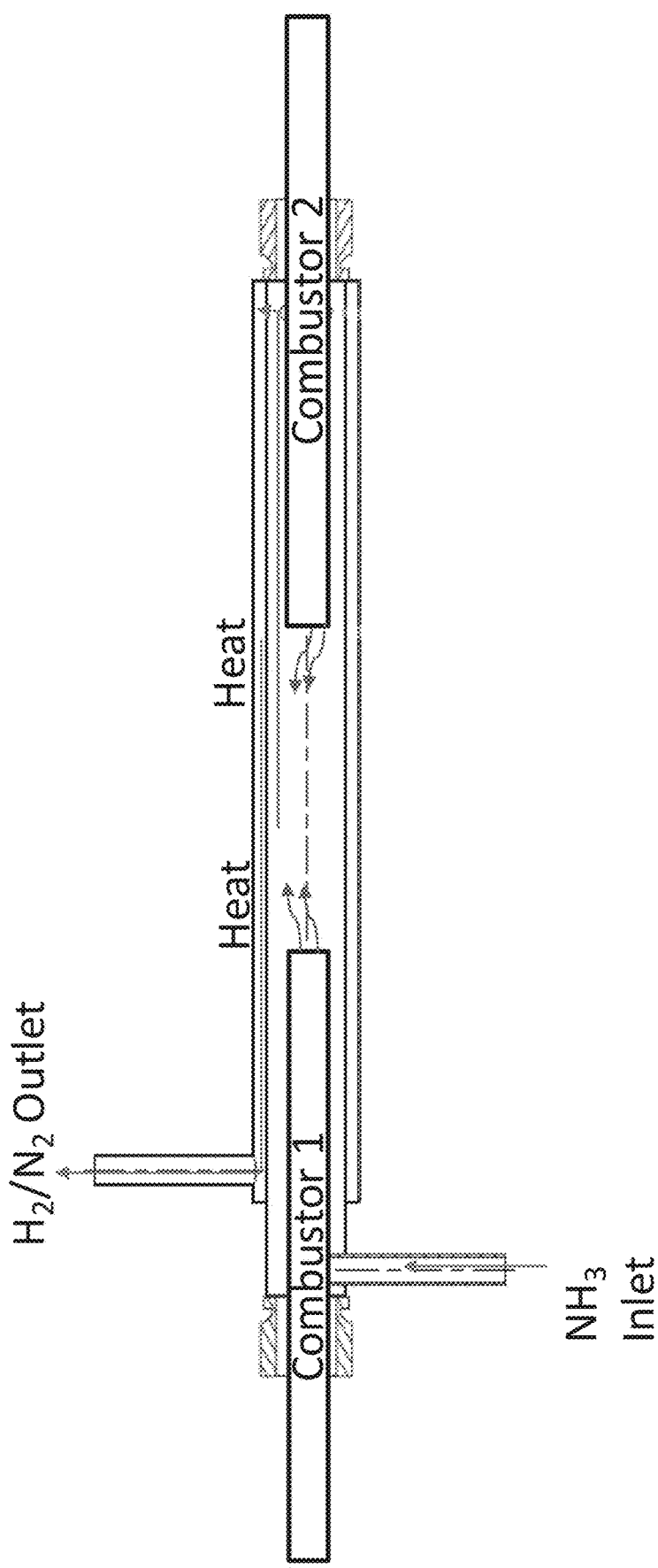
FIG. 42 schematically illustrates a design comprising two combustors partially embedded within a reactor, in accordance with one or more embodiments of the present disclosure.

As described elsewhere herein, the system may comprise one or more combustors. In some cases, the one or more combustors may be embedded at least partially within the reactor, as shown in FIGS. 38A-38B, FIG. 39, FIGS. 40A-40D, FIG. 42. In some cases, the one or more combustors may be configured to generate thermal energy for heating the reactor in a plurality of different regions to facilitate ammonia decomposition, as shown in FIG. 42. Various portions of the one or more combustors may be embedded in the reactor. The one or more combustors may be embedded in various regions of the reactor so that various regions within the reactor may be separately and/or individually heated by the one or more combustors.

In some cases, the one or more combustors may be configured to combust a mixture of air and fuel that may be at least partially pre-mixed upstream of a combustion region, as shown in FIG. 38A. In some cases, premixing the mixture of air and fuel allows for a more complete combustion of the air-fuel mixture at the combustion zone.

In some cases, the one or more combustors may be configured to combust a mixture of air and fuel, wherein the air and the fuel may be mixed at or near the combustion region, as shown in FIG. 38B.

The fuel may be sourced from one or more of the various components disclosed herein. In some cases, the fuel may comprise the reactor exit flow. In some cases, the fuel may comprise the filtered reactor exit flow. In some cases, the fuel may comprise the fuel cell exit flow. In some cases, the fuel may comprise an ammonia flow from the ammonia storage tank. In some cases, the fuel may comprise hydrogen, nitrogen, and ammonia.

Figure 39:
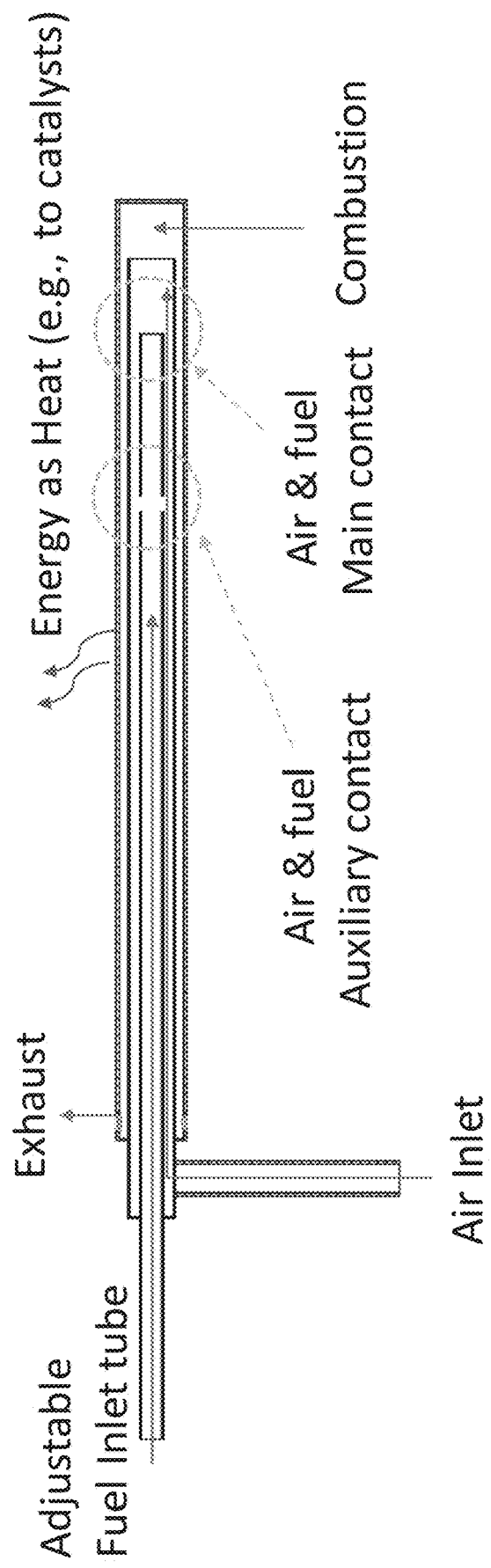
FIG. 39 schematically illustrates a combustor design with multiple air and fuel contacts, in accordance with one or more embodiments of the present disclosure.

In some cases, the one or more combustors may comprise one or more air-fuel contact zones configured to mix a flow comprising hydrogen and a flow comprising oxygen to facilitate combustion. FIG. 39 shows an illustration of one embodiment of the system comprising two air-fuel contact zones with one combustor. The two air-fuel contact zones may be located at a pre-determined distance upstream from the combustion zone. In some cases, the two air-fuel contact zones may comprise an auxiliary contact zone and a main contact zone. In some cases, the auxiliary contact zone and the main contact zone may be separated by a predetermined distance. In some cases, the predetermined distance may be at least about 1 mm to about 1 meter. In some cases, the predetermined distance may be at least about 1 cm to about 20 cm.

The one or more combustors may comprise any number of combustion zones at various locations within the reactor. In some cases, the one or more combustors may comprise 1, 2, 3, 4, 5, 6, 7, 8, 9, or 10 combustion zones.

The one or more combustors may comprise any number of air-fuel contact zones at various locations within the reactor. In some cases, the one or more combustors may comprise 1, 2, 3, 4, 5, 6, 7, 8, 9, or 10 air-fuel contact zones.

The one or more combustors may comprise any number of air-fuel pre-mixing zones at various locations within the reactor. In some cases, the one or more combustors may comprise 1, 2, 3, 4, 5, 6, 7, 8, 9, or 10 air-fuel pre-mixing zones.

Figure 40A:
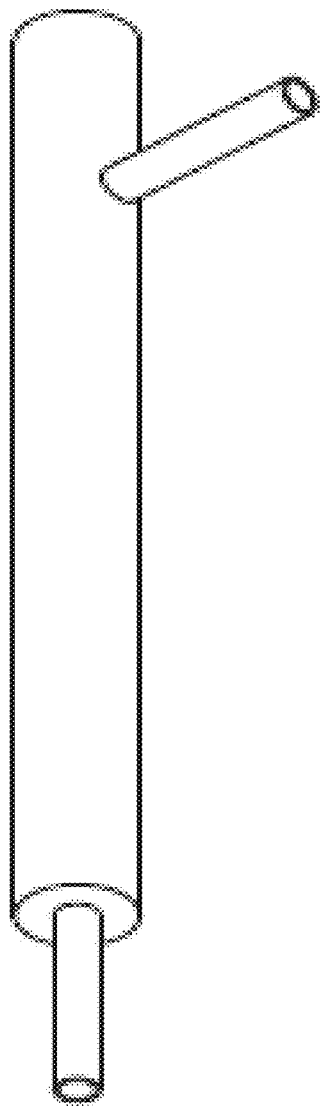
FIGS. 40A and 40B schematically illustrate an outside view and an inside cross-sectional view of a combustor and reactor design, in accordance with one or more embodiments of the present disclosure.
Figure 40B:
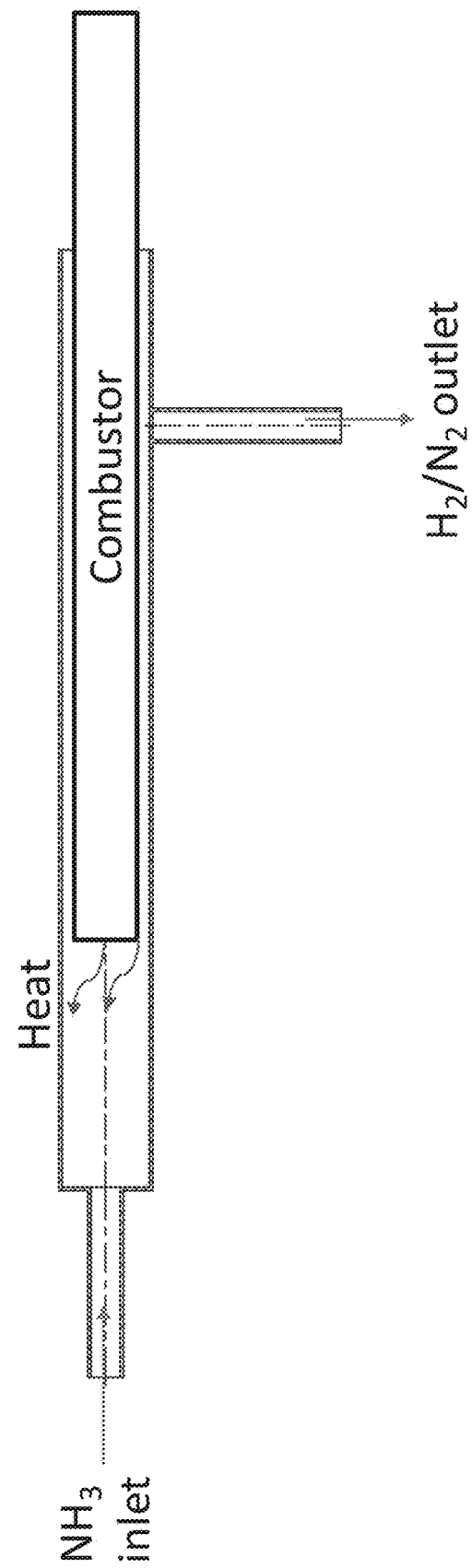
Figure 40C:
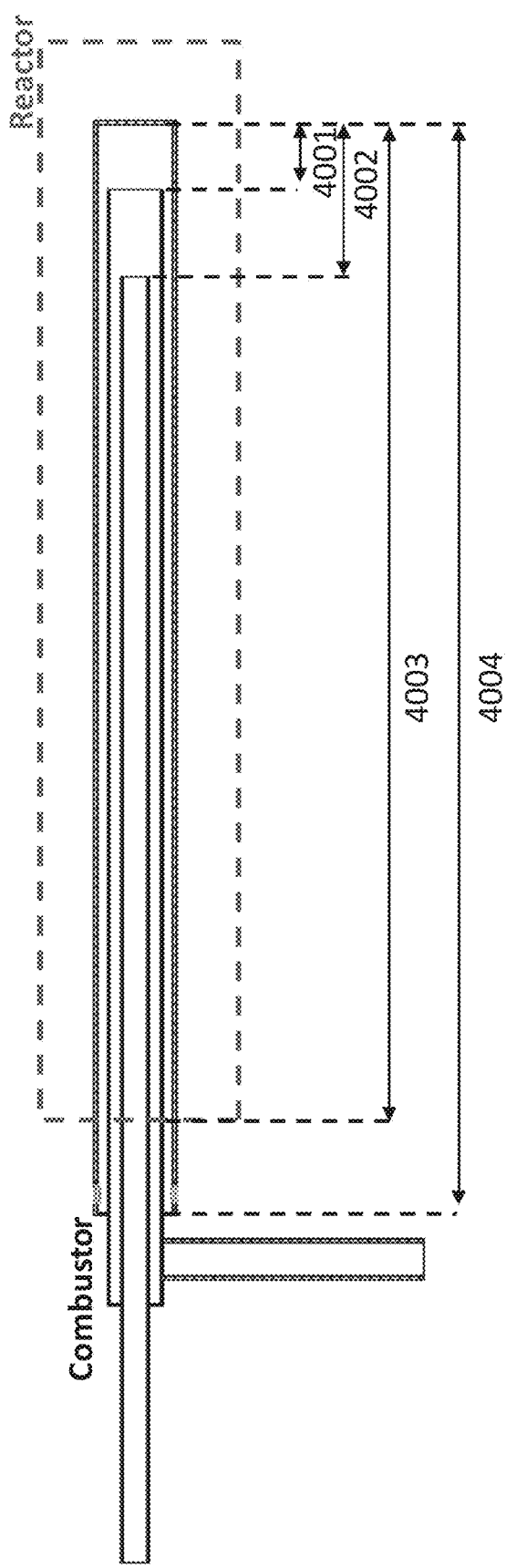
FIG. 40C schematically illustrates a system comprising a combustor configured for combustion inside a reactor, in accordance with one or more embodiments of the present disclosure.
Figure 40D:
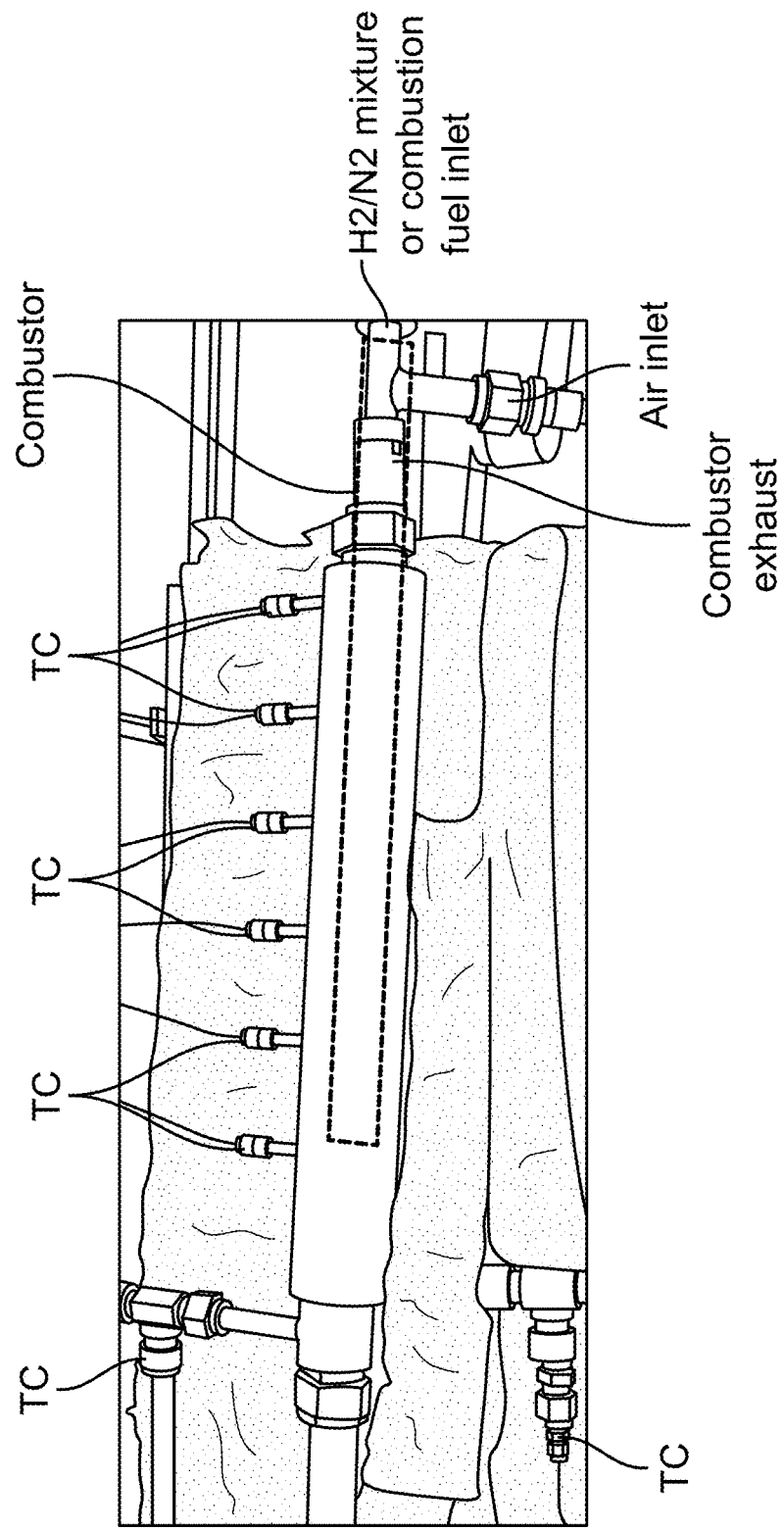
FIG. 40D shows a photograph of a system comprising a combustor configured for combustion inside a reactor, in accordance with one or more embodiments of the present disclosure.

In some cases, a hydrogen and nitrogen supply tube and a combustor end may be separated by various distances. FIGS. 40A-40D show illustrations of one embodiment of the system comprising a combustor configured for combustion inside a reactor. FIG. 40C illustrates some dimensions of a system comprising a combustor configured for combustion inside a reactor, including: distance between the air supply tube and the reactor end (4001), distance between the $H_2/N_2$ mixture supply tube and the reactor end (4002), combustor insertion length into the reactor (4003), and reactor length (4004). FIG. 40D shows a photograph of one embodiment of the system comprising a combustor configured for combustion inside a reactor.

Figure 41A:
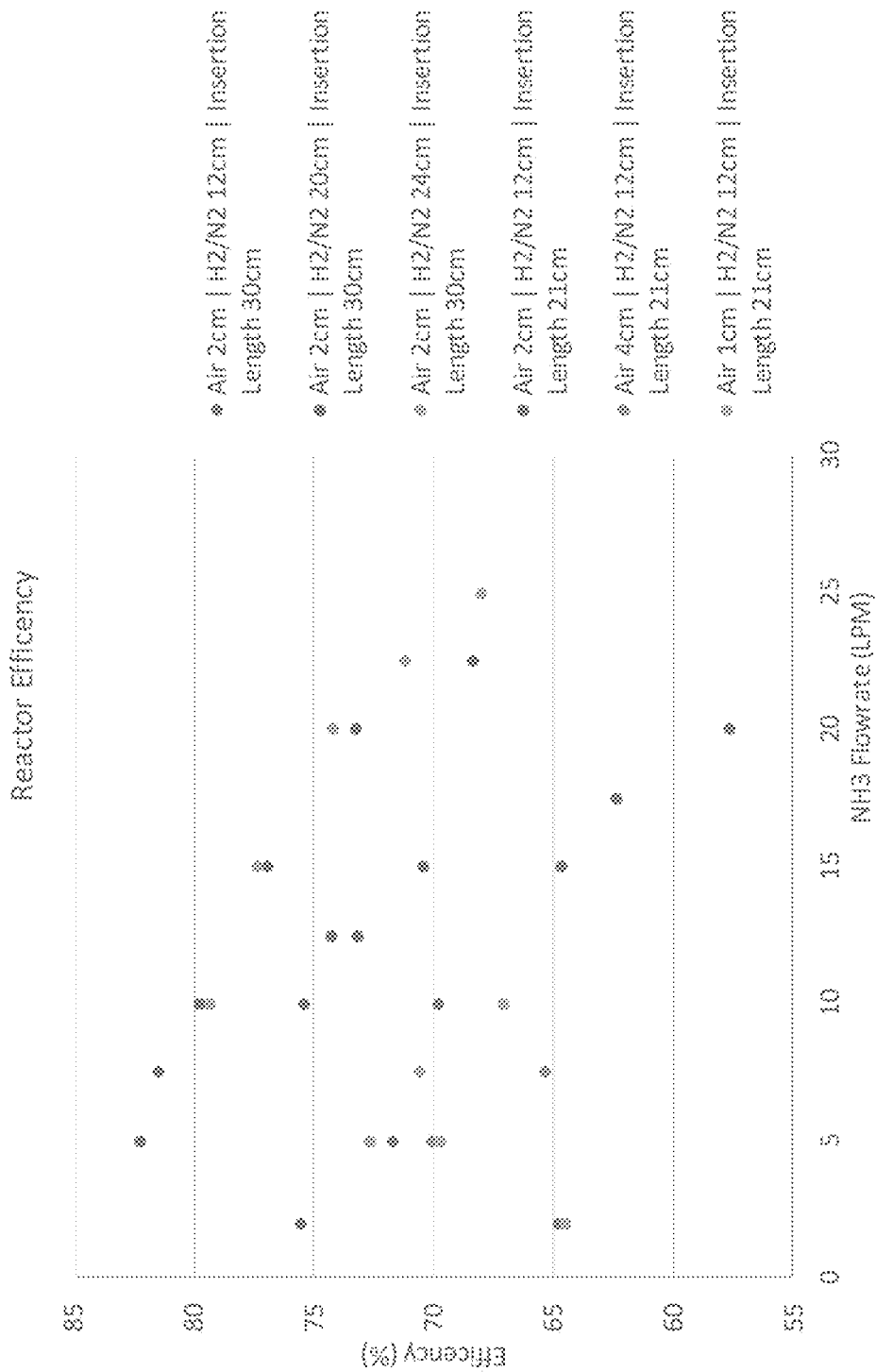
FIGS. 41A and 41B show experimental measurements of reactor thermal reforming efficiency and combustor efficiency as a function of $NH_3$ flow rate, conducted with the design shown in FIG. 40C.
Figure 41B:
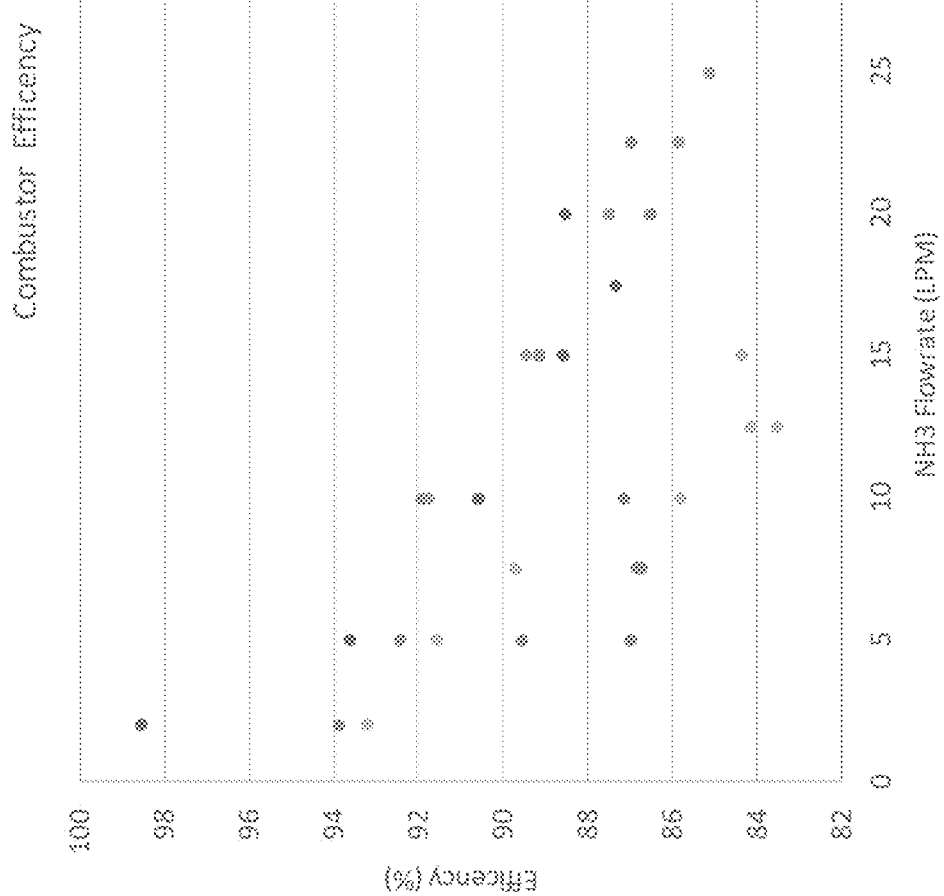

Experiments were carried out to assess system performance while varying $NH_3$ flow rates and the positions of the hydrogen and nitrogen mixture (1:1 volume ratio) supply tube and air supply tube relative to a combustor end configured for combustion. The results of these experiments are shown in FIGS. 41A-41B. Improvements in the reactor and combustor efficiencies were observed by adjusting the positions of the hydrogen and nitrogen mixture supply tube and air supply tube relative to the combustor end. FIG. 41A shows the reactor thermal reforming efficiency as a function of ammonia flow rate and FIG. 41B shows the combustor efficiency as a function of ammonia flow rate. In this example, reactor thermal reforming efficiency is defined as (chemical energy of produced hydrogen)/(chemical energy of input ammonia+heat energy input), i.e., lower heating value of produced hydrogen relative to the sum of lower heating value of input ammonia and heat energy input. In this example, heat energy input accounts for the heat of reaction and heat loss. In this example, the combustor efficiency is defined as (hydrogen enthalpy of combustion-enthalpy of combustor exit flow)/(hydrogen enthalpy of combustion). For instance, Air 2 cm-$H_2/N_2$ 12 cm-Insertion Length 30 cm refers to distance between the air supply tube and the combustor end of 2 cm (i.e., 4001 in FIG. 40C), distance between the hydrogen and nitrogen mixture supply tube and the combustor end of 12 cm (i.e., 4002 in FIG. 40C), and the combustor insertion length inside the reactor of 30 cm (the combustor length is about 30 cm from the end to the exhaust outlet, therefore, 30 cm insertion length refers to the complete insertion, i.e., 4003 in FIG. 40C).

In some cases, the one or more combustors may comprise two or more combustors configured to heat a plurality of different regions within the reactor. The plurality of different regions may correspond to distinct combustion zones. FIG. 42 shows an illustration of one embodiment of the system comprising two combustors. The two combustors may be cylindrical and may be concentrically embedded in the reactor, which may also be cylindrical. The two combustors may be diametrically opposed with a separation distance between opposing faces of the combustors. The combustors may be configured to separately or independently heat at least two different regions within the reactor.

Figure 43:
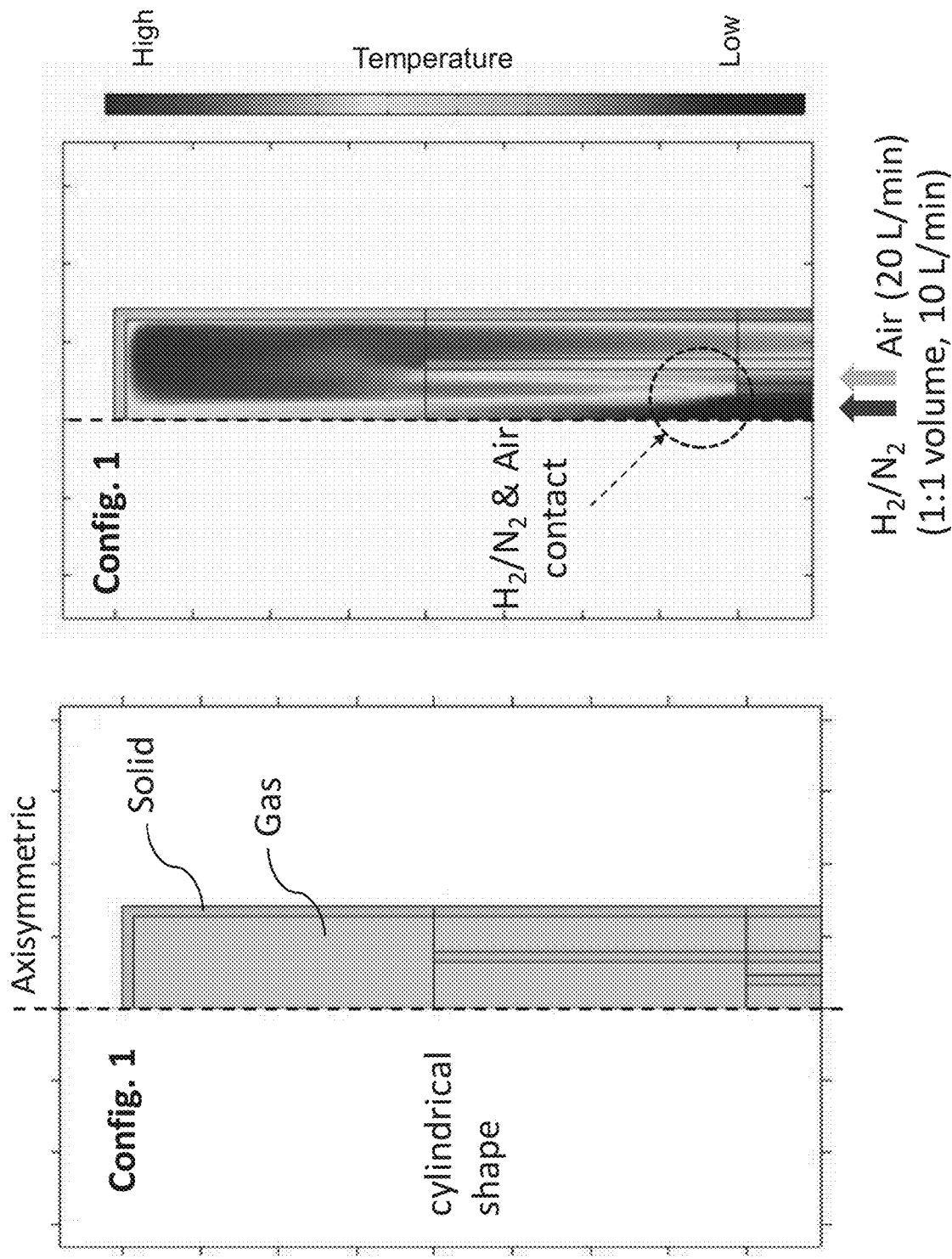
FIG. 43 shows a temperature profile of a combustor design solved with a simulation, in accordance with one or more embodiments of the present disclosure.
Figure 44:
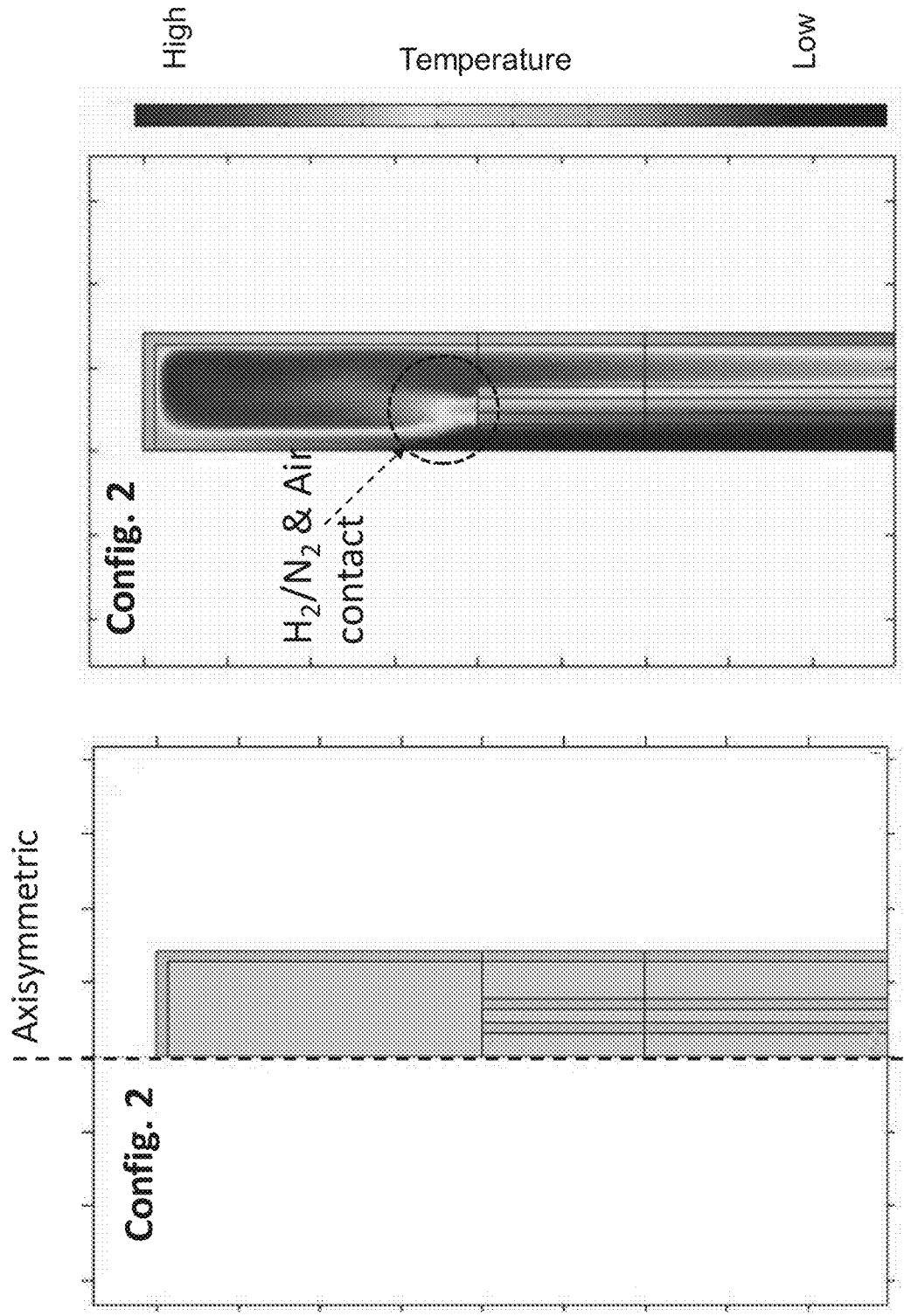
FIG. 44 shows a temperature profile of a combustor design solved with a simulation, in accordance with one or more embodiments of the present disclosure.
Figures 45A, 45B:
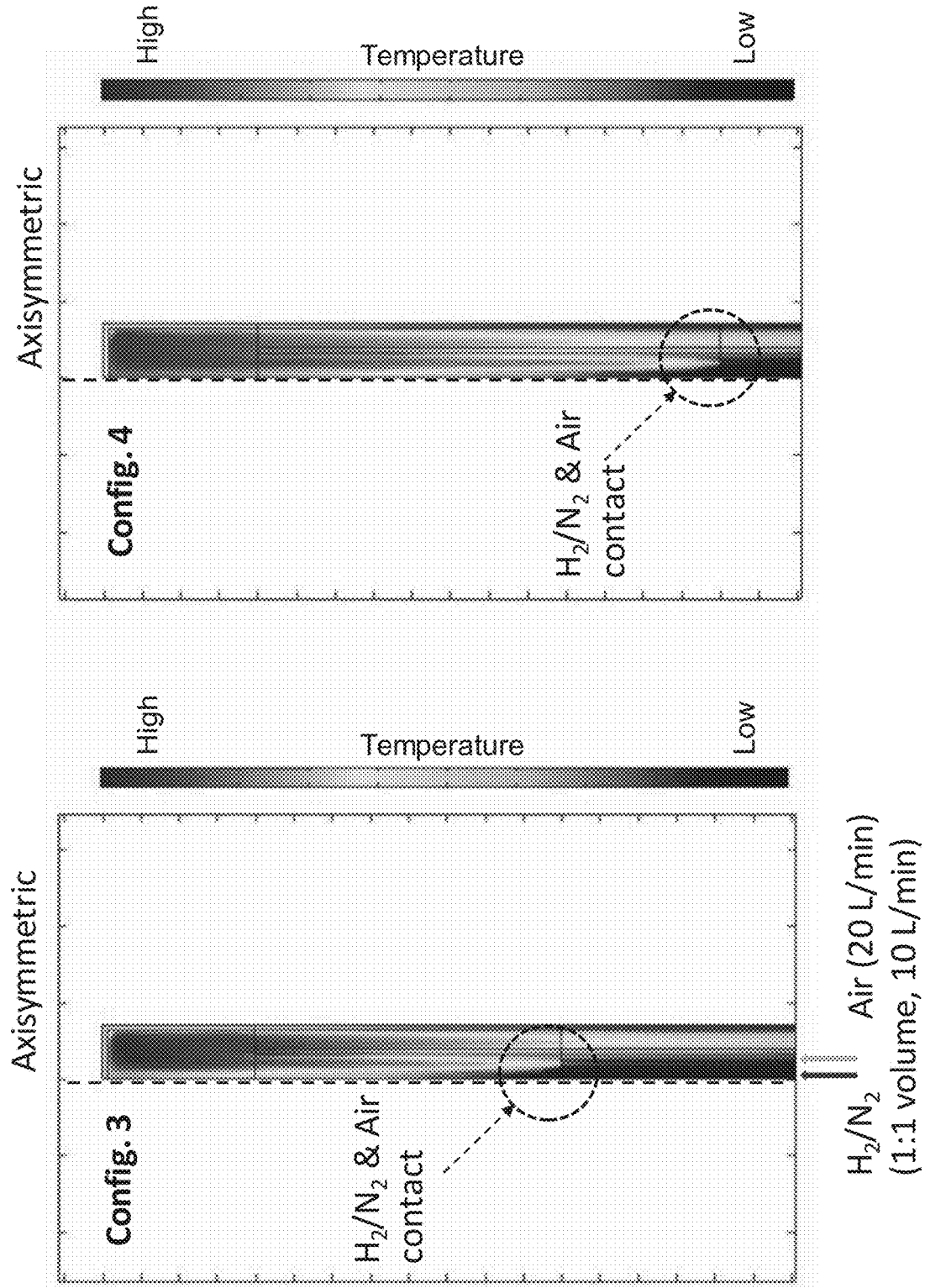
FIGS. 45A and 45B show a temperature profile of a combustor design solved with a simulation, in accordance with one or more embodiments of the present disclosure.

The air and the fuel may be mixed and combusted at various distances away from a combustor end. FIGS. 43-45 each illustrate simulation results that show the effects of mixing and combustion of the air and the fuel at various distances. In each simulation, cylindrical tubes are concentrically embedded in a cylindrical combustor. Combustion takes place at the air-fuel mix location, and the heated flow is turned around at the end of the combustor and transported in a direction opposite the air/fuel supply direction. As mixing the fuel and air is required for complete combustion, not all of hydrogen is combusted at the air-fuel mixing location immediately but the flame stretches through the combustor with the flow of the air-fuel mixture. This heat may be then transferred to the most outer wall of the combustor and to the external surroundings (e.g., reactor). The air-fuel contact and combustion zone may be located at a pre-determined distance from the combustor end, for instance, about 4 cm in FIG. 43, about 2 cm in FIG. 44, about 6 cm in FIG. 45A, and about 8 cm in FIG. 45B. In each simulation, the fuel ($H_2/N_2$ 1:1 volume ratio mixture) flow rate was 10 lpm, and the air flow rate was 20 lpm. The temperature profile within the system was computed under steady-state assumptions for each simulation. With each configuration in FIGS. 43-45, the temperature profiles varied with respect to the maximum temperature within the combustor, which may impact the stability of materials in the system. In some cases, the temperature profiles also varied with respect to the maximum temperature gradient within the reactor, which may induce different levels of stress and/or oxidation in the materials in the system. In some cases, the temperature profiles also varied with respect to the distribution of temperature at various regions in the combustor, which may impact the performance of the reactor.

Figure 46A:
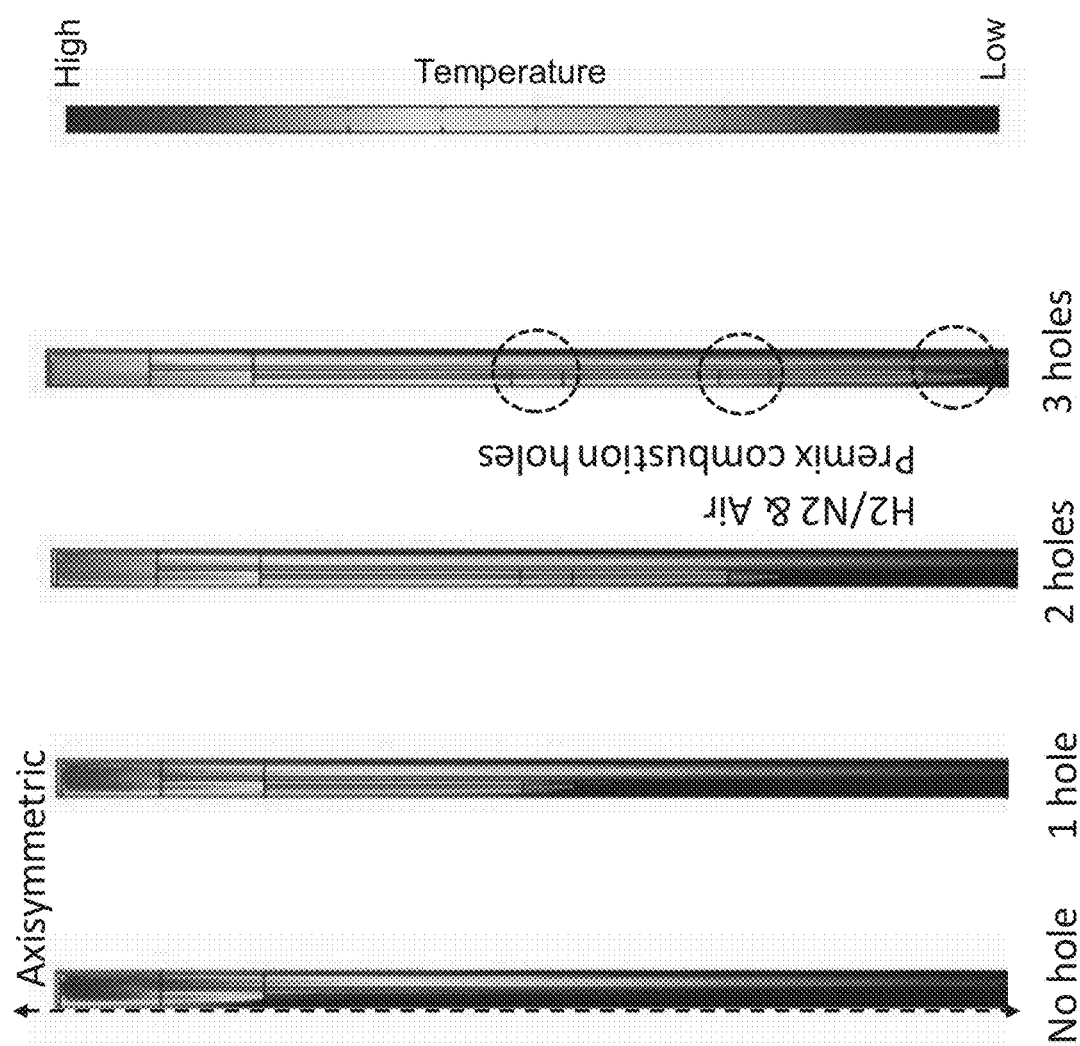
FIGS. 46A and 46B show a temperature profile and a hydrogen mass profile of a combustor design solved with a simulation, in accordance with one or more embodiments of the present disclosure.
Figure 46B:
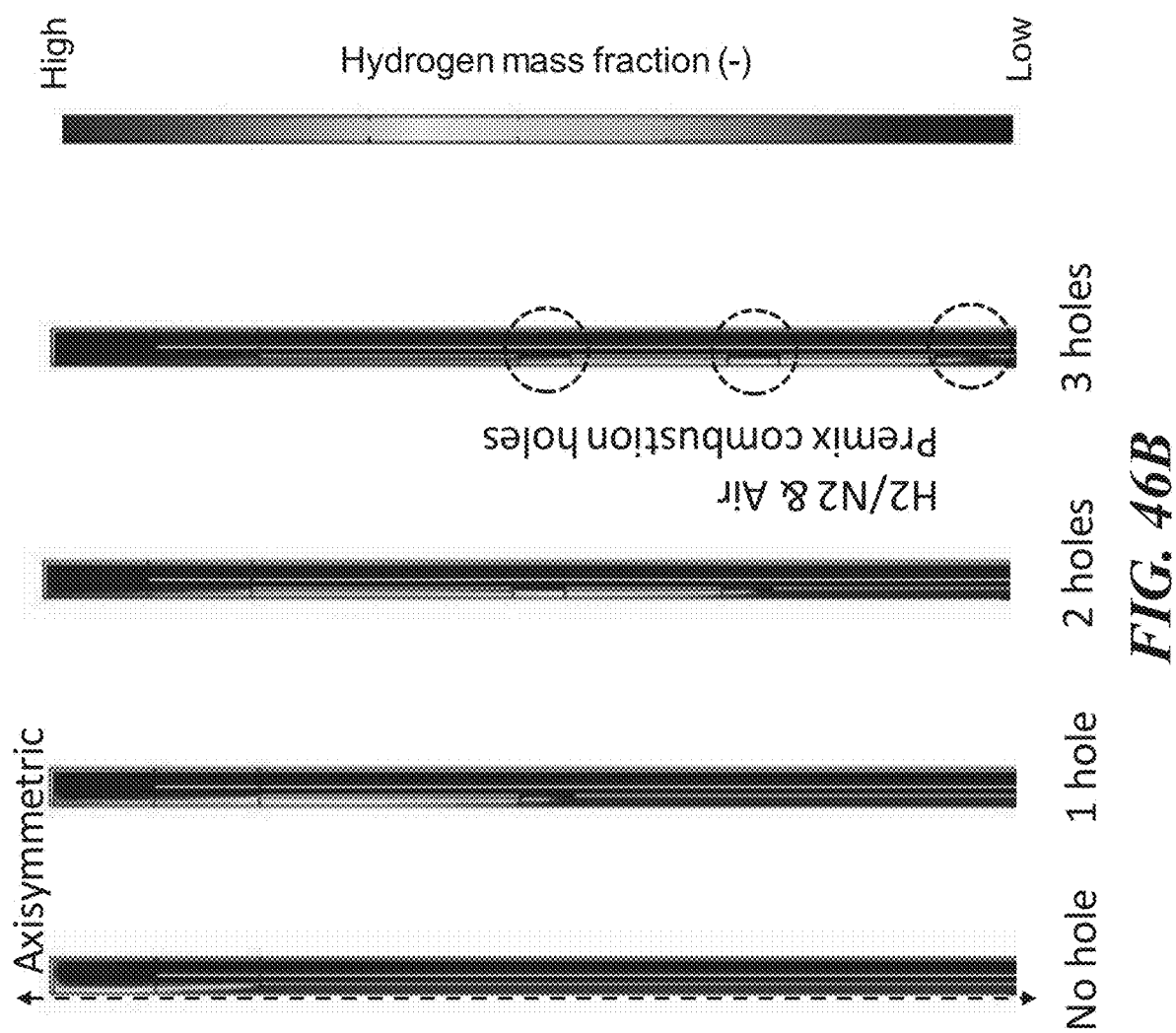

FIGS. 46A-46B each illustrate simulation results that show the effects of pre-mixing/pre-combustion holes for the air and the fuel at various distances. At the pre-mixing/pre-combustion holes, fuel and air may be mixed partially and combusted. This mechanism may distribute the heat more uniformly throughout the combustor and may reduce local hot spot temperatures, in comparison to cases without pre-mixing/pre-combustion holes. For example, FIG. 46A shows a temperature distribution wherein the case with no pre-mixing/pre-combustion holes has the highest local hot spot temperatures in comparison to the cases with holes (e.g., 1, 2, and 3 holes). Thus, pre-mixing/pre-combustion holes may impact the stability of materials in the system. The maximum temperature gradient within the reactor also varied between the cases, wherein the various maximum temperature gradient may induce different levels of stress and oxidation in the materials of the system. In some cases, the temperature profiles also varied in the distribution of temperature at various regions in the combustor, which may impact the performance of the reactor.

The one or more combustors may each comprise various shapes and sizes. In some cases, the one or more combustors may comprise a cylindrical shape or a circular cross-section, as shown in FIG. 40A-40D, and FIGS. 43-45B. In some cases, the one or more combustors may comprise a rectangular shape or a rectangular cross-section. In some cases, the one or more combustors may be concentric to the reactor.

In some cases, the one or more combustors may comprise a high temperature refractory material. High temperature refractory materials may be resistant to thermal shock, be chemically inert, have specific ranges of thermal conductivity, or have specific ranges of thermal expansion coefficient. In some cases, the high temperature refractory material may be configured to enhance combustor stability. In some cases, the temperature refractory material may comprise steel, tungsten carbide alumina, magnesia, silica, lime, metal oxides, tungsten, molybdenum, or any combination thereof. In some cases, the temperature refractory material may comprise at least one of: metal oxides such as $Al_2O_3$, $SiO_2$, $ZrO_2$, $VO_2$, Ta, alloys of Ni, Al, Mo, Cr, Si, or any combination thereof. In some cases, the temperature refractory material may comprise at least one of steel, tungsten, molybdenum, tungsten carbide, or any combination thereof. In some cases, the refractory material may be coated on one or more surfaces of the one or more combustors. The refractory material may be coated on or near the combustion zone, on or near the surfaces that contact the reactor, or any other surface of the reactor. In some cases, the refractory material may be enforced with a structural metal. In some cases, the refractory material may be held and/or covered by a structural metal such that the structural metal supports the refractory material against one or more fractures.

Figure 47:
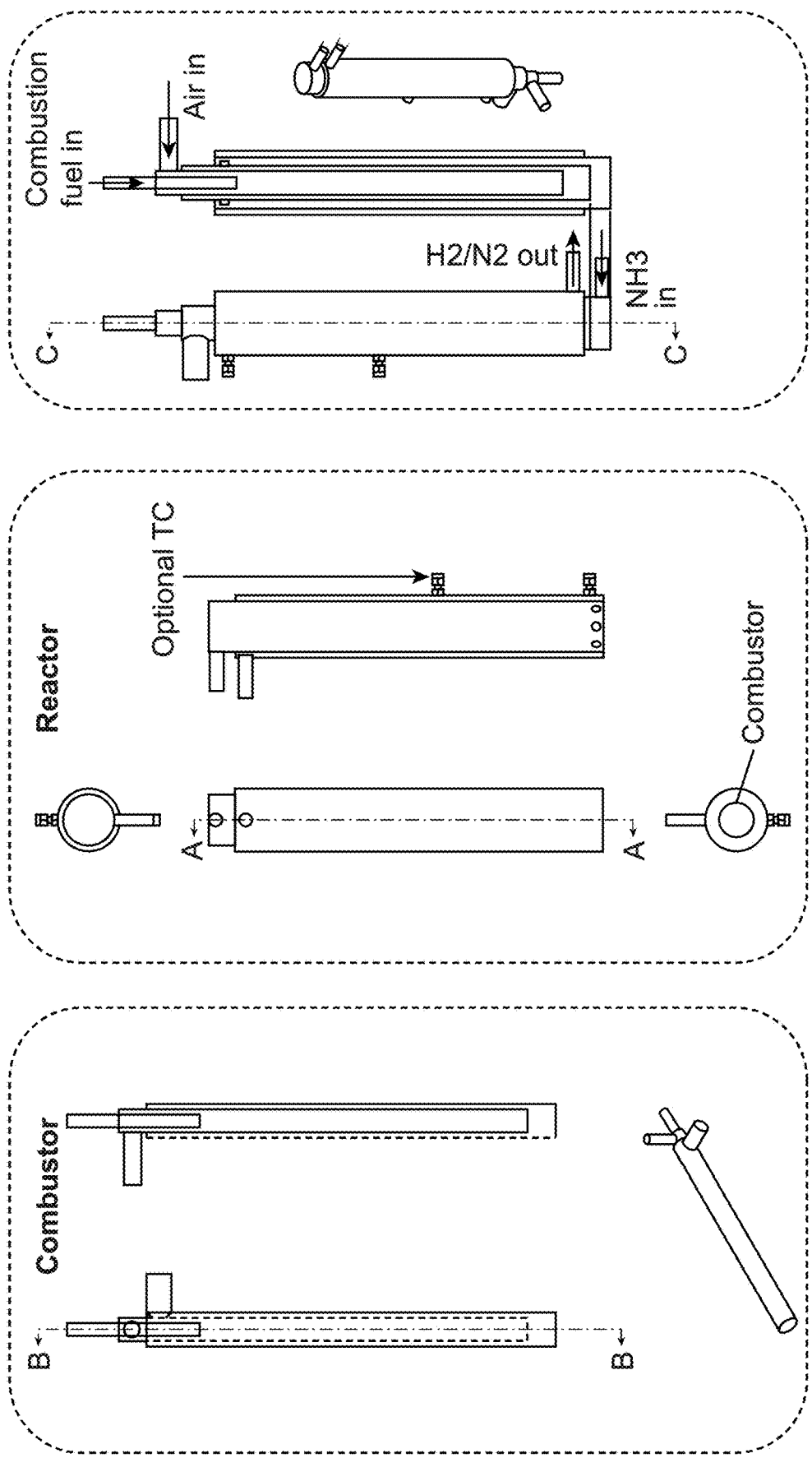
FIG. 47 schematically illustrates an exemplary design for a combustor and a reactor, in accordance with one or more embodiments of the present disclosure.
Figure 48:
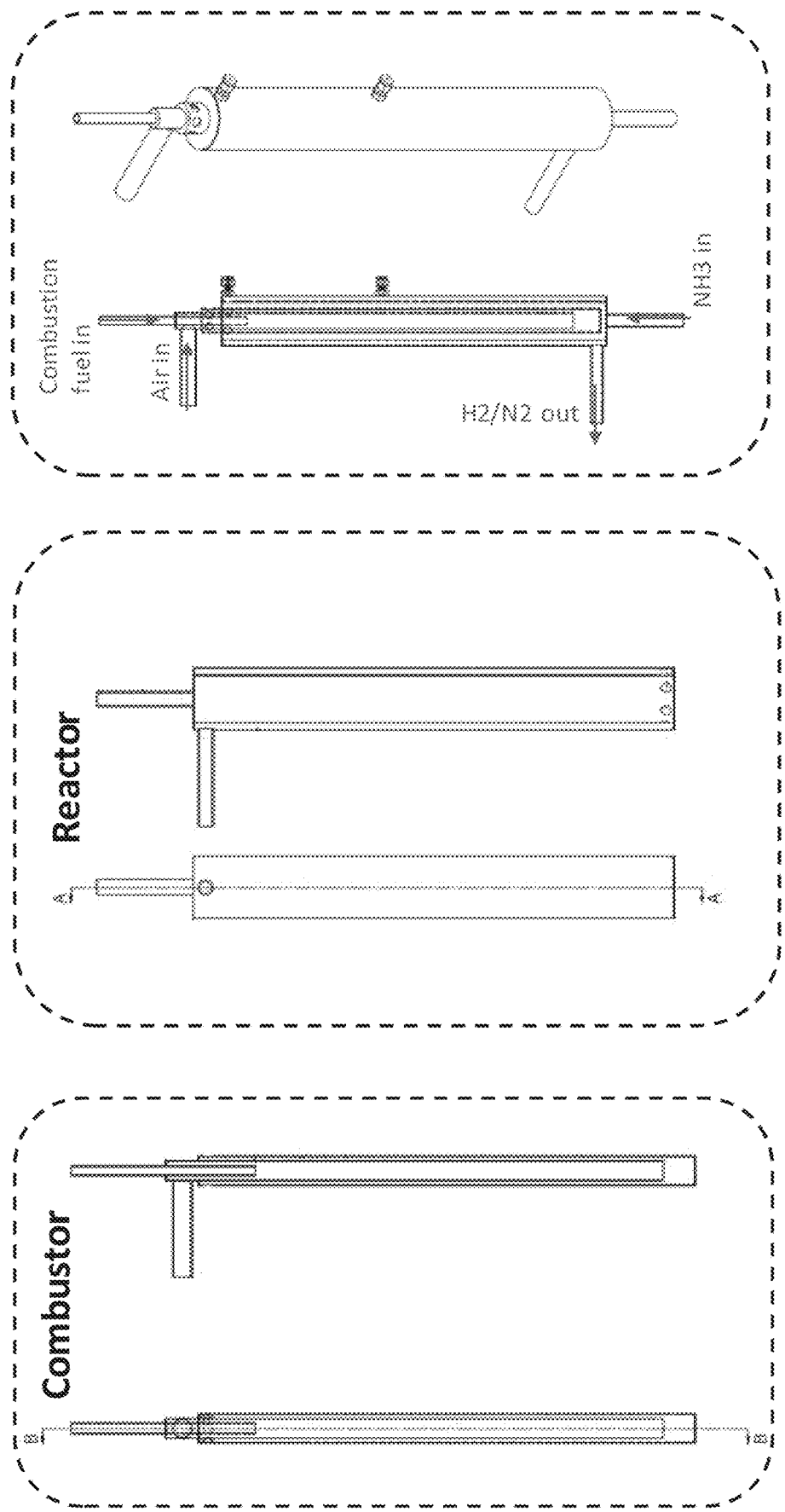
FIG. 48 schematically illustrates an exemplary design for a combustor and a reactor, in accordance with one or more embodiments of the present disclosure.

FIGS. 47-48 each schematically illustrates a design for a combustor and a reactor, in accordance with one or more embodiments of the present disclosure. In some cases, the combustor and the reactor may comprise dimensions such that the combustor may fit within the reactor.

The reactor may be configured to receive ammonia from a tank and to process the ammonia (as described elsewhere herein) to generate hydrogen and/or nitrogen. Processing the ammonia may comprise cracking, decomposing or dissociating the ammonia to yield the hydrogen and/or the nitrogen. The hydrogen and/or nitrogen may flow out from the reactor to one or more adsorbents before the mixture of hydrogen and nitrogen is directed to one or more fuel cells. The adsorbents may be used to remove trace ammonia and/or nitrogen from the outlet flow of the reactor. The one or more fuel cells may be configured to generate electrical energy from the hydrogen/nitrogen mixture. In some cases, the one or more fuel cells may have an exhaust flow comprising unconverted or unprocessed hydrogen and/or nitrogen.

In some cases, the reactor may comprise a combustor that is positioned at least partially within the reactor. The combustor may be configured to receive air through a first inlet and a mixture of hydrogen and nitrogen from the one or more fuel cells through a second inlet. The combustor may comprise an inner region or volume for combusting the mixture of hydrogen and nitrogen with supplied air to heat the reactor for further ammonia decomposition.

The combustor may comprise various sizes and various cross-sectional areas. In some cases, a combustor having a larger cross-sectional area, e.g., FIG. 47, may experience a lower pressure drop than a combustor having a smaller cross-sectional area, e.g., FIG. 48. In some cases, a combustor may have a cross-sectional area between 5 $cm^2$ and 25 $cm^2$. In some cases, a combustor may have a cross-sectional area between 25 $cm^2$ and 200 $cm^2$. In some cases, a combustor may have a cross-sectional area between 10 $cm^2$ and 500 $cm^2$. In some cases, a combustor may have a cross-sectional area between 100 $cm^2$ and 5000 $cm^2$.

The combustor may comprise one or more inlets and one or more outlets at various locations on the combustor. In some cases, the combustor may comprise one or more inlets and one or more outlets on a same side of the combustor. In some cases, the combustor may comprise one or more inlets and one or more outlets on different sides of the combustor.

The combustor may comprise one or more inlets and one or more outlets oriented in various directions on the combustor. In some cases, the combustor may comprise one or more inlets and one or more outlets oriented in a same direction. In some cases, the combustor may comprise one or more inlets and one or more outlets oriented in perpendicular directions. In some cases, the combustor may comprise one or more inlets and one or more outlets oriented along the longest axis of the combustor. In some cases, the combustor may comprise one or more inlets and one or more outlets oriented perpendicular to the longest axis of the combustor. In some cases, the combustor may comprise one or more inlets and one or more outlets oriented in a single direction. In some cases, the combustor may comprise one or more inlets and one or more outlets oriented in at least two different directions. In some cases, the combustor may comprise one or more inlets and one or more outlets oriented in at least three different directions.

The systems disclosed herein may comprise a mobile system with various volumes. In some cases, the mobile system may have a volume of at most about 10 $m^3$. In some cases, the mobile system may have a volume of at most about 2 $m^3$. In some cases, the mobile system may have a volume of at most about 1 $m^3$. In some cases, the mobile system may have a volume of at most about 0.5 $m^3$. In some cases, the mobile system may have a volume of at most about 0.25 $m^3$. In some cases, the mobile system may have a volume of at most about 0.1 $m^3$. In some cases, the mobile system may have a volume of at most about 0.05 $m^3$. In some cases, the mobile system may have a volume of at most about 0.01 $m^3$.

In some embodiments, the system may comprise a plurality of reactors connected in parallel. In some cases, the plurality of reactors may comprise one or more combustor reactors and one or more electrical reactors (e.g., 4 or more electrical reactors). In some cases, a heat exchanger may be used to transfer heat and/or evaporate incoming ammonia flow from one or more exit flows from the one or more combustor reactors or electrical reactors. In some cases, after the heat exchanger, preheated ammonia stream may be distributed evenly between each reactor in the plurality of reactors. In some cases, flow distribution in one or more reactors in the plurality reactors may be enhanced using a pressure drop element, such as a restrictive orifice. In some cases, a distributed preheated and/or evaporated ammonia gas may be passed through a combustion heater to pre-heat before entering an electrical reactor or a combustion reactor. In some cases, outflow of an electrical reactor may be input to a combustor reactor. In some cases, an outflow of a combustion reactor may be input to an electrical reactor. In some cases, one or more combustor reactor outlet flows may be merged and input to the heat exchanger. In some cases, one or more electrical reactor outlet flows may be merged and input to the heat exchanger. In some cases, cooled product gas from the heat exchanger may be passed through an additional heat exchanger to further cool towards ambient temperature. In some cases, adsorbent may be used to filter unconverted ammonia from the product gas from the combustor reactor, the electrical reactor, the heat exchanger, or any combination thereof. In some cases, filtered $N_2/H_2$ mixture product stream may be supplied to fuel cells. In some cases, a hydrogen separation unit (e.g., a pressure swing adsorption (PSA) system or hydrogen permeable membrane system) may be used to produce a product gas with a higher concentration of hydrogen compared a flow of gas input to the separation unit. In some cases, unconverted hydrogen from one or more fuel cells may be distributed evenly through each combustion reactors in the plurality of reactors to be used as combustion fuel. In some cases, a discharged stream comprising hydrogen and nitrogen from one or more hydrogen separation units may be distributed evenly through each combustion reactor in the plurality of reactors to be used as combustion fuel. In some cases, one or more air supply units may provide air for the one or more combustion reactors in the plurality of reactors. In some cases, the system may operate using a self-sustaining auto-thermal reforming process. In some cases, depending on the air flow rates to the one or more combustor reactors, hydrogen utilization, and/or hydrogen consumption rate of the one or more fuel cells, flame flare may be observed in proximity to exhaust ports of the one or more combustor reactors. In some cases, hydrogen combustion required to sustain auto-thermal reforming may be about 25-45% of produced hydrogen from ammonia cracking. In some cases, hydrogen combustion required to sustain auto-thermal reforming may be at least about 10, 20, 30, 40, 50, 60, 70, 80, or 90% of produced hydrogen from ammonia cracking. In some cases, hydrogen combustion required to sustain auto-thermal reforming may be at most about 10, 20, 30, 40, 50, 60, 70, 80, or 90% of produced hydrogen from ammonia cracking. In some cases, remaining hydrogen, (e.g., 55-75%) of produced hydrogen, may be consumed by the one or more fuel cells for generating electrical power or supplied as a hydrogen gas on demand. In some cases, at least about 10, 20, 30, 40, 50, 60, 70, 80, or 90% of produced hydrogen from ammonia cracking may be consumed by the one or more fuel cells for generating electrical power or supplied as a hydrogen gas on demand. In some cases, at most about 10, 20, 30, 40, 50, 60, 70, 80, or 90% of produced hydrogen from ammonia cracking may be consumed by the one or more fuel cells for generating electrical power or supplied as a hydrogen gas on demand. In some cases, a higher percentage of hydrogen produced from ammonia cracking may be consumed during a startup operation or heating up phase.

Figure 74:
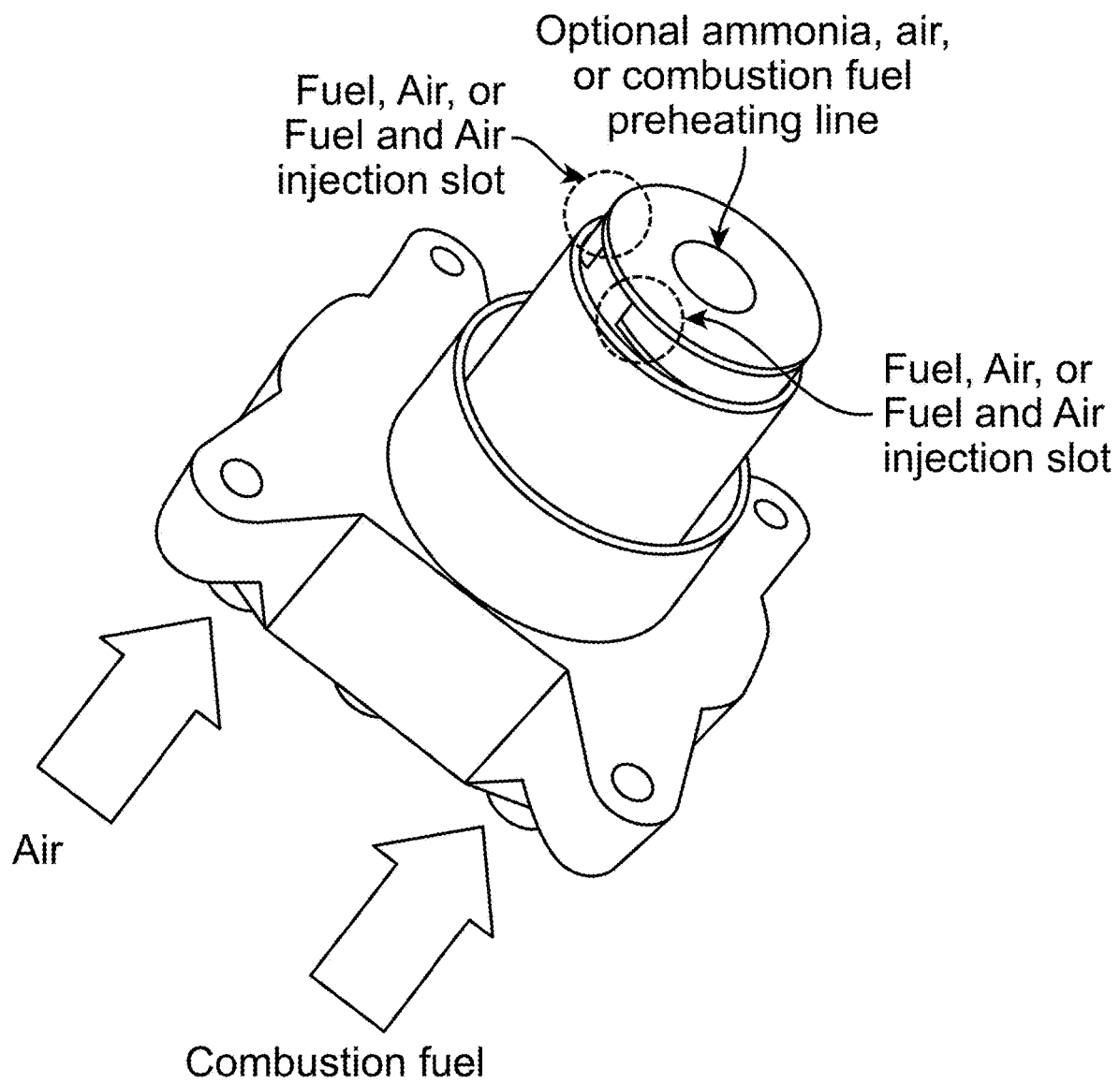
FIG. 74 shows a combustion burner head design, in accordance with one or more embodiments of the present disclosure.

FIG. 74 shows a combustion burner head design, in accordance with one or more embodiments of the present disclosure. In some cases, hydrogen-nitrogen mixture fuel may be supplied through a fuel inlet and air may be supplied to an air inlet. In some cases, the hydrogen-nitrogen mixture fuel may be distributed into one or more outlets/slots (e.g., total 4 outlets/slots). In some cases, at these outlets, fuel and air may be injected substantially perpendicular to the direction of flow (e.g., between about 60 and about 120 degrees). In some cases, the injection of fuel and air may form a rapidly mixing (e.g., swirl) combustion. In some cases, fuel and air lines for providing the fuel and air may be sized to have a relatively low pressure drop (e.g., less than about 1 bar). In some cases, fuel and air lines for providing the fuel and air may be sized to maintain a high injection velocity. In some cases, the high injection velocity may be sufficiently high to reduce or prevent back flow and/or flash back, and may improve mixing, as compared to a lower injection velocity. In some cases, a plenum type reservoir may be used to further minimize the pressure drop. In some cases, an insertable design may be used to facilitate maintenance and replacement. In some cases, a burner head may be inserted or permanently attached to a combustor reactor. In some cases, a burner head may comprise one or more fuel or air injection slots. In some cases, a burner head may comprise one or more insertable seals for inserting into a combustor reactor. In some cases, a burner head may comprise an air or fuel injection slot cross-sectional area of 1 to 50 mm². In some cases, a burner head may comprise an air or fuel injection slot cross-sectional area of 1-20 mm². In some cases, a burner head may comprise a fuel injection slot cross-sectional area of 4-15 mm² for fuel input. In some cases, a burner head may comprise an air injection slot cross-sectional area of 5-18 mm² for air input. In some cases, a burner head may comprise a fuel injection slot cross-sectional area of 6-12 mm² for fuel input. In some cases, a burner head may comprise an air injection slot cross-sectional area of 7-15 mm² for air input. In some cases, fuel velocities and air velocities at one or more injection slots may comprise various speeds. In some cases, fuel velocity may comprise 10-200 m/s. In some cases, fuel velocity may comprise 50-130 m/s. In some cases, air velocity may comprise 30-250 m/s. In some cases, air velocity may comprise 50-200 m/s. In some cases, air velocity may comprise 70-130 m/s.

An ammonia reforming combustor durability test was performed an installed burner head for rapid 10+ consecutive on/off temperature cycles. Throughout 10+ cycles, ammonia reforming performance remained constant with an ammonia conversion efficiency of over 99% and a hydrogen consumption of about 30-40% (with respect to the hydrogen produced by ammonia decomposition) without using any heat exchangers or recuperators.

Figure 75B:
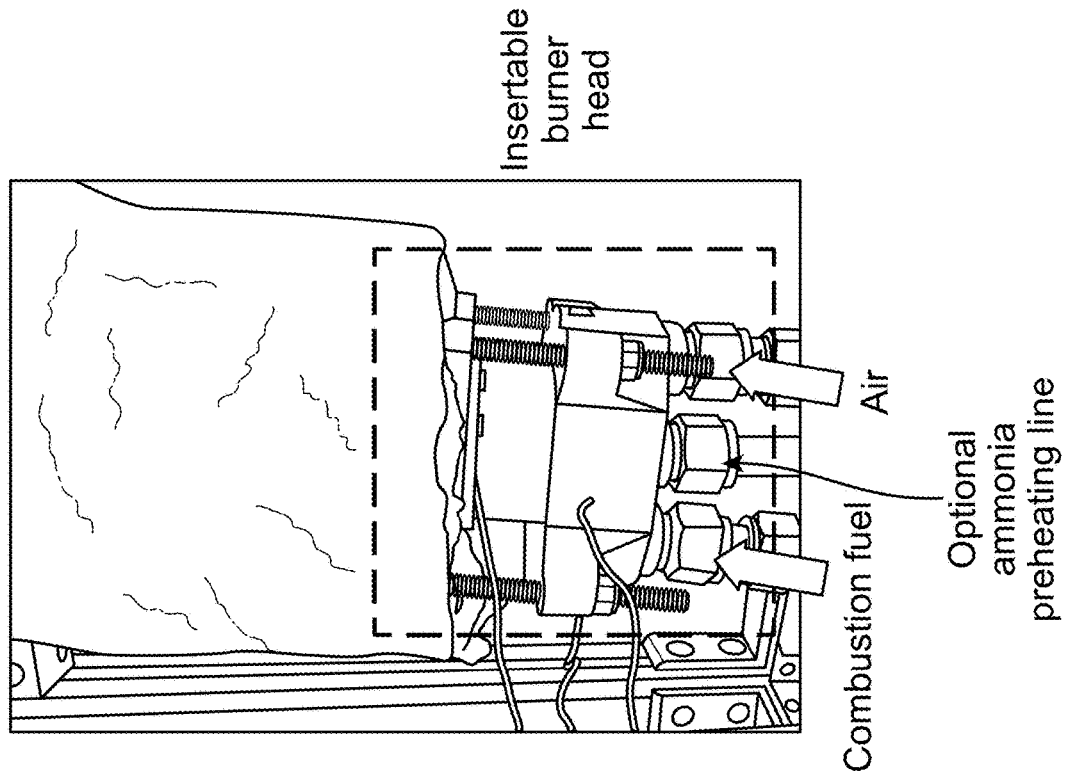
FIGS. 75A-75B show a burner head design, in accordance with one or more embodiments of the present disclosure.
Figure 75A:
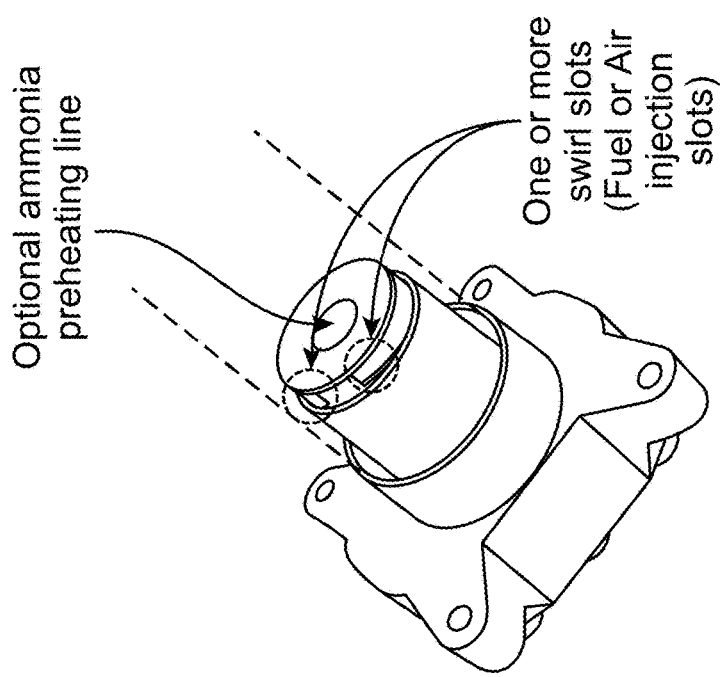

FIGS. 75A-75B show a burner head design, in accordance with one or more embodiments of the present disclosure. In some cases, a burner head may comprise an optional ammonia preheating line. In some cases, a burner head may comprise one or more slots for inputting fuel and/or air. In some cases, a burner head may comprise at least about 1, 2, 3, 4, 5, 6, 7, 8, 9, 10, 11, or 12 slots for inputting fuel and/or air. In some cases, a burner head may comprise at most about 1, 2, 3, 4, 5, 6, 7, 8, 9, 10, 11, or 12 slots for inputting fuel and/or air. In some cases, a burner head may comprise an even number of slots (e.g., 2, 4, 6, 8, 10 . . . ) for inputting fuel and/or air. In some cases, a burner head may be configured to provide a swirling flow of gases when the fuel and/or air is input trough the one or more slots. In some cases, the burner head may be at least partially enclosed in an insulating material. In some cases, at least one of ammonia, air, and combustion fuel may be preheated through a concentric flow tube positioned inside the one or more combustor tubes by exchanging heat with a combustion product gas. In some cases, pressure drop of an air and/or combustion fuel flow through the burner head is less than about 2 bar. In some cases, pressure drop of an air and/or combustion fuel flow through the burner head is less than about 1 bar. In some cases, pressure drop of an air and/or combustion fuel flow through the burner head is less than about 0.5 bar. Air and/or combustion fuel flow through the burner head is less than about 5, 4, 3, 2, 1, 0.5, 0.4, 0.3, 0.2, or 0.1 bar. In some cases, pressure drop of an air and/or combustion fuel flow through the burner head is greater than about 0.5 bar. air and/or combustion fuel flow through the burner head is less than about 5, 4, 3, 2, 1, 0.5, 0.4, 0.3, 0.2, or 0.1 bar.

Figure 76A:
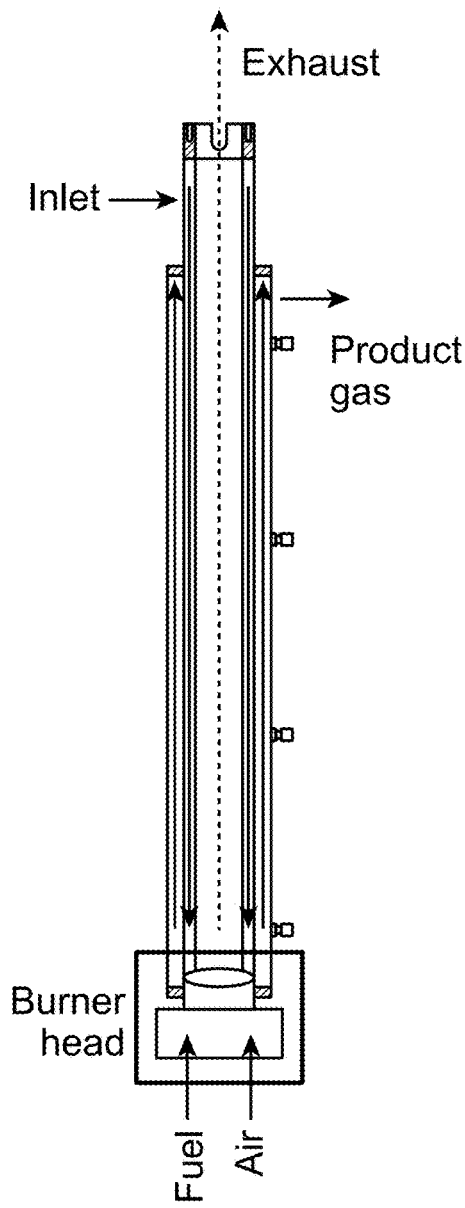
FIGS. 76A-76B show a burner head design, in accordance with one or more embodiments of the present disclosure.
Figure 76B:
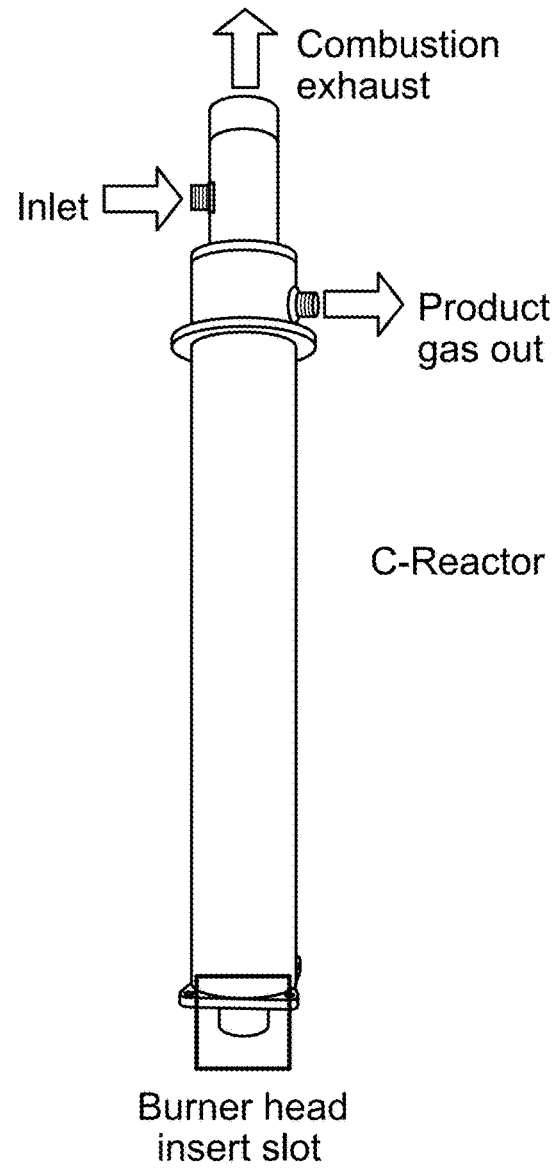

FIGS. 76A-76B show a burner head design, in accordance with one or more embodiments of the present disclosure. In some cases, a burner head may be configured to insert into a combustion reactor. In some cases, a combustion reactor may be configured to insert into a burner head. In some cases, a burner head and an elongated a combustion reactor may couple at an end of the elongated combustion reactor.

Figure 77:
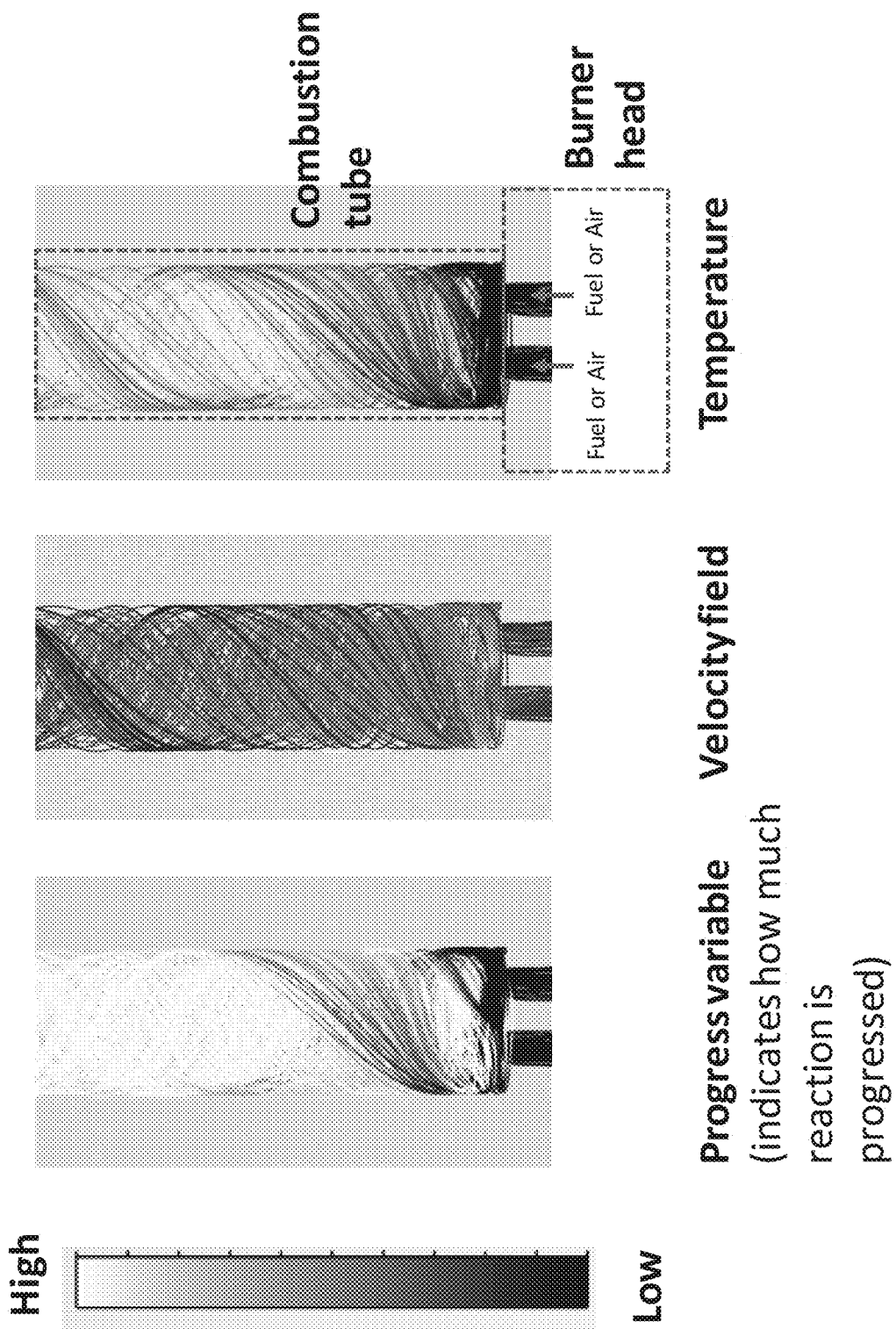
FIG. 77 shows flow simulations in a combustion tube with a burner head, in accordance with one or more embodiments of the present disclosure.

FIG. 77 shows flow simulations in a combustion tube with a burner head, in accordance with one or more embodiments of the present disclosure. Reaction flow simulations were carried out to investigate combustion and reaction characteristics without ammonia reforming. Heat transfer boundary conditions of 900 K and 400 W/m$^2$-K were used. When ammonia reforming is considered in the simulation, the progress variable, the velocity field, and the temperature field may change. Flow field lines are shown without any solid physical boundaries.

Figure 78:
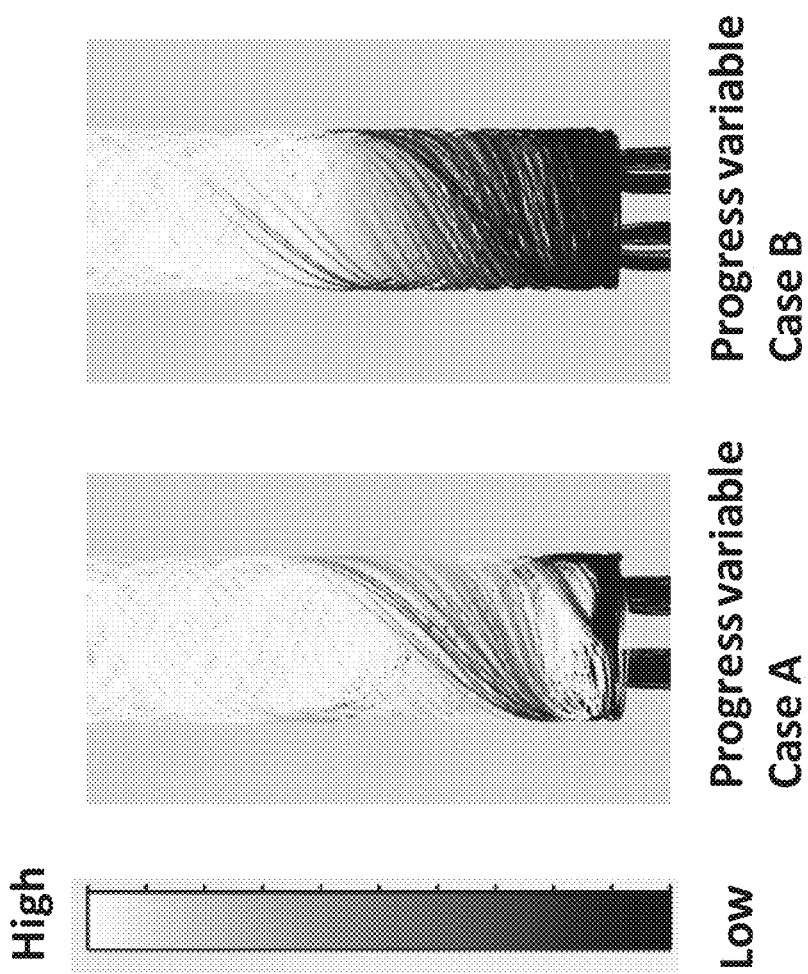
FIG. 78 shows flow simulations in a combustion tube with a burner head, in accordance with one or more embodiments of the present disclosure.
Figure 79:
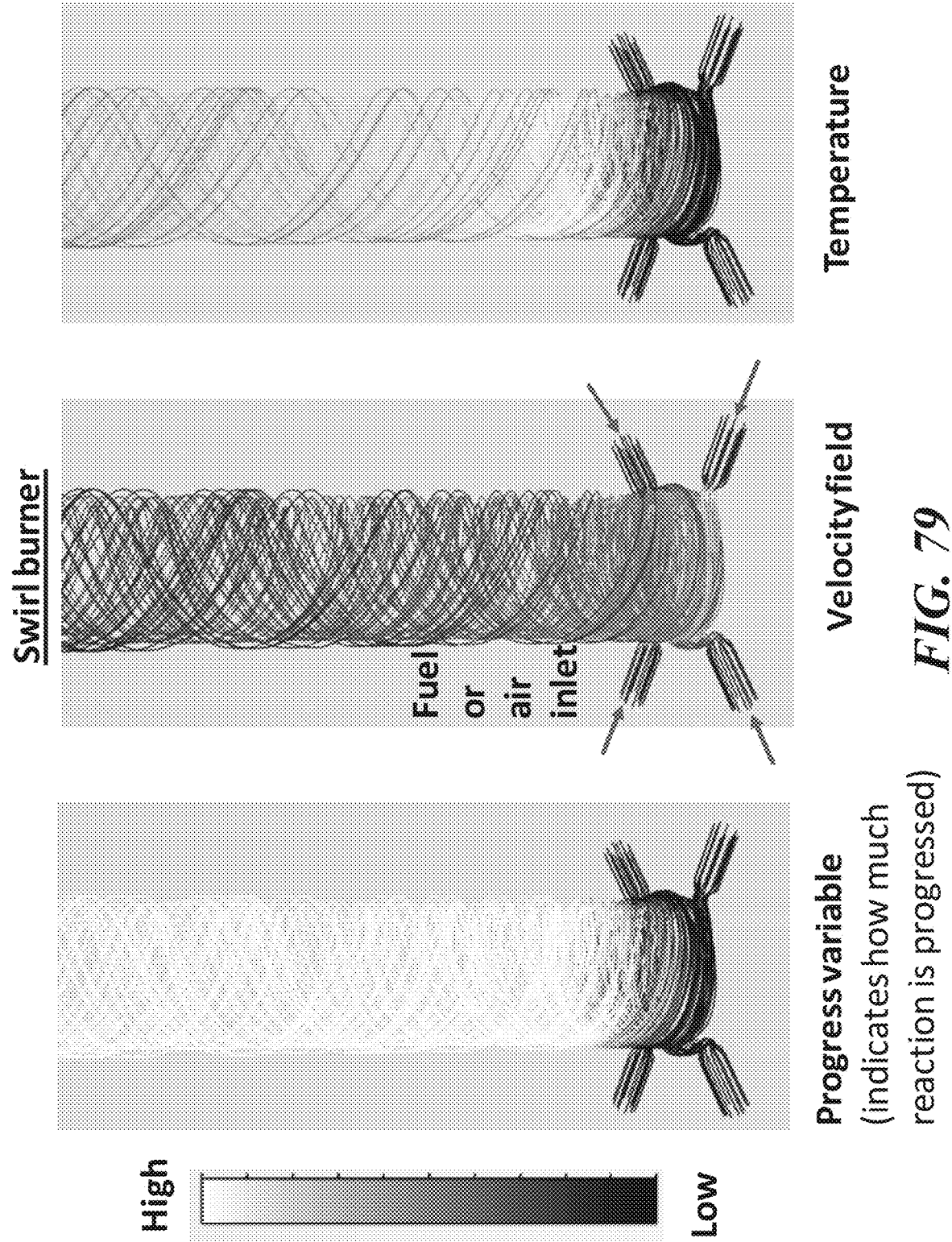
FIG. 79 shows flow simulations in a combustion tube with a burner head, in accordance with one or more embodiments of the present disclosure.

FIG. 78 shows flow simulations in a combustion tube with a burner head, in accordance with one or more embodiments of the present disclosure. Fuel and/or air injection (i) slot size or cross-sectional area, (ii) injection direction or angle, (iii) burner insertion depth, or (iv) gap between the slot and the combustion tube may be optimized to alter the combustion characteristics. FIG. 79 shows flow simulations in a combustion tube with a burner head, in accordance with one or more embodiments of the present disclosure. In some cases, a burner head may comprise one or more fuel or air inlets that are configured to provide a swirling flow in a combustion reactor. In some cases, the one or more fuel or air inlets may be positioned substantially radially symmetrically on a burner head.

Aerial Vehicle

Figure 49:
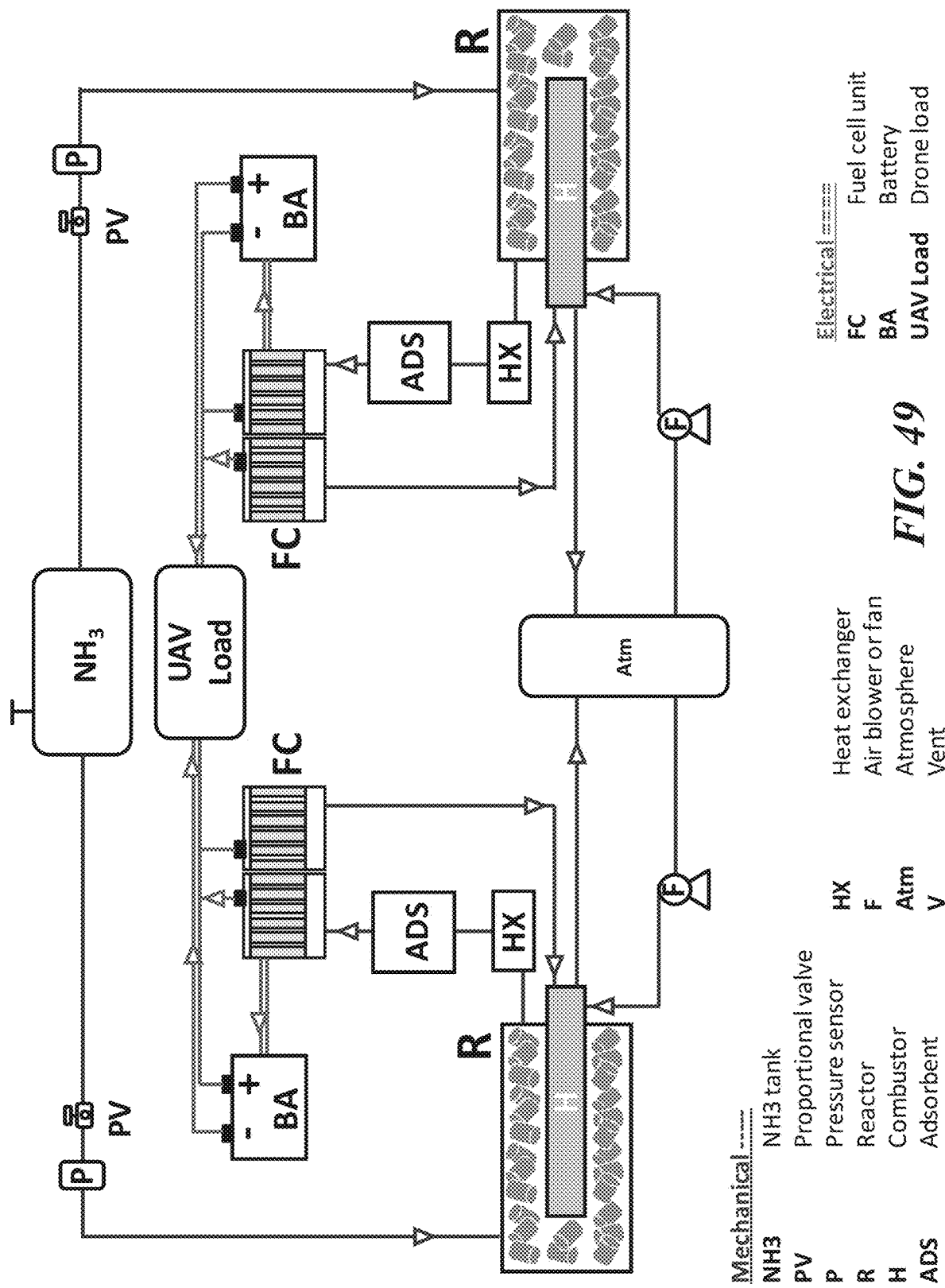
FIG. 49 schematically illustrates an example of a system architectural configuration for an ammonia processing system, in accordance with one or more embodiments of the present disclosure.

FIG. 49 schematically illustrates an example of a system architectural configuration for an ammonia processing system that may be mounted to and used compatibly with an aerial vehicle. The aerial vehicle may comprise an unmanned airborne vehicle (UAV), a drone, a rotor craft, a fixed wing, a flapping-wing, a helicopter, an airplane, or a jet. Table 1 describes each figure element shown in FIG. 49.

TABLE 1

| Description of figure elements in FIG. 49 | |
|---|---|
| Mechanical | |
| NH3 | Ammonia tank |
| PV | Valve |
| P | Pressure Sensor |
| R | Reactor |
| H | Heater or Combustor |
| ADS | Adsorbent |
| HX | Heat Exchanger |
| F | Air Supply Unit |
| Atm | Atmosphere |
| V | Vent |
| Electrical | |
| FC | Fuel Cell |
| BA | Battery |
| UAV Load | Drone Load |

In some cases, the system may comprise one or more reactors (R) configured to partially or fully crack ammonia provided to the one or more reactors to yield hydrogen, nitrogen, and/or ammonia. In some cases, a system may comprise one or more fuel cells (FC) in fluid communication with the one or more reactors. In some cases, the one or more fuel cells are configured to receive and process the hydrogen from the one or more reactors to generate electrical energy. In some cases, the one or more reactors and the one or more fuel cells may be configured to be mounted on or to an aerial vehicle. In some cases, the one or more fuel cells are in electrical communication with one or more motors or drive units of the aerial vehicle to drive the one or more motors or drive units of the aerial vehicle. The drive units may comprise, for example, one or more rotors or propellers.

In some cases, the one or more reactors may be configured to be mounted to an aerial vehicle. In some cases, the one or more fuel cells may be configured to be mounted to an aerial vehicle. In some cases, the one or more reactors and the one or more fuel cells may be configured to be mounted to an aerial vehicle. In some cases, the one or more motors or drive units may be configured to be mounted to an aerial vehicle.

Figure 50:
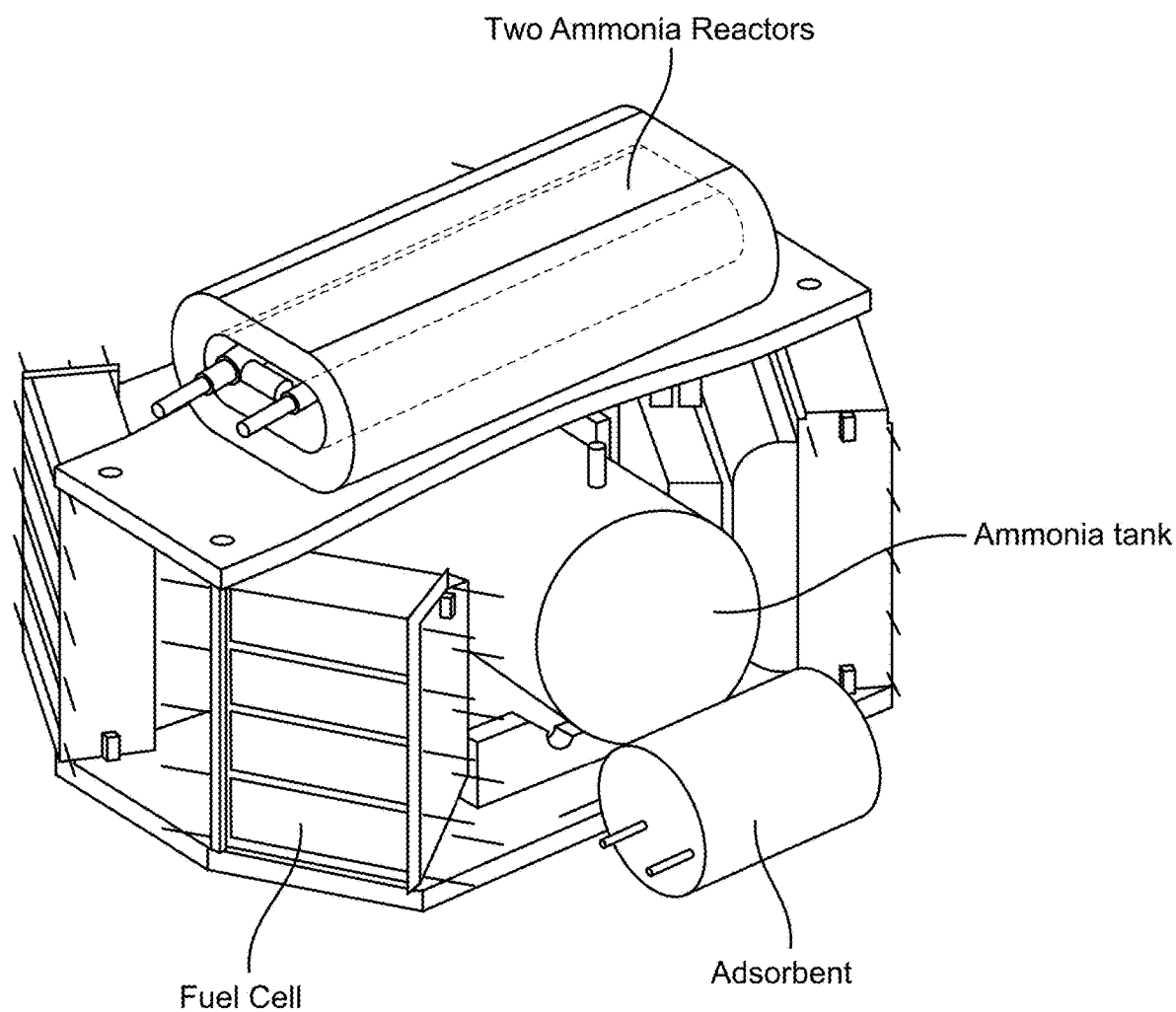
FIG. 50 shows a digital rendition of an ammonia powerpack system mounted on an aerial vehicle, in accordance with one or more embodiments of the present disclosure.

In another aspect, the present disclosure provides an ammonia power pack system that may be mounted to an aerial vehicle to power one or more motors or drive units of the aerial vehicle. In some cases, the ammonia powerpack system may have an optimized physical layout and/or packaging. FIG. 50 shows a digital rendition of an ammonia powerpack system, in accordance with one or more embodiments of the present disclosure. This rendition shows an embodiment where a plurality of fuel cells, an ammonia tank, and one or more adsorbents are mounted on a first stage, and one or more ammonia reactors are mounted on a second stage above the first stage. The aforementioned components and their assembly may be engineered so that the weight and the volume of the whole system is at most about 25 kilograms (kg). In some cases, the total weight of the system, including the weight of ammonia on a full tank, may be between about 24 kg and about 25 kg. In some cases, the total weight of the system may be between about 20 kg and about 30 kg. In some cases, the total weight of the system may be between about 10 kg and about 40 kg. In some cases, the total weight of the system may be at most about 25 kg. In some cases, the total weight of the system may be at most about 100 kg. In some cases, the total volume of the system may be between about 35 L and about 37 L. The total volume may be construed as the volume of fluid that is displaced when an object is fully immersed in the fluid. The total volume may be construed as the sum of the volume of individual components and/or hardware of the system. In some cases, the total volume of the system may be between about 30 L and about 40 L. In some cases, the total volume of the system may be between about 20 L and about 50 L. In some cases, the total volume of the system may at most about 40 L. In some cases, the total volume of the system may be at most about 200 L. In some cases, the total volume of the system may be between about 200 L and about 1000 L.

Figure 51:
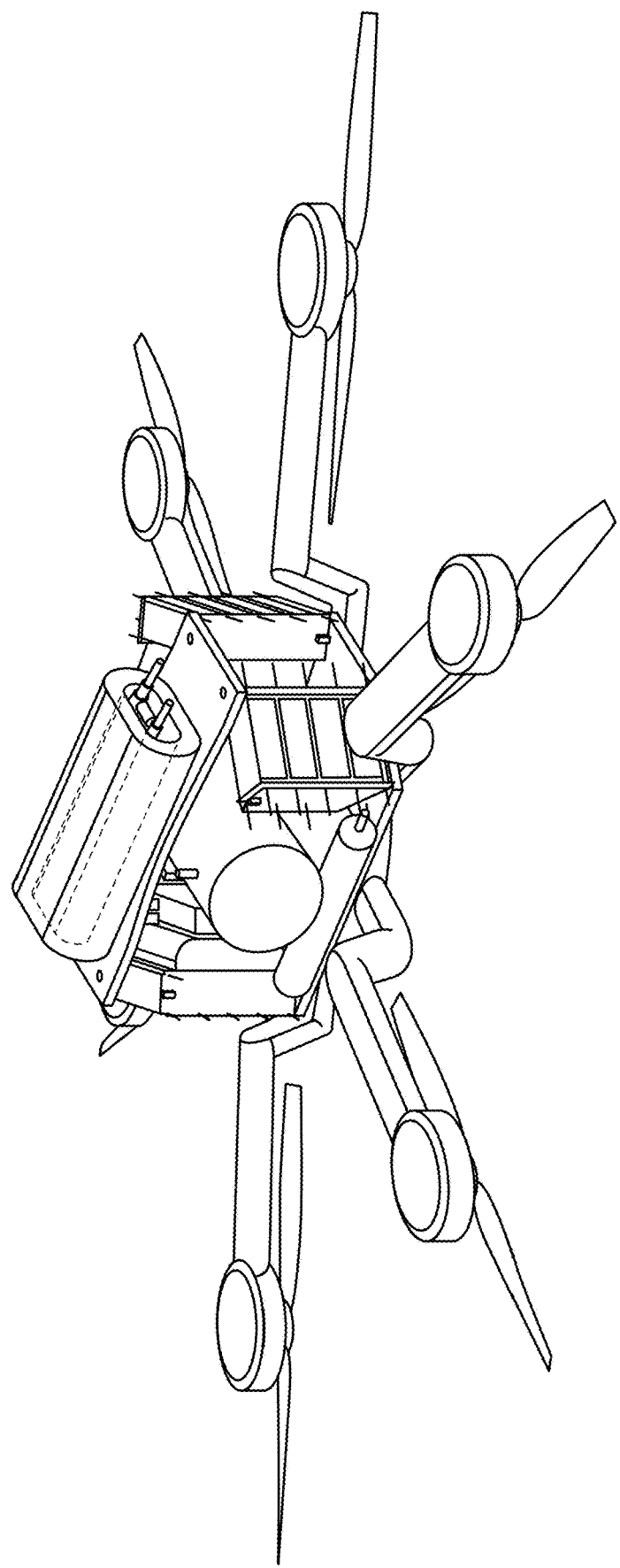
FIG. 51 shows a digital rendition of an ammonia powerpack system mounted on an aerial vehicle, in accordance with one or more embodiments of the present disclosure.

In some cases, the components may be arranged to allow easy access to the ammonia tank so that a user may easily exchange a tank with a full or a partially filled tank or fill the tank with ammonia on demand. The components may also be arranged symmetrically, so that the weight distribution of the system is balanced when mounted on the aerial device. FIG. 51 shows a digital rendition of an ammonia powerpack system mounted on an aerial vehicle, in accordance with one or more embodiments of the present disclosure.

Figure 52:
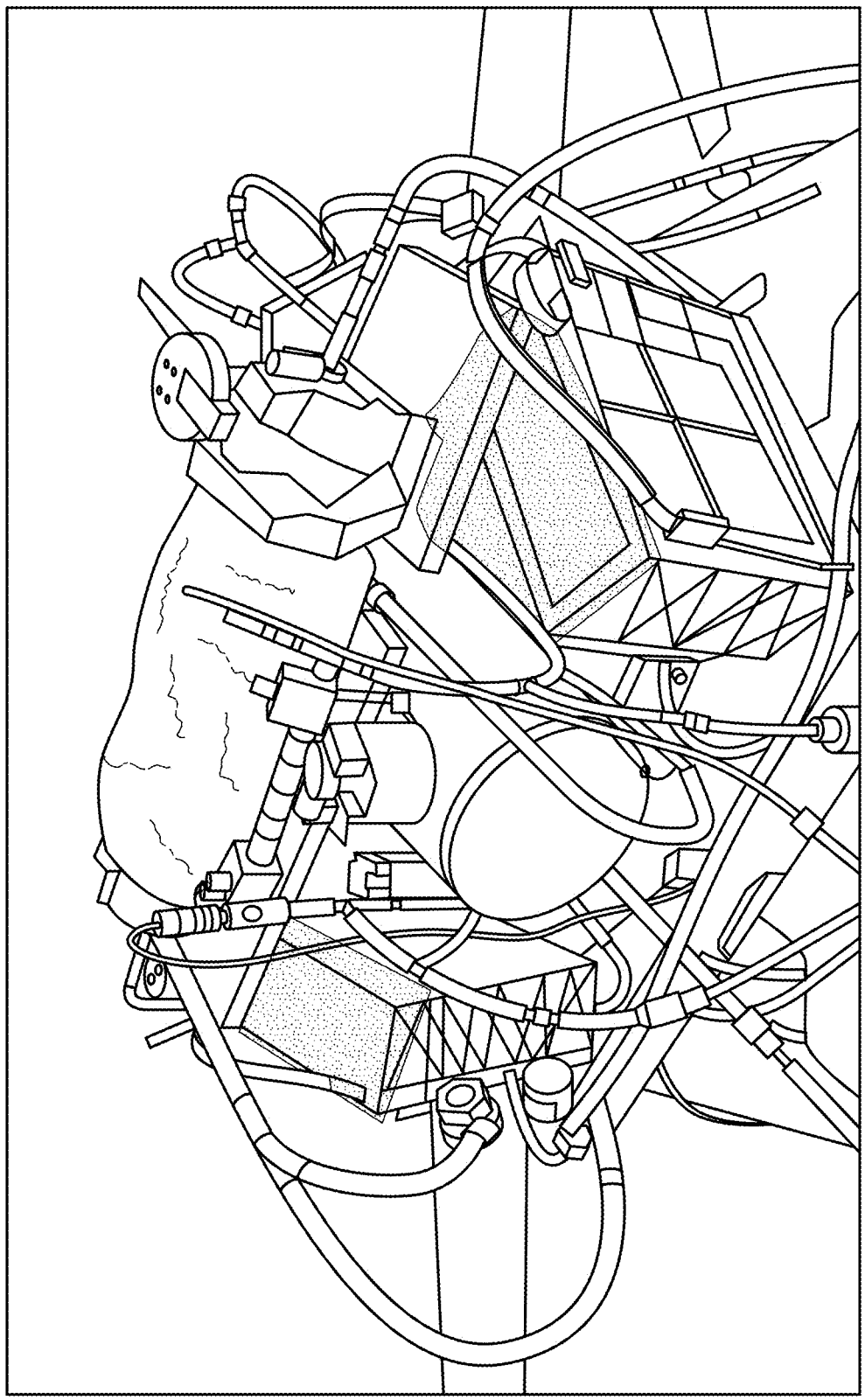
FIG. 52 shows an ammonia powerpack system mounted on an aerial vehicle, in accordance with one or more embodiments of the present disclosure.
Figure 53:
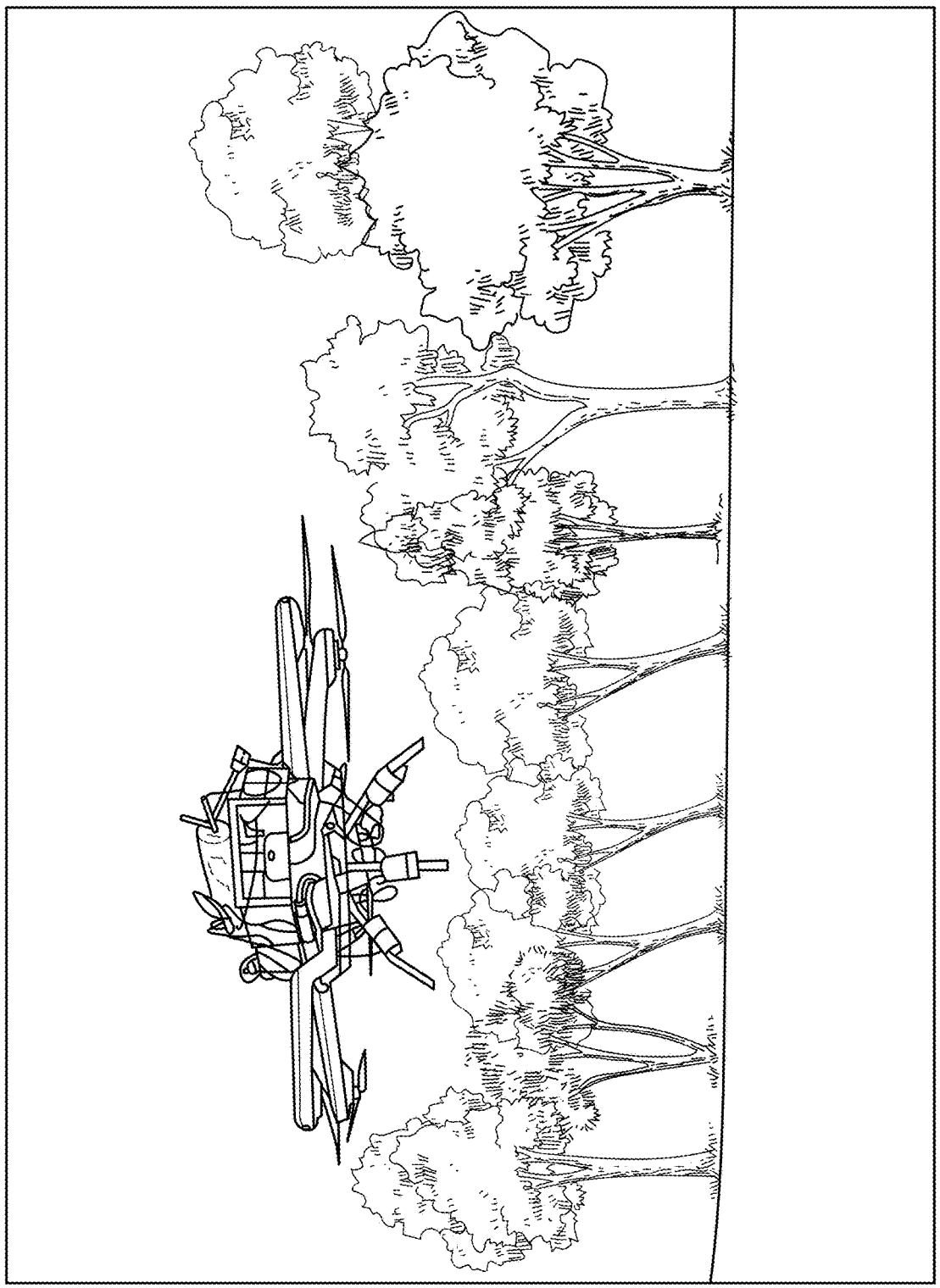
FIG. 53 shows an aerial vehicle in flight while being powered by an ammonia powerpack system, in accordance with one or more embodiments of the present disclosure.

FIG. 52 shows a photograph of an aerial vehicle with the ammonia powerpack system mounted thereon. Flight tests were conducted with the aerial system to measure the flight duration and the power output of the ammonia powerpack system. FIG. 53 shows a photograph of the aerial vehicle during flight. The specifications of the vehicle are shown below in Table 2.

TABLE 2

Specifications of the ammonia powerpack for the ammonia powerpack system.

| | |
|---|---|
| Maximum Power | 5 kW (at 100% Hydrogen Utilization by Fuel Cells) |
| Weight | 25 kg |
| Volume | 36 L |
| Fuel Capacity | 16 liters tank volume/8.6 kg of Ammonia at full loading |
| System Energy Density | 655 Wh/kg and 447 Wh/L (electrical) |
| Conversion Efficiency (Ammonia Lower Heating Value to Electricity) | >35% |
| Percent Contribution of Ammonia Powerpack to Total Power | 70% on average (peak contribution >85%) |

Figure 54:
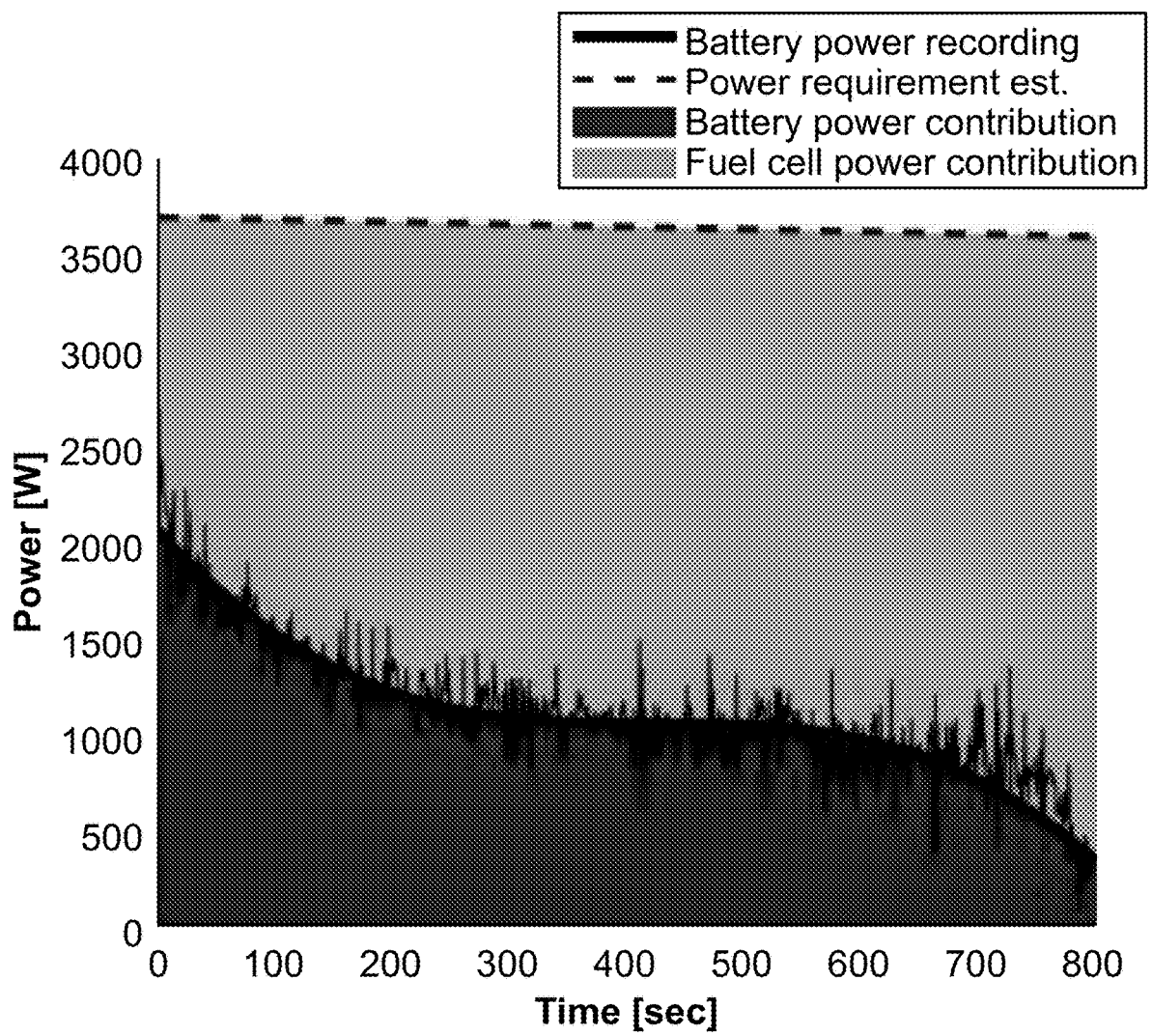
FIG. 54 shows a power profile of an aerial vehicle comprising an ammonia powerpack system, in accordance with one or more embodiments of the present disclosure.

FIG. 54 shows a test result of the aerial system through 800 seconds of flight. The total power requirement of the system was kept substantially steady over time, at about 3600 Watts. The power output of the battery and the ammonia powerpack system were modulated so that the contribution of the battery decreased overtime while the total power output was maintained substantially the same.

In some cases, the ammonia processing and the ammonia powerpack system may be sized to satisfy 100% of the power requirements of a load (e.g., the aerial vehicle). In some cases, the ammonia processing and the ammonia powerpack system may be sized to satisfy 100% of the power requirements of a load (e.g., the aerial vehicle), and generate additional energy to be able to charge an on-board auxiliary battery.

In some cases, the ammonia processing and the ammonia powerpack system may have an energy density of at least about 650-watt hours per kilogram (Wh/kg). In some cases, the ammonia processing and the ammonia powerpack system may have an energy density of at least about 100, 200, 300, 400, 500, 600, 700, 800, 900, 1000, 2000, 3000, 4000, 5000, or 6000 watt hours per kilogram. In some cases, the ammonia processing and the ammonia powerpack system may have an energy density of at most about 100, 200, 300, 400, 500, 600, 700, 800, 900, 1000, 2000, 3000, 4000, 5000, or 6000 watt hours per kilogram.

In some cases, the ammonia processing and the ammonia powerpack system may have an energy density of at least about 400 watt hours per liter (Wh/L). In some cases, the ammonia processing and the ammonia powerpack system may have an energy density of at least about 100, 200, 300, 400, 500, 600, 700, 800, 900, 1000, 2000, 3000, or 4000 watt hours per liter. In some cases, the ammonia processing and the ammonia powerpack system may have an energy density of at most about 100, 200, 300, 400, 500, 600, 700, 800, 900, 1000, 2000, 3000, or 4000 watt hours per liter.

Figure 81A:
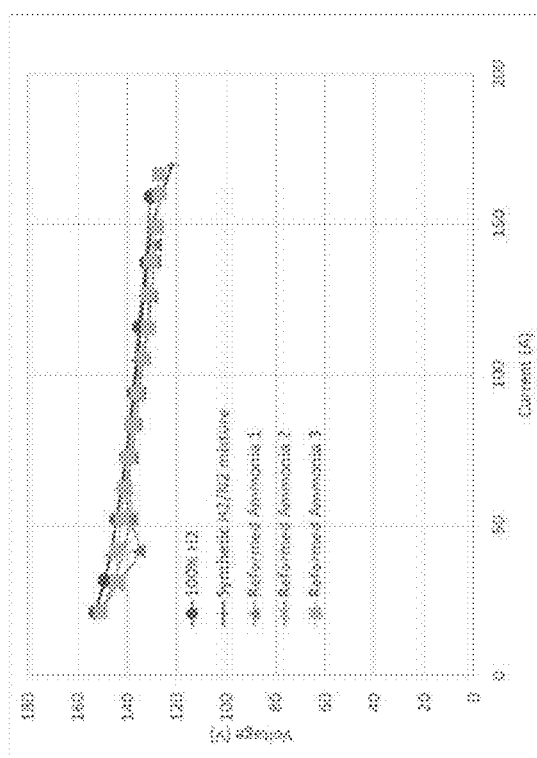
FIGS. 81A-81B show voltage versus current and power versus current, respectively, for an integrated powerpack with a fuel cell.
Figure 81B:
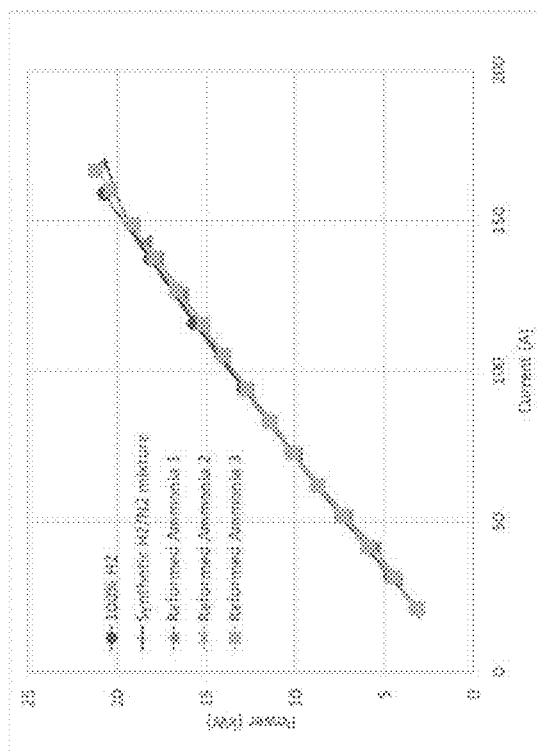

FIGS. 81A-81B show voltage versus current and power versus current, respectively, for an integrated powerpack with a fuel cell. The fuel cell generated over 20 kilowatts of electricity using product gas from a system comprising three electrical reactors and three combustor reactors. In some embodiments, a system may comprise one or more pairs of electrical reactor-combustion reactor modules. In some embodiments, a pair of electrical reactor-combustion reactor modules may comprise an electrical reactor and a combustion reactor connected in series flow. In some embodiments, at least two pairs of electrical reactor-combustion reactor modules may be connected in parallel flow. Pure hydrogen and synthetic hydrogen/nitrogen mixture experimental results performed at steady state are also shown for comparison. Slight voltage drop for the integrated reformed ammonia fuel cell runs compared to the pure $H_2$ and synthetic mixture runs may occur due to fuel cell cold start. Three different runs were performed using reformed ammonia product gas. Fuel cell exit flows were supplied to the combustion heaters. The system maintained auto-thermal reforming.

In some cases, the energy density of the system may be defined as a ratio between the amount of energy available in ammonia, wherein the ammonia is stored within the system. In some cases, the energy density of the system may be defined as a ratio between the amount of energy available in ammonia that is convertible to usable electricity, wherein the ammonia is stored within the system. In some cases, the energy density of the system may be defined as a ratio between the amount of energy available in ammonia that is convertible to usable hydrogen energy, wherein the ammonia is stored within the system. In some cases, the system may refer to one or more ammonia tanks and one or more reactors. In some cases, the system may refer to one or more ammonia tanks, one or more reactors, and one or more fuel cells. In some cases, the system may refer to one or more ammonia tanks, one or more reactors, one or more fuel cells, and various other components coupled thereto (e.g., combustors, adsorbents, heat exchanger, electrical components, or any other components disclosed herein).

Each of the one or more reactors may be configured to crack various amounts of ammonia per unit time. The amount of ammonia that is cracked may be based at least partially on the size of the aerial vehicle, the weight of the aerial vehicle, whether the aerial vehicle is moving or stationary, or any combination thereof. In some cases, each of the one or more reactors may be configured to crack at least about 30 liters of ammonia per minute (e.g., at about standard temperature and pressure). In some cases, each of the one or more reactors may be configured to crack about 30 to 100 liters of ammonia per minute (e.g., at about standard temperature and pressure). In some cases, each of the one or more reactors may be configured to crack about 100 to 300 liters of ammonia per minute (e.g., at about standard temperature and pressure). In some cases, each of the one or more reactors may be configured to crack at most about 1000 liters of ammonia per minute (e.g., at about standard temperature and pressure). In some cases, each of the one or more reactors may be configured to crack at most about 5000 liters of ammonia per minute (e.g., at about standard temperature and pressure).

The one or more reactors may be mounted to any side of the aerial vehicle, or to one or more sides of the aerial vehicle, e.g., a front side, rear side, lateral side, top side, or bottom side of the aerial vehicle. As used herein, terms denoting an orientation or a direction (e.g., "front", "rear", "lateral", "top", "bottom") may be referential to an axis of longest dimension in a body and/or gravity or center of gravity. For instance, in an aerial vehicle, an orientation or a direction may be referential to the longest dimension of the aerial vehicle and/or gravity. In another example, in an aerial vehicle comprising a body that is radially symmetrical such that the aerial vehicle comprises more than one axes of longest dimension the body, an orientation or a direction may be referential to any one of the axes.

In some cases, the one or more reactors may be mounted between two adjacent sides of the aerial vehicle. In some cases, the one or more reactors may be mounted all on one side. In some cases, the one or more reactors may be mounted on multiple sides. The one or more reactors may be oriented to receive a flow of ammonia from a tank that is located on the front of the aerial vehicle, behind the aerial vehicle, or from the lateral sides of the aerial vehicle. The one or more reactors may be oriented to output a flow of hydrogen, nitrogen, and/or trace ammonia towards one or more adsorbents, heat exchangers, and/or fuel cells positioned on the front of the aerial vehicle, behind the aerial vehicle, on a lateral side of the aerial vehicle, on the bottom of the aerial vehicle, or on the top of the aerial vehicle. The one or more reactors may be mounted onto another component that is mounted on the aerial vehicle. In some cases, the one or more reactors may comprise two or more startup reactors and two or more main reactors. In some cases, the ammonia tank may be in fluid communication with one or more heat exchangers to vaporize the ammonia and/or to heat up the ammonia. In some cases, the vaporized ammonia gas may be supplied to the one or more reactors.

The one or more fuel cells may be mounted to any side of the aerial vehicle, or to one or more sides of the aerial vehicle, e.g., a front side, rear side, lateral side, top side, or bottom side of the vehicle. In some cases, the one or more fuel cells may be mounted between two adjacent sides of the aerial vehicle. In some cases, the one or more fuel cells may be mounted all on one side. In some cases, the one or more fuel cells may be mounted on multiple sides. In some cases, the one or more fuel cells may be oriented to receive a flow comprising hydrogen and/or nitrogen from one or more reactors or one or more adsorbents that are positioned on the front of the aerial vehicle, behind the aerial vehicle, on a lateral side of the aerial vehicle, on the bottom of the aerial vehicle, or on the top of the aerial vehicle. The one or more fuel cells may be oriented to output a flow comprising hydrogen and/or nitrogen towards one or more reactors or one or more combustors that are positioned on the front of the aerial vehicle, behind the aerial vehicle, on a lateral side of the aerial vehicle, on the bottom of the aerial vehicle, or on the top of the aerial vehicle. The one or more fuel cells may be mounted onto another component that is mounted on the aerial vehicle.

The one or more motors or drive units may be mounted to any side of the aerial vehicle, or to one or more sides of the aerial vehicle, e.g., a front side, rear side, lateral side, top side, or bottom side of the vehicle. In some cases, the one or more motors or drive units may be mounted between two adjacent sides of the aerial vehicle. In some cases, the one or more motors or drive units may be mounted all on one side. In some cases, the one or more motors or drive units may be mounted on multiple sides. The one or more motors or drive units may be oriented to exert force on the aerial vehicle in any direction, for example, to exert force in a forward direction, in a backward direction, in a sideways direction, in a vertical direction, a radial direction, or any combination thereof. The one or more motors or drive units may be oriented to move the aerial vehicle in any direction, for example, to move in a forward direction, in a backward direction, in a sideways direction, in a vertical direction, in a radial direction, or any combination thereof. The one or more motors or drive units may be mounted onto another component that is mounted on the aerial vehicle.

In some cases, the system may further comprise one or more adsorbents in fluid communication with the one or more reactors. In some cases, the one or more adsorbents may be configured to process an exit flow from the one or more reactors to filter out or remove ammonia from the exit flow. In some cases, the one or more adsorbents may be configured to process an exit flow from the one or more reactors to filter out or remove nitrogen from the exit flow. In some cases, the exit flow comprises hydrogen and/or nitrogen. In some cases, the adsorbents may be in fluid communication with the one or more fuel cells. In some cases, the adsorbents are configured to direct the hydrogen and/or the nitrogen to the one or more fuel cells after filtering out or removing the ammonia from the exit flow of the one or more reactors.

The one or more adsorbents may be mounted to any side of the aerial vehicle, or to one or more sides of the aerial vehicle, e.g., a front side, rear side, lateral side, top side, or bottom side of the vehicle. In some cases, the one or more adsorbents may be mounted between two adjacent sides of the aerial vehicle. In some cases, the one or more adsorbents may be mounted all on one side. In some cases, the one or more adsorbents may be mounted on multiple sides. The one or more adsorbents may be oriented to receive a flow comprising hydrogen, ammonia, nitrogen, or any combination thereof from one or more reactors, one or more combustors, or one or more fuel cells positioned on the front of the aerial vehicle, behind the aerial vehicle, on a lateral side of the aerial vehicle, on the bottom of the aerial vehicle, or on the top of the aerial vehicle. The one or more adsorbents may be oriented to output a flow comprising hydrogen and/or nitrogen both towards one or more fuel cells or one or more combustors positioned on the front of the aerial vehicle, behind the aerial vehicle, on a lateral side of the aerial vehicle, on the bottom of the aerial vehicle, or on the top of the aerial vehicle. The one or more adsorbents may be mounted onto another component that is mounted on the aerial vehicle.

In some cases, the system may further comprise one or more combustors in fluid communication with the one or more fuel cells. In some cases, the one or more combustors are configured to combust an exit flow from the one or more fuel cells to heat the one or more reactors. In some cases, the one or more combustors may be configured to combust a flow from the ammonia tank, an exit flow from the one or more reactors, an exit flow from the one or more fuel cells, or any combination thereof.

In some cases, the system may further comprise a selective catalytic reduction (SCR) system configured to remove nitrous oxides (NOx) from one or more combustion exhaust streams. In some cases, the SCR system receives ammonia from the one or more ammonia tanks.

The one or more combustors may be mounted to any side of the aerial vehicle, or to one or more sides of the aerial vehicle, e.g., a front side, rear side, lateral side, top side, or bottom side of the vehicle. In some cases, the one or more combustors may be mounted between two adjacent sides of the aerial vehicle. In some cases, the one or more combustors may be mounted all on one side. In some cases, the one or more combustors may be mounted on multiple sides. The one or more combustors may be oriented to receive a flow comprising hydrogen and/or nitrogen from one or more reactors, one or more adsorbents, or one or more fuel cells positioned on the front of the aerial vehicle, behind the aerial vehicle, on a lateral side of the aerial vehicle, on the bottom of the aerial vehicle, or on the top of the aerial vehicle. The one or more combustors may be oriented to output a flow comprising combustion byproducts to an ambient environment. The one or more combustors may be mounted onto another component that is mounted on the aerial vehicle.

In some cases, one or more electrical heaters may be used inside the one or more reactors. In some cases, the one or more electrical heaters may be used in addition to the one or more combustors in the one or more reactors.

In some cases, the system may further comprise one or more fuel storage tanks mounted on the aerial vehicle. In some cases, the fuel storage tanks are in fluid communication with the one or more reactors to provide the ammonia to the one or more reactors for cracking or decomposition of the ammonia. In some cases, the one or more fuel storage tank may be in fluid communication with the one or more heat exchangers to vaporize and heat up the ammonia. In some cases, the vaporized ammonia gas may be provided to the one or more reactors to crack or decompose the ammonia.

The one or more fuel storage tanks may be mounted to any side of the aerial vehicle, or to one or more sides of the aerial vehicle, e.g., a front side, rear side, lateral side, top side, or bottom side of the vehicle. In some cases, the one or more fuel storage tanks may be mounted between two adjacent sides of the aerial vehicle. In some cases, the one or more fuel storage tanks may be mounted all on one side. In some cases, the one or more storage tanks may be mounted on multiple sides. In some cases, the one or more fuel storage tanks may be oriented to output a flow comprising ammonia towards one or more reactors positioned on the front of the aerial vehicle, behind the aerial vehicle, on a lateral side of the aerial vehicle, on the bottom of the aerial vehicle, or on the top of the aerial vehicle. In some cases, the one or more fuel storage tanks may be oriented to output a flow comprising ammonia towards one or more heat exchangers positioned on the front of the aerial vehicle, behind the aerial vehicle, on a lateral side of the aerial vehicle, on the bottom of the aerial vehicle, or on the top of the aerial vehicle. The one or more fuel storage tanks may be mounted onto another component that is mounted on the aerial vehicle.

In some cases, the system may further comprise one or more heat exchangers for cooling an exit flow of the one or more reactors. In some cases, the one or more heat exchangers may be in thermal communication with an exit flow from the one or more fuel cells to cool the heat exchangers and/or the exit flow from the one or more reactors. The exit flow from the one or more fuel cells may comprise air or oxygen.

The one or more heat exchangers may be mounted to any side of the aerial vehicle, or to one or more sides of the aerial vehicle, e.g., a front side, rear side, lateral side, top side, or bottom side of the vehicle. In some cases, the one or more heat exchangers may be mounted between two adjacent sides of the aerial vehicle. In some cases, the one or more heat exchangers may be mounted all on one side. In some cases, the one or more heat exchangers may be mounted on multiple sides. The one or more heat exchangers may be oriented to receive a flow comprising hydrogen and/or nitrogen from one or more reactors, one or more combustors, one or more fuel cells, or one or more adsorbents mounted on the front of the aerial vehicle, behind the aerial vehicle, on a lateral side of the aerial vehicle, on the bottom of the aerial vehicle, or on the top of the aerial vehicle. The one or more heat exchangers may be oriented to output a flow comprising hydrogen and/or nitrogen towards one or more reactors, one or more combustors, one or more fuel cells, or one or more adsorbents mounted on the front of the aerial vehicle, behind the aerial vehicle, on a lateral side of the aerial vehicle, on the bottom of the aerial vehicle, or on the top of the aerial vehicle. The one or more heat exchangers may be mounted onto another component that is mounted on the aerial vehicle.

In some cases, the one or more heat exchangers may be oriented to receive a flow comprising ammonia from one or more ammonia storage tanks mounted on the front of the aerial vehicle, behind the aerial vehicle, on a lateral side of the aerial vehicle, on the bottom of the aerial vehicle, or on the top of the aerial vehicle. The one or more heat exchangers may be oriented to output a flow comprising ammonia towards one or more reactors and/or one or more combustors mounted on the front of the aerial vehicle, behind the aerial vehicle, on a lateral side of the aerial vehicle, on the bottom of the aerial vehicle, or on the top of the aerial vehicle. The one or more heat exchangers may be mounted onto another component that is mounted on the aerial vehicle.

In some cases, the one or more fuel cells may be in communication with an electrical load. In some cases, the electrical load may comprise the one or more motors or drive units of the aerial vehicle. In some cases, the electrical load may be one or more auxiliary electrical batteries. In some cases, the one or more fuel cells may charge one or more electrical batteries.

In some cases, the one or more fuel cells may be in thermal communication with the one or more fuel storage tanks to facilitate a transfer of thermal energy from the fuel cells to the fuel storage tanks to heat the fuel storage tanks for ammonia evaporation. In some cases, the one or more fuel cells may be in thermal communication with the one or more air-cooled heat exchangers to facilitate a heat rejection to an ambient environment. In some cases, the one or more fuel cells may be in thermal communication with the one or more heat exchangers to facilitate a transfer of thermal energy from the fuel cells to evaporate one or more liquid or liquid/gas two phase ammonia flows.

In some cases, the system may further comprise a controller configured to control a flow of the ammonia provided to the one or more reactors based on a desired power output from the one or more fuel cells. In some cases, the desired power output may be based at least partially on a user input for controlling the aerial vehicle. In some cases, the desired power output may be based at least partially on a power output required to maintain the aerial vehicle at a stationary position or to move the aerial vehicle. In some cases, the controller may be configured to shut off the one or more ammonia flows.

In some cases, the system may further comprise a controller operatively coupled to one or more valves for controlling (i) a flow of the ammonia to the one or more reactors or (ii) a flow of hydrogen to the one or more fuel cells. In some cases, the controller may be configured to provide dynamic power control by controlling an operation of the one or more valves. In some cases, the controller may be configured to modulate the one or more valves connected to an ammonia storage tank to maintain or reach a threshold pressure point and increase ammonia flow rate and power output. In some cases, the ammonia flow rate is correlated to a flow pressure of the ammonia. In some cases, the controller may be configured to modulate the one or more valves (e.g., solenoid valves) connected to an ammonia storage tank to maintain or reach a threshold flow rate.

In some cases, the system may further comprise a controller and one or more sensors operatively coupled to the controller. In some cases, the controller is configured to monitor a temperature of the one or more reactors, a flow pressure of the ammonia, and/or an electrical output of the one or more fuel cells based on one or more measurements obtained using the one or more sensors. In some cases, the controller may be configured to monitor a flow rate of the one or more ammonia flow using a mass flow meter or a mass flow controller.

In some cases, the controller may be configured to increase an air supply unit power to increase the air flow rate to one or more combustors of the one or more reactors when a temperature of the one or more reactors decreases or falls below a threshold temperature. In some cases, the threshold temperature may be about 600° C. In some cases, the threshold temperature may be between about 550° C. to about 650° C. In some cases, the threshold temperature may be between about 450° C. to about 700° C. In some cases, the threshold temperature may be about 800° C. In some cases, the threshold temperature may be about 300° C. to about 450° C.

In some cases, the system may further comprise an auxiliary electrical battery for powering the one or more motors or drive units of the aerial vehicle. In some cases, the desired power output may be met with power contributions from the one or more fuel cells and a second power source. In some cases, the flow of ammonia provided to the one or more reactors may be controlled so that the total amount of power generated by the one or more fuel cells and the second power source meets the desired power output. In some cases, the second power source may comprise an auxiliary electrical battery.

In some cases, the system may comprise a startup reactor. In some cases, the startup reactor may be configured to crack at least a portion of the ammonia provided to the one or more reactors to yield hydrogen, nitrogen, and/or ammonia. In some cases, the startup reactor maybe in fluid communication with the main reactor and/or combustor. In some cases, the main reactor is configured to combust at least a portion of an exit flow from the startup reactor to heat or pre-heat the main reactor. In some cases, the exit flow from the startup reactor may comprise hydrogen and at least one of ammonia or nitrogen.

In some cases, the ammonia powerpack system may follow a startup sequence. In some cases, the startup sequence may comprise a step for heating one or more reactors. In some cases, the startup sequence may comprise a step for heating a startup reactor. In some cases, heating of the one or more reactors or the startup reactor may be performed using an external power source or by combusting a fuel. In some cases, the external power source may be a battery (e.g., a chemical battery or an electrical battery). In some cases, the fuel may be hydrogen, gasoline, diesel, methanol, ethanol, biodiesel, propane, butane, or any other type of combustible material. In some cases, the external power source may be electricity from a grid.

In some cases, the startup sequence may comprise a step for providing a flow of ammonia ($NH_3$) to the one or more reactors and/or the startup reactor to partially or fully crack the $NH_3$ flow using the one or more reactors or a startup reactor.

In some cases, the startup sequence may comprise a step for heating the one or more combustors of the main reactor by combusting an output flow from the startup reactor. In some cases, the output flow from the startup reactor may comprise hydrogen and/or nitrogen. In some cases, the output flow may further comprise ammonia.

In some cases, the startup sequence may comprise a step for changing (e.g., increasing or decreasing) an $NH_3$ flowrate to the one or more reactors. In some cases, changing the $NH_3$ flowrate to the one or more reactors changes the amount of $NH_3$ converted to generated hydrogen. In some cases, changing an $NH_3$ flowrate to the one or more reactors may control the amount of hydrogen fed to the one or more fuel cells. In some cases, changing an $NH_3$ flowrate to the one or more reactors may control (i) the amount of hydrogen produced or the rate at which hydrogen is produced using the one or more reactors, and/or (ii) a power output from the one or more fuel cells. In some cases, a flowrate may be changed by modulating a position of a valve between a fully open state and a fully close state. In some cases, a flowrate may be changed using a controller that is operatively coupled to one or more valves.

In some cases, the startup sequence may comprise a step for directing a flow comprising hydrogen and nitrogen to an adsorbent when the one or more reactors reach a target temperature. In some cases, the startup sequence may comprise a step for directing a flow comprising hydrogen and nitrogen to an adsorbent when a target $NH_3$ flowrate range is reached. In some cases, the startup sequence may comprise a step for directing a flow comprising hydrogen and nitrogen to an adsorbent when a target $NH_3$ decomposition rate is reached. In some cases, the startup sequence may comprise a step for directing a flow comprising hydrogen and nitrogen to an adsorbent, then to the one or more fuel cells, and then to the one or more combustors, when (i) the one or more reactors reach a target temperature, (ii) a target $NH_3$ flowrate range is reached, and (iii) a target $NH_3$ decomposition rate is reached.

In some cases, the target temperature may be between about 400° C. and about 600° C. In some cases, the target temperature may be between about 350° C. and about 650° C. In some cases, the target temperature may be at least about 350° C. In some cases, the target temperature may be between about 100° C. and about 600° C. In some cases, the target temperature may be between about 600° C. and about 800° C.

In some cases, the startup sequence may comprise processing hydrogen using the one or more fuel cells to generate electrical energy or electrical power. In some cases, the startup sequence may comprise a step for providing electrical energy or electrical power to a load. In some cases, the load may be one or more motors or drive units for the aerial vehicle. In some cases, the startup sequence may comprise a step for providing electrical energy or electrical power to one or more sensors, one or more components, and/or one or more auxiliary batteries.

Scalable Reactors for Reforming Ammonia

In some aspects, the present disclosure provides a system for processing ammonia. The system may comprise one or more reactors for decomposing ammonia, one or more heating elements positioned in at least one of the one or more reactors, and one or more flow channels provided around or adjacent to the one or more heating elements to enhance flow field and heating uniformity. In some cases, the one or more heating elements may be configured to heat a fluid comprising one or more reforming gases as the fluid flows along the one or more flow channels provided around or adjacent to the one or more heating elements. In some cases, the one or more reforming gases may comprise ammonia. In some cases, the system may further comprise one or more catalysts configured to decompose or crack ammonia when heated by the one or more heating elements. In some cases, the one or more catalysts may be provided outside of or external to the one or more heating elements.

Figures 55A, 55B:
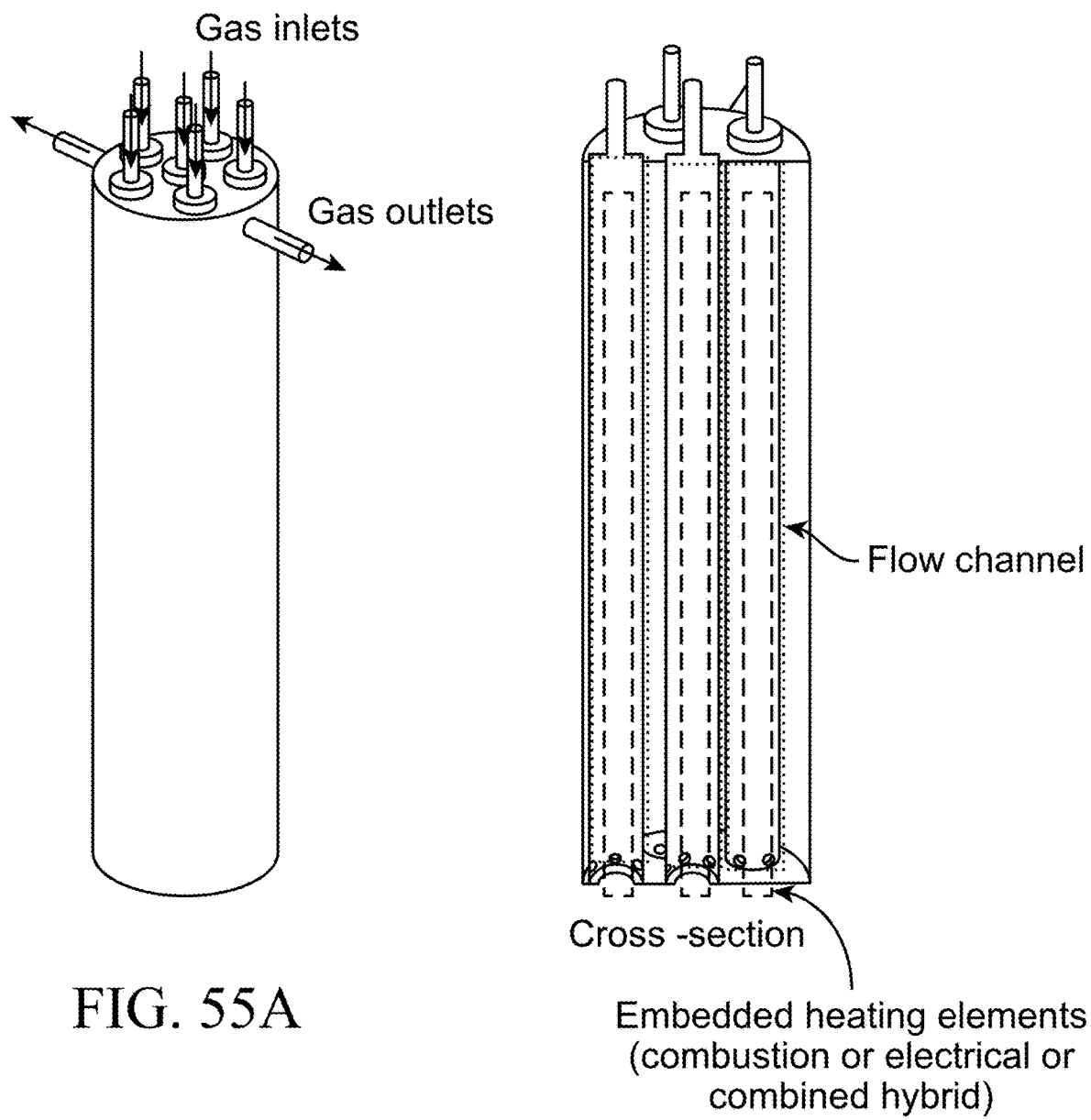
FIGS. 55A and 55B schematically illustrate an outside view and an inside view of a reactor with a circular cross-section, in accordance with one or more embodiments of the present disclosure.

FIGS. 55A and 55B schematically illustrate an outside view and an inside view of a reactor, in accordance with one or more embodiments of the present disclosure. In some cases, the reactor may comprise a plurality of gas inlets and a plurality of gas outlets. In some cases, the gas inlets may be configured to receive ammonia to be decomposed by the reactor. In some cases, the gas outlets may be configured to expel hydrogen, nitrogen, and/or unconverted ammonia. In some cases, the hydrogen and nitrogen expelled through the gas outlets may be derived from the ammonia that is input into the reactor for decomposition or cracking.

In some cases, the reactor may comprise one or more embedded heating elements. In some cases, the one or more embedded heating elements may have a shell or outer surface that is in thermal communication with a fluid flowing through the reactor, which can enable improved heat transfer between (i) the fluid flowing through the reactor (e.g., through one or more flow channels surrounding the embedded heating elements) and (ii) the embedded heating elements. In some cases, the one or more heating elements may be configured to provide a plurality of heating zones within the reactors. In some cases, the plurality of heating zones may have different temperatures that are predetermined or adjustable. In some cases, the embedded heating elements may comprise a combustion heater, an electrical heater, or a hybrid heating element comprising both a combustion heater and an electrical heater. In some cases, embedded heating elements can make reactor systems more compact by minimizing volume requirement for heating elements. In some cases, a hybrid heating element may enable faster startup and response. In some cases, a hybrid heating element may result in reactor systems that are more compact in volume. In some cases, a hybrid heating element may enable easier control of temperature. In some cases, a hybrid heating element may enable a plurality of catalyst materials to be loaded. In some cases, a hybrid heating element may be used to control temperatures for a plurality of regions.

In some cases, the embedded heating elements may comprise different types of heaters with different startup and response times. For example, an electrical heater may have a faster response or heating time than a combustion heater. Though a combustion heater may be used for heating, during reactor startup an electrical heater may be able to generate heat quicker than the combustion heater. In some cases, the electrical heater may generate heat to raise the reactor temperature to an ideal temperature range quickly. In some cases, when there are sudden temperature changes, the rate of heat generation of the electrical heater may be modulated to respond to the sudden temperature changes quickly. In some cases, the combustion heater may generate heat or thermal energy quickly and respond to the sudden temperature changes quickly by supplying additional air to the combustor. In some cases, the embedded heating elements described herein may comprise both a combustion heater and an electrical heater. In some cases, one or more reactors with the one or more embedded electrical heaters may be connected in series or parallel with one or more reactors with the one or more embedded combustion heaters. In any of the embodiments described herein, a combustion heater and an electrical heater may be arranged spatially in series or spatially in parallel along a longitudinal axis of a respective reactor.

Figure 60:
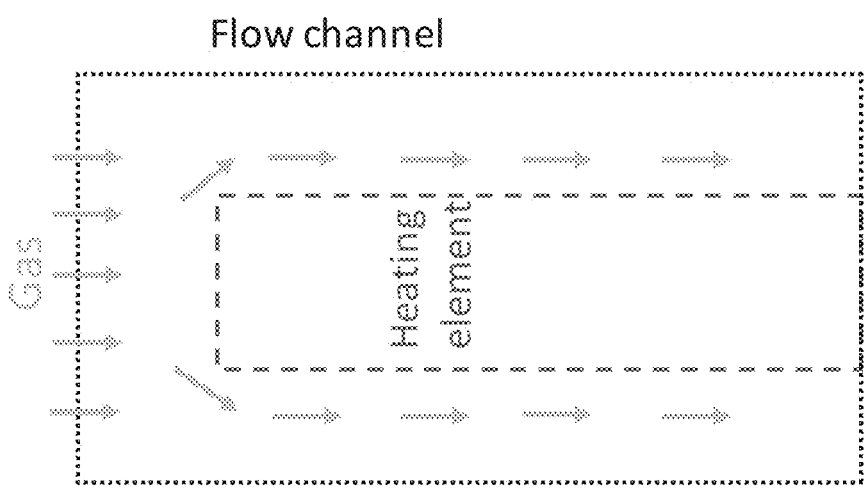
FIG. 60 schematically illustrates a gas flow path in a flow channel of a reactor, in accordance with one or more embodiments of the present disclosure.

FIG. 60 schematically illustrates a gas flow path in a flow channel of a reformer, in accordance with one or more embodiments of the present disclosure. In some cases, ammonia may be directed to flow along the gas flow path within the flow channel. In some cases, the catalysts may be positioned in the flow channel and/or along the gas flow path for the ammonia such that the ammonia comes into contact with the catalysts when the ammonia flows along the gas flow path within the flow channel.

Figure 56:
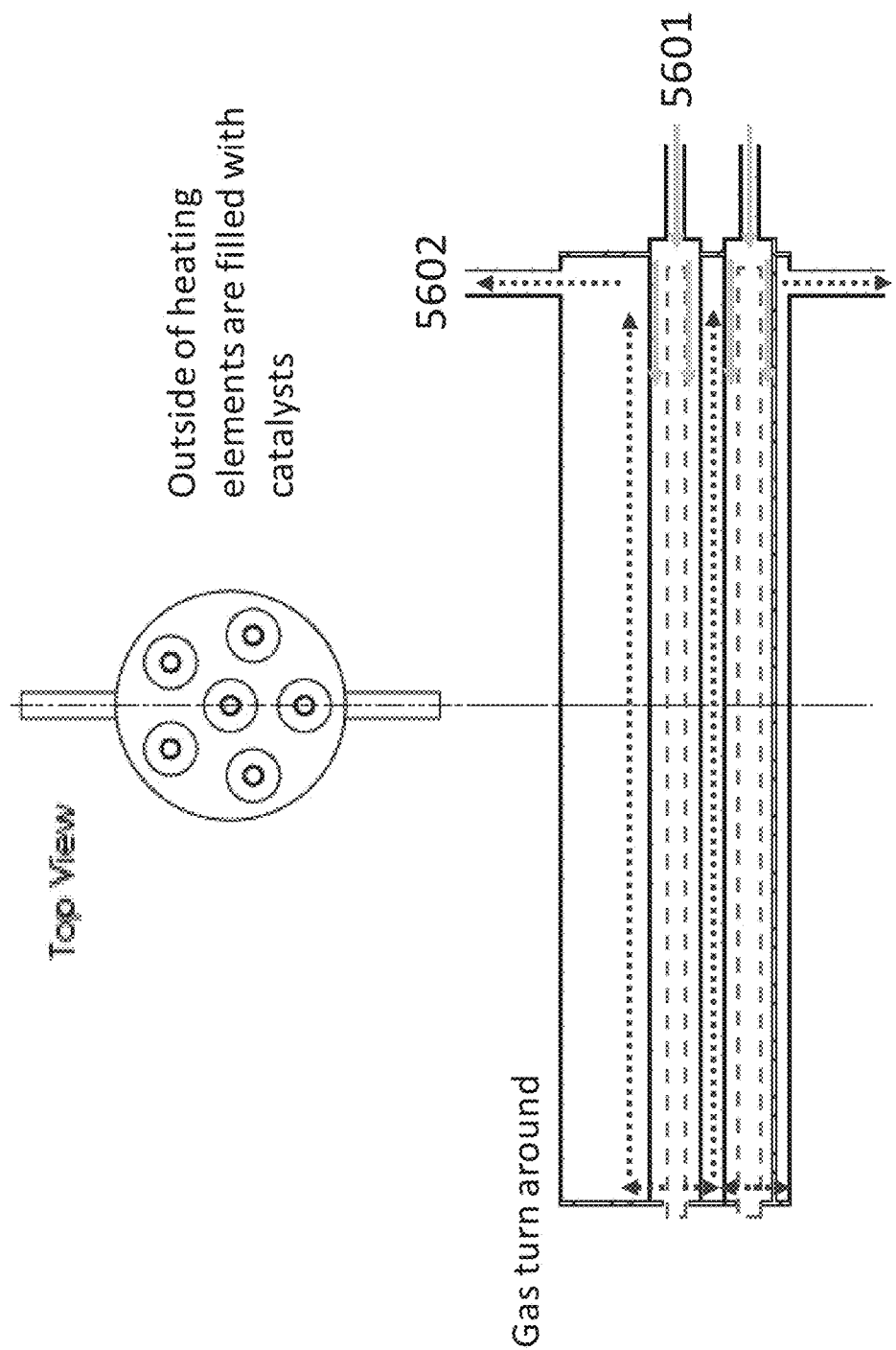
FIG. 56 schematically illustrates a top view and an inside view of a reactor with a circular cross-section, in accordance with one or more embodiments of the present disclosure.
Figure 58A:
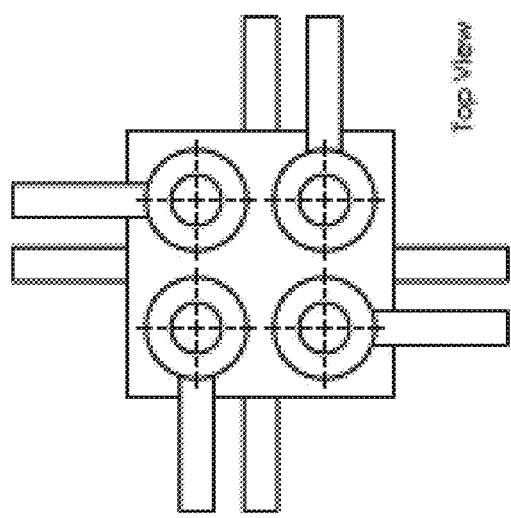
FIGS. 58A and 58B schematically illustrate a top view and an inside view of a reactor with a square cross-section, in accordance with one or more embodiments of the present disclosure.
Figure 58B:
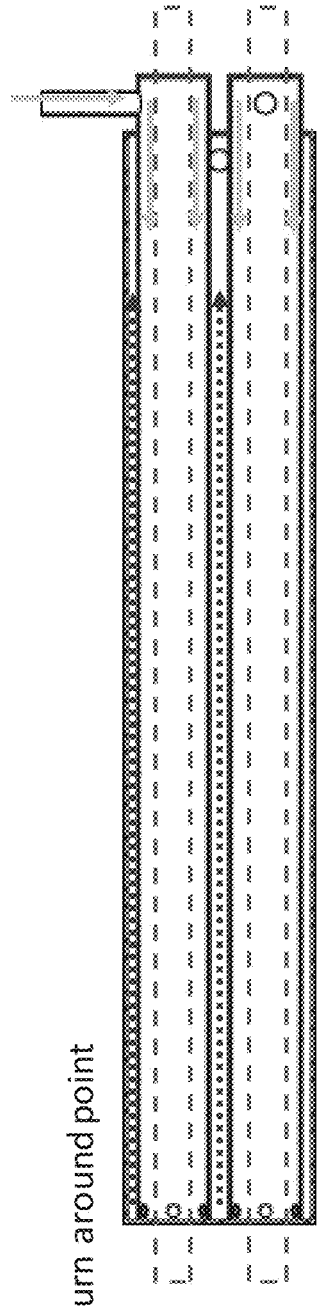

FIGS. 56, 58A, and 58B schematically illustrate a top view and an inside cross-sectional view of a reformer, in accordance with one or more embodiments of the present disclosure. In some cases, catalysts may have ammonia decomposition efficiencies that are dependent on temperature. In some cases, precise control of temperature (both spatially and temporally) may enhance the performance of reactors by providing ideal temperature range(s) for heating catalysts and one or more gases flowing through the reformer as uniformly and as quickly as possible. In some cases, the embedded heating elements described herein may be used to heat the one or more catalysts to one or more ideal temperature range(s). In some cases, the catalysts may be provided outside of the heating elements. In some cases, the catalysts positioned outside of the heating elements may be in thermal communication with the heating elements to enable a transfer of thermal energy between the heating elements and the catalysts. In some cases, extended surfaces may be provided outside of the heating elements to enhance thermal communications between the catalysts and heating elements. In some cases, the one or more gases and/or the catalysts may have relatively low thermal conductivity. In some cases, extended surfaces (e.g., fins and/or baffles) may be provided within flow channels to increase heat transfer. In some cases, the extended surface (e.g., fins and/or baffles) may be provided within outer shell channels to increase heat transfer.

In some cases, the one or more reactors may comprise (i) a first flow path for passage of reforming gases from one or more gas inlets along a portion of the one or more heating elements and (ii) a second flow path for directing reformate gases to one or more gas outlets. In some cases, the reforming gases may comprise ammonia. In some cases, reformate gases may comprise hydrogen and/or nitrogen. In some cases, the first flow path may connect directly to the second flow path to enable a flow of fluids between the first and second flow paths. FIGS. 56, 58A, and 58B schematically illustrates a first flow path (solid arrows, 5601) and a second flow path (dotted arrows, 5602) within reactors having various different cross-sectional shapes or profiles. In some cases, the first flow path may extend from the gas inlets of the reactor along a length of the heating element until a gas turn around point in the reactor, after which the gases flowing along the first flow path may enter the second flow path via the gas turn around point. In some cases, the second flow path may extend back along the length of the heating element towards the gas outlets of the reactor.

In some cases, the first flow path and the second flow path may be oriented in different directions. In some cases, the first flow path and the second flow path may be oriented in opposite directions. In some cases, a portion of the first flow path and a portion the second flow path may be oriented in opposite directions.

In some cases, a reforming gas entering a reactor may have a lower temperature than a reformate gas exiting a reactor. In some cases, the gas entering the reactor may flow along the first flow path and the gas exiting the reactor may flow along the second flow path. As described above, the first flow path and the second flow path may place the gas entering the reactor in thermal communication with the gas exiting the reactor. In some cases, the first flow path or the second flow path, or both flow paths may have heat transfer enhancement mechanisms, such as metallic fins or extended surfaces within the flow channel. By enabling a transfer of thermal energy between the gas entering the reactor and the gas exiting the reactor, the gas entering the reactor may be heated or pre-heated by the gas exiting the reactor, which can facilitate heating and decomposition of the gas entering the reactor. In some cases, one or more heat exchangers or heat recuperating units outside of the one or more reactors may be used to exchange heat between the reactor exit flows and cold incoming flows before entering the reactor.

In some cases, the first flow path and the second flow path may be positioned adjacent to each other to enable a transfer of thermal energy between (i) the one or more reforming gases entering the one or more reactors via the one or more gas inlets and (ii) one or more reformate gases exiting the one or more reactors via the gas outlets. In some cases, each individual heating element of the one or more heating elements may comprise one or more dedicated flow channels. In some cases, the one or more heating elements may each comprise different respective flow channels. In some cases, flow channels may comprise one or more internal heat transfer enhancement mechanisms, such as fins or extended surfaces. In some cases, an outer shell (after gas turn around) in a reactor may serve as a heat exchanging channel between incoming cold gas and outgoing hot reformed gas. In some cases, an outer shell may comprise one or more internal heat transfer enhancement mechanisms, such as fins or extended surfaces.

In some cases, the one or more reactors may comprise one or more enclosed or partially enclosed regions which (i) comprise the one or more flow channels and (ii) surround the one or more heating elements. In some embodiments, the one or more enclosed or partially enclosed regions may allow a passage of the one or more reforming gases around the one or more heating elements to facilitate heat transfer and flow field uniformity between the one or more heating elements and the one or more reforming gases.

In some cases, the one or more heating elements may comprise one or more external surfaces in thermal communication with the fluid flowing along or through the one or more flow channels. In some cases, the one or more catalysts are provided adjacent to and/or in thermal communication with the external surfaces of the one or more heating elements. In some cases, the one or more catalysts may be located or provided within the one or more flow channels. In some cases, the one or more flow channels may comprise a circular cross-section to enable uniform heating of the fluid. In some cases, a volume of the reactor that is external to the embedded heating elements may be filled with the one or more catalyst(s). In some cases, the volume of the reactor that is external to the embedded heating elements may comprise the one or more flow channels.

As described elsewhere herein, in some cases the reactor may comprise a circular cross-section. The circular cross-section may enable uniform heating of the catalysts since the catalysts are provided at a consistent or similar radial distance from the embedded heating units. The circular cross-section may also enable a more uniform temperature and/or flow distribution within the reactor. In some cases, improved spatial uniformity of the temperature and/or flow distribution within the reactor may enable more uniform heating of the catalysts within the reactor such that the catalysts are collectively heated to an ideal temperature range.

In some cases, the cross-sectional size and/or shape of the flow channel around the heating element may be adjusted or optimized to enhance flow uniformity. In some cases, a flow rate through a flow channel may be varied depending on a predetermined heating power input to the designated heating element. In some cases, multiple gas outlets may improve flow uniformity. For example, FIGS. 62A-62D show reactors comprising two or four gas outlets in accordance with one or more embodiments of the present disclosure. In some cases, the four gas outlets are positioned symmetrically such that gas flow out of the reactor is directed to each of the four sides of the reactor. In some cases, multiple gas outlets may be positioned symmetrically. In some cases, multiple gas outlets may have substantially equal cross-sectional areas. In some cases, multiple gas outlets may be positioned on one end of a reactor. In some cases, multiple gas outlets may be positioned on multiple sides of a reactor. In some cases, the flow channels may comprise one or more baffles to induce turbulence, mixing, increase flow residence time, and/or enhance flow uniformity and heat transfer. In some cases, increasing the length of a flow path (e.g., by using baffles) may increase flow residence time and lead to better flow uniformity and heat transfer between (i) the embedded heating elements and (ii) the gases flowing through the reactor or reformer.

Figure 63A:
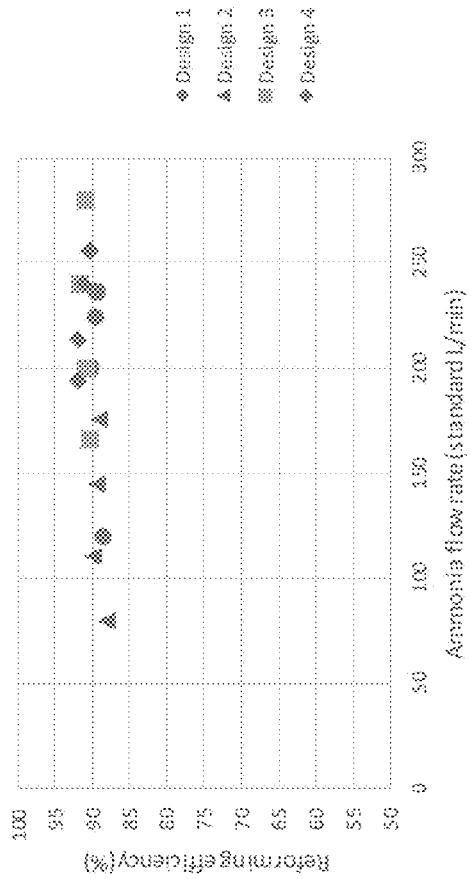
FIGS. 63A and 63B schematically illustrate reactor thermal reforming efficiency and ammonia conversion as a function of ammonia flow rate through a reactor, in accordance with one or more embodiments of the present disclosure.

FIG. 63A shows a plot of thermal reforming efficiencies for the presently disclosed reactor designs as a function of ammonia flow rate. Measurements were taken using electrical joule heating only. Inlet ammonia gas flow was at around 25° C. Incorporating one or more heat exchangers between hot outlet flow (around 400-500° C.) and cold inlet flow (around 25° C.) may significantly increase the thermal reforming efficiency (e.g., 92-95% or greater). Up to about 300 standard liters per minute (LPM) of ammonia flow were tested, where 99% conversion of this flow is hydrogen equivalent to about 40 kW electrical power output from fuel cells. Thus, scaling the reactor design to support 100+kW operations may be possible, for example, with a reactor having a longer length, or larger channel dimensions and heating elements, or more channels and heating elements, or by stacking modular reactors. The reactors may be constructed with great flexibility in the form factor, which may enable the use of multiple modular reactors in a system.

Some designs lacking flow channels were also tested. In some designs lacking flow channels, the efficiency and conversion was outside of the measurement range (i.e., below 80% ammonia conversion). In some designs lacking flow channels, several heating elements were found to be over-heated due to insufficient heat transfer.

In some cases, the reactors disclosed herein may have a thermal reforming efficiency of at least about 90%. In some cases, the reactors disclosed herein may have a thermal reforming efficiency of at least about 50, 60, 70, 80, 90, 91, 92, 93, 94, 95, 96, 97, 98, or 99%. In some cases, the reactors disclosed herein may have a thermal reforming efficiency of at most about 50, 60, 70, 80, 90, 91, 92, 93, 94, 95, 96, 97, 98, 99%, or 100%.

Figure 63B:
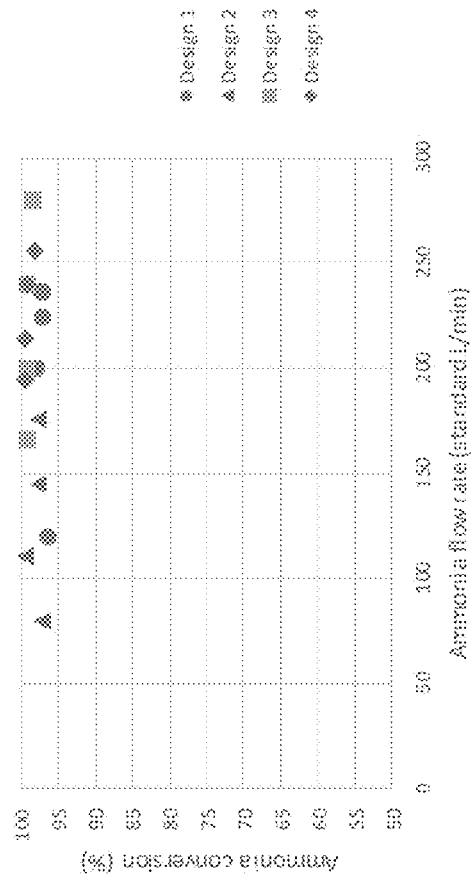

FIG. 63B shows a plot of ammonia conversion efficiency for the presently disclosed reactor designs as a function of ammonia flow rate. In some cases, the reactors may have an ammonia conversion efficiency of at least about 95%. In some cases, the reactors may have an ammonia conversion efficiency of at least about 50, 60, 70, 80, 90, 91, 92, 93, 94, 95, 96, 97, 98, or 99%. In some cases, the reactors may have an ammonia conversion efficiency of at most about 50, 60, 70, 80, 90, 91, 92, 93, 94, 95, 96, 97, 98, 99%, or 100%.

The reactors of the present disclosure may be sized appropriately to generate various levels of power. In some cases, the reactors may be configured to output at least about 25 kilowatts of power. In some cases, a reactor is configured to output at least about 1, 2, 3, 4, 5, 6, 7, 8, 9, 10, 20, 30, 40, 50, 60, 70, 80, 90, 200, 300, 400, or 500 kilowatts of power. In some cases, the reactors may be configured to output at most about 1, 2, 3, 4, 5, 6, 7, 8, 9, 10, 20, 30, 40, 50, 60, 70, 80, 90, 200, 300, 400, or 500 kilowatts of power. In some cases, the reactors may be configured to output at most about 0.1, 1, 2, 3, 4, 5, 6, 7, 8, 9, 10, 20, 30, 40, 50 megawatts of power.

Figures 59A, 59B:
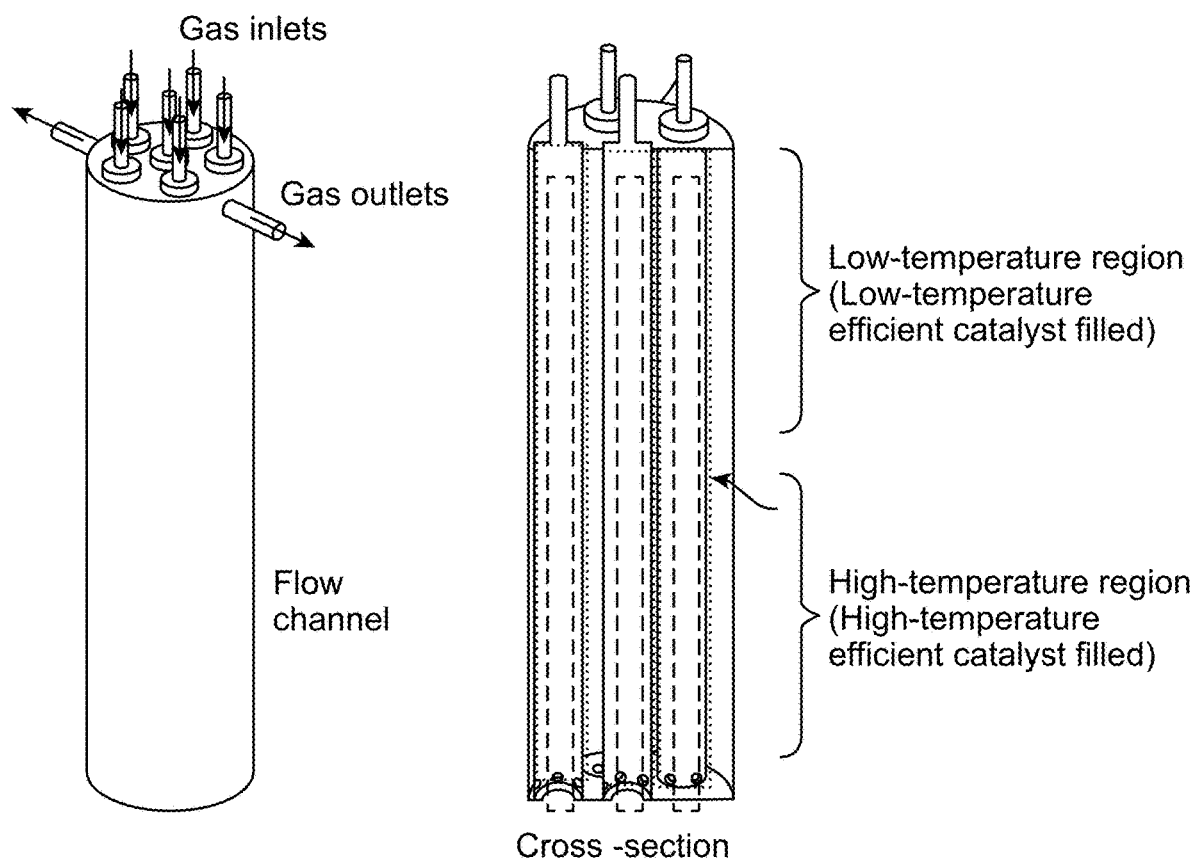
FIGS. 59A and 59B schematically illustrate an outside view and an inside view of a reactor having both high-temperature efficient catalysts and low-temperature efficient catalysts, in accordance with one or more embodiments of the present disclosure.

In some cases, the system may further comprise a plurality of different catalysts for decomposing ammonia. In some cases, the plurality of different catalysts may be in thermal communication with at least one of the one or more heating elements. FIGS. 59A and 59B schematically illustrate an outside view and an inside view of a reactor having two catalysts, in accordance with one or more embodiments of the present disclosure. In some cases, the two catalysts may be provided in two different regions or heating zones (e.g., a low-temperature region and a high-temperature region). In some cases, a first catalyst that is efficient at lower temperatures may be provided in a first region, and a second catalyst that is efficient at higher temperatures may be provided in a second region. In some cases, the first region may be closer to the gas inlets and/or gas outlets of the reactor than the second region. In some cases, one or more reactors with one or more heating elements may be in fluid communication with one or more reactors with more or more heating elements. For example, multiple modular reactors in series or parallel fluid communication may increase overall hydrogen generation output. In some cases, one or more reactors with one or more electrical heating elements may have fluid communications with one or more reactors with more or more combustion heating elements. In some cases, one or more reactors with one or more electrical heating elements may operate at lower temperatures than one or more reactors with one or more combustion heating elements. In this case, exit flows of the electrically heated reactor may enter the combustion heated reactor as inlet flows to further increase ammonia conversion and/or thermal reforming efficiency. In some cases, one or more reactors with one or more combustion heating elements may operate at lower temperatures than one or more reactors with one or more electrical heating elements. In some cases, exit flows of a combustion heated reactor may enter an electrically heated reactor as inlet flows to further increase ammonia conversion and/or thermal reforming efficiency.

In some cases, the plurality of different catalysts may comprise a first catalyst with a first set of ammonia reforming properties and a second catalyst with a second set of ammonia reforming properties. In some cases, the ammonia reforming properties may comprise, for example, thermal reforming efficiency as a function of temperature or thermal reforming efficiency as a function of ammonia conversion. In some cases, the first catalyst and the second catalyst may be in thermal communication with different heating elements, different locations or regions of a same heating element, or different heating zones generated by the one or more heating elements. In some cases, the one or more heating elements may be configured to provide a plurality of heating zones within the reactors. In some cases, the plurality of heating zones may have different temperatures that are predetermined or adjustable.

In some cases, the first catalyst and the second catalyst may have different ideal temperature ranges for decomposing ammonia. In some cases, the first catalyst and the second catalyst may be provided in different regions or heating zones within a reactor, such that the first catalyst and the second catalyst are heated to their corresponding ideal temperature ranges. In some cases, the first catalyst may be heated to a lower temperature range than the second catalyst. In some cases, the first catalyst may be heated to a higher temperature range than the second catalyst. In some cases, the first catalyst and the second catalyst may be in thermal communication with different heating elements, different locations or regions of a same heating element, or different heating zones generated by the one or more heating elements. In some cases, the first catalyst and the second catalyst may be separated into different reactors that are in fluid communication with each other.

In some cases, the one or more heating elements may be configured to (i) control temperatures of different regions of the one or more heating elements or the one or more reactors or (ii) adjust a location of one or more heating zones within the one or more reactors to optimize ammonia thermal reforming efficiency and/or conversion efficiencies.

In some cases, the system may further comprise a controller configured to control a flow of ammonia into the one or more flow channels by modulating one or more flow control units. In some cases, the controller may be configured to control the flow of ammonia based on a heating power input to each of the one or more heating elements. In some cases, the system may further comprise a controller configured to control an operation or a temperature of the one or more heating elements. In some cases, the controller may set or maintain a uniform temperature distribution within a reactor. In some cases, the uniform temperature distribution may correspond to spatial or temporal uniformity of temperature or heating. In some cases, the controller may maintain a uniform flow rate distribution between one or more channels within a reactor.

In some cases, the system may further comprise one or more heat exchanger(s) between a hot outlet flow and a cold inlet flow of the reactors. In some cases, the controller may be configured to run a startup protocol to heat the reactor to a predetermined temperature range within a predetermined amount of time. In some cases, the controller may be operatively coupled to one or more sensors for sensing (i) a temperature of the one or more heating elements or (ii) a flow rate of ammonia or hydrogen/nitrogen mixture into the flow channels or out of the channels or (iii) one or more pressures in various locations of the one or more reactors. In some cases, the controller may be configured to implement one or more control loops, for example, proportional-integral-derivative (PID), a proportional-integral (PI), or a proportional (P) control loop(s) to modulate temperatures. In some cases, controlling the operation of the heating elements may involve controlling a heating power input to the heating elements. In some cases, the one or more flow control units may comprise one or more valves and/or one or more pressure sensors.

Figure 57A:
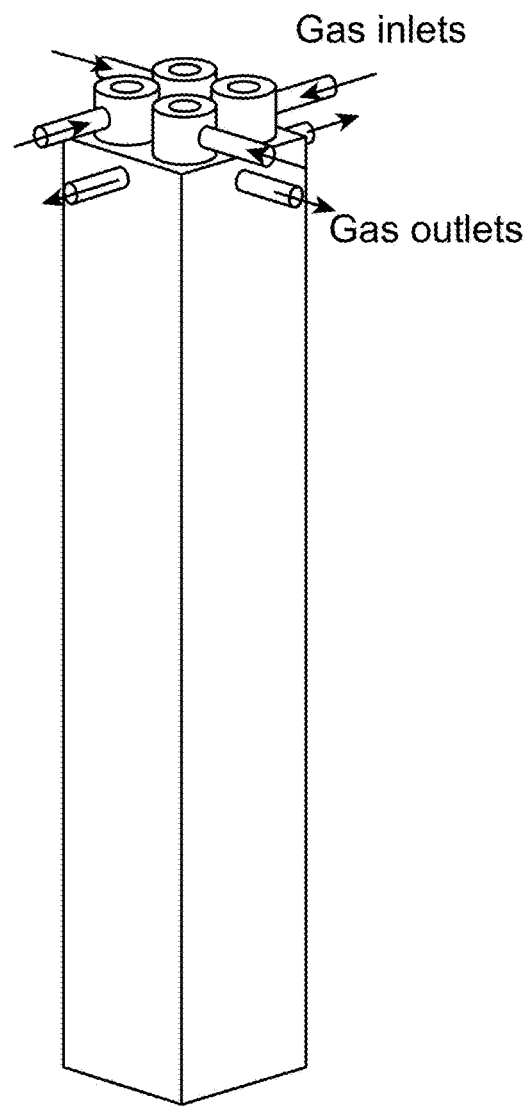
FIGS. 57A and 57B schematically illustrate an outside view and an inside view of a reactor with a square cross-section, in accordance with one or more embodiments of the present disclosure.
Figure 57B:
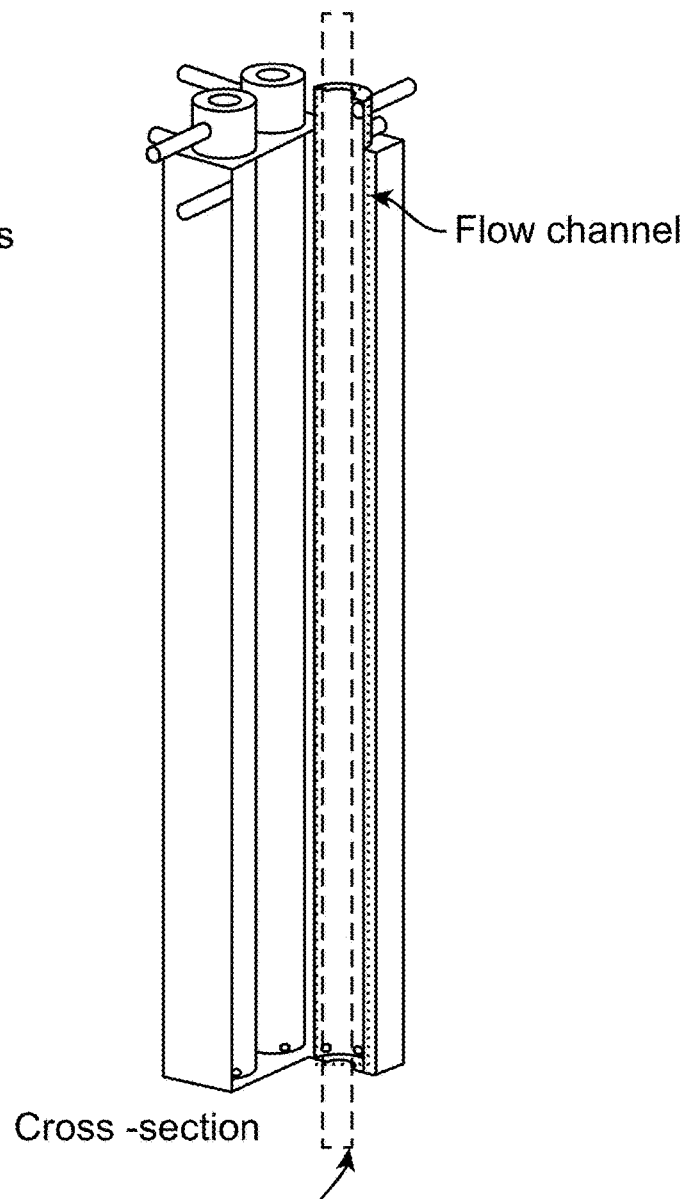
Figure 61:
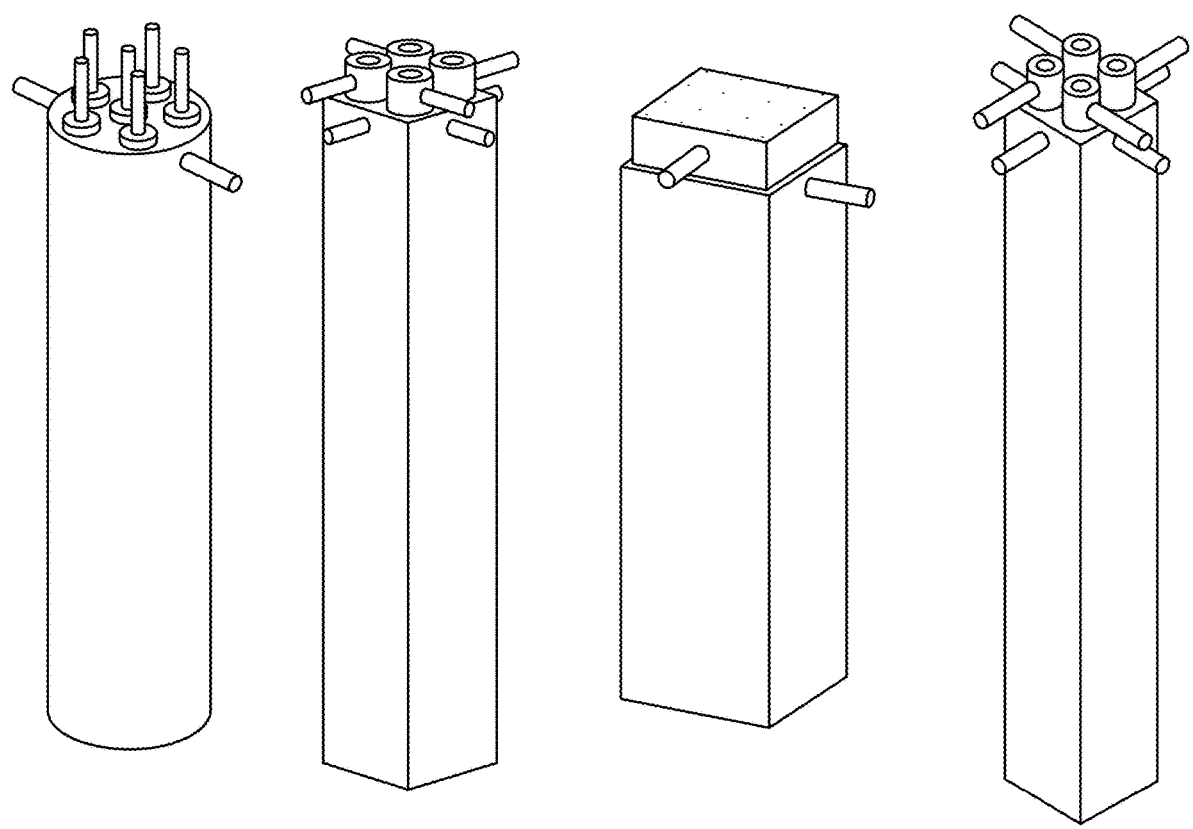
FIG. 61 shows digital renditions of reactors having various shapes and configurations, in accordance with one or more embodiments of the present disclosure.

The reactors disclosed herein may comprise various shapes or sizes. For example, FIGS. 55A and 55B schematically illustrate an outside view and an inside view of a reactor with a circular cross section having a plurality of gas inlets and a plurality of gas outlets. In another example, FIGS. 57A and 57B schematically illustrate an outside view and an inside view of a reactor with a square cross section having a plurality of gas inlets and a plurality of gas outlets. FIG. 61 shows additional non-limiting examples of various reactor configurations. In some cases, the reactor may comprise various other cross-sectional shapes or profiles, including but not limited to, triangular, rectangular, pentagonal, hexagonal, heptagonal, or octagonal shapes or profiles. In some cases, the one or more reactors may comprise a cross-sectional shape comprising a circle, an ellipse, an oval, or any polygon comprising three or more sides. In some cases, the one or more reactors may comprise a cross-sectional shape that is similar to a cross-sectional shape of the flow channels. In some cases, the one or more reactors may comprise a cross-sectional shape that is different than a cross-sectional shape of the flow channels.

In some cases, the cross-sectional shape of the reactor may permit stacking of a plurality of reactors. In some cases, a plurality of reactors may be stacked horizontally (i.e., laying down) or vertically (i.e., standing up). In some cases, a plurality of reactors may be stacked in a rectangular or square grid pattern. In some cases, a plurality of reactors may be stacked in a hexagonal grid pattern (i.e., honeycomb). In some cases, a plurality of reactors may be stacked and connected linearly.

The reactors disclosed herein may comprise any numbers of gas inlets and gas outlets. In some cases, the reactor may comprise one or more gas inlets or gas outlets. In some cases, the reactor may comprise two or more gas inlets or gas outlets. In some cases, the reactor may comprise a single gas inlet and/or a single gas outlet. In some cases, the reactor may comprise a single gas inlet and/or a single gas outlet whereas flow is distributed to one or more flow channels internally. In some cases, the reactor may comprise at least about 1, 2, 3, 4, 5, 6, 7, 8, 9, 10, 20, 30, 40, 50, 60, 70, 80, 90, or 100 gas inlets or gas outlets. In some cases, the reactor may comprise at most about 1, 2, 3, 4, 5, 6, 7, 8, 9, 10, 20, 30, 40, 50, 60, 70, 80, 90, or 100 gas inlets or gas outlets.

In some cases, the one or more gas inlets may be oriented parallel to a lengthwise direction of a reactor. In some cases, the one or more gas inlets may be oriented perpendicular to the lengthwise direction of a reactor. In some cases, the one or more gas outlets may be oriented parallel to a lengthwise direction of a reactor. In some cases, the one or more gas outlets may be oriented perpendicular to the lengthwise direction of a reactor. The gas inlets and/or the gas outlets may be oriented in any direction relative to the reactor.

The reactor may comprise various length to width ratios. FIGS. 62A-62D show examples of reactor designs having different length to width ratios, in accordance with one or more embodiments of the present disclosure. FIG. 62A shows a first design having a square form factor. FIG. 62B shows a second design having a square form factor, but 50% longer in length than the first design. FIG. 62C shows a third design having a square form factor, but 50% larger in flow channel and heater diameters than the first design. FIG. 62D shows a fourth design having a cylindrical form factor, having the same flow channel and heater diameters as the second design. In some cases, the length of the reactor may be at least about 5 times longer than the width or diameter of the reactor. In some cases, the length of the reactor may be at least about 2, 3, 4, 5, 6, 7, 8, 9, or 10 times longer than the width or diameter of the reactor. In some cases, the length of the reactor may be at most about 2, 3, 4, 5, 6, 7, 8, 9, or 10 times longer than the width or diameter of the reactor. In some cases, the length of the reactor may be at most about 10, 20, 30, 40, 50, 60, 70, 80, 90, 100 times longer than the width or diameter of the reactor.

In any of the embodiments described herein, the system or powerpack unit may comprise a pressure swing adsorption (PSA) or a membrane separation unit. The PSA or membrane separation unit may be configured to remove nitrogen from an exit flow of the one or more reactors. The PSA or membrane separation unit may be located or positioned downstream of one or more adsorbents in fluid communication with the one or more reactors. The PSA or membrane separation unit may be located or positioned upstream of one or more fuel cells. In some cases, the PSA or membrane separation unit may be further configured to remove trace ammonia from an exit flow from the one or more adsorbents or the one or more reactors. In some cases, the PSA or membrane separation unit may be configured to process an exit flow from the one or more adsorbents or the one or more reactors to produce a discharge stream comprising nitrogen and hydrogen. In some cases, the discharge stream may be supplied to a combustion heater of the one or more reactors.

In some embodiments, the system or powerpack unit may comprise one or more combustors. In some cases, the one or more combustors may consume about 15 to 50 percent of the total hydrogen produced from ammonia reforming as a combustion fuel. In some cases, the one or more combustors may consume about 30 to 40 percent of the total hydrogen produced from ammonia reforming as a combustion fuel. In some cases, the one or more combustors may consume about 25 to 45 percent of the total hydrogen produced from ammonia reforming as a combustion fuel. In some cases, the one or more combustors may consume less than about 30 percent of the total hydrogen produced from ammonia reforming as a combustion fuel. In some cases, the one or more combustors may consume less than about 25 percent of the total hydrogen produced from ammonia reforming as a combustion fuel. In some cases, the one or more combustors may consume less than about 80, 70, 60, 50, 40, 30, 20, or 10 percent of the total hydrogen produced from ammonia reforming as a combustion fuel. In some cases, the one or more combustors may consume more than about 80, 70, 60, 50, 40, 30, 20, or 0 percent of the total hydrogen produced from ammonia reforming as a combustion fuel.

In one or more of the embodiments described herein, one or more electrical heaters at least partially embedded in one or more reactors may provide heating only during a startup operation. In some cases, the one or more electrical heaters turns on and off intermittently during operation, either by automatically turning the electrical heater on and off (e.g., based on a temperature measured in a reactor and/or heater) or by manually turning the electrical heater on and off (e.g., based on a user input to an input device, such as a button, switch, knob, mouse, keyboard, etc.). In some cases, the one or more electrical heaters provide about 30% to 50% of the total heating power requirement during operation. In some cases, the one or more electrical heaters provide about 15% to 40% of the total heating power requirement during operation. In some cases, the one or more electrical heaters provide less than 15% of the total heating power requirement during operation. In some cases, the one or more electrical heaters provide about 50% to 70% of the total heating power requirement during operation. In some cases, the one or more electrical heaters provide at least 70% of the total heating power requirement intermittently. In some cases, the one or more electrical heaters provide about 100% of the total heating power requirement intermittently. In some cases, the total heating power requirement is based on sum of Joule heating and combustion energy input to maintain auto-thermal reforming.

In any of the embodiments described herein, the system or powerpack unit may output an ammonia lower heating value to useful electricity conversion efficiency of about 20 to 60%. In some cases, the system or powerpack unit may output an ammonia lower heating value to useful electricity conversion efficiency of about 30 to 50%. In some cases, the system or powerpack unit may output an ammonia lower heating value to useful electricity conversion efficiency of about 35 to 45%. In some cases, the system or powerpack unit may output an ammonia lower heating value to useful electricity conversion efficiency of greater than about 35%.

In any of the embodiments described herein, one or more combustion heaters at least partially embedded in one or more reactors may have pressure drops of combustion fuel and air flows across the one or more combustion heaters of less than 5 bar. In some cases, one or more combustion heaters may have pressure drops of combustion fuel and air flows across the one or more combustion heaters of less than 2 bar. In some cases, one or more combustion heaters may have pressure drops of combustion fuel and air flows across the one or more combustion heaters of less than 1 bar. In some cases, one or more combustion heaters may have pressure drops of combustion fuel and air flows across the one or more combustion heaters of less than 0.5 bar.

In any of the embodiments described herein, the system or powerpack unit may be utilized for stationary applications and/or mobile applications. Stationary applications may involve the generation of electricity or hydrogen for non-mobility applications or platforms (e.g., to supply power and/or hydrogen to a network or a grid). Mobile applications involve the generation of electricity and/or hydrogen for mobile applications or platforms (e.g., vehicles or other movable platforms).

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An ammonia reforming system comprising:
    a first reformer configured to reform ammonia and generate a reformate stream comprising hydrogen, nitrogen, and residual ammonia, wherein the first reformer comprises a first inlet and a first outlet, wherein the first reformer comprises a first catalyst and electrodes that heat the first catalyst;
    a second reformer configured to reform the residual ammonia in the reformate stream, wherein the second reformer comprises a second inlet and a second outlet, wherein the second reformer comprises a second catalyst;
    a combustion heater configured to combust at least part of the reformate stream to heat the second reformer, wherein the second reformer at least partially surrounds the combustion heater, wherein the combustion heater comprises a combustion region and a plurality of holes along a length of the combustion heater, wherein each of the plurality of holes is configured to inject a mixture of air and fuel into the combustion region; and
    a conduit configured to heat the ammonia, wherein the conduit is concentric with the second reformer and at least partially surrounded by the combustion heater, and wherein the conduit comprises a third inlet and a third outlet;
    wherein the third inlet is in fluid communication with an ammonia storage tank;
    wherein the first inlet is in fluid communication with the third outlet;
    wherein the second inlet is in fluid communication with the first outlet.

2. The ammonia reforming system of claim 1, further comprising at least one fuel cell configured to process a first fraction of the hydrogen to generate electricity.

3. The ammonia reforming system of claim 2, wherein an exit flow of the at least one fuel cell comprises a second fraction of the hydrogen.

4. The ammonia reforming system of claim 3, wherein the combustion heater is configured to combust at least part of the second fraction of the hydrogen to heat the second reformer.

5. The ammonia reforming system of claim 2, wherein the at least one fuel cell comprises a proton-exchange membrane fuel cell (PEMFC) or a solid oxide fuel cell (SOFC).

6. The ammonia reforming system of claim 1, further comprising at least one internal combustion engine.

7. The ammonia reforming system of claim 6, wherein the at least one internal combustion engine is configured to combust a first fraction of the hydrogen.

8. The ammonia reforming system of claim 7, wherein the at least one internal combustion engine is configured to combust the first fraction of the hydrogen with natural gas.

9. The ammonia reforming system of claim 1, further comprising an air supply unit configured to supply at least oxygen to the combustion heater.

10. The ammonia reforming system of claim 9, wherein the air supply unit comprises a fan, a blower, or a compressor.

11. The ammonia reforming system of claim 1, wherein the electrodes comprise electrically conductive springs.

12. The ammonia reforming system of claim 11, wherein the electrically conductive springs comprise copper.

13. The ammonia reforming system of claim 1, wherein the first catalyst and the second catalyst comprise ruthenium and at least one material selected from the group consisting of $ZrO_2$, $Al_2O_3$, $CeO_2$, $La_2O_3$, $MgO$, $MgAl_2O_4$, $SiO_2$, $Y_2O_3$, $TiO_2$, and SiC.

14. The ammonia reforming system of claim 13, wherein the first catalyst and the second catalyst are the same catalyst.

15. The ammonia reforming system of claim 1, wherein the combustion heater further comprises at least one pre-mixing zone upstream of the combustion region.

16. The ammonia reforming system of claim 1, wherein the combustion heater is concentric with the second reformer.

17. The ammonia reforming system of claim 1, wherein the second outlet is in fluid communication with the first inlet.

18. The ammonia reforming system of claim 1, further comprising a hydrogen permeable separation membrane.

19. The ammonia reforming system of claim 1, wherein the ammonia reforming system is a mobile system that has a volume of at most about 10 cubic meters ($m^3$).

20. The ammonia reforming system of claim 1, further comprising one or more adsorption towers configured to remove at least part of the nitrogen or at least part of the residual ammonia from the reformate stream.

* * * * *